United States Patent
Lu

(10) Patent No.: US 10,116,195 B2
(45) Date of Patent: Oct. 30, 2018

(54) DISPLACEMENT DEVICES AND METHODS FOR FABRICATION, USE AND CONTROL OF SAME

(71) Applicant: The University of British Columbia, Vancouver (CA)

(72) Inventor: Xiaodong Lu, Vancouver (CA)

(73) Assignee: The University of British Columbia, Vancouver, British Columbia (CA)

( * ) Notice: Subject to any disclaimer, the term of this patent is extended or adjusted under 35 U.S.C. 154(b) by 0 days.

(21) Appl. No.: 15/365,767

(22) Filed: Nov. 30, 2016

(65) Prior Publication Data

US 2017/0179805 A1 Jun. 22, 2017

Related U.S. Application Data

(63) Continuation of application No. PCT/CA2015/050157, filed on Mar. 2, 2015.
(Continued)

(51) Int. Cl.
*H02K 41/02* (2006.01)
*H02K 41/03* (2006.01)
*H02N 15/00* (2006.01)
*H02P 8/00* (2006.01)
*H02P 25/06* (2016.01)

(52) U.S. Cl.
CPC .......... *H02K 41/031* (2013.01); *H02K 41/02* (2013.01); *H02K 41/03* (2013.01); *H02N 15/00* (2013.01); *H02P 8/00* (2013.01); *H02P 25/06* (2013.01)

(58) Field of Classification Search
CPC .. H02K 41/03; H02K 2201/18; H02K 41/031; H02K 41/02
(Continued)

(56) References Cited

U.S. PATENT DOCUMENTS

| 3,376,578 A | 4/1968 | Sawyer |
| 3,894,276 A | 7/1975 | Janssen |

(Continued)

FOREIGN PATENT DOCUMENTS

| CN | 201956875 U | 8/2011 |
| EP | 1357434 | 10/2003 |

(Continued)

OTHER PUBLICATIONS

Cho et al., "Magnetic Field Analysis of 2-D Permanent Magnet Array for Planar Motor", IEEE Tran. On Magnetics, 2001, vol. 37 No. 5, pp. 3762-3766.
(Continued)

*Primary Examiner* — Thanh Lam
(74) *Attorney, Agent, or Firm* — Todd A. Rattray; Oyen Wiggs Green & Mutala LLP

(57) ABSTRACT

A displacement device comprise a stator having a plurality of electrically conductive coils shaped to provide: a first plurality of coil traces generally elongated in a stator-x direction and distributed over at least a first portion of a first layer; a second plurality of coil traces generally elongated in a stator-y direction and distributed over at least a second portion of a second layer. The first and second portions of the first and second layers overlapping one another in a stator-z direction. The displacement device also comprises a moveable stage having one or more magnet arrays. The moveable stage is moveable relative to the stator within a two-dimensional working region. The one or more magnet arrays include a first magnet array comprising a plurality of first magnetization segments, each having a corresponding first magnetization direction. The displacement device comprises one or more amplifiers connected to drive a plurality of currents in the plurality of electrically conductive coils; and a controller configured to control the currents driven by the
(Continued)

one or more amplifiers and to thereby cause the moveable stage to track a desired position, $(x_r, y_r)$, within the working region.

20 Claims, 50 Drawing Sheets

Related U.S. Application Data

(60) Provisional application No. 62/004,907, filed on May 30, 2014.

(58) Field of Classification Search
USPC .............................. 310/12.05, 12.19, 12.21
See application file for complete search history.

(56) References Cited

U.S. PATENT DOCUMENTS

| | | | |
|---|---|---|---|
| 4,535,278 A | 8/1985 | Asakawa | |
| 4,654,571 A | 3/1987 | Hinds | |
| 4,835,424 A | 5/1989 | Hoffman et al. | |
| 5,196,745 A | 3/1993 | Trumper | |
| 5,334,892 A | 8/1994 | Chitayat | |
| 5,925,956 A | 7/1999 | Ohzeki | |
| 6,003,230 A | 12/1999 | Trumper et al. | |
| 6,005,309 A | 12/1999 | Chitayat | |
| 6,069,418 A | 5/2000 | Tanaka | |
| 6,072,251 A | 6/2000 | Markle | |
| 6,097,114 A | 8/2000 | Hazelton | |
| 6,144,119 A | 11/2000 | Hazelton | |
| 6,208,045 B1 | 3/2001 | Hazelton et al. | |
| 6,252,234 B1 | 6/2001 | Hazelton et al. | |
| 6,304,320 B1 | 10/2001 | Tanaka et al. | |
| 6,339,266 B1 | 1/2002 | Tanaka | |
| 6,437,463 B1 | 8/2002 | Hazelton et al. | |
| 6,441,514 B1 | 8/2002 | Markle | |
| 6,445,093 B1 | 9/2002 | Binnard | |
| 6,452,292 B1 | 9/2002 | Binnard | |
| 6,495,934 B1 | 12/2002 | Hayashi et al. | |
| 6,531,793 B1* | 3/2003 | Frissen | G03F 7/70758 310/12.06 |
| 6,590,355 B1 | 7/2003 | Kikuchi et al. | |
| 6,650,079 B2 | 11/2003 | Binnard | |
| 6,710,495 B2 | 3/2004 | Lipo et al. | |
| 6,720,680 B1 | 4/2004 | Tanaka | |
| 6,777,896 B2 | 8/2004 | Teng | |
| 6,835,941 B1 | 12/2004 | Tanaka | |
| 6,847,134 B2 | 1/2005 | Frissen et al. | |
| 6,879,063 B2 | 4/2005 | Frissen et al. | |
| 6,885,430 B2 | 4/2005 | Tanaka et al. | |
| 6,949,844 B2 | 9/2005 | Cahill et al. | |
| 6,987,335 B2 | 1/2006 | Korenaga | |
| 7,057,370 B2 | 6/2006 | Touzov | |
| 7,075,198 B2 | 7/2006 | Korenaga | |
| 7,084,534 B2 | 8/2006 | Ohishi | |
| 7,199,493 B2 | 4/2007 | Ohishi | |
| 7,224,252 B2 | 5/2007 | Meadow, Jr. et al. | |
| 7,227,284 B2 | 6/2007 | Korenaga | |
| 7,436,135 B2 | 10/2008 | Miyakawa | |
| 7,550,890 B2 | 6/2009 | Kloeppel et al. | |
| 7,696,653 B2 | 4/2010 | Tanaka | |
| 7,808,133 B1 | 10/2010 | Widdowson et al. | |
| 7,948,122 B2 | 5/2011 | Compter et al. | |
| 8,031,328 B2 | 10/2011 | Asano et al. | |
| 8,046,904 B2 | 11/2011 | Kloeppel et al. | |
| 8,129,984 B2 | 3/2012 | Hosek et al. | |
| 8,384,317 B2 | 2/2013 | Shikayama et al. | |
| 8,593,016 B2 | 11/2013 | Pelrine et al. | |
| 8,686,602 B2 | 4/2014 | Pelrine et al. | |
| 8,736,133 B1 | 5/2014 | Smith et al. | |
| 9,202,719 B2 | 12/2015 | Lu et al. | |
| 9,685,849 B2 | 6/2017 | Lu et al. | |
| 2002/0149270 A1 | 10/2002 | Hazelton | |
| 2002/0149271 A1 | 10/2002 | Bartolotti | |
| 2002/0180395 A1 | 12/2002 | Binnard | |
| 2003/0085627 A1 | 5/2003 | Lipo et al. | |
| 2004/0007920 A1 | 1/2004 | Teng | |
| 2004/0140780 A1 | 7/2004 | Cahill et al. | |
| 2005/0001579 A1 | 1/2005 | Touzov | |
| 2005/0090902 A1 | 4/2005 | Masini | |
| 2005/0093378 A1 | 5/2005 | Ohishi | |
| 2005/0194843 A1* | 9/2005 | Korenaga | G03F 7/70758 310/12.05 |
| 2005/0194918 A1 | 9/2005 | Takeuchi | |
| 2006/0175993 A1 | 8/2006 | Shibata et al. | |
| 2006/0214518 A1 | 9/2006 | Ohishi | |
| 2007/0035267 A1 | 2/2007 | Gao et al. | |
| 2007/0046127 A1 | 3/2007 | Kloeppel et al. | |
| 2007/0046221 A1* | 3/2007 | Miyakawa | H01L 21/682 318/135 |
| 2007/0145831 A1 | 6/2007 | Antonius Theodorus Dams | |
| 2008/0203828 A1 | 8/2008 | Cornelis et al. | |
| 2008/0285005 A1 | 11/2008 | Gery et al. | |
| 2008/0290741 A1 | 11/2008 | Cardon et al. | |
| 2009/0058199 A1 | 3/2009 | Ito | |
| 2009/0195195 A1 | 8/2009 | Huang | |
| 2009/0251678 A1 | 10/2009 | Ohishi | |
| 2009/0315413 A1 | 12/2009 | Iwatani et al. | |
| 2010/0090545 A1 | 4/2010 | Binnard et al. | |
| 2010/0167556 A1* | 7/2010 | Totsu | H02K 41/03 438/795 |
| 2010/0238425 A1 | 9/2010 | Binnard | |
| 2011/0050007 A1 | 3/2011 | Kubo | |
| 2011/0062901 A1 | 3/2011 | Busch | |
| 2011/0101896 A1 | 5/2011 | Shikayama et al. | |
| 2012/0113405 A1 | 5/2012 | Yang et al. | |
| 2012/0127447 A1 | 5/2012 | Yang et al. | |
| 2012/0139455 A1 | 6/2012 | Tojo et al. | |
| 2012/0300186 A1 | 11/2012 | Butler et al. | |
| 2013/0164687 A1* | 6/2013 | Binnard | H02K 41/031 430/322 |
| 2013/0241575 A1 | 9/2013 | Finkler | |
| 2014/0285122 A1 | 9/2014 | Lu et al. | |
| 2015/0097498 A1 | 4/2015 | Hemati et al. | |
| 2015/0137624 A1* | 5/2015 | Wu | H02K 41/031 310/12.05 |
| 2015/0338750 A1* | 11/2015 | Yang | G03F 7/70758 355/72 |
| 2016/0065043 A1 | 3/2016 | Lu et al. | |

FOREIGN PATENT DOCUMENTS

| | | |
|---|---|---|
| JP | 08006642 A | 1/1996 |
| JP | 2002112526 | 4/2002 |
| JP | 2003209963 | 7/2003 |
| JP | 2004047981 | 2/2004 |
| JP | 2004254489 | 9/2004 |
| TW | 201330485 | 7/2013 |
| WO | 2001018944 | 3/2001 |
| WO | 20050909202 | 9/2005 |
| WO | 2013059934 | 5/2013 |
| WO | 2015017933 | 2/2015 |
| WO | 2015179962 | 12/2015 |
| WO | 2015184553 | 12/2015 |
| WO | 2015188281 | 12/2015 |
| WO | 2016012157 | 1/2016 |
| WO | 2016012158 | 1/2016 |
| WO | 2016012159 | 1/2016 |
| WO | 2016012160 | 1/2016 |
| WO | 2016012171 | 1/2016 |
| WO | 2016091441 | 6/2016 |

OTHER PUBLICATIONS

Filho, A.F.F., "Investigation of the Forces Produced by a New Electromagnetic Planar Actuator", Electric Machines and Drives Conference, IEMDC 2001. IEEE International, pp. 8-13.
Filho, A.F., "Analysis of a DC XY-Actuator", XIX International Conference on Electrical Machines—ICEM 2010, Rome.

(56) References Cited

OTHER PUBLICATIONS

Filho, A.F., "Development of a novel planar actuator", Ninth International Conference on Electrical Machines and Drives, Conference Publication No. 468, 1999.

Fujii et al., "X-Y Linear Synchronous Motors Without Force Ripple and Core Loss for Precision Two-Dimensional Drives", IEEE Transactions on Magnetics, vol. 38, No. 5, Sep. 2002.

Buckley et al., "Step-and-scan lithography using reduction optics", J. Vae. Sci. Technol. B 7 (6), Nov./Dec. 1989.

Hesse et al., "Interferometric Controlled Planar Nanopositioning System With 100 MM Circular Travel Range", ASPE 2011 Annual Meeting, Denver, CO.

Tomita et al., "Study on a surface-motor driven precise positioning system", Journal of Dynamic Systems, Measurement, and Control Sep. 1995, vol. 117/311-319.

Ueda et al., "A planar actuator with a small mover traveling over large yaw and translational dispalcements", IEEE Transactions on Magnetics, vol. 44, No. 5, May 2008.

Kajiyama et al., "Development of ironless type surface motor", XIX International Conference on Electrical Machines—ICEM 2010, Rome.

Shinno et al., "A Newly Developed Linear Motor-Driven Aerostatic X-Y Planar Motion Table System for Nano-Machining", Annals of the CIRP, 2007, 56/1:369-372.

Gao et al., "A surface motor-driven planar motion stage integrated with an XYθZ surface encoder for precision positioning", Precision Engineering, 2004, 28/3:329-337.

In et al., "Design of a planar-type high speed parallel mechanism positioning platform with the capability of 180 degrees orientation", Annals of the CIRP, 2008, 57/1:421-424.

Lee et al., "Dynamic Modeling and Control of a Ball-Joint-Like Variable-Reluctance Spherical Motor", Journal of Dynamic Systems, Measurement, and Control, 1996, 118/1:29-40.

Weck et al., "Design of a Spherical Motor with Three Degrees of Freedom", Annals of the CIRP, 2000, 49/1:289-294.

Hollis et al., "A six-degree-of-freedom magnetically levitated variable compliance fine-motion wrist: Design, modeling, control", IEEE Trans. Robot. Automat, 1991, 7/3:320-332.

Verma et al., "Six-axis nanopositioning device with precision magnetic levitation technology", IEEE Tran. on Mechatronics, 2004, 9/2:384-391.

Kim et al., "High-precision magnetic levitation stage for photolithography", Precision Engineering, 1998, 22/2:66-77.

Holmes et al., "The Long-Range Scanning Stage: a Novel Platform for Scanned-Probe Microscopy", Precision Engineering, 2000, 24/3:191-209.

Etxaniz et al., "Magnetic Levitated 2D Fast Drive", IEEJ Transactions on Industry Applications, 2006, 126/12:1678-1681.

Compter, J., "Electro-dynamic planar motor", Precision Engineering, 2003, 28/2: 171-180.

Jansen et al., "Modeling of magnetically levitated planar actuators with moving magnets", IEEE Tran. Magnetic, 2007, 43/1:15-25.

Trumper et al., "Magnet arrays for synchronous machines", IEEE Industry Applications Society Annual Meeting, 1993, 1:9-18.

Jansen et al., "Magnetically Levitated Planar Actuator with Moving Magnets", IEEE Tran. Ind. App.,vol. 44, No. 4, 2008.

Kim, W.J., "High-Precision Planar Magnetic Levitation", Massachusetts Institute of Technology, Jun. 1997.

Jansen, J.W., "Magnetically levitated planar actuator with moving magnets: Electromechanical analysisTo and Design", IOP-EMVT, SenterNovem, an agency of the Dutch Ministry of Economic Affairs, 2007.

Khan et al., "A Long Stroke Electromagnetic XY Positioning Stage for Micro Applications", IEEE/ASME Transactions on Mechatronics, vol. 17, No. 5, Oct. 2012, pp. 866-875.

\* cited by examiner

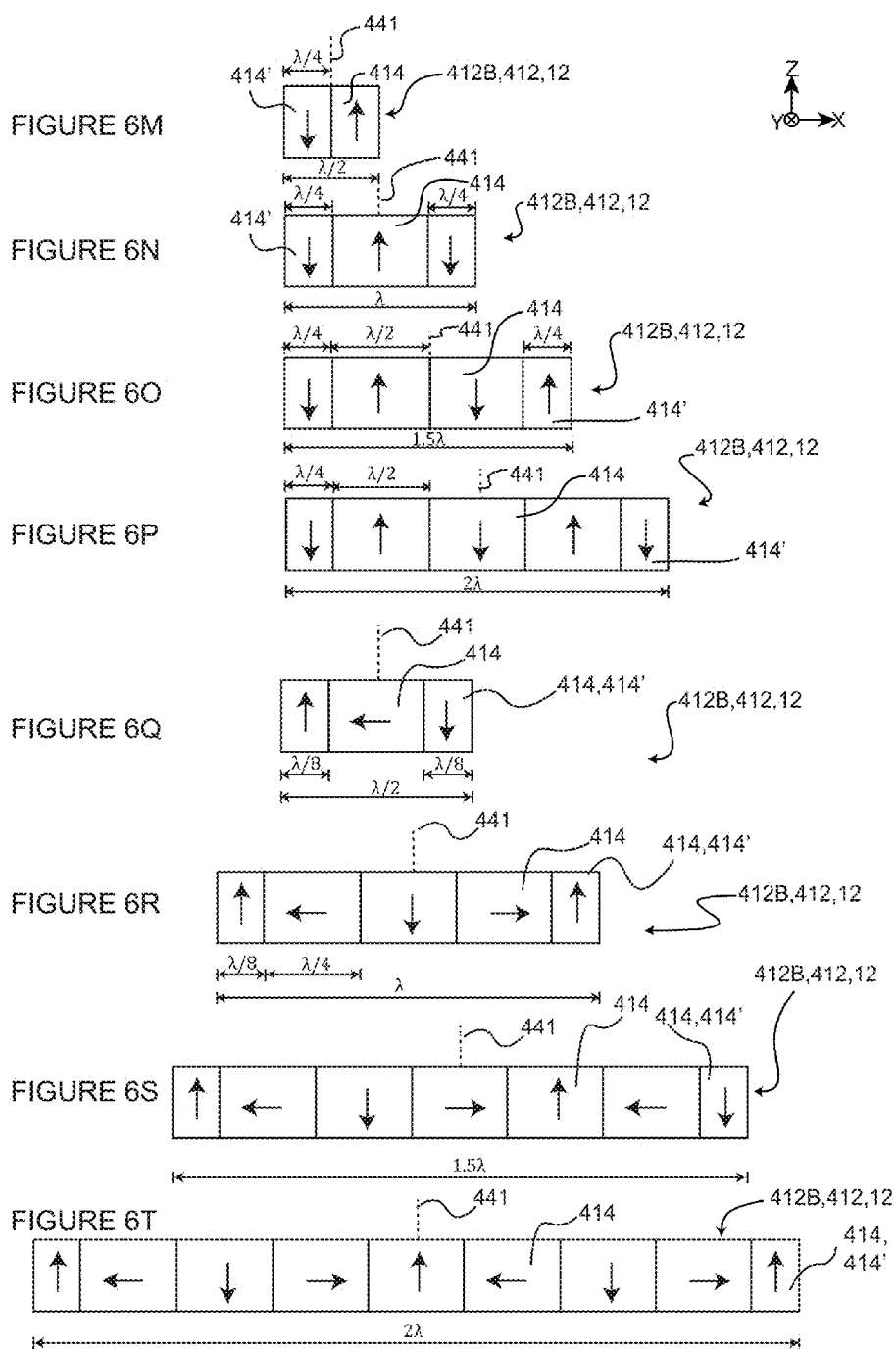

734−
driven by Y-trace current traveling with Xr−dr

734+
driven by Y-trace current traveling with Xr+dr

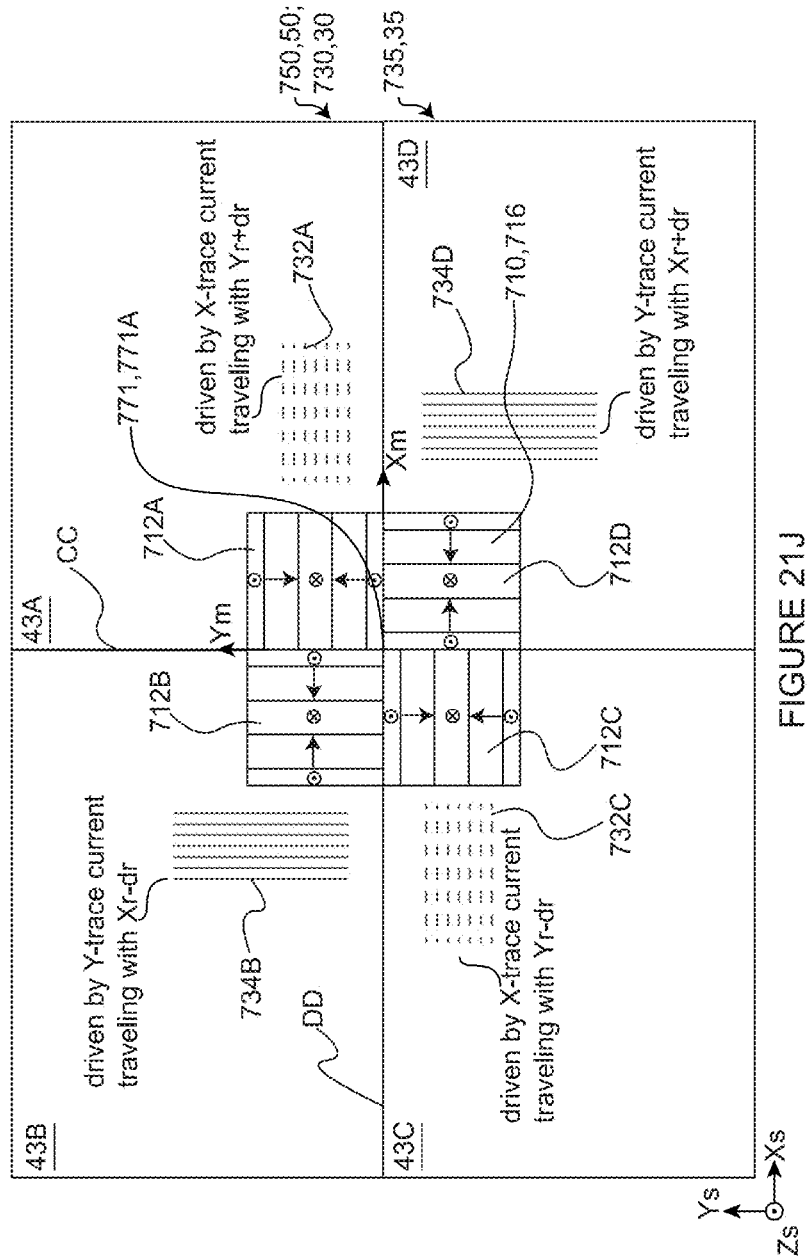

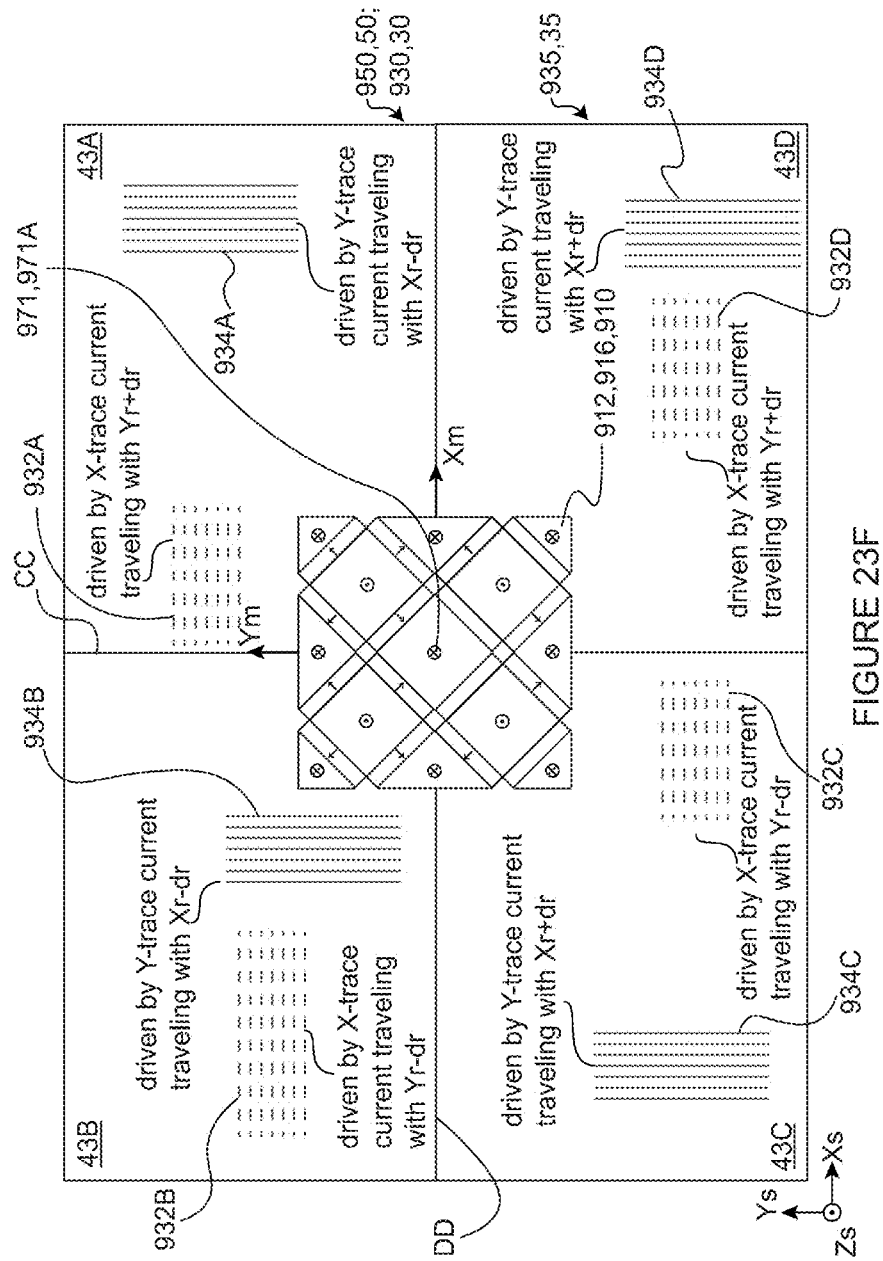

DISPLACEMENT DEVICES AND METHODS FOR FABRICATION, USE AND CONTROL OF SAME

RELATED APPLICATIONS

This application is a continuation of PCT international application No. PCT/CA2015/050157 having an international filing date of 2 Mar. 2015, which in turn claims the benefit under 35 USC 119(e) of, and the priority of, U.S. application No. 62/004,907 filed 30 May 2014. PCT application No. PCT/CA2015/050157 and U.S. application No. 62/004,907 are hereby incorporated herein by reference

TECHNICAL FIELD

The invention relates to displacement devices. Particular non-limiting embodiments provide displacement devices for use in the semi-conductor fabrication industry and for use in sample transfer for automated in-vitro diagnostics.

BACKGROUND

Displacement devices typically comprise moveable stages which move relative to a stator and/or relative to an environment in which they are located. Displacement devices are widely used in various manufacturing, inspection, sample/part transfer, and assembly processes. A common solution currently in use achieves XY (i.e. planar) motion of the moveable stage using a toothed belt/chain transfer system. Another common solution currently in uses achieves XY motion of the moveable stage by stacking two linearly moveable stages (i.e. an X-stage and a Y-stage) together via connecting bearings.

Some generally more desirable solutions involve having one or more moveable stages capable of XY (i.e. planar) motion and, where a displacement device comprises more than one moveable stage, allowing more than one of such moveable stages to share a common working region and/or a common stator. It might be desirable for such a moveable stage to be able to provide two-dimensional programmable motion. Attempts have been made to design such displacement devices using the interaction between current-carrying coils and permanent magnets. Examples of efforts in this regard include the following: U.S. Pat. No. 6,003,230; U.S. Pat. No. 6,097,114; U.S. Pat. No. 6,208,045; U.S. Pat. No. 6,441,514; U.S. Pat. No. 6,847,134; U.S. Pat. No. 6,987,335; U.S. Pat. No. 7,436,135; U.S. Pat. No. 7,948,122; U.S. Pat. No. 8,593,016; U.S. Pat. No. 8,686,602; US patent publication No. 2008/0203828; W. J. Kim and D. L. Trumper, High-precision magnetic levitation stage for photolithography. *Precision Eng.* 22 2 (1998), pp. 66-77; D. L. Trumper, et al, "Magnet arrays for synchronous machines", IEEE Industry Applications Society Annual Meeting, vol. 1, pp. 9-18, 1993; and J. W. Jansen, C. M. M. van Lierop, E. A. Lomonova, A. J. A. Vandenput, "Magnetically Levitated Planar Actuator with Moving Magnets", IEEE Tran. Ind. App., Vol 44, No 4, 2008.

There is a general desire to provide displacement devices having characteristics that improve upon those known in the prior art.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 23B-23F illustrate possible coil traces and corresponding current phases $i_{kx}$, $i_{jy}$ driven therein to operate the FIG. 23A magnet array assembly to achieve controllable rotation.

DESCRIPTION

Figure 1A:
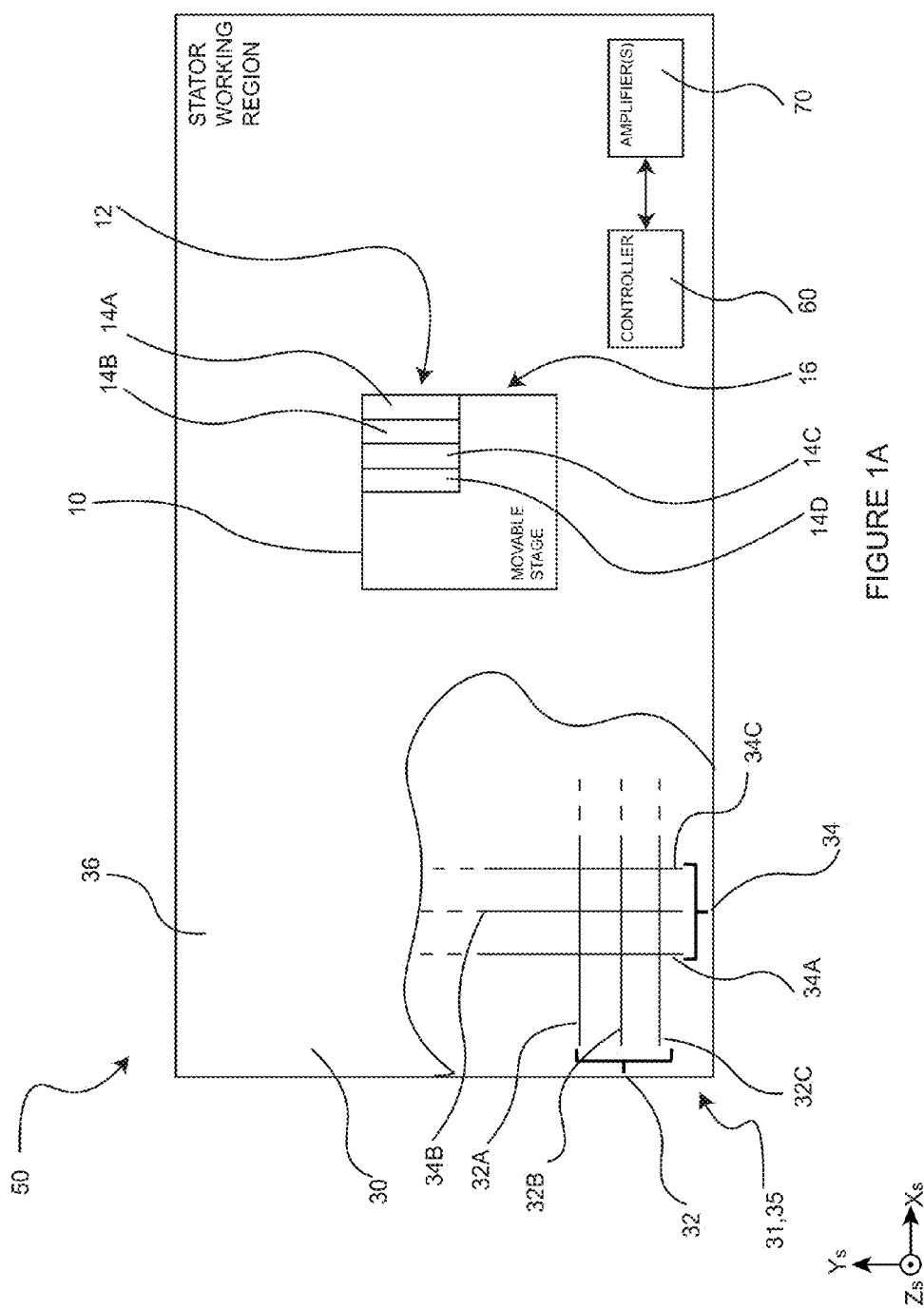
FIG. 1A is a schematic top view of a displacement device according to a particular embodiment.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provided displacement devices which comprise a stator and one or more moveable stages. The stator comprises a plurality of electrically conductive coils shaped to provide pluralities of generally linearly elongated coil traces. In some embodiments, the electrically conductive coils may be shaped to provide a first plurality of coil traces which are generally elongated in a stator-x direction and a second plurality of coil traces generally elongated in a stator-y direction which may be generally orthogonal to, or otherwise non-parallel to the stator-x direction. The first and second pluralities of coil traces may be provided in portions of first and second layers. The portions of the first and second layers may be located at the same stator-z location or at different stator-z locations. Portions of layers at different stator z-locations may overlap each other in the stator-z direction. In some embodiments, a first portion of a first layer comprises a plurality of coil traces generally elongated in the stator-x direction and a stator-z direction overlapping first portion of a second layer comprises a plurality of coil traces generally elongated in the stator-y direction; and a second portion of the first layer comprises a plurality of coil traces generally elongated in the stator-y direction and a stator-z direction overlapping second portion of the second layer comprises a plurality of coil traces generally elongated in the stator-x direction. The moveable stage may be controllably moveable relative to the stator within two-dimensional working region.

Each moveable stage may comprise one or more magnet arrays. In some embodiments, each magnet array comprises a plurality of magnetization segments, where each magnetization segment has a corresponding magnetization direction. Each magnet array may comprise at least two magnetization segments with different magnetization directions. One or more amplifiers may be connected to drive a plurality of currents in the plurality of electrically conductive coils. A controller may be connected to deliver signals to the one or more amplifiers. The signals may be used to control current driven by the one or more amplifiers into at least some of the plurality of coil traces and to thereby cause the moveable stage to track a desired position in the working region—e.g. a desired position, $(x_r, y_r)$, within the working region, where $x_r$ is a desired position of the moveable stage in the stator-x direction and $y_r$ is a desired position of the moveable stage in the stator-y direction. Unless the context dictates otherwise, throughout this disclosure and the accompanying claims, when referring to a position of the moveable stage, a location of the moveable stage, movement of the moveable stage generally within the working region and/or the like, such position, location, movement and/or the like should be understood to refer to the position, location, movement and/or the like of a reference point on the moveable stage. Such reference point may be, but is not limited to, a point at the center of the magnet array assembly of the moveable stage. Such reference point could be some other location on the moveable stage. Generally, the desired position ($x_r$, $y_r$) is a function of time, t, and represents where a moveable stage should be ideally located at each time, t. The currents controllably driven into the at least some of the plurality of coil traces create magnetic fields which cause corresponding magnetic forces on the one or more magnet arrays of the moveable stage. In some embodiments, the magnetic forces associated with the interaction between the magnetic fields created by the currents in the at least some of the coil traces and the magnetic fields associated with the magnet arrays may attract the moveable stage toward the stator at all times when the controller is controlling the currents driven by the one or more amplifiers. In some embodiments, the magnetic fields associated with the magnet arrays may push the moveable stage away from the stator to balance gravitational forces with an air gap at all times when the controller is controlling the currents driven by the one or more amplifiers.

For purposes of describing the displacement devices disclosed herein, it can be useful to define a pair of coordinate systems—a stator coordinate system which is fixed to the stator (e.g. to stator 30 of FIG. 1A); and a stage coordinate system which is fixed to the moveable stage (e.g. moveable stage 10 of FIG. 1A) and moves with the moveable stage relative to the stator and the stator coordinate system. This description may use conventional Cartesian coordinates (x, y, z) to describe these coordinate systems, although, it will be appreciated that other coordinate systems could be used. For convenience and brevity, in this description and the associated drawings, the directions (e.g. x, y, z directions) in the stator coordinate system and the directions in the stage coordinate system may be shown and described as being coincident with one another—i.e. the stator-x, stator-y and stator-z directions may be shown as coincident with stage-x, stage-y and stage-z directions, respectively. Accordingly, this description and the associated drawings may refer to directions (e.g. x, y, and/or z) to refer to directions in both or either of the stator and stage coordinate systems. However, it will be appreciated from the context of the description herein that in some embodiments and/or circumstances, the moveable stage (e.g. moveable stage 10) may move relative to the stator (e.g. stator 30) such that these stator and stage directions are no longer coincident with one another. In such cases, this disclosure may adopt the convention of using the terms stator-x, stator-y and stator-z to refer to directions in the stator coordinate system and the terms stage-x, stage-y and stage-z to refer to directions in the stage coordinate system. In this description and the associated drawings, the symbols Xm, Ym and Zm may be used to refer respectively to the stage-x, stage-y and stage-z directions, the symbols Xs, Ys and Zs may be used to refer respectively to the stator-x, stator-y and stator-z directions and the symbols X, Y and Z may be used to refer respectively to either or both of the stage-x, stage-y and stage-z and/or stator-x, stator-y and stator-z directions. In some embodiments, during normal operation, the stage-z and stator-z directions are approximately in the same direction (e.g. within ±30° in some embodiments; within ±10° in some embodiments; and within ±2° in some embodiments).

In some embodiments, the stator-x and stator-y directions are non-parallel. In particular embodiments, the stator-x and stator-y directions are orthogonal. In some embodiments, the stage-x and stage-y directions are non-parallel. In particular embodiments, the stage-x and stage-y directions are orthogonal.

Figure 1B:
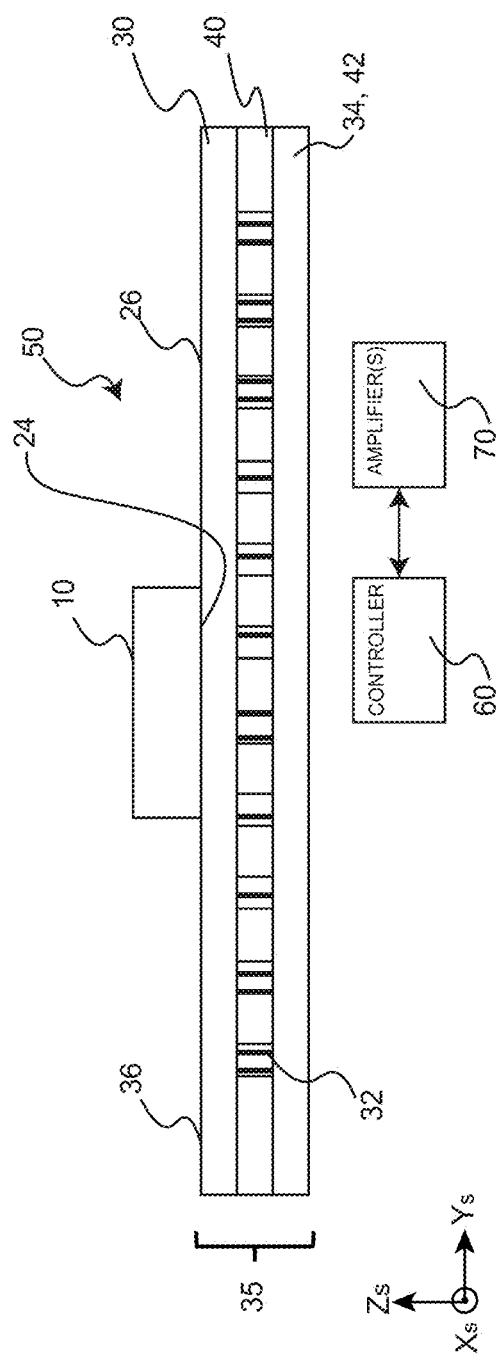
FIG. 1B is an exploded side view of a portion of the FIG. 1A a displacement device.

FIGS. 1A and 1B (together, FIG. 1) respectively depict a schematic partially cut-away top view and side cross-sectional views of a displacement device 50 according to a particular embodiment of the invention. Displacement device 50 comprises a stator 30, a moveable stage 10, a controller 60 and one or more amplifiers 70.

Stator 30 comprises a stator coil assembly 35 which comprises at least the traces of a plurality of electrically conductive coils 31. Electrically conductive coils 31 may be shaped to provide a first plurality of coil traces 32A, 32B, 32C (collectively, first coil traces 32). Coil traces 32 may be distributed over at least a portion of a first layer 40 at a corresponding first stator-z location and generally elongated in the stator-x direction. Electrically conductive coils may also be shaped to provide a second plurality of coil traces 34A, 34B, 34C (collectively, second coil traces 34) distributed over at least a portion of a second layer 42 at a corresponding second stator-z location and generally elongated in a stator-y direction. Because of their respective elongation directions, first coil traces 32 may be referred to herein as x-coil traces 32 or x-traces 32 and second coil traces 34 may be referred to as y-coil traces 34 or y-traces 34. In particular embodiments, such as depicted in FIG. 1, the stator-x elongation direction of first coil traces 32 is orthogonal to the stator-y elongation direction of second coil traces 34. This is not necessary. In some embodiments, first coil traces 32 are merely non-parallel to second coil traces 34. In the particular case of FIG. 1, stator 30 comprises a pair of layers and corresponding first and second pluralities of coil traces 32. 34. In some embodiments, stator 30 may comprise additional layers and corresponding additional pluralities of coil traces which may be elongated in the stator-x direction, the stator y-direction or other suitable directions.

Coil traces 32, 34 in layers 40, 42 overlap one another in the stator-z direction. The two dimensional space over which coil traces 32, 34 overlap one another in the stator-z direction may define a working region 36 over which moveable stage 10 is moveable relative to stator 30. In some embodiments, the span of working region 36 (in the stator-x and stator-y directions) may be larger than moveable stage 10 (and may be much larger than moveable stage 10) to permit moveable stage 10 to move within working region 36, although this is not necessary. It should be noted that the schematic illustrations of FIG. 1 show only portions of a relatively small number of traces 32, 34 and it is understood that coil traces 32, 34 in each corresponding layer 40, 42 may be distributed throughout their respective layers 40, 42 so that coil traces 32, 34 and/or layers 40, 42 may overlap in the stator-z direction at all locations in working region 36. Some of coil traces 32, 34 may be connected at their ends to form a two-phase, three-phase, or multiple-phase winding configuration as described in more detail below. While working region 36 is a two-dimensional space, this description may describe working region 36 as a feature of stator 30, for convenience.

Moveable stage 10 comprises a magnet array assembly 16 which comprises one or more magnet arrays 12. Magnet array assembly 16 should be understood to comprise the combination of the one or more individual magnet arrays 12. Each magnet array 12 may comprise a corresponding plurality of magnetization segments 14A, 14B, 14C, 14D . . . (collectively, magnetization segments 14), each magnetization segment 14 having a corresponding magnetization direction. In some embodiments, the magnetization segments 14 of a particular magnet array 12 have at least two magnetization directions that are different from one another. In the FIG. 1 embodiment, moveable stage 10 comprises a first magnet array 12 having a plurality of corresponding first magnetization segments 14. Moveable stage 10 may be located immediately adjacent to and may bear against stator 30. In the illustrated embodiment, moveable stage 10 comprises a stage bearing surface 24 that is generally planar (with a normal in the stage-z direction) and which bears against a generally planar stator bearing surface 26 (with a normal in the stator-z direction). Accordingly, when operating with this configuration, stage bearing surface 24 is generally parallel to the planes of stator layers 40, 42 in which coil traces 32, 34 are located.

Displacement device 50 comprises one or more amplifiers 70 which are connected (e.g. with suitable electrical connections (not expressly shown in FIG. 1)) to drive a plurality of currents into coil traces 32, 34. Amplifier(s) 70 are controlled by controller 60. Controller 60 (and components thereof) may comprise hardware, software, firmware or any combination thereof. For example, controller 60 may be implemented on a programmed computer system comprising one or more processors, user input apparatus, displays and/or the like. Controller 60 may be implemented as an embedded system with a suitable user interface comprising one or more processors, user input apparatus, displays and/or the like. Processors may comprise microprocessors, digital signal processors, graphics processors, field programmable gate arrays, and/or the like. Components of controller 60 may be combined or subdivided, and components of controller 60 may comprise sub-components shared with other components of controller 60. Components of controller 60, may be physically remote from one another. Controller 60 may be connected (e.g. with suitable electrical connections (not expressly shown in FIG. 1)) to deliver signals to amplifier(s) 70. Controller 60 may be configured (e.g. using suitable software, logic configuration and/or the like) to use those signals to control the currents driven by amplifier(s) 70 into at least some of first coil traces 32 and at least some of second coil traces 34 to thereby cause moveable stage 10 to track a desired position within working region 36—e.g. a desired position, $(x_r, y_r)$, within working region 36, where $x_r$ is a desired position of moveable stage 10 in the stator-x direction and $y_r$ is a desired position of moveable stage 10 in the stator-y direction.

Figure 2:
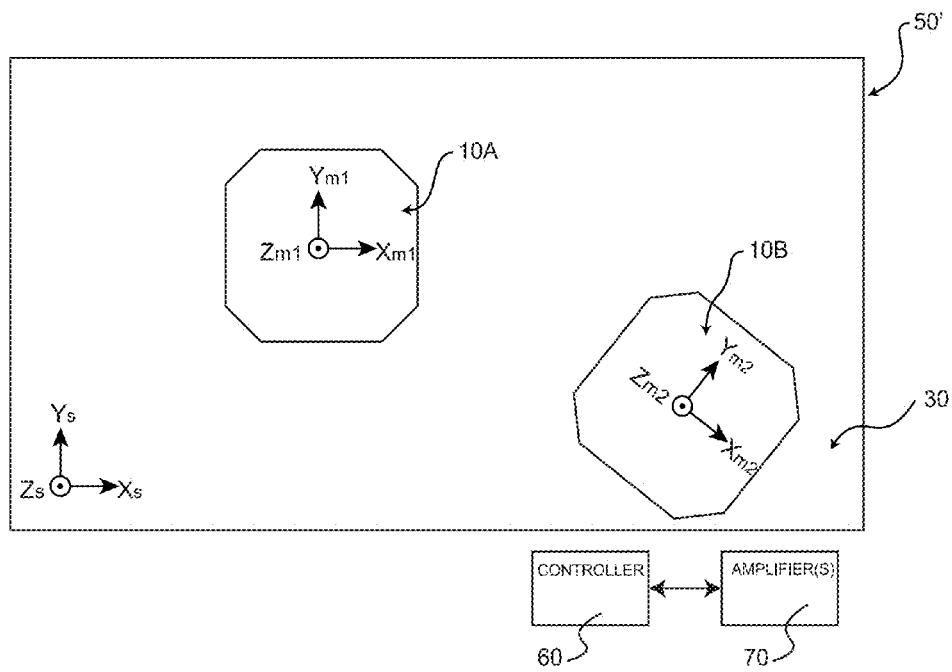
FIG. 2 is a top view of a displacement device which comprises a plurality of moveable stages.

In the FIG. 1 embodiment, displacement device 50 is shown with a single moveable stage 10. In general, however, displacement device 50 may comprise a plurality of moveable stages, each of which may be similar to moveable stage 10 and each of which may be controlled by controller 60 using amplifier(s) 70 to drive currents in coil traces 32, 34 as described herein. FIG. 2 shows a top view of displacement device 50', which comprises a plurality (e.g. two) moveable stages 10A, 10B. In other respects, displacement device 50' may be substantially similar to the FIG. 1 displacement device 50. FIG. 2 also shows that moveable stages 10A, 10B need not be aligned with one another and so each moveable stage 10A, 10B may be described using its own corresponding stage coordinate system. In the case shown in FIG. 2, the stage directions $X_{m1}/Y_{m1}/Z_{m1}$ define the stage coordinate system for moveable stage 10A and the stage directions $X_{m2}/Y_{m2}/Z_{m2}$ define the stage coordinate system for moveable stage 10B. Displacement device 50' can be built to operate with any suitable number of moveable stages 10. In some embodiments, displacement device 50' comprises three moveable stages. In some embodiments, displacement device 50' may comprise dozens to hundreds of moveable stages. In some embodiments still, displacement device 50' may comprise thousands of moveable stages.

It should be understood that FIG. 1 provides a general embodiment of displacement device 50. Unless the context dictates otherwise, further embodiments described herein (e.g. displacement devices 150, 250, 350, etc.) may use like numbering to show that they are particular embodiments of displacement device 50. For example, displacement device 150 is a particular embodiment of displacement device 50. Displacement device 150 comprises a moveable stage 110, which is a particular embodiment of moveable stage 10, a stator 130, which is a particular embodiment of stator 30 and so on. Similarly, displacement device 250 is a particular embodiment of displacement device 50 that comprises a moveable stage 210, which is a particular embodiment of moveable stage 10, a stator 230 which is a particular embodiment of stator 30 and so on. Further, unless the context dictates otherwise, it should also be understood that when referring to generic displacement device 50 or a part thereof (e.g. moveable stage 10, stator 30 and/or the like), the corresponding description should be understood to apply to any of the particular embodiments of displacement devices 150, 250, 350, etc. and parts thereof (e.g. moveable stages 110, 210, 310 etc., stators 130, 230, 330 etc. and/or the like).

Figure 3:
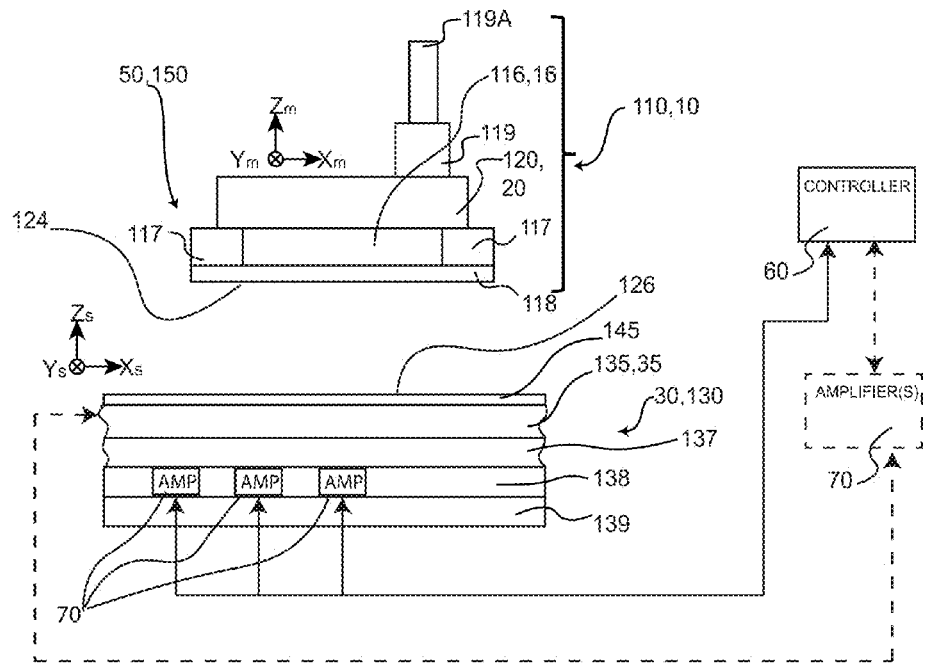
FIG. 3 is a exploded partial schematic side view of a displacement device according to a particular embodiment of the invention.

FIG. 3 is an exploded partial schematic side view of a displacement device 150 according to a particular embodiment of the invention. Displacement device 150 comprises a moveable stage 110 and a stator 130. In the FIG. 3 depiction, moveable stage 110 is shown exploded (i.e. spaced apart) from stator 130. In general, however, moveable stage 110 will be located immediately adjacent to and may bear on stator 130. In the FIG. 3 embodiment, moveable stage 110 comprises a stage bearing surface 124 which may be generally planar and which is parallel with and adjacent to (and may bear against) stator bearing surface 126 of stator 130, which also may be generally planar. In some embodiments, displacement device may comprise more than one moveable stage 110.

Moveable Stage

As discussed above, moveable stage 10 comprises a magnet array assembly 16 comprising one or more magnet arrays 12. Each magnet array comprises a plurality of magnetization segments 14 having corresponding magnetization directions. In some embodiments, the magnetization directions of at least two magnetization segments 14 are different from one another.

In the FIG. 3 embodiment, moveable stage 110 of displacement device 150 comprises a magnet array assembly 116 comprising one or more magnet arrays (not expressly shown in FIG. 3) having the features of the magnet arrays 12 described herein. Moveable stage 110 of the FIG. 3 embodiment also includes a number of optional features comprising one or more bumpers 117, stage bearing layer 118 (which provides stage bearing surface 124), one or more part holders 119, and a stage support structure 120. Each part holder 119 may be configured to hold a part 119A. In some applications, each part holder 119 may hold a plurality of parts 119A. By way of non-limiting example, part 119A may comprise one or more glass/plastic tubes containing biological samples. Stage support structure 120 may function to provide a framework to which other components of moveable stage 110 may be mounted or otherwise supported. Stage bearing layer 118 can be located between magnet array assembly 116 and stator 130 to provide stage bearing surface 124, which may be generally planar.

Magnet Arrays

Displacement device 50 may comprise any one or more of a variety of embodiments of magnet array assembly 16. Unless otherwise specified, embodiments of magnet array assemblies 16 shown in this document are illustrative rather than restrictive. There are many other possible permutations for each embodiment of magnet array assemblies 16. For example, the magnetization directions of the permanent magnet pieces/elements/segments (e.g. magnetization segments 14) in a magnet array assembly 16 may all be inverted (i.e. 180° changes in magnetization direction), in which case the resulting magnet array assembly 16 could still be used in a corresponding displacement device to achieve the desired motion by suitable adjustment of the corresponding currents in coil traces 32, 34 (e.g. by suitable configuration of controller 60 and/or amplifier(s) 70). Two general types of magnet array assemblies 16 are described herein for use with displacement device 50. These types of magnet array assemblies may be referred to as 2D magnet array assemblies and 1D magnet array assemblies.

2D Magnet Array Assemblies

Figure 4A:
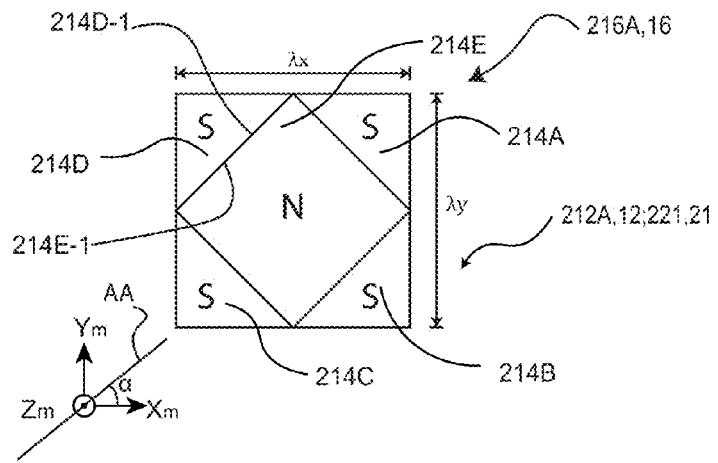
FIG. 4A-4D are each a schematic top view of a 2D magnet array assembly comprising a 2D magnet array according to a particular embodiment.

One type of magnet array assembly that can be used with any of the displacement devices disclosed herein is referred to as a 2D magnet array assembly 16. A 2D magnet array assembly 16 comprises one or more 2D magnet arrays 12. In some embodiments, 2D magnet arrays 12 may comprise one or more sub-arrays 21. FIG. 4A is a schematic top view of a 2D magnet array assembly 216A comprising a 2D magnet array 212A according to a particular embodiment. In the FIG. 4A embodiment, magnet array 212A comprises a single sub-array 221, which in turn comprises a plurality (e.g. five) magnetization segments 214A, 214B, 214C, 214D, 214E. Each sub-array 221 may comprise a central magnetization segment (e.g. central magnetization segment 214E in the FIG. 4A embodiment) and a plurality of additional magnetization segments (e.g. additional magnetization segments 214A, 214B, 214C, 214D in the FIG. 4A embodiment). Each additional magnetization segment 214A, 214B, 214C, 214D comprises an edge which abuts against a corresponding peripheral edge of central magnetization segment 214E. For example, in the illustrated embodiment of FIG. 4A, edge 214D-1 of additional magnetization segment 214D abuts against peripheral edge 214E-1 of central magnetization segment 214E.

Each of magnetization segments 214A, 214B, 214C, 214D, 214E comprises a corresponding magnetization direction. Central magnetization segment 214E may have a first magnetization direction opposed to a second magnetization direction of additional magnetization segments 214A, 214B, 214C, 214D. For example, in the illustrated embodiment of FIG. 4A, the letter N indicates that central magnetization segment 214E has its magnetic north pole facing out of the page (and magnetization direction in the positive Zm direction) and the letters S indicates that additional magnetization segments 214A, 214B, 214C, 214D have their magnetic south pole facing out of the page (and magnetization direction in the negative Zm direction). Note that this convention is used throughout this description and the accompanying drawings. In some embodiments, the magnetization directions of each of the magnetization segments 214 in the FIG. 4A sub-arrays 221 could be reversed (i.e. have its magnetization direction changed by 180°) with suitable adjustment of controller signals and/or control algorithm(s).

A stage-x dimension (i.e. a length in a stage-x direction) of sub-array 221 may be generally equal to a spatial period $\lambda_x$ and a stage-y dimension of sub-array 221 may be generally equal to a spatial period $\lambda_y$. The stage-x and stage-y spatial periods $\lambda_x$, $\lambda_y$ may also be referred to as $\lambda_2$, $\lambda_1$ (i.e. $\lambda_x=\lambda_2$ and $\lambda_y=\lambda_1$). The significance of spatial periods $\lambda_x$, $\lambda_y$ is explained in more detail below. These spatial periods $\lambda_x$, $\lambda_y$ may be the same as the spatial periods of the currents driven in coil traces 32, 34. In some embodiments, such as is illustrated in the FIG. 4A embodiment, the stage-x and stage y-dimensions (e.g. $\lambda_x$ and $\lambda_y$) of sub-array 221 are generally equal to one another. This is not necessary. In general, the stage-x and stage y-dimensions (e.g. $\lambda_x$ and $\lambda_y$) of sub-array 221 may be different from one another.

Figure 4B:
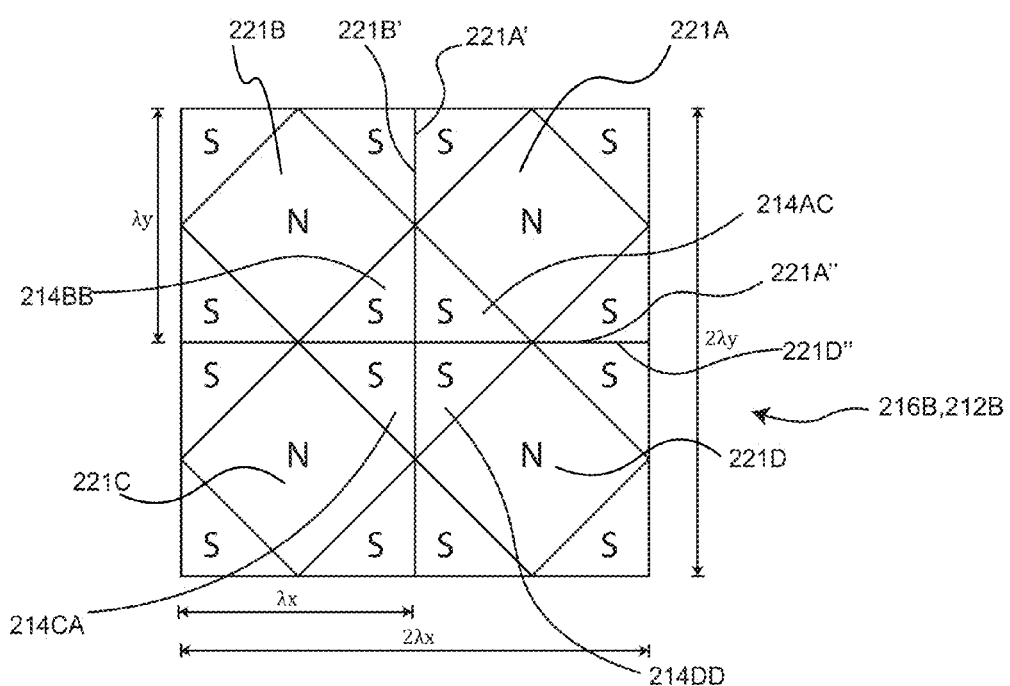

FIG. 4B is a schematic top view of a 2D magnet array assembly 216B comprising a 2D magnet array 212B according to a particular embodiment. In the FIG. 4B embodiment, magnet array 212B comprises a plurality (e.g. four) of sub-arrays 221A, 221B, 221C, 221D (collectively sub-arrays 221). Each of sub-arrays 221 is substantially similar to sub-array 221 of FIG. 4A. In the FIG. 4B embodiment, each of sub-arrays 221 comprises at least one edge (e.g. one or a pair of edges), each of which abuts against a corresponding edge of a different one of sub-arrays 221. For example, edge 221A' of sub-array 221A abuts against corresponding edge 221B' of sub-array 221B and edge 221A" of sub-array 221A abuts against corresponding edge 221D" of sub-array 221D, as illustrated in FIG. 3B. Such edge abutment is not generally necessary. In some embodiments, each sub-array 221 may comprise a single edge which abuts against a corresponding edge of another sub-array 221. In some embodiments, sub-arrays 221 may not have abutting edges. In some embodiments, each sub-array 221 and its corresponding magnetization segments 214 may be separately fabricated. This is the case in the illustrated embodiment of FIG. 4B. In some embodiments, magnetization segments 214 having a unitary construction may be shared between sub-arrays 221. For example, in the FIG. 4B embodiment, magnetization segments 214AC (of sub-array 221A), 214BB (of sub-array 221B), 214CA (of sub-array 221C) and 214DD (of sub-array 221D) may be fabricated from a single unitary magnet. In some embodiments, the magnetization directions of each of the magnetization segments 214 in the FIG. 4B sub-arrays 221 could be reversed (i.e. have its magnetization direction changed by 180°).

As was the case with magnet array 212A (FIG. 4A), the stage-x dimension of each sub-array 221 in magnet array 212B may be generally equal to the spatial period $\lambda_x$ and the stage-y dimension of each sub-array 221 in magnet array 212B may be generally equal to the spatial period $\lambda_y$. In the FIG. 4B embodiment, because magnet array 212B comprises four identical sub-arrays 221 located such that pairs of sub-arrays 221 are aligned with and abut against each other in the stage-x and stage-y directions, the overall stage-x and stage-y dimensions of magnet array 212B are generally equal to $2\lambda_x$, $2\lambda_y$ respectively. The significance of the dimensions $\lambda_x$, $\lambda_y$ as spatial periods is more discernable from the FIG. 4B embodiment, where it can be seen that the magnetization direction of magnet array 212A is periodic in the stage-x direction with the spatial period $\lambda_x$ and in the stage-y direction with the spatial period $\lambda_y$.

Figure 4C:
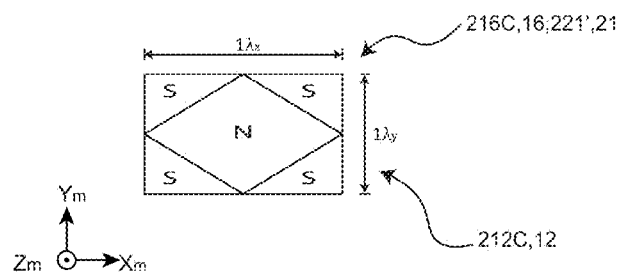

As was the case with magnet array 212A, in some embodiments, the spatial periods $\lambda_x$, $\lambda_y$ of magnet array 212B are generally equal to one another, but this is not necessary. FIG. 4C is a schematic top view of a 2D magnet array assembly 216C comprising a 2D magnet array 212C according to a particular embodiment. In the FIG. 4C embodiment, magnet array 212C comprises a single sub-array 221' which may be substantially similar to sub-arrays 221 described herein except that the stage-x and stage-y dimensions (spatial periods $\lambda_x$, $\lambda_y$) are different from one another. In the illustrated embodiment, $\lambda_x > \lambda_y$. In some embodiments, a magnet array could comprise a plurality of such sub-arrays 221' with different stage-x and stage-y dimensions (spatial periods $\lambda_x$, $\lambda_y$). In some embodiments, the magnetization directions of each of the magnetization segments in the FIG. 4C sub-array 221 could be reversed (i.e. have its magnetization direction changed by 180°).

Figure 4D:
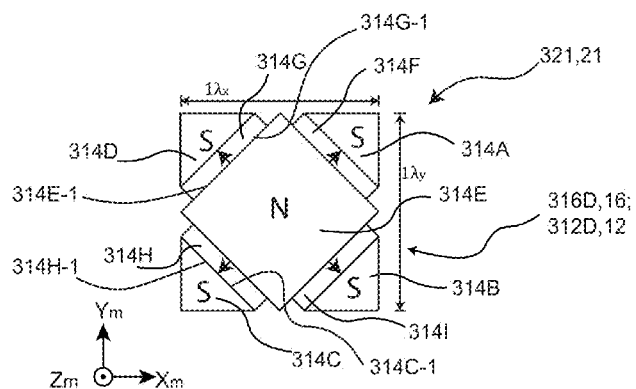

FIG. 4D is a schematic top view of a 2D magnet array assembly 316D comprising a 2D magnet array 312D according to a particular embodiment. In the FIG. 4D embodiment, magnet array 312D comprises one or more sub-arrays 321 (one of which is shown in FIG. 4D). Each sub-array comprises a plurality (e.g. nine) magnetization segments 314A-314I and each magnetization segment has a corresponding magnetization direction. In the FIG. 4D embodiments, each sub-array 321 comprises a central magnetization segment (e.g. central magnetization segment 314E in the FIG. 4D embodiment), a plurality of additional magnetization segments (e.g. additional magnetization segments 314F, 314G, 314H, 314I in the FIG. 4D embodiment) and a plurality of peripheral magnetization segments (e.g. peripheral magnetization segments 314A, 314B, 314C, 314D in the FIG. 4D embodiment). Like sub-array 221 described above, each additional magnetization segment 314F, 314G, 314H, 314I comprises an edge which abuts against a corresponding peripheral edge of central magnetization segment 314E. For example, in the illustrated embodiment of FIG. 4D, edge 314G-1 of additional magnetization segment 314G abuts against peripheral edge 314E-1 of central magnetization segment 314E. Also, each peripheral magnetization segment 314A, 314B, 314C, 314D comprises an edge which abuts against a corresponding peripheral edge of a corresponding additional magnetization segment 314F, 314G, 314H, 314I. For example, in the illustrated embodiment of FIG. 4D, edge 314C-1 of peripheral magnetization segment 314C abuts against peripheral edge 314H-1 of additional magnetization segment 314H.

In the FIG. 4D embodiment, each peripheral magnetization segment 314A, 314B, 314C, 314D has a corresponding peripheral magnetization direction which is opposite to the first magnetization direction of the central magnetization segment 314E and is generally orthogonal to the magnetization direction of the additional magnetization segments 314F, 314G, 314H, 314I. For example, in the FIG. 3D embodiment, central magnetization segment 314E is magnetized in the positive stage-z direction (i.e. with its magnetic north pole facing out of the FIG. 4D page), peripheral magnetization segments 314A, 314B, 314C, 314D are magnetized in the negative stage-z direction (i.e. with their magnetic south poles facing out of the FIG. 4D page) and additional magnetization segments 314F, 314G, 314H, 314I are magnetized in directions orthogonal to the stage-z direction (i.e. in the plane of the FIG. 4D page) as shown by the arrows in additional magnetization segments 314F, 314G, 314H, 314I. In some embodiments, the magnetization directions of each of the magnetization segments 314 in the FIG. 4D sub-array 321 could be reversed (i.e. have its magnetization direction changed by 180°). In some embodiments, a stage-x dimension (i.e. a length in a stage-x direction) of sub-array 321 may be set to be generally equal to a spatial period $\lambda_x$ and a stage-y dimension of sub-array 321 may be set to be generally equal to a spatial period $\lambda_y$. These y spatial periods $\lambda_x$, $\lambda_y$ may also be referred to as $\lambda_2$, $\lambda_1$ (i.e. $\lambda_x = \lambda_2$ and $\lambda_y = \lambda_1$). The significance of spatial periods $\lambda_x$, $\lambda_y$ is explained in more detail below. These spatial periods $\lambda_x$, $\lambda_y$ may be the same as the spatial periods of the current phases driven in coil traces 32, 34. In some embodiments, such as is illustrated in the FIG. 4D embodiment, the stage-x and stage y-dimensions (e.g. $\lambda_x$ and $\lambda_y$) of sub-array 321 are generally equal to one another. This is not necessary. In general, the stage-x and stage y-dimensions (e.g. $\lambda_x$ and $\lambda_y$) of sub-array 321 may be different from one another. The stage-x and stage-y directions may be the principal directions of magnet array 312D. Principal directions are described in more detail below.

Referring back to FIG. 4A, line AA is located in the stage-x/stage-y plane and intersects with a notional stage-z axis (not expressly shown) at the stage-x-stage-y plane geometric center of sub-array 21, magnet array 12 and/or magnet array assembly 16. Line AA is shown at an angle $\alpha$ with respect to the stage-x direction. When a notional single linear wire of infinite length and infinitesimal cross-section (not shown) is aligned with line AA and a constant current flows through this wire, the lateral force (i.e. the force generally orthogonal to the stage-z direction) on moveable stage 10 resulting from the interaction of the magnetic field of magnet array 12 and the magnetic field induced by the current in the notional coil trace will vary with the angle $\alpha$. For the magnet arrays 12 of FIGS. 4A, 4B and 4D, the magnitude of this force will have maximum values at $\alpha=0°$ (i.e. line AA is parallel to the stage-x axis) and $\alpha=90°$ (i.e. line AA is parallel to the stage y-axis) and will have minimum values at $\alpha=45°$, and $\alpha=135°$. Based on these maxima of the force profile at $\alpha=0°$ and $\alpha=90°$, the stage-x ($\alpha=0°$) and stage-y ($\alpha=90°$) directions may be referred to as the principal directions of the 2D magnet arrays shown in FIGS. 4A, 4B and 4D. For the magnet array 12 of FIG. 4C, the magnitude of this force will have minimum values at approximately $$\alpha = \tan^{-1}\left(\frac{\lambda_y}{\lambda_x}\right).$$

For the 2D magnet arrays 12 of FIGS. 4A-4D, the peripheral edges of each magnet array 12 (and of each sub-array 21) are parallel with one of the principal (stage-x and stage-y directions) directions. More particularly, the peripheral edges of additional magnetization segments 214A, 214B, 214C and 214D of magnet array 12 (FIG. 4A) and sub-arrays 221 (FIG. 4B) are aligned with the principal directions ($\alpha=0°$ and $\alpha=90°$) of magnet array 212 and sub-arrays 221. Similarly, the peripheral edges of peripheral magnetization segments 314A, 314B, 314C and 314D are aligned with the principal directions ($\alpha=0°$ and $\alpha=90°$) of magnet array 312 and sub-array 321. This feature of the 2D magnet arrays 12 (and sub-arrays 21 of FIGS. 4A-4D (i.e. sub-arrays having additional/peripheral magnetization segments with peripheral edges aligned with principal directions) may be referred to as principal-aligned outlines. This principal-aligned outlines feature allows efficient use of working region 36 and permits a displacement device to operate with a relatively large number of moveable stages 10 compared to displacement devices having moveable stages without principal-aligned outlines. In some embodiments, the central magnetization segments of the embodiments of FIGS. 4A-4D may be shaped to have principal direction dimensions x, y which are in a range of $x \leq \lambda_2 \leq 2x$ and $y \leq \lambda_1 \leq 2y$. In some embodiments, the central magnetization segments of FIGS. 4A-4D may be shaped to have principal direction dimensions x, y which are in a range of $0.5x \leq \lambda_2 \leq 3x$ and $0.5y \leq \lambda_1 \leq 3y$.

Figure 4E:
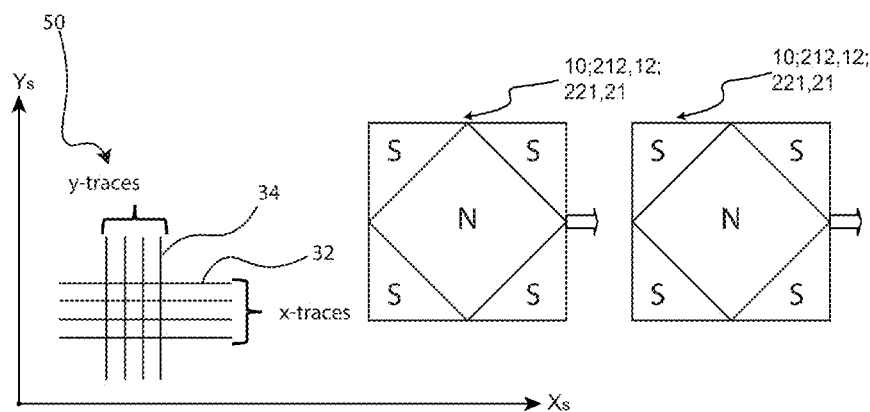
FIG. 4E is a schematic top view of a displacement device incorporating a pair of moveable stages, each moveable stage comprising one of the FIG. 4A magnet arrays.

FIG. 4E is a schematic top view of a displacement device 50 comprising a pair of moveable stages 10 each having a magnet array 212A of the type shown in FIG. 4A and a stator 30 comprising x-traces 32 and y-traces 34. The FIG. 4E displacement device 50 can achieve maximum force or maximum efficiency, when each magnet array 212A has one of its principal axes (Xm, Ym) aligned with either the stator-x direction (Xs) or the stator-y direction (Ys). These are the preferred orientations of magnet arrays 212A (and the other 2D magnet arrays 12 of FIG. 4A-4D) about the stage-z axis for each moveable stage 10, especially during relatively fast motion (e.g. for motion above 75% of the top speed of moveable stage(s) 10) and/or for relatively long distances of travel (e.g. for distances above 75% of a distance across working region 36). Therefore, given a minimum gap between two adjacent moveable stages 10, magnet arrays 12 with principal-aligned outlines can help maximize the utilization of working region 36 and thus increase moveable stage density per unit stator area in the Xs-Ys plane.

Another property shared by the 2D magnet arrays 12 (and sub-arrays 21) depicted in FIGS. 4A, 4B and 4D is 90° degree rotational symmetry (e.g. after a magnet array assembly 16 one magnet array 12 rotates by 90° about a stage-z axis (centrally located with respect to the stage-x-stage-y dimensions of the corresponding magnet array assembly 16 or magnet array 12, as the case may be), it has the same magnetic configuration as it had before the rotation). This property can simplify the control procedures associated with the movement of moveable stage 10, by minimizing the possible number of orientations of each magnet array 12. Otherwise, there will be two or more possible states for moveable stages 10 even when one of the principal axes (Xm, Ym) of their magnet arrays 12 is aligned with stator-x and/or stator-y directions.

1D Magnet Array Assemblies

A second general type of magnet array assembly that can be used with any of the displacement devices disclosed herein is referred to as a 1D magnet array assembly 16. A 1D magnet array assembly 16 comprises one or more magnet arrays 12 and each such magnet array 12 comprises plurality of linearly elongated magnetization segments 14 (e.g. elongated in a stage-x direction or a stage-y direction), with each magnetization segment 14 having a corresponding magnetization direction that is generally orthogonal to its elongation direction. At least two of the magnetization segments 14 in each magnet array 12 may have magnetization directions that are different from one another.

In some embodiments, a moveable stage 10 comprise a first magnet array 12 comprising a plurality of linearly elongated first magnetization segments 14 (e.g. elongated in a stage-x direction), with each first magnetization segment 14 having a corresponding magnetization direction that is generally orthogonal to the stage-x direction. At least two of the first magnetization segments 14 may have magnetization directions that are different from one another. The first magnetization directions of the first magnetization segments 14 may exhibit a first spatial period $\lambda_1$ over a stage-y direction width of the first magnet array 12. In some embodiments, the stage-y direction width of the first magnet array 12 is generally equal to $\lambda_1$, so that the first magnetization directions of the first magnetization segments 14 exhibit a single first spatial period $\lambda_1$ over the stage-y direction width of the first magnet array 12. In some embodiments, the first magnetization directions of the first magnetization segments 14 exhibit multiple first spatial periods $\lambda_1$ which repeat over the stage-y direction width of the first magnet array 12 such that the period of repetition is equal to the first spatial period $\lambda_1$. In some embodiments, the stage-y direction width $W_{my}$ of the first magnet array is related to the first spatial period $\lambda_1$ according to $$W_{my} = a\frac{\lambda_1}{2}$$

where a is a positive integer.

In some embodiments, a moveable stage 10 comprises two magnet arrays 12. Similar to the first magnet array 12, the second magnet array 13 may comprise a plurality of linearly elongated second magnetization segments 14. However, the second magnetization segments 14 may be linearly elongated in the stage-y direction (e.g. non-parallel to the stage-x direction or generally orthogonal to the stage-x direction). Each second magnetization segment 14 has a corresponding second magnetization direction that is generally orthogonal to the stage-y direction and at least two of the second magnetization segments 14 have second magnetization directions that are different from one another. The second magnetization directions of the second magnetization segments 14 may exhibit a second spatial period $\lambda_2$ over a stage-x direction width of the second magnet array 12. In some embodiments, the stage-x direction width of the second magnet array 12 is generally equal to $\lambda_2$, so that the second magnetization directions of the second magnetization segments 14 exhibit a single second spatial period $\lambda_2$ over the stage-x direction width. In other embodiments, the second magnetization directions of the second magnetization segments 14 exhibit multiple second spatial periods $\lambda_2$ which repeat over the stage-x direction width such that the period of repetition is equal to the second spatial period $\lambda_2$. In some embodiments, the stage-x direction width $W_{mx}$ of the second magnet array is related to the second spatial period $\lambda_2$ according to $$W_{mx} = b\frac{\lambda_2}{2}$$

where b is a positive integer. In some embodiments, the first spatial period $\lambda_1$ s equal to the second spatial period $\lambda_2$ and they may both be referred to as the spatial period $\lambda$.

In some embodiments, a moveable stage 10 comprises four magnet arrays 12. Similar to the first magnet array 12, the third magnet array 12 may comprise a plurality of third magnetization segments 14 linearly elongated in the stage-x direction, where each third magnetization segment 14 has a corresponding third magnetization direction that is generally orthogonal to the stage-x direction and at least two of the third magnetization segments 14 have third magnetization directions that are different from one another. Similar to the second magnet array 12, the fourth magnet array 12 may comprise a plurality of fourth magnetization segments 14 linearly elongated in the stage-y direction, where each fourth magnetization segment 14 has a corresponding fourth magnetization direction that is generally orthogonal to the stage-y direction and at least two of the fourth magnetization segments 14 have fourth magnetization directions that are different from one another. The third magnetization directions of the third magnetization segments 14 may exhibit the first spatial period $\lambda_1$ (or a unique third spatial period $\lambda_3$) over a stage-y direction width of the third magnet array 12. In some embodiments, the stage-y direction width of the third magnet array 12 is generally equal to $\lambda_1$ (or $\lambda_3$), so that the third magnetization directions of the third magnetization segments 14 exhibit a single first spatial period $\lambda_1$ (or single third spatial period $\lambda_3$) over the stage-y direction width. In other embodiments, the third magnetization directions of the third magnetization segments 14 exhibit multiple first spatial periods $\lambda_1$ (or multiple third spatial periods $\lambda_3$) which repeat over the stage-y direction width such that the period of repetition is equal to the first spatial period $\lambda_1$ (or third spatial period $\lambda_3$). In some embodiments, the stage-y direction width $W_{my}$ of the third magnet array is related to the first spatial period $\lambda_1$ according to $$W_{my} = a \frac{\lambda_1}{2}$$

where a is a positive integer. The fourth magnetization directions of the fourth magnetization segments 14 may exhibit the second spatial period $\lambda_2$ (or a unique fourth spatial period $\lambda_4$) over a stage-x direction width of the fourth magnet array 12. In some embodiments, the stage-x direction width of the fourth magnet array 12 is generally equal to $\lambda_2$ (or $\lambda_4$), so that the fourth magnetization directions of the fourth magnetization segments 14 exhibit a single second spatial period $\lambda_2$ (or singles spatial period $\lambda_4$) over the stage-x direction width. In other embodiments, the fourth magnetization directions of the fourth magnetization segments 14 exhibit multiple second spatial periods $\lambda_2$ (or multiple fourth spatial periods $\lambda_4$) which repeat over the stage-x direction width such that the period of repetition is equal to the second spatial period $\lambda_2$ (or fourth spatial period $\lambda_4$). In some embodiments, the stage-x direction width $W_{mx}$ of the fourth magnet array is related to the second spatial period $\lambda_2$ according to $$W_{mx} = b \frac{\lambda_2}{2}$$

where b is a positive integer. In some embodiments, the first spatial period $\lambda_1$ is equal to the second spatial period $\lambda_2$ and they may both be referred to as the spatial period $\lambda$.

Figure 5A:
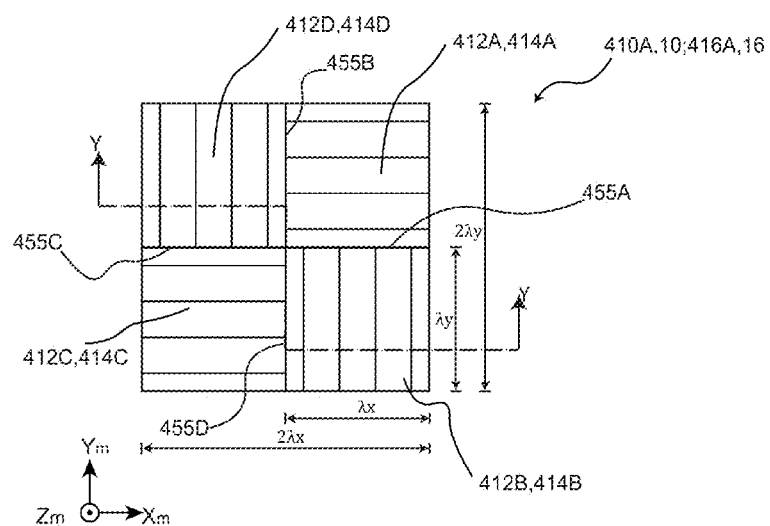
FIGS. 5A and 5B are each a schematic top view of a magnet array assembly comprising a plurality of 1D magnet arrays according to a particular embodiment.
Figure 5B:
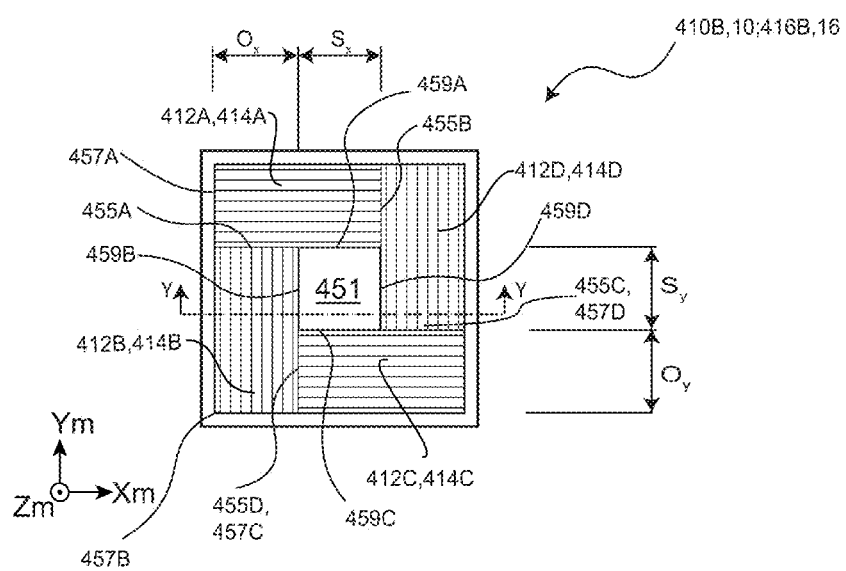

FIGS. 5A and 5B respectively depict schematic top views of moveable stages 410A, 410B incorporating magnet array assemblies 416A, 416B comprising a plurality of 1D magnet arrays 412 according to particular embodiments. In the illustrated embodiment, each of magnet array assemblies 416A, 416B comprise four 1D magnet arrays 412A, 412B, 412C, 412D (collectively, magnet array assemblies 412) which include a first magnet array 412A comprising magnetization segments 414A elongated in the stage-x direction, second magnet array 412B comprising magnetization segments 414B elongated in the stage-y direction, third magnet array 412C comprising magnetization segments 414C elongated in the stage-x direction and fourth magnet array 412D comprising magnetization segments 414D elongated in the stage-y direction. Because of their elongation directions, first and third magnet arrays 412A, 412C may be referred to as x-magnet arrays and their corresponding magnetization segments 414A, 414C may be referred to herein as x-magnetization segments and second and fourth magnet arrays 412B, 412D may be referred to as y-magnet arrays and their corresponding magnetization segments 414B, 414D may be referred to herein as y-magnetization segments. Other than for their locations and/or orientations, any of magnet arrays 412 in any one of magnet array assemblies 416A, 416B and/or in any one of moveable stages 410A, 410B may be substantially similar to one another. In this way, magnet array assemblies 416A, 416B and moveable stages 410A, 410B may be 90° rotationally symmetric about a stage-z oriented axis located at the stage-x-stage-y center of magnet array assemblies 416A, 416B and moveable stages 410A, 410B.

Although their individual magnet arrays 412 may be similar to one another, magnet array assemblies 416A, 416B and moveable stages 410A, 410B of the FIGS. 4A and 4B embodiments have layouts which are similar to one another in some respects and differ from one another in other respects. In the case of both magnet array assemblies 416A, 416B, a stage-x oriented edge of first magnet array 412A abuts against a stage-x oriented edge of second magnet array 412B (at abutment 455A), a stage-y oriented edge of the first magnet array 412A abuts against a stage-y oriented edge of the fourth magnet array 412D (at abutment 455B), a stage-x oriented edge of third magnet array 412C abuts against a stage-x oriented edge of the fourth magnet array 412D (at abutment 455C), and a stage-y oriented edge of the third magnet array 412C abuts against a stage-y oriented edge of the second magnet array 412B (at abutment 455D). Further, in the case of both magnet array assemblies 416A, 416B, the peripheral edges of magnet arrays 412 are aligned with one another to provide magnet array assemblies 416A, 416B with a generally rectangular peripheral shape. In particular, the stage-y oriented peripheral edges of first and second magnet arrays 412A, 412B and the stage-y oriented peripheral edges of third and fourth magnet arrays 412C, 412D are aligned with one another in the stage-y direction. Further, the stage-x oriented peripheral edges of the first and fourth magnet arrays 412A, 412D and the stage-x oriented peripheral edges of second and third magnet arrays 412B, 412C are aligned with one another in the stage-x direction.

In some embodiments, these abutments and/or peripheral edge alignments are not necessary and magnet array assemblies 16 may comprise as few as one 1D magnet array 12 or a plurality of 1D magnet arrays 412 which are spaced apart from one another (i.e. non-abutting), which have non-aligned peripheral edges and/or which abut one another with different abutment and/or alignment relationships. For example, in some embodiments, the stage-y oriented peripheral edges of first and second magnet arrays 412A, 412B and the stage-y oriented peripheral edges of third and fourth magnet arrays 412C, 412D are not aligned with one another in the stage-y direction; and in some embodiments, the stage-x oriented peripheral edges of the first and fourth magnet arrays 412A, 412D and the stage-x oriented peripheral edges of second and third magnet arrays 412B, 412C are not aligned with one another in the stage-x direction.

The layout of magnet array assembly 416B differs from the layout of magnet array assembly 416A in that for magnet array assembly 416B, corresponding stage-y oriented edges 457A, 457C of first and third magnet arrays 412A, 412C are offset from one another in the stage-x direction (by an offset Ox) and adjacent stage-x oriented edges 459A, 459C of first and third magnet arrays 412A, 412C are spaced apart from one another in the stage-y direction (by a first space Sy) and corresponding stage-x oriented edges 457B, 457D of second and fourth magnet arrays 412B, 412D are offset from one another in the stage-y direction (by an offset Oy) and adjacent stage-y oriented edges 459B, 459D of second and fourth magnet arrays 412B, 412D are spaced apart from one another in the stage-x direction (by a second space Sx). It can be seen from FIG. 5B, that for magnet array assembly 416B, the stage-x dimensions of the first and third magnet arrays 412A, 412C are larger than their corresponding stage-y dimensions, while the stage-y dimensions of the second and fourth magnet arrays 412B, 412D are larger than their corresponding stage-x dimensions. These offsets Ox, Oy and spaces Sx, Sy give rise to a non-magnetized space 451 in the center of magnet arrays assembly 416B. The layout of magnet array assembly 416B may be advantageous (relative to the layout of magnet array assembly 416A) because active coil traces interacting closely with magnet array 412A may generate relatively little coupling force on the magnet array 412C, and vice versa in magnet array assembly 416B as compared to magnet array assembly 416A; and active coil traces interacting closely with magnet array 412B generates little coupling force on the magnet array 412D, and vice versa in magnet array assembly 416B as compared to magnet array assembly 416A.

The layout of magnet array assembly 416A differs from the layout of magnet array assembly 416B in that: the stage-x oriented edges of the first and second magnet arrays 412A, 412B (i.e. the stage-x oriented edges that provide abutment 455A) have the same stage-x dimension; the stage-y-oriented edges of the first and fourth magnet arrays 412A, 412D (i.e. the stage-y oriented edges that provide abutment 455B) have the same stage-y dimension; the stage-x oriented edges of the third and fourth magnet arrays 412C, 412D (i.e. the stage-x oriented edges that provide abutment 455C) have the same stage-x dimension; and the stage-y-oriented edges of the second and third magnet arrays 412B, 412C (i.e. the stage-y oriented edges that provide abutment 455D) have the same stage-y dimension. Further, with these dimensions (and the above-described abutment and peripheral edge alignment features) magnet array assembly 416A does not have a space that is analogous to space 451 of magnet array assembly 416B. The layout of magnet array assembly 416A may be advantageous (relative to the layout of magnet array 416B) because the magnet array assembly footprint (in the stage-x and stage-y directions) is fully utilized for magnetic field generation.

Another difference between magnet array assemblies 416A, 416B is that for magnet array assembly 416A, the magnet array 412A that is furthest in the positive stage-x direction and furthest in the positive stage-y direction comprises magnetization segments 414A which are elongated in the stage-x direction and the other magnet arrays 412B, 412C, 412D alternate between having magnetization segments 414B, 414C, 414D elongated in the stage-y and stage-x directions. In contrasts, for magnet array assembly 416B, the magnet array 412D that is furthest in the positive stage-x direction and furthest in the positive stage-y direction comprises magnetization segments 414D which are elongated in the stage-y direction and the other magnet arrays 412A, 412B, 412C alternate between having magnetization segments 414A, 414B, 414C elongated in the stage-x and stage-y directions. In this description: magnet array assemblies, like magnet array assembly 416A of FIG. 5A, which have a magnet array that is furthest in the positive stage-x direction and furthest in the positive stage-y direction and which comprises magnetization segments which are elongated in the stage-x direction may be referred to as right-handed magnet array assemblies; and magnet array assemblies, like magnet array assembly 416B of FIG. 5B, which have a magnet array that is furthest in the positive stage-x direction and furthest in the positive stage-y direction and which comprises magnetization segments which are elongated in the stage-y direction may be referred to as left-handed magnet array assemblies. It should be understood that many variations to magnet array assemblies 416A, 416B can be used in moveable stages 410A, 410B. In one example, magnet array assembly 416A of FIG. 5A can be changed from a right-handed to a left-handed variation. In another example, magnet array assembly 416B of FIG. 5B can be changed from a left handed to a right handed variation.

Figure 5C:
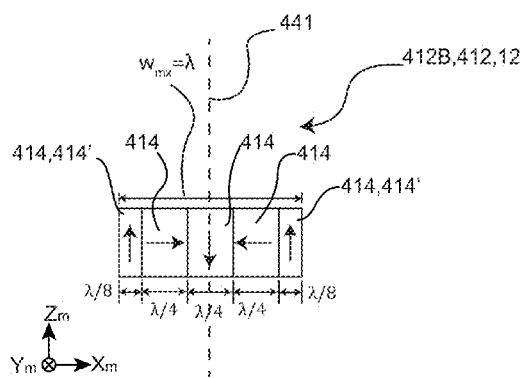
FIG. 5C is a cross-sectional view of an exemplary y-magnet array which is used in FIG. 5A magnet array assembly and which could be used for the magnet array assemblies of FIG. 5B or any of the other 1D magnet array assemblies described herein.
Figure 5D:
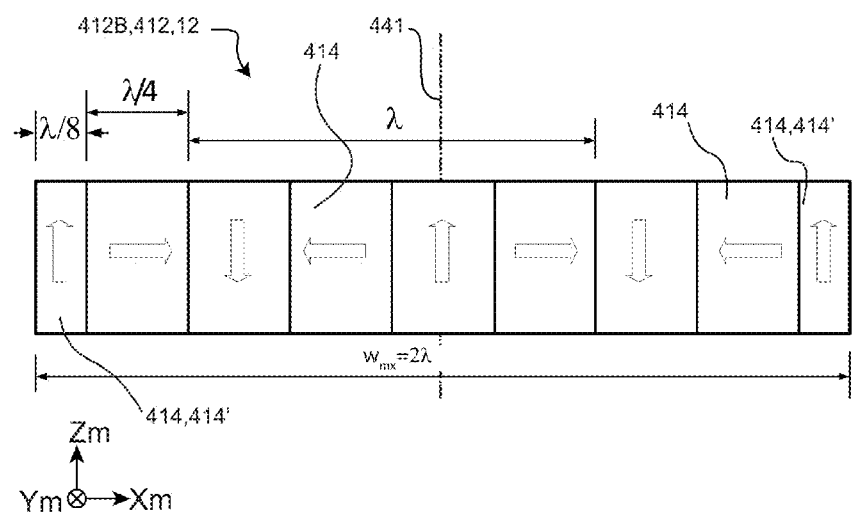
FIG. 5D is a cross-sectional view of an exemplary y-magnet array which is used in FIG. 5B magnet array assembly and which could be used for the magnet array assemblies of FIG. 5A or any of the other 1D magnet array assemblies described herein.

As discussed above, other than for their orientations, the magnet arrays 412 in magnet array assemblies 416A, 416B and moveable stages 410A, 410B may be substantially similar to one another. However, the magnet arrays 412 in magnet array assemblies 416A, 416B may have a wide variety of patterns of magnetization segments 414 (and their corresponding magnetization directions). This disclosure describes a number of different embodiments of 1-D magnet arrays 412, each of which could be used for magnet arrays 412 in any of the 1-D magnet array assemblies described herein (e.g. magnet arrays assemblies 416A, 416B). For brevity and convenience, except where otherwise dictated by the context, this disclosure refers to each of these 1D magnet arrays using reference number 412. FIG. 5C is a cross-sectional view of an exemplary y-magnet array 412 (e.g. array 412B) which is used in FIG. 5A magnet array assembly 416A and which could be used for the FIG. 5B magnet array assembly 416B or any of the other 1D magnet array assemblies described herein. FIG. 5D is a cross-sectional view of an exemplary y-magnet array 412 (e.g. array 412B) which is used in FIG. 5B magnet array assembly 416B and which could be used for the FIG. 5A magnet array assembly 416A or any of the other 1D magnet array assemblies described herein. In the illustrated cross-sectional views of FIGS. 5C and 5D, each magnet array 412 comprises a plurality of magnetization segments 414, each of which has a corresponding magnetization direction (where the magnetization directions of magnetization segments 414 are indicated by arrows). While the magnet arrays 412 of FIGS. 5C and 5D are y-magnet arrays, it will be appreciated that x-magnet arrays may be provided by merely altering the orientations of the illustrated magnet arrays and that the description of magnet arrays 412 described herein should be understood to apply to y-magnet arrays 412 or x-magnet arrays 412 with adjustment of orientation, as appropriate.

As can be seen from FIGS. 5A and 5B, magnet arrays 412 shown in FIGS. 5A and 5B exhibit a number of similar properties. The magnetization directions of magnetization segments 414 are orthogonal to the elongation directions of magnetization segments 414. At least two of magnetization segments 414 of each magnet array 412 are different from one another. In general, magnet arrays 412 may comprise magnetization segments 414 with any suitable integer number $N_t$ ($N_t \geq 2$) of magnetization directions. In the illustrated embodiments of FIGS. 5C and 5D, $N_t$=4. The magnetization directions of magnetization segments 414 exhibit a spatial period $\lambda_x$ over the stage-x width of magnet arrays 412. To avoid complicating the illustrations of FIGS. 5C and 5D, the spatial periods $\lambda_x$ are shown as $\lambda$ without loss of generality. In the FIG. 5C embodiment, the stage-x direction width ($W_{mx}$) of magnet array 412 is generally equal to $\lambda_x$, so that the magnetization directions of magnetization segments 414 exhibit a single spatial period $\lambda_x$ over the stage-x direction width of magnet array 412. In the FIG. 5D embodiment, the magnetization directions of magnetization segments 414 exhibit two spatial periods $\lambda_x$ which repeat over the stage-x direction width (($W_{mx}=2\lambda_x$) of magnet array 412. In general, the magnetization directions of first magnetization segments 214 may exhibit any positive integer number $N_m$ spatial periods $\lambda_x$ which repeat over the stage-x direction width (($W_{mx}=N_m\lambda_x$) of magnet array 412. In the illustrated embodiments of FIGS. 5C and 5D, the magnetization directions of magnetization segments 414 are mirror symmetric relative to a plane of symmetry (extending in the stage-y and stage z-directions and passing through the stage-x direction center of magnet array 412 indicated by lines 441 shown in FIGS. 5C and 5D).

In the illustrated embodiments of FIGS. 5C and 5D, the stage-x direction widths of each magnetic segment 414 is generally equal to one of $$\frac{\lambda_x}{4} \text{ or } \frac{\lambda_x}{8}.$$

In the case of the FIGS. 5A and 5B embodiments, the edge magnetization segments 414' (i.e. magnetization segments 414' at the edges of arrays 412) have stage-x direction widths $$\left(\frac{\lambda_x}{8}\right)$$

that are half of the stage-x direction widths $$\left(\frac{\lambda_x}{4}\right)$$

of the other (interior) magnetization segments 414. In some embodiments, the stage-x direction widths of each magnetic segment 414 may be generally equal to one of $$\frac{\lambda_x}{N} \text{ or } \frac{\lambda_x}{2N},$$

where N is any positive integer. In some embodiments, edge magnetization segments 414' may have stage-x direction widths $$\left(\frac{\lambda_x}{2N}\right)$$

that are half of the stage-x direction widths $$\left(\frac{\lambda_x}{N}\right)$$

magnetization segments 414. In some embodiments, $N=N_t$ (i.e. the number of different magnetization directions), as is the case in the illustrated embodiments of FIGS. 5C and 5D. In the illustrated embodiments of FIGS. 5C and 5D, the edge magnetization segments 414' have magnetization directions that are oriented in the stage-z direction (in the positive stage-z direction in the case of the illustrated embodiments).

For any of the embodiments of magnet arrays 412 shown and/or described herein, the stage-z directions of the magnetization segments 414 may be inverted from those shown and/or described herein.

The characteristics of the embodiments of FIGS. 5A-5J allow these magnet array assemblies 416 to be 90° rotationally symmetric about a stage-z oriented axis located at a stage-x-stage-y center of these magnet array assemblies 416. These characteristics include: in the cross-sectional (or split cross-sectional) view of two magnet arrays 412 having magnetization segments 414 elongated in the same directions, the patterns of the magnetization directions of the magnetization segments 414 are mirror-symmetric about a middle plane extending in the stage-z direction and in direction of elongation of these magnetization segments 414 and coinciding with a stage-x-stage-y center of the magnet array assembly 416. For example, in magnet array assemblies 416E, 416F of FIGS. 5A and 5B, two magnet arrays 412D and 412B are elongated in the stage-y direction; in the split cross-sectional view along the line Y-Y, the magnetization patterns of magnet arrays 412B, 412D are mirror symmetric about a middle plane extending in the stage-y-stage-z directions and coinciding with a stage-x-stage-y center of the magnet array assembly 416.

Figure 6A:
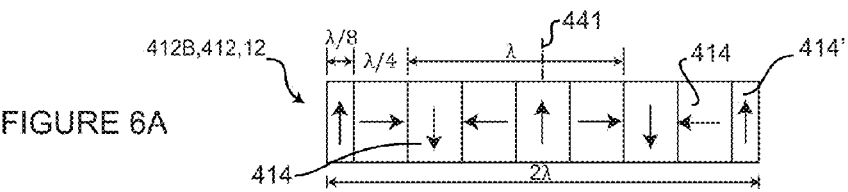
FIGS. 6A-6T are cross-sectional views of exemplary y-magnet arrays which may be used in the magnet array assemblies of FIGS. 5A, 5B or any of the other 1D magnet array assemblies described herein.

Magnet arrays 412 of FIGS. 5C, 5D represent examples of magnet arrays 412 which may be used to implement magnet arrays 412 of magnet array assemblies 416A, 416B of FIGS. 5A, 5B or any of the other 1D magnet array assemblies described herein. FIGS. 6A-6T are cross-sectional views of exemplary y-magnet arrays 412 which may be used in magnet array assemblies 416A, 416B of FIGS. 5A, 5B or any of the other 1D magnet array assemblies described herein. In the illustrated cross-sectional views of FIGS. 6A-6T, each magnet array 412 comprises a plurality of magnetization segments 414, each of which has a corresponding magnetization direction (where the magnetization directions of magnetization segments 414 are indicated by arrows). The magnetization directions of magnetization segments 414 of the magnet arrays exhibit a spatial period $\lambda_x$ over the stage-x width of magnet arrays 412. To avoid complicating the illustrations of FIGS. 6A-6T, the spatial periods $\lambda_x$ are shown as $\lambda$ without loss of generality. While the magnet arrays 412 of FIGS. 6A-6T are y-magnet arrays, it will be appreciated that x-magnet arrays may be provided by merely altering the orientations of the illustrated magnet arrays and that the description of magnet arrays 412 described herein should be understood to apply to y-magnet arrays 412 or x-magnet arrays 412 with adjustment of orientation, as appropriate.

Figure 6B:
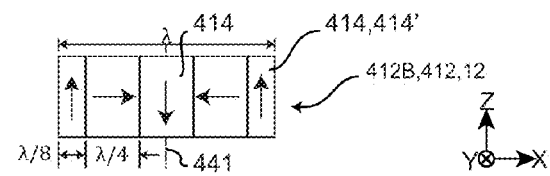
Figure 6C:
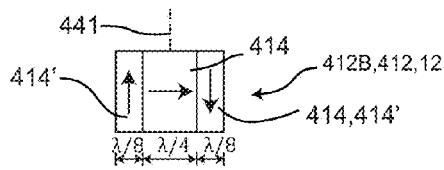
Figure 6D:
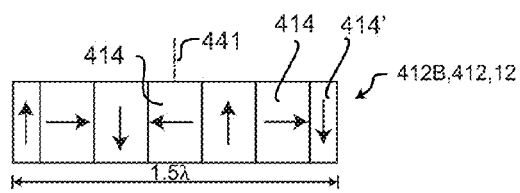

For the sake of brevity, only the differences between the magnet arrays 412 of FIGS. 6A-6T (relative to magnet arrays 412 of FIGS. 5C and 5D, described above) are described in detail here. FIG. 6A shows a magnet array 412 according to an example embodiment that is substantially similar to magnet array 412 shown in FIG. 5D. FIG. 6B shows a magnet array 412 according to an example embodiment that is substantially similar to magnet array 412 shown in FIG. 5C. FIGS. 6C and 6D show particular embodiments of magnet arrays 412 which differ from magnet arrays 412 of FIGS. 5C and 5D in that: magnet arrays 412 of FIGS. 6C and 6D have magnetization directions which are anti-symmetric about their central planes 441 extending in the stage-x-stage-z directions and passing through their stage-z-dimension centers; and have stage-x widths $W_{mx}$ given generally by $W_{mx}=(N_m-0.5)\lambda_x$ where $N_m$ is a positive integer and $\lambda_x$ is the spatial periodicity. It can be observed that $N_m=1$ for the embodiment of FIG. 6C and $N_m=2$ for the embodiment of FIG. 6D. In the FIG. 6C embodiment, the total number of magnetization directions $N_t=3$ and in the FIG. 6D embodiment, the total number of magnetization directions $N_t=4$. Any of the magnet array embodiments of FIGS. 6A-6D can be used to create a magnet array assembly 16 that is 90° rotationally symmetric about its central stage-z axis. By way of non-limiting example, the magnet array 412 shown in FIG. 6C can be used to make the right handed magnet array assembly 416 shown in FIG. 5A, by putting the FIG. 6C magnet array 412 at the location of magnet array 412B in the FIG. 5A array assembly 416 and by putting a magnet array similar to the FIG. 6C magnet array, but with the magnetization directions of each of its magnetization segments 414 inverted by 180° at the location of magnet array 412D in the FIG. 5A array assembly 416. As another non-limiting example, the magnet array 412 shown in FIG. 6D can be used to make the right handed magnet array assembly 416 shown in FIG. 5A, by putting the FIG. 6D magnet array 412 at the location of magnet array 412B in the FIG. 5A array assembly 416 and by putting a magnet array similar to the FIG. 6D magnet array, but with the magnetization directions of each of its magnetization segments 414 inverted by 180° at the location of magnet array 412D in the FIG. 5A array assembly 416.

Figure 6E:
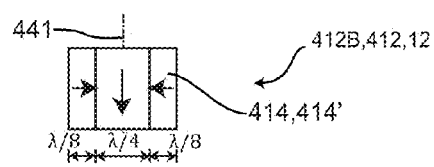
Figure 6F:
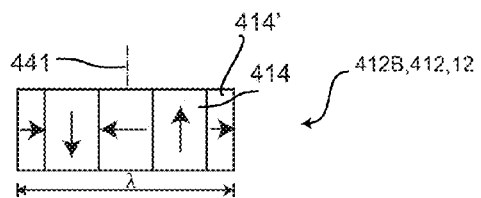
Figure 6G:
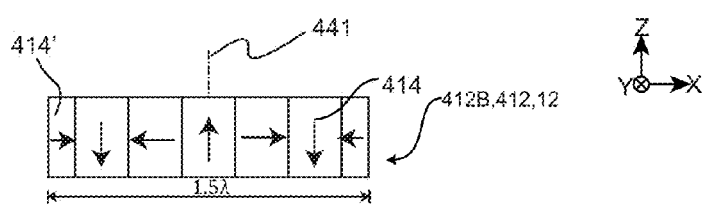
Figure 6H:
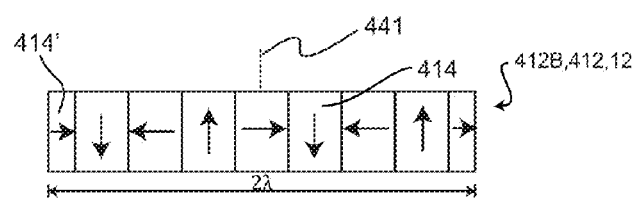
Figure 6I:
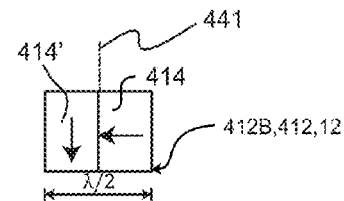
Figure 6J:
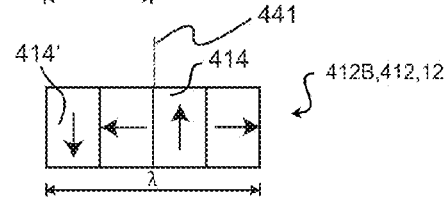
Figure 6K:
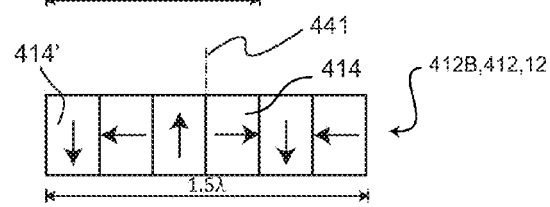
Figure 6L:
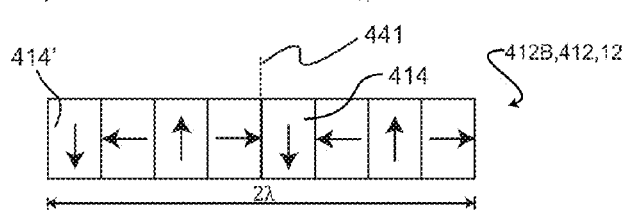

In the embodiments of FIGS. 6E-6T, magnet arrays 412 have stage-x widths $W_{mx}$ given generally by $$W_{mx} = \frac{N_m \lambda_x}{2}$$

(where $N_m$ is a positive integer and $\lambda_x$ is the spatial periodicity). It can be observed that: $N_m=1$ for the embodiments of FIGS. 6E, 6I, 6M, 6Q; $N_m=2$ for the embodiments of FIGS. 6F, 6J, 6N, 6R; $N_m=3$ for the embodiments of FIGS. 6G, 6K, 6O, 6S; and $N_m=4$ for the embodiments of FIGS. 6H, 6L, 6P, 6T. In the case of the embodiments of FIGS. 6E and 6Q, the total number of magnetization directions $N_t=3$; in the case of the embodiments of FIGS. 6I, 6M, 6N, 6O, 6P, the total number of magnetization directions $N_t=2$; and, in the case of the embodiments of FIGS. 6F, 6G, 6H, 6J, 6K, 6L, 6R, 6S, 6T, the total number of magnetization directions $N_t=4$. In the embodiments of FIG. 6E-6H, the edge magnetization segments 414' have magnetization directions that are generally oriented in the same stage-x directions (where $N_m$ is an even integer (FIGS. 6F, 6H)) and in opposing stage-x directions (where $N_m$ is an odd integer (FIGS. 6E, 6G)). Further, in the embodiments of FIGS. 6E-6H, edge magnetization segments 414' of magnet arrays 412 have stage-x direction widths $$\left(\text{e.g. } \frac{\lambda_x}{2N}\right)$$

where N is a positive integer) that are half that $$\left(\text{e.g. } \frac{\lambda_x}{N}\right)$$

of interior magnetization segments 414. In the embodiments of FIGS. 6I-6L, the edge magnetization segments 414' are of the same stage-x direction width $$\left(\text{e.g. } \frac{\lambda_x}{N},\right.$$

where N is a positive integer) as the interior magnetization segments 414 and comprise one edge magnetization segment 414' that is oriented along the stage-z direction (positive stage-z or negative stage-z) and one edge magnetization segment 414' that is oriented along the stage-x direction (positive stage-x or negative stage-x).

In the embodiments of FIGS. 6M-6P, the total number of magnetization directions $N_t=2$ and these two magnetization directions are in the positive stage-z direction and the negative stage-z direction, so that edge magnetization segments 414' have magnetization directions that are either in the positive or negative stage-z direction. Further, edge magnetization segments 414' of the embodiments of 6M-6P have stage-x direction widths $$\left(\text{e.g. } \frac{\lambda_x}{2N}\right.$$

where iv is a positive integer) that are half that $$\left(\text{e.g. } \frac{\lambda_x}{N}\right)$$

of interior magnetization segments 414. The embodiments of FIG. 6M-6P are either mirror symmetric about a stage-y-stage-z oriented central plane 441 (where $N_m$ is an even integer (FIGS. 6N, 6P)) or mirror anti-symmetric about a stage-y-stage-z oriented central plane 441 (where $N_m$ is an odd integer (FIGS. 6M, 6O)). Like the embodiments of FIGS. 6A-6D, the characteristics of the embodiments of FIGS. 6M-6P allow these magnet arrays 412 to be used to construct magnet array assemblies 416 that are 90° rotationally symmetric about a stage-z oriented axis located at a stage-x-stage-y center of the magnet array assemblies 416. These characteristics include: (i) either mirror symmetry or mirror anti-symmetry about stage-z-y plane 441; (ii) stage-x directions widths $$W_{mx} = \frac{N_m \lambda_x}{2}$$

(where $N_m$ is a positive integer and $\lambda_x$ is the spatial periodicity); and (iii) edge magnetization segments 414' have stage-x direction widths $$\left(\frac{\lambda_x}{2N},\right.$$

where N is a positive integer) that are half of the stage-x direction widths $$\left(\frac{\lambda_x}{N}\right)$$

of the other (interior) magnetization segments 414. It should be noted that suitable magnet arrays 412 may comprise one or more of these 90° rotationally symmetric characteristics, but need not have all of them.

In the embodiments of FIGS. 6Q-6T, the total number of magnetization directions $N_t=3$ (FIG. 6Q) or $N_t=4$ (FIGS. 6R-6T) and these magnetization directions are in the positive and negative stage-z directions and the positive and negative stage-x directions. In the embodiments of FIG. 6Q-6T, the edge magnetization segments 414' have magnetization directions that are generally oriented in the same (e.g. positive) stage-z directions (where $N_m$ is an even integer (FIGS. 6R, 6T)) and in opposing stage-z directions (where $N_m$ is an odd integer (FIGS. 6Q, 6S)). Further, edge magnetization segments 414' of the embodiments of 6Q-6T have stage-x direction widths $$\left(\text{e.g. } \frac{\lambda_x}{2N}\right)$$

where N is a positive integer) that are half that)

$$\left(\text{e.g. } \frac{\lambda_x}{N}\right)$$

of interior magnetization segments 414. The embodiments of FIG. 6Q-6T are either mirror symmetric about central plane 441 (where $N_m$ is an even integer (FIGS. 6R, 6T) or mirror anti-symmetric about central plane 441 (where $N_m$ is an odd integer (FIGS. 6Q, 6S)). Like the embodiments of FIGS. 6A-6D, the characteristics of the embodiments of FIGS. 6M-6P allow these magnet arrays 412 to be used to construct magnet array assemblies 416 that are 90° rotationally symmetric about a stage-z oriented axis located at a stage-x-stage-y center of the magnet array assemblies 416. These characteristics include: (i) either mirror symmetry or mirror anti-symmetry about stage-z-y plane 441; (ii) stage-x directions widths $$W_{mx} = \frac{N_m \lambda_x}{2}$$

(where $N_m$ is a positive integer and $\lambda_x$ is the spatial periodicity); and (iii) edge magnetization segments 414' have stage-x direction widths $$\left(\frac{\lambda_x}{2N},\right.$$

where N is a positive integer) that are half of the stage-x direction widths $$\left(\frac{\lambda_x}{N}\right)$$

of the other (interior) magnetization segments 414. It should be noted that a suitable magnet array 412 may comprise one or more of these 90° rotationally symmetric characteristics, but need not have all of them.

It will be appreciated from the discussion above, that there are a large number of possible embodiments of magnet arrays 412 which may be used in the magnet array assemblies 416A, 416B of FIG. 5A, 5B or any of the other 1D magnet array assemblies described herein, with potential adjustments to the individual magnet arrays 412 of such magnet array assemblies 416. It will be appreciated that the exemplary embodiments described in FIGS. 6A-6T are exemplary and non-limiting in nature and that magnet arrays 412 may be provided with other features not explicitly described herein. For example, in some embodiments, magnet arrays 412 could comprise different parameters $W_{mx}$, N, $N_m$, $N_t$ and/or $N_z$. As another example, in some embodiments, magnet arrays 412 could comprise centralized non-magnetic spacers like those described in PCT publication No. WO2013/059934.

Bumpers

Referring back to FIG. 3, moveable stage 110 of displacement device 150 comprises optional bumpers 117 which may protect moveable stage 110 from other moveable stages and other objects that may be introduced onto stator 30 or into working region 36. Bumpers 117 may be made of non-magnetic materials to protect moveable stage 110 and its magnet array assembly 116. Further bumpers 117 may prevent two or more moveable stages 110 from getting too close to one another (e.g. to a vicinity where their respective magnetization segments might attract one another and might overcome the forces caused by current controllably driven into coil traces 34). Bumpers 117 may also serve to prevent other objects with high magnetic permeability from getting too close to magnet array assembly 116. For example, in the absence of non-magnetic bumpers 117, an iron or steel washer/screw/nuts dropped onto working region 36 can be attached to magnet array assembly 116 and cause system failure.

Figures 7, 8A:
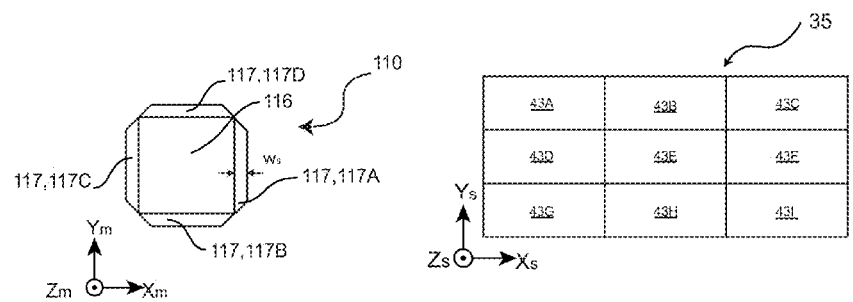
FIG. 7 is a top cross-sectional view of the FIG. 3 moveable stage according to a particular embodiment showing its non-magnetic bumpers.
FIG. 8A shows a schematic top view of a stator coil assembly according to a particular embodiment which may be used in any of the displacement devices described herein.

FIG. 7 shows a top cross-sectional view of the FIG. 3 moveable stage 110 according to a particular embodiment showing non-magnetic bumpers 117. Bumper 117 comprises four bumper elements 117A, 117B, 117C, 117D abutting respective peripheral edges of magnet array assembly 116. The lateral width $W_B$ of a bumper element 117A, 117B, 117C, 117D may be defined to be the narrower one of its stage-x or stage-y dimension. The lateral width $W_B$ of each bumper element 117A, 117B, 117C, 117D is preferably between 0.1λ and 0.75λ, where λ is the magnet spatial period and it is assumed, for the exemplary embodiment of FIG. 7, that $\lambda_x=\lambda_y=\lambda$. In some embodiments, this lateral width $W_B$ is set at 0.2λ~1λ. In some embodiments, this lateral width $W_B$ is set at 0.3λ~0.5λ. In some embodiments, this lateral width $W_B$ is set to be generally equal to 0.4λ. In some embodiments, this lateral width $W_B$ is set to be generally equal to 0.45λ.

Back Iron

Figure 11A:
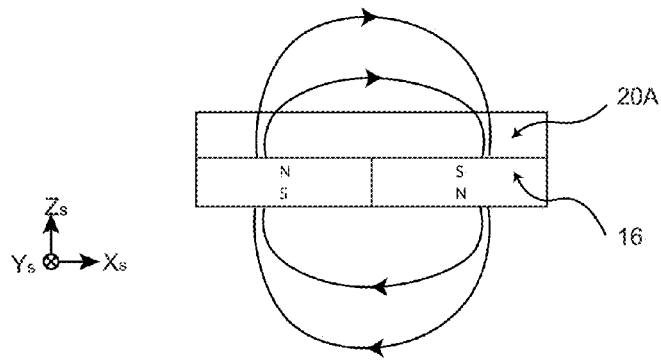
FIGS. 11A and 11B respectively depict cross-sectional views of the same magnet array assembly supported by a non-magnetic stage support structure and an iron-based stage support structure.
Figure 11B:
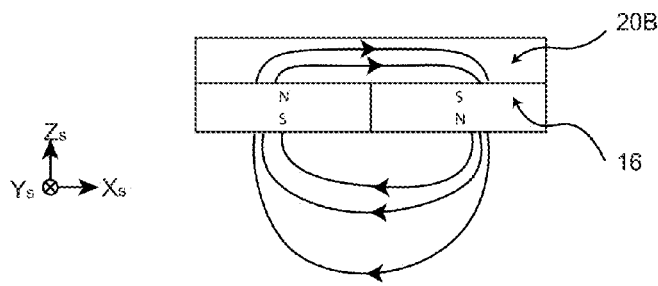

Referring back to FIG. 3, in some embodiments, stage support structure 20 may be fabricated from highly magnetically permeable material (e.g. with relative magnetic permeability greater than 100), such as iron, ferrite, cobalt, combinations of these materials and/or the like. High magnetic permeability helps enhance the magnetic field below (e.g. in the negative stator-z direction relative to) magnet array assembly 16, which is where the coil traces of stator 30 are located during operation. FIGS. 11A and 11B respectively depict cross-sectional views of the same magnet array assembly 16 supported by a non-magnetic stage support structure 20A and an iron-based stage support structure 20B. Stage support structure 20B of the FIG. 11B embodiment is iron-based, but other magnetically permeable materials could be used to provide this stage support structure 20B (as discussed above). When provided in stage support structures 20, such magnetically permeable materials may be referred to herein as back iron. It can be seen from FIGS. 11A and 11B, that the magnetic field in the case where support structure 20B comprises back iron (FIG. 11B) is relatively strong below (e.g. in the negative stator-z direction relative to) magnet array assembly 16 when compared to the case where support structure 20A does not include back iron. A stronger magnetic field generated by the permanent magnets in magnet array assembly 16 can help increase the force on moveable stage 10 under the same coil trace current conditions.

In some embodiments, it may be beneficial to use a stage support structure 20A without back iron. Such embodiments may be desirable to minimize the weight of moveable stage 10, for example. Such stage support structures 20A can be fabricated from aluminum, ceramic, carbon-fiber reinforced composite materials, combinations of these materials and/or the like. Reducing the weight of stage support layer 20A may help to minimize moveable stage inertia.

Stator Coil Assembly

Various embodiments and additional detail of stator 30 are now provided. Referring back to FIG. 1 described above, stator 30 comprises a stator coil assembly 35 which comprises at least the traces of a plurality of electrically conductive coils 31. Coils 31 are shaped to provide first and second pluralities of coil traces 32, 34 which are respectively elongated in non-parallel directions. In particular embodiments, such as depicted in FIG. 1A, the first plurality of coil traces 32 is orthogonal to the second plurality of coil traces 34. In particular embodiments, such as depicted in FIG. 1A, first plurality of coil traces 32 is distributed over at least a portion of a first layer 40 and generally elongated in a stator-x direction; and second plurality of coil traces 34 is distributed over at least a portion of a second layer 42 and generally elongated in a stator-y direction. In some embodiments, such as depicted in FIG. 1A, the first and second layers 40, 42 over which first and second pluralities of coil traces 32, 34 are respectively distributed may be located at different (e.g. first and second) stator-z locations, although this is not necessary and, in some embodiments, first and second layers 40, 42 may be provided in different excitation regions (described in more detail below), but at the same stator-z location.

In some embodiments, stator 30 may comprise additional pluralities of coil traces which may be distributed over portions of additional layers at corresponding additional stator-z direction locations. For example, stator 30 may comprise a first additional plurality of coil traces (not shown) distributed over at least a portion of a first additional layer at a corresponding first additional stator-z location and generally elongated in a stator-x direction; and a second additional plurality of coil traces (not shown) distributed over at least a portion of a second additional layer at a corresponding second additional stator-z location and generally elongated in a stator-y direction. Additional pluralities of coil traces are not limited to being elongated in the stator-x or stator-y directions. In some embodiments, additional pluralities of coil traces are provided which are generally elongated in angular directions between the stator-x and stator-y directions. For example, in some embodiments, stator 30 may comprise one or both of: a first additional angular plurality of coil traces (not shown) distributed over at least a portion of a first additional angular layer at a corresponding first additional angular stator-z location and generally elongated in a direction split between the positive stator-x and positive stator-y directions (e.g. at 45° counter-clockwise around a stator-z axis from the positive stator-x direction in some embodiments); and a second additional angular plurality of coil traces (not shown) distributed over at least a portion of a second additional angular layer at a corresponding second additional angular stator-z location and generally elongated in a direction split between the negative stator-x and positive stator-y directions (e.g. at 45° clockwise around a stator-z axis from the negative stator-x direction in some embodiments).

In some embodiments, coil traces 32, 34 in layers 40, 42 at different stator-z locations may overlap one another in the stator-z direction. The two dimensional space over which coil traces 32, 34 overlap one another in the stator-z direction may define a working region 36 over which moveable stage 10 is moveable relative to stator 30. In some embodiments, coil traces 32, 34 in each corresponding layer 40, 42 may be distributed throughout their respective layers 40, 42, so that coil traces 32, 34 and/or layers 40, 42 may overlap in the stator-z direction at all locations in working region 36. This is not necessary. In some embodiments, coil traces 32, 34 may occupy particular excitation regions (described in more detail below) that occupy less than an entirety of a corresponding layer 40, 42. Some of coil traces 32, 34 may be connected at their ends to form a two-phase, three-phase, or multiple-phase winding configuration as described in more detail below. While working region 36 is a two-dimensional space, this description may describe working region 36 as a feature of stator 30, for convenience.

FIG. 3 shows another embodiment of a displacement device 150 which comprises a stator 130 according to a particular embodiment. Stator 130 of the FIG. 3 embodiment comprises a stator bearing layer 145, stator coil assembly 135, coil supporting layer 137, power electronics layer 138, and cooling layer 139. Stator coil assembly 135 may comprise the aforementioned coils 31 and/or coil traces 32, 34.

Stator bearing layer 145 may overlap with stator coil assembly 135 in stator-z direction over the stator-x/stator-y span of working region 36 (not shown in FIG. 3). In the illustrated embodiment, stator bearing layer 145 comprises a generally planar stator bearing surface 126 which may be parallel and adjacent to (and may bear against) generally planar stage bearing surface 124 of moveable stage 110 during operation. In the illustrated embodiment, stage bearing surface 124 faces the negative stator-z direction and stator bearing surface 126 faces the positive stator-z direction. Bearing layers 118, 145 may support moveable stage 10 in the stator-z direction, may constrain moveable stage 10 rotation about stator-x and stator-y oriented axes, may minimize friction forces in lateral (stator-x and stator-y) directions, and may minimize friction torque around axes oriented in the stator-z direction. Bearing layers 118, 145 may be fabricated from materials with a low coefficient of sliding friction. For example, in some embodiments, the coefficient of sliding friction (the ratio of the stator-x or stator-y direction friction force over their normal (stator-z direction) contact force) between bearing layers 118, 145 and their respective bearing surfaces 124, 126 is less than 0.2. In some embodiments, this coefficient of sliding friction is less than 0.15 and in some embodiments this coefficient of sliding friction is less than 0.06. In some embodiments, one of stage bearing layer 118 and stator bearing layer 145 is fabricated from PTFE (Polytetrafluoroethylene) or PTFE doped materials, and the other of stage bearing layer 118 and stator bearing layer 145 is fabricated from metal-based material, such as stainless steel. Such combination of bearing materials results in their coefficient of friction as low as 0.04. In some embodiments, both bearing layers 118, 145 are made of PTFE or PTFE doped plastic material. Bearing layers 118, 145 may be provided in the shape of film, sheet, pad, a thin layer of coating and/or the like.

In some embodiments, stage bearing layer 118 may comprise a very flat bearing surface 124 which may be provided using manufacturing processes such as grinding, polishing and/or the like and stator bearing layer 145 may comprise or provide a restrictor layer which may be used to create an air bearing between stage bearing layer 118 and stator bearing layer 145. Such a restrictor layer may be fabricated from porous material with a large number of small holes. Non-limiting examples of materials which may be used to fabricate a restrictor layer include porous carbon, porous bronze, porous steel and/or the like. In some embodiments, a restrictor layer may comprise a hard solid material with small holes (e.g. created by a laser drilling process) that may be used to guide high pressure air. The diameter of the pores or holes in such restrictor layers may range between less than 100 nm to a few hundreds of microns, for example.

Figure 12:
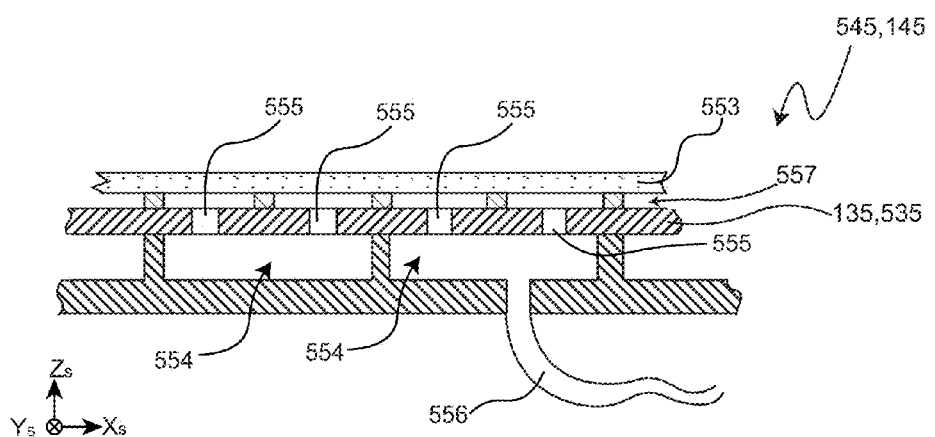
FIG. 12 is a schematic partial cross-sectional view of a stator bearing layer which comprises a restrictor layer and can be used to create an air bearing according to a particular embodiment.

FIG. 12 depicts a stator bearing layer 545 which comprises a restrictor layer 553. Stator bearing layer 545 may be used to provide an air bearing between the stator 30 and moveable stage 10 of any of the displacement devices 50 described herein. Stator bearing layer 545 comprises multiple sub-layers, which define a plurality of air distribution chambers 554 and holes 555. The stator coil assembly 535 may be located between air distribution chambers 554 and a spacing layer 557. Holes 555 through stator coil assembly 535 may be provided by PCB vias, for example. High pressure air may be supplied to air chambers 554 via a suitably configured conduit 556. The high pressure air is forced out of chambers 554 via holes 555 and impinges on restrictor layer 553. As discussed above, restrictor layer 553 is porous and air flowing through its pores can create an air bearing above (in the positive stator-z direction relative to) stator bearing layer 545. As shown in the FIG. 12 embodiment, stator bearing layer 545 may optionally comprise a spacing layer 557 between holes 555 and restrictor layer 553. Spacing layer 557 may provide through holes with cross-sectional areas that are larger than holes 555 for directing air from holes 555 to restrictor layer 553.

Coil supporting layer 137 may provide mechanical support to stator coil assembly 135.

Stator coil assembly 135 of the FIG. 3 embodiment may be substantially similar to stator coil assembly 35 of the FIG. 1 embodiment and may comprise coils 31 shaped to provide coil traces 32, 34 (and any additional coil traces) having features similar to those of the FIG. 1 embodiment. Controller 60 may be connected to deliver control signals to one or more amplifiers 70 and controller 60 may be configured to use those signals to control the currents driven by amplifier(s) 70 into at least some of first coil traces 32 and at least some of second coil traces 34 to thereby cause moveable stage 10 to track a desired position within working region 36—e.g. a desired position, $(x_r, y_r)$, within working region 36, where $x_r$ is a desired position of moveable stage 10 in the stator-x direction and $y_r$ is a desired position of moveable stage 10 in the stator-y direction.

When in operation, moveable stage bearing surface 124 is in close proximity with (e.g. adjacent to) and generally parallel to stator bearing surface 126. The stator-z direction gap between moveable stage 110 and stator 130 is less than 10 mm, and is typically less than 1 mm. In some embodiments, stage bearing surface 124 of moveable stage 110 is always in contact and bears against stator bearing surface 126 of stator 30. In some embodiments, the magnetic forces generated by the interaction of currents driven into coil traces 32, 34 and magnet array(s) 12 of moveable stage 30 may be controlled (e.g. by controller 60), such that moveable stage 110 is attracted toward stator 30 whenever the currents are being controllably driven into coil traces 32, 34.

FIG. 8A shows a schematic top view of a stator coil assembly 35 according to a particular embodiment which may be used in displacement device 50 (FIG. 1), displacement device 150 (FIG. 3) or any of the other displacement devices described herein. Stator coil assembly 35, as depicted, comprises a plurality of excitation regions 43A-43I (collectively, excitation regions 43). In some embodiments, each of excitation regions 43 is rectangular in shape. In some embodiments, excitation regions 43 may have other shapes (e.g. triangular, hexagonal and/or the like). Each location in each of excitation regions 43 may overlap corresponding coil trace layers 40, 42 at different stator-z locations and corresponding coil traces 32, 34 (and any additional layers and additional coil traces) in the stator-z direction. Coil traces 32, 34 that overlap a particular one of excitation regions 43 in the stator-z direction may be said to be coil traces 32, 34 in, of, associated with or corresponding to the particular one of excitation regions 43. Each coil trace 32, 34 in each excitation region 43 can be excited with a controllable current, where such current may be controlled by controller 60 which may use control signals to control amplifier(s) 70 which in turn drive current into coil traces 32, 34. Each of excitation regions 43 may be connected to a corresponding amplifier module, which may be located in power electronics layer 138 (see FIG. 3) or may be spatially separated from stator 30 and connected to coil traces 32, 34 in its excitation region 43 using suitable electrical connections. Currents driven into the coil traces 32, 34 in each excitation region 43 can be independently controlled. In some embodiments, two or more excitation regions 43 may share a common amplifier by connecting their corresponding coil traces in parallel or serially. It is not necessary that a particular stator coil assembly 35 comprise a plurality of excitation regions. In some embodiments, it is sufficient for a stator coil assembly 35 to have a single excitation region that spans the entire working region.

Figure 8B:
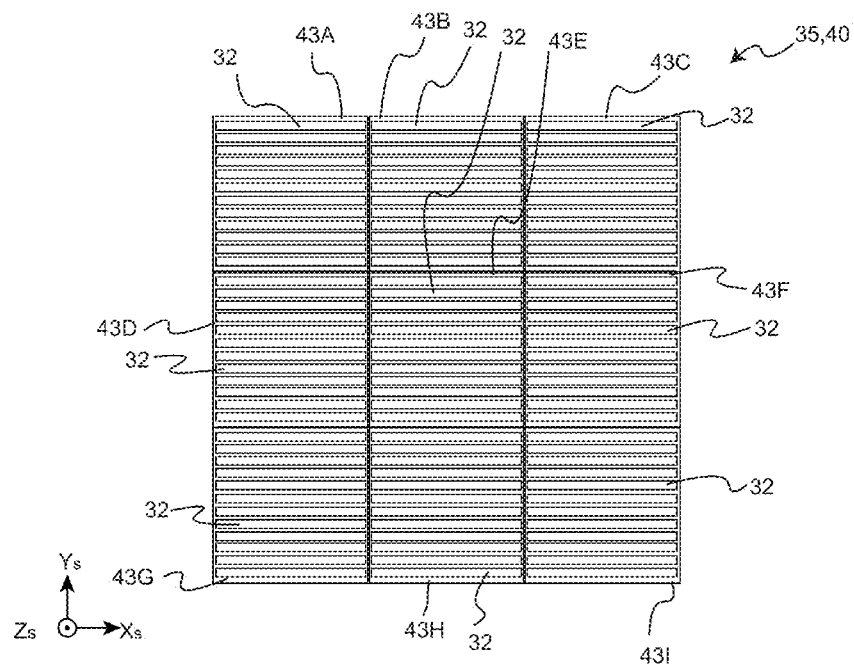
FIG. 8B shows a schematic top view of a single layer of the FIG. 8A stator coil assembly according to a particular embodiment, where the individually controllable coil traces in each excitation region all have the same orientation.

FIG. 8B shows a schematic top view of a single layer 40 of the FIG. 8A stator coil assembly 35 according to a particular embodiment, where the individually controllable coil traces 32 corresponding to each excitation region 43 have the same orientation in the illustrated layer 40. In the case of the example layer 40 illustrated in FIG. 8B, layer 40 comprises individually controllable coil traces 32 which are elongated in the stator-x direction corresponding to each excitation region 43. In such embodiments, the FIG. 8A stator coil assembly 35 may also comprise another layer 42 (not expressly shown) at another stator-z location wherein the other layer 42 comprises individually controllable coil traces 34 which are elongated in the stator-y direction corresponding to each excitation region 43. It will be appreciated from the discussion herein that the FIG. 8A stator assembly could comprise additional layers similar to layers 40, 42 described above.

Figure 8C:
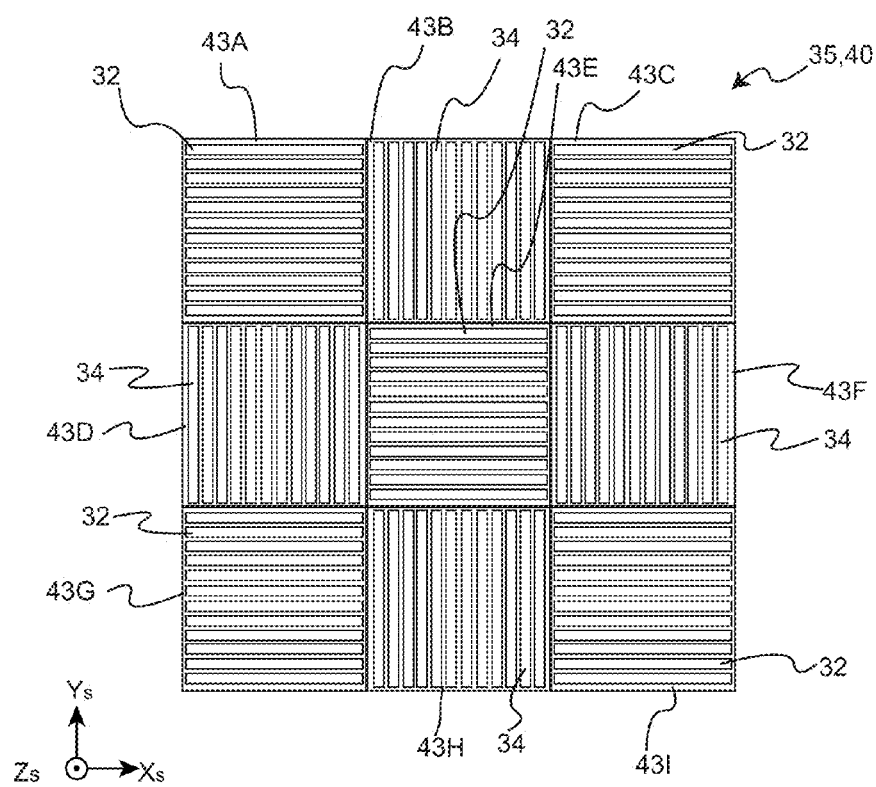
FIG. 8C shows a schematic top view of a single layer of the FIG. 8A stator coil assembly according to a particular embodiment, where the individually controllable coil traces in each excitation region have different orientations.

FIG. 8C shows a schematic top view of a single layer 40 of the FIG. 8A stator coil assembly 35 according to another particular embodiment, where the individually controllable coil traces 32, 34 corresponding to each excitation region 43 have different orientations. In the case of the example layer 40 illustrated in FIG. 8B, layer 40 comprises individually controllable coil traces 32 which are elongated in the stator-x direction corresponding to excitation regions 43A, 43C, 43E, 43G, 43I and layer 40 comprises individually controllable coil traces 34 which are elongated in the stator-y direction corresponding to excitation regions 43B, 43D, 43F and 43H. In some such embodiments, the FIG. 8A stator coil assembly 35 may also comprise another layer 42 (not expressly shown) at another stator-z location wherein the orientations of the coil traces 32, 34 in each excitation region 43 are reversed. For example, in in another layer 42, layer 42 may comprise individually controllable coil traces 34 which are elongated in the stator-y direction corresponding to excitation regions 43A, 43C, 43E, 43G, 43I and layer 42 may comprise individually controllable coil traces 32 which are elongated in the stator-x direction corresponding to excitation regions 43B, 43D, 43F and 43H. It will be appreciated from the discussion herein that the FIG. 8A stator assembly could comprise additional layers similar to layers 40, 42 described above. In some embodiments, the FIG. 8A stator assembly could comprise combinations of layers of the type described with reference to FIG. 8B and layers of the type described with reference to FIG. 8C.

Figure 9A:
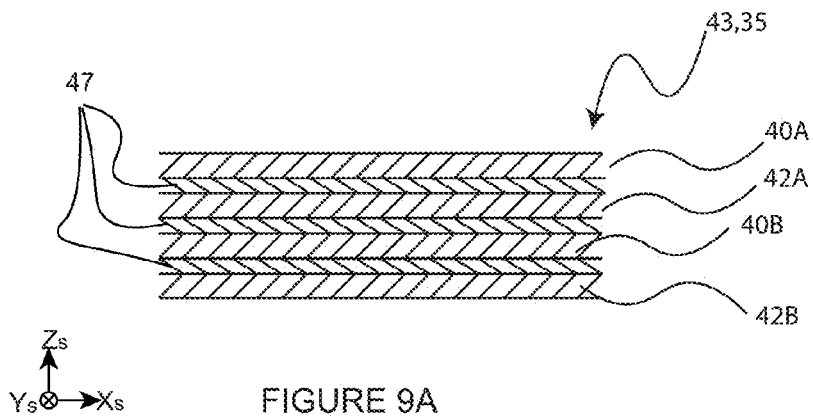
FIGS. 9A-9D each show schematic depictions of portions of coil traces in a corresponding excitation region according to a particular embodiment.

FIGS. 9A-9D each show schematic depictions of portions of coil traces in one corresponding excitation region 43. FIG. 9A is a cross-sectional view (along a stator-x/stator-z plane) of one excitation region 43 of stator coil assembly 35 comprising a plurality of coil trace layers 40A, 40B, 42A, 42B (collectively, coil trace layers, 40, 42). In the FIG. 9A embodiment, each coil trace layer 40, 42 is separated from adjacent coil trace layers 42, 40 by an insulation layer 47. Insulation layer 47 prevents electrical conduction between coil trace layers 40, 42. Each coil trace layer 40, 42 extends in the stator-x and stator-y directions with its normal direction generally parallel to the stator-z direction. As discussed above, each coil trace layer 40, 42 comprises a plurality of coil traces which may be distributed over at least a portion of the layer and which extend in a particular stator direction (e.g. in the stator-x direction or the stator-y direction).

Figure 9B:
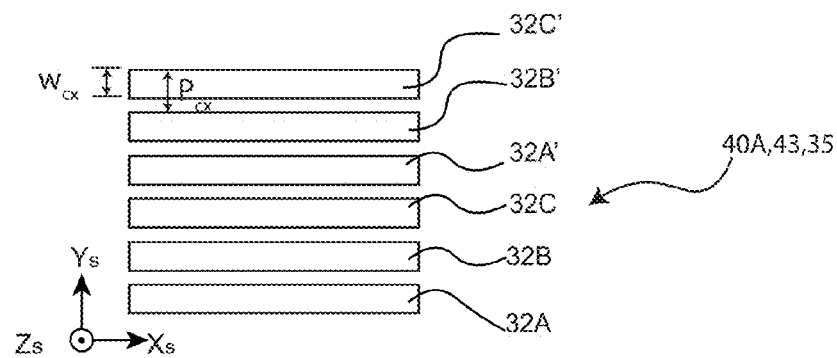
Figure 9C:
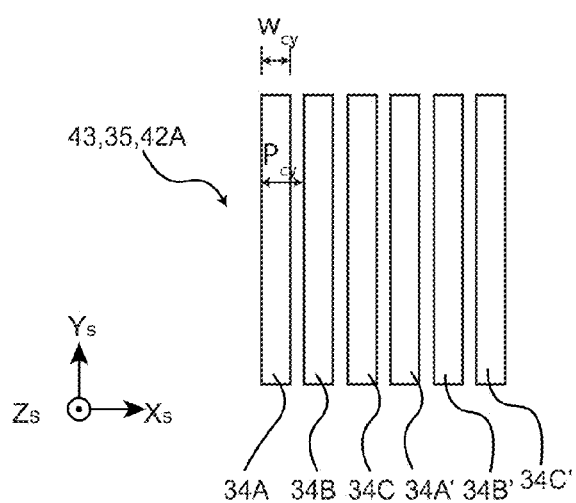

FIG. 9B is a schematic cross-sectional view (along a stator-x/stator-y plane) of a first coil trace layer 40A according to a particular embodiment. Coil trace layer 40B may have characteristics similar to coil trace layer 40A. Coil trace layer 40A of the FIG. 9B embodiment comprises a plurality of coil traces 32A, 32B, 32C, 32A', 32B', 32C' (collectively, coil traces 32), with each coil trace 32 linearly elongated in the stator-x direction. Due to their elongation in the stator-x direction, coil traces 32 may be referred to herein as x-traces 32 and coil trace layer 40A may be referred to as an x-trace layer 40 or an x-layer 40. FIG. 9C is a schematic cross-sectional view (along a stator-x/stator-y plane) of a second coil trace layer 42A according to a particular embodiment. Coil trace layer 42B may have characteristics similar to coil trace layer 42A. Coil trace layer 42A of the FIG. 9C embodiment comprises a plurality of coil traces 34A, 34B, 34C, 34A', 34B', 34C' (collectively, coil traces 34), with each coil trace 34 linearly elongated in the stator-y direction. Due to their elongation in the stator-y direction, coil traces 34 may be referred to herein as y-traces 34 and coil trace layer 42A may be referred to as an y-trace layer 42 or a y-layer 42.

As can be seen from FIGS. 9B and 9C, each x-trace 32 has a stator-y direction width $W_{cx}$ and adjacent pairs of x-traces 32 are spatially offset by a stator-y direction spatial pitch $P_{cx}$ and each y-trace 34 has a stator-x direction width of $W_{cy}$ and adjacent pairs of y-traces 34 are spatially offset by a stator-x direction spatial pitch $P_{cy}$. In some embodiments, the stator-y direction spatial pitch $P_{cx}$ of x-traces 32 may be generally equal to $$P_{cx} = \frac{\lambda_1}{2n_p} = \frac{\lambda_y}{2n_p},$$

where $\lambda_1 = \lambda_y$ is a first spatial period in a stage-y direction (as explained in more detail below) and $n_p$ is an effective number of phases in the first currents (as explained in more detail below). In some embodiments, the stator-x direction spatial pitch $P_{cy}$ of y-traces 34 may be generally equal to $$P_{cy} = \frac{\lambda_2}{2m_p} = \frac{\lambda_x}{2m_p},$$

where $\lambda_2 = \lambda_x$ is a second spatial period in a stage-x direction (as explained in more detail below) and $m_p$ is an effective number of phases in the second currents (as explained in more detail below). For example, a trace pitch of x-traces 32 in the stator-y direction could be $$P_{cx} = \frac{\lambda_1}{2n_p} = \frac{\lambda_y}{2n_p} = \frac{\lambda_1}{6}$$

(corresponding to three effective phases (e.g. $n_p=3$)). A three-phase amplifier with 6 transistors (e.g. MOSFET, or IGBT or BJT) could then be used to drive the x-traces 32 in layer 40A. In some embodiments, the stator-y direction spatial pitch $P_{cx}$ of x-traces 32 may be generally equal to $$P_{cx} = \frac{P\lambda_1}{Q} = \frac{P\lambda_y}{Q}$$

where P and Q are arbitrary positive integers. In some embodiments, the stator-x direction spatial pitch $P_{cy}$ of y-traces 34 may be generally equal to $$P_{cy} = \frac{R\lambda_2}{S} = \frac{R\lambda_x}{S},$$

where R and S are arbitrary positive integers.

As shown in FIGS. 9B and 9C, the trace widths $W_{cx}$ and $W_{cy}$ are each less than the respective trace pitches $P_{cx}$ and $P_{cy}$ to avoid electric conduction between two adjacent traces. In some embodiments, these differences ($P_{cx}-W_{cx}$ and $P_{cy}-W_{cy}$) may be relatively small (e.g. on the order of 100-400 microns in some embodiments) and may depend on the thickness of corresponding traces 32, 34 in the stator-z direction). It should be noted that there may be a plurality of x-trace layers 40 and y-trace layers 42 in one excitation region (as is the case, for example, in the embodiment of FIG. 9A), and these trace layers 40, 42 may be located at different stator-z locations. X-traces 32 in different x-trace layers 40 of one excitation region 43 may be connected in parallel or be connected in serial or be each independently driven with different power amplifier channels. Similarly, y-traces 34 in different y-trace layers 42 of one excitation region 43 may be connected in parallel or be connected in serial or be each independently driven with different power amplifier channels.

Figure 9D:
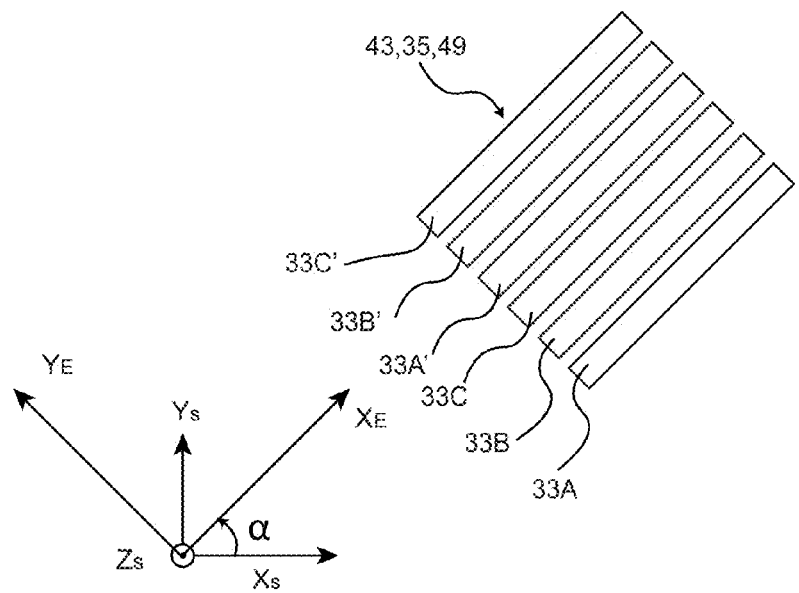

FIG. 9D shows an embodiment of coil trace layer 49 having coil traces 33A, 33B, 33C, 33A', 33B', 33C' (collectively, coil traces 33). Each trace 33 of the FIG. 9D coil trace layer 49 is linearly elongated along a stator direction $X_E$, which is oriented at an angle α relative to the stator-x direction. Due to its elongation direction at an angle α relative to the stator-x axis, coil traces 33 in the FIG. 7D coil trace layer 49 may be referred to as α-traces 33 and coil trace layer 49 may be referred to as an a-trace layer 49. Typical values of angle α in some embodiments are 45° and 135°, although other angles may be used. The trace pitch and trace width of traces 33 in a-layer 49 may have features similar to those of coil traces 32, 34 of FIGS. 9B and 9C. It will be appreciated that α-layer 49 and α-traces 33 are optional and not necessary.

In general, current driven through the coil traces 32, 33, 34 is used to propel moveable stage 10 to a desired position. In particular, current driven in x-traces 32 may be used to propel moveable stage 10 along a stator-y direction to track a desired stator-y position $y_r$; current driven in y-coil traces 34 may be used to propel moveable stage 10 along a stator-x direction to track a desired stator-x position $x_r$; and current driven in a-traces 33 may be used to rotate moveable stage 10 around a stator-z oriented axis, as explained below.

It will be appreciated that the number of coil traces 32, 34, 33 in layers 40, 42, 49 need not be limited to the exemplary six traces shown in FIGS. 9B, 9C, 9D. In some embodiments, coil trace layers 40, 42, 49 adjacent to one another in the stator-z direction may comprise coil traces 32, 34, 33 that are non-parallel with respect to one another. In some embodiments, coil trace layers 40, 42, 49 adjacent to one another in the stator-z direction may comprise coil traces that are orthogonally oriented with respect to one another. It will be appreciated that the number of coil trace layers 40, 42, 49 in stator 30 need not be limited to the four traces shown in the illustrative embodiment of FIG. 9A. In general, stator 30 may comprise any suitable number of coil trace layers 40, 42, 49. Further, it is not a requirement that the orientations of coil traces 32, 34, 33 in coil trace layers 40, 42, 49 adjacent to one another in the stator-z direction be different from one another.

One excitation region 43 may comprise one or a plurality of x-trace layers 40 and one or a plurality of y-trace layers 42. In some embodiments, it may be desired that one excitation region 43 comprises one or a plurality of x-trace layers 40, one or a plurality of y-trace layers 42, and one or a plurality of a-trace layers 49. Coil trace layers 40, 42, 49 (and their respective coils 32, 34, 33) in one excitation region 43 may overlap with each other in the stator-z direction throughout the excitation region 43. Generally, one coil excitation region 43 may comprise one or more $\alpha_1$-coil trace layers, one or more $\alpha_2$-trace layers, one or more $\alpha_3$-trace layers . . . one or more $\alpha_t$-trace layers, where t is any positive integer, $\alpha_1, \alpha_2 \ldots \alpha_t$ are greater than or equal to 0° and less than 180°, but not equal to each other.

Figure 10:
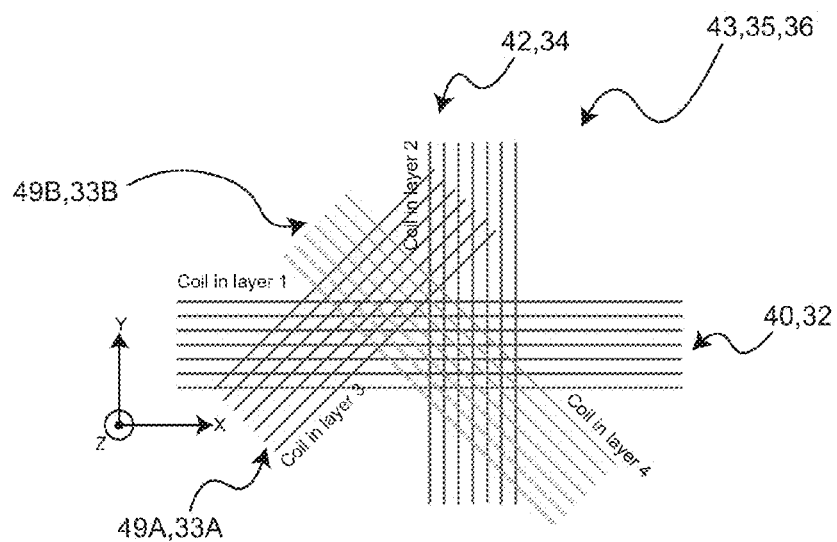
FIG. 10 is a schematic depiction of an excitation region which forms part of a working region associated with a stator coil assembly according to an example embodiment.

FIG. 10 is a schematic depiction of an excitation region 43 which forms part of a working region 36 associated with a stator coil assembly 35 according to an example embodiment. In excitation region 43, stator coil assembly 35 comprises an x-trace layer 40 comprising x-traces 32, a y-trace layer 42 comprising y-traces 34, an $\alpha_1$-trace layer 49A comprising $\alpha_1$-traces 33A and an $\alpha_2$-trace layer 49B comprising $\alpha_2$-traces 33B. In the illustrated embodiment of FIG. 10, $\alpha_1$ is generally equal to 45° and $\alpha_2$ is generally equal to 135°. It should be noted that in the depictions of FIGS. 9 and 10, only partial traces are shown for illustrative convenience and it should be understood that coil traces 32, 34, 33 in each coil trace layer 40, 42, 49 may be distributed throughout at least a portion of their corresponding excitation region 43 and may extend (in their corresponding extension direction) across at least a portion of their corresponding excitation region 43. Coil traces in coil-trace layers 40, 42, 49 of an excitation region 43 may be electrically connected at their ends to form multiple-phase (e.g. two phase, three phase or more) winding configurations.

Referring back to the illustrated embodiment of FIG. 3, stator 130 comprises a coil support layer 137 for supporting coil assembly 135 and a power electronics layer 138. Power electronics layer 138 may comprise one or more amplifier(s) 70 connected by suitable electrical connections (not shown) to the coil traces of coil assembly 135 to provide excitation currents to the coil traces. In some embodiments, it is not necessary that amplifier(s) 70 be located in power electronics layer 138 and amplifier(s) 70 may be located in any suitable location which can facilitate the electrical connection of amplifier(s) 70 to the coil traces in coil trace assembly 135. This configuration is shown in dashed lines in FIG. 3. Stator 130 and/or displacement device 150 may comprise a signal interface (and corresponding electrical connections) between amplifier(s) 70 and controller 60 to facilitate control of amplifiers 70 by controller 60. Such a signal interface between controller 60 and amplifiers 70 may comprise any suitable form of signal interface, such as a real-time network interface, fieldbus and/or the like. In one example embodiment, this interface between controller 60 and amplifier(s) 70 comprises an EtherCAT interface.

Coil support layer 137 may be fabricated using highly magnetically permeable material (e.g. with relative magnetic permeability greater than 100), such as iron, ferrite, cobalt combinations of these materials and/or the like. Fabricating coil support layer 137 using magnetically permeable materials may help to increase the magnetic flux density at stator coil traces 32, 33, 34 and may thereby enhance the lateral (stator-x and stator-y) direction interaction forces associated with the interaction of the magnetic fields generated by stator 30 and by moveable stage 10. In some embodiments, coil support layer 137 may be fabricated using non-conductive materials to minimize eddy currents induced by motion of moveable stages. Non-limiting examples of non-conductive materials include plastics, ceramics, mineral-based materials, composite materials and/or the like. In some embodiments, coil support layer 137 may be fabricated using materials with low magnetic permeability, such as aluminum, ceramics, plastic, and/or the like.

Heat can be generated in displacement device 150. Such heat can come from a number of sources which may include: the currents driven into the traces of stator coil assembly 135, friction between stage bearing layer 118 and stator bearing layer 145, eddy currents in stator 30 induced by motion of moveable stage 110, electronic devices/components inside power electronics layer 138 and/or the like. To accommodate such heat, in some embodiments, stator 130 comprises a cooling layer 139. Cooling layer 139 may comprise one or more cooling devices. Non-limiting examples of cooling devices include fans, surface area increasing heat sinks to allow air flow to carry heat away from stator 30, fluid-based cooling devices which may comprise cooling channels through which fluid coolant may flow and/or the like.

Stator 30 and coil assembly 35 may be fabricated using one or more printed-circuit boards (PCBs). PCBs can be manufactured using standard PCB fabrication, flat-panel display lithography, lithography and/or similar technology known in the art to provide coils 31 and coil traces 32, 34, 33 in their respective layers 40, 42, 49. Insulator layers 47 may comprise FR4 core, prepreg, ceramic material and/or the like and may be fabricated or otherwise inserted between coil layers 40, 42, 49. One or more coil layers 40, 42, 49 may be stacked together (i.e. adjacent to one another in the stator-z direction) in a single PCB board. In some embodiments, coil traces 32, 34, 33 generally elongated in the same direction (e.g. at different coil trace layers 40, 42, 49) may be connected in parallel or serially, depending on via design and/or electrical connection techniques for the ends of coil traces 32, 33, 34. In some embodiments, coil traces 32, 33, 34 generally elongated in the same direction (e.g. at different coil trace layers 40, 42, 49) are not electrically connected to one another.

Coil traces 32, 34, 33 fabricated using PCB technology can accommodate sufficient current for controlling the motion of moveable stage 10. By way of non-limiting example, each coil trace 32, 34, 33 can be fabricated from 6 oz copper (about 200-220 μm thick) or more. As discussed above, in the portions of coil trace layers 40, 42, 49 that overlap with working region 36 may comprise coil traces 32, 34, 33 which are shaped in the form of flattened strips. Coil traces 32, 34, 33 having such flattened strip shapes may provide good thermal conductivity. The inventors have confirmed (via testing) that laminated copper can carry a sustained current density of 10 A/mm$^2$ with a 50° C. temperature rise above ambient without using an active heat sink. Another advantage of planar layers 40, 42, 49 of coil traces 32, 34, 33 is that the naturally stratified conductors that provide coil traces 32, 34, 33 make them ideally suitable for carrying AC current, because the self-generated alternating magnetic field can easily penetrate the conductor through top and bottom (stator-z direction facing) surfaces but generates only relatively low self-induced eddy currents.

Multiple PCBs may be aligned side by side (e.g. in one or both of the stator-x and stator-y directions) to provide the desired stator-x and stator-y dimensions for working region 36. Board-to-board lateral connections (in the stator-x and/or stator-y directions) may be made at the edges by connecting pads, through-holes of edge-adjacent boards, copper wires and/or using other suitable bridging components of the like for electrically connecting conductors on adjacent PCB boards. In some embodiments, such bridging components may be located underneath the PCB boards (e.g. on the stator-z side opposite moveable stage 10); in some embodiments, such bridging components may be additionally or alternatively located above the PCB boards (e.g. on the same stator-z side as moveable stage 10) or on the side(s) of the PCB boards. When PCBs are connected adjacent to one another in the stator-x and/or stator-y directions, the end terminals (not shown) of coils 32, 33, 34 may be located at or near the perimeter of stator 30 for ease of wiring to amplifier(s) 70. Connecting PCBs to one another in this manner allows displacement device 50 to be easily extended in both stator-x and stator-y dimensions for various applications. In some embodiments, coil traces 32, 34, 33 on stator x-y adjacent PCB boards may be serially connected to one another to reduce the number of amplifier(s) 70 for driving current through coil traces 32, 33, 34. In some embodiments, coil traces 32, 33, 34 on any particular PCB board may be driven by one or more independent amplifier(s) 70—e.g. coils 32, 33, 34 on one PCB board may be driven by amplifier(s) 70 that are different from amplifier(s) 70 which drive coils 32, 33, 34 on a stator x-y adjacent PCB board. Using independent amplifier(s) in this manner may increase the flexibility for multi-stage actuation and to reduce heat generation.

A single PCB board may be fabricated to have a thickness (in the stator-Z direction) of up to 5 mm (or more) using available PCB technology. When thicker boards are desired (e.g. for heavy-duty applications), multiple PCBs can be stacked together in the stator-Z direction. Another benefit of using PCB technology to fabricate coil assembly 35 is the possibility of deploying large numbers of low-profile sensors (such as Hall-effect position sensor, capacitive position sensors and/or the like) directly on the board.

Motion Control

Figure 13A:
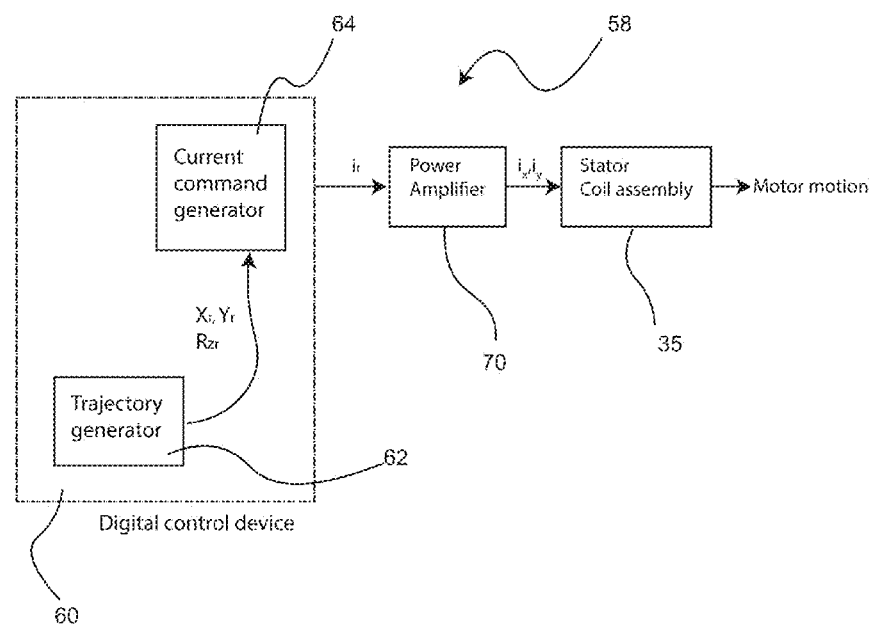
FIG. 13A shows a schematic block diagram of a control system suitable for use in controlling any of the displacement devices described herein according to a particular embodiment.

FIG. 13A shows a schematic block diagram of a control system 58 suitable for use in controlling any of the displacement devices 50 described herein according to a particular embodiment. Although they may be described as different embodiments, except where otherwise specifically note, control system 58 and any of the control techniques, embodiments and methods described in the remainder of this description may be used with any of the displacement devices 50 described herein. Control system 58 of the FIG. 13A embodiment comprises controller 60, one or more amplifier(s) 70 and stator coil assembly 35. Controller 60 may comprise any suitably programmed controller capable of implementing control system 58. Such a controller 60 (and components thereof) may comprise hardware, software, firmware or any combination thereof. For example, such a controller 60 may be implemented on a programmed computer system comprising one or more processors, user input apparatus, displays and/or the like. Such a controller 60 may be implemented as an embedded system with a suitable user interface comprising one or more processors, user input apparatus, displays and/or the like. Processors may comprise microprocessors, digital signal processors, graphics processors, field programmable gate arrays, and/or the like. Components of controller 60 may be combined or subdivided, and components of controller 60 may comprise sub-components shared with other components of controller 60. Components of controller 60, may be physically remote from one another.

Controller 60 may be configured to control one or more amplifiers 70 (illustrated, in FIG. 13A, as power amplifier 70) to drive currents into the plurality of coil traces in coil trace assembly 35 and to thereby controllably move moveable stage 10 relative to stator 30. In some embodiments, the currents in the plurality of coil traces create magnetic fields which interact with the magnetic fields of the magnet array assembly on moveable stage 10 and cause corresponding forces on moveable stage 10. The currents may be controlled by controller 60 such that these magnetic forces on moveable stage 10 may attract moveable stage 10 toward stator 30 (e.g. in the negative stator-z direction in the case of the illustrated embodiments) at all times when controller 60 is controlling the currents driven by the one or more amplifiers 70.

In the illustrated embodiment, controller 60 is shown as comprising a trajectory generator 62 which generates desired or reference positions for each moveable stage 10. Such reference positions may include a desired or reference stator-x position $x_r$ of moveable stage 10, a desired or reference stator-y position $y_r$ of moveable stage and, optionally, a desired rotational orientation $rz_r$ of moveable stage 10 about a stage-z oriented axis (e.g. a stage-z oriented axis through the stage-x/stage-y center of moveables stage 10). The reference positions $(x_r,y_r,rz_r)$ generated by trajectory generator 62 are typically based on user requirements, application requirements and/or the present actual location of moveable stage(s) 10. In the illustrated embodiment, controller 60 also comprises a current command generator 64. Typically, although not necessarily, the desired position $(x_r,y_r,rz_r)$ of moveable stage 10 will vary over time, such that each of the reference positions $x_r,y_r,rz_r$ is a function of time and may be described herein as $x_r(t),y_r(t),rz_r(t)$ at a particular time, t. The evolutions of the desired positions ($x_r, y_r, rz_r$) over time may be referred to as a desired or reference trajectory. Generally, each moveable stage 10 has a unique reference trajectory. For brevity, except where otherwise dictated by the context, this description will focus on the trajectory and corresponding control of one moveable stage 10, it being understood that trajectories and control of other moveable stages 10 may be similarly implemented.

Current command generator 64 receives the desired positions $x_r$, $y_r$, $rz_r$ from trajectory generator 62 and creates corresponding current control signals $i_r$ which are provided to amplifier(s) 70. It will be appreciated that current control signals $i_r$ may comprise a plurality of control signals. In response to these current control signals $i_r$, amplifier(s) 70 drive currents $i_x$, $i_y$ into at least some of the coil traces of stator coil assembly 35. In some embodiments, first currents $i_x$ may be driven into a first plurality of coil traces and second currents $i_y$ may be driven into a second plurality of coil traces. In some embodiments, $i_x$ represents the currents driven into stator-x oriented coil traces 32 and $i_y$ represents the currents driven into stator-y oriented coil traces 34. Accordingly, the currents $i_x$ may be referred to herein as x-currents and the currents $i_y$ may be referred to herein as y-currents. As discussed above, stator coil assembly may also comprise α-oriented coil traces 33 and amplifier(s) 70 may additionally or alternatively drive currents $i_\alpha$ into these traces 33. However, except where otherwise dictated by the context, discussion of drive currents $i_\alpha$ is omitted for brevity from the description of motion control.

Figure 13B:
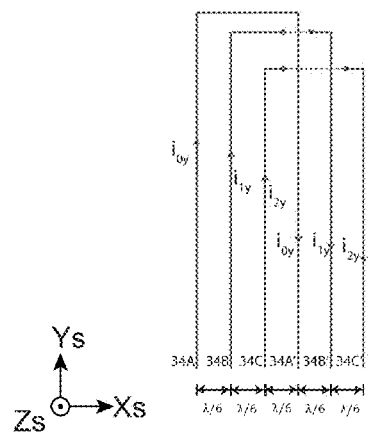
FIG. 13B shows one possible connection scheme to connect a plurality of y-coil traces in one coil trace layer within an excitation region according to a particular embodiment.

FIG. 13B schematically depicts one possible connection scheme to connect a plurality of y-coil traces 34 in one coil trace layer 42 within an excitation region 43 according to a particular embodiment. It will be appreciated that x-traces 32 in layer 40 may have characteristics analogous to those of y-traces 34 in layer 42. While traces 34 shown in FIG. 13B are generally elongated in the stator-y direction, there may be some terminal connections near the edges of one excitation region 43 which connect different traces 34 together. Trace terminating connections sometimes extend through one or more other layer (e.g. another layer in the stator-z direction), as shown by the dashed lines in FIG. 13B. The illustrated embodiment of FIG. 13B depicts a three-phase effective current embodiment where y-currents comprise three different current phases $i_{jy}$ (j=0, 1, 2), each of which flows along a first trace 34A, 34B, 34C in a first direction and returns along a second trace 34A', 34B', 34C' in an opposite, direction (e.g. current $i_{0y}$ flows in one direction along coil trace 34A and flows in the opposite direction along coil trace 34A').

As the current phases $i_{jy}$ return in the opposite direction, they effectively provide opposite waveforms, as compared to when they flow in the first direction. As discussed further below, the waveforms of current phases $i_{jy}$ may be spatially periodic as a function of with spatial periods $\lambda_x$ (also referred to herein as $\lambda_2$) in the stator-x direction. In such cases, the opposite waveforms of current phases $i_{jy}$ flowing in opposite directions are out of spatial phase with one another by half the spatial period $$\left(\frac{\lambda_x}{2} = \frac{\lambda_2}{2}\right).$$

In the FIG. 13B embodiment, the current phases $i_{jy}$ which are driven into adjacent traces 34 (e.g. into traces 34A and 34B) may be controlled to have waveforms which have spatial phase differences of $$\frac{\lambda_x}{6} = \frac{\lambda_2}{6}.$$

The spatial period $\lambda_x = \lambda_2$ of the current phases may be same spatial period described elsewhere herein in connection with the spatially periodic characteristics of magnet arrays 12 and/or coil traces 34. For example, in the FIG. 13B embodiment, the stator-x direction pitch $P_{cy}$ of stator-y oriented traces 34 is also configured to be a function of the spatial period $\lambda_x = \lambda_2$. In particular, the stator-x direction pitch $P_{cy}$ of traces 34 in the FIG. 13B embodiment is generally given by $$P_{cy} = \frac{\lambda_x}{6} = \frac{\lambda_2}{6}.$$

In the FIG. 13B embodiment, the currents $i_y$ may be described as comprising three effective current phases, because the currents $i_y$ include three current phases $i_{jy}$ flowing in the first direction and then returning in the opposing direction at phases that are out of spatial phase with one another by half the spatial period $$\left(\frac{\lambda_x}{2} = \frac{\lambda_2}{2}\right).$$

For example, in FIG. 13B embodiment, the current in trace 34A has the same amplitude as the current in trace 34A', but is flowing in an opposite direction; therefore, the currents in traces 34A, 34A' are not independent and are considered as one effective current phase. In general, the currents $i_y$ are multi-phase currents comprising a plurality $m_p$ of current phases $i_{jy}$ (j=0, 1, ..., $m_p-1$), where $m_p$ is an integer greater than one. Similarly, the currents $i_x$ are multi-phase currents comprising a plurality $n_p$ of current phases $i_{kx}$ (k= 0, 1, ..., $n_p-1$), where $n_p$ is an integer greater than one. The currents $i_x$ may be referred to as first currents $i_x$ and their corresponding current phases $i_{kx}$ may be referred to as first current phases $i_{kx}$. The currents $i_y$ may be referred to as second currents $i_y$ and their corresponding current $i_x$ phases may be referred to as second current phases $i_{jy}$. In some embodiments, the first currents $i_x$ comprise a plurality of first current phases, $i_{kx}$, where k is an integer from 0 to $n_p-1$ representing a first phase index. In some cases, the first phase index k may be represented as a letter, where the letter represents an integer from 0 to $n_p-1$ (e.g. A may represent 0, B may represent 1, C may represent 2, etc.). The first current phases $i_{kx}$ may each be driven into a corresponding one of a first plurality of stage-x oriented coil traces (e.g. coil traces 32A, 32B, 32C, etc.) and may return along another corresponding one of the stage-x oriented coil traces (e.g. coil traces 32A', 32B', 32C', etc.). Phase-adjacent first current phases $i_{kx}$ are driven into spatially adjacent ones of at least some of the first plurality of stator-x oriented coil traces 32. As a function of $y_r$, each first current phase $i_{kx}$ in a particular one of the first plurality of coil traces is out of phase with one or more phase-adjacent first current phases in one or more spatially adjacent ones of the first plurality of coil traces 32 by a first spatial phase difference of $$\frac{\lambda_1}{2n_p} = \frac{\lambda_y}{2n_p}.$$

Such embodiments may be described has having $n_p$ effective first current phases $i_{kx}$.

Similarly, in some embodiments, the second currents $i_y$ comprise a plurality of second current phases, $i_{jy}$, where j is an integer from 0 to $m_p-1$ representing a second phase index, where $m_p$ is the effective number of second current phases. In some cases, the second phase index j may be represented as a letter, where the letter represents an integer from 0 to $m_p-1$ (e.g. A may represent 0, B may represent 1, C may represent 2, etc.). The second current phases $i_{jy}$ may each be driven into a corresponding one of a second plurality of stage-y oriented coil traces (e.g. coil traces 34A, 34B, 34C, etc.) and may return along another corresponding one of the stage-y oriented coil traces (e.g. coil traces 34A', 34B', 34C', etc.). Phase-adjacent second current phases $i_{jy}$ are driven into spatially adjacent ones of at least some of the second plurality of stator-y oriented coil traces 34. As a function of $y_r$, each second current phase $i_{jy}$ in a particular one of the second plurality of coil traces is out of phase with one or more phase-adjacent second current phases in one or more spatially adjacent ones of the second plurality of coil traces 34 by a second spatial phase difference of $$\frac{\lambda_2}{2m_p} = \frac{\lambda_x}{2m_p}.$$

Figure 13C:
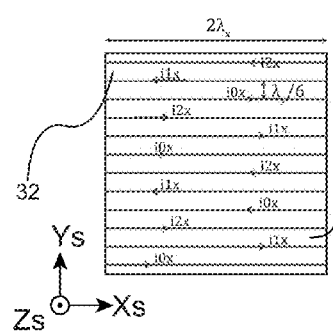
FIGS. 13C and 13D respectively schematically depict an x-trace layout in a first layer and a y-trace layout in a second layer of an exemplary excitation region according to a particular embodiment.
Figure 13D:
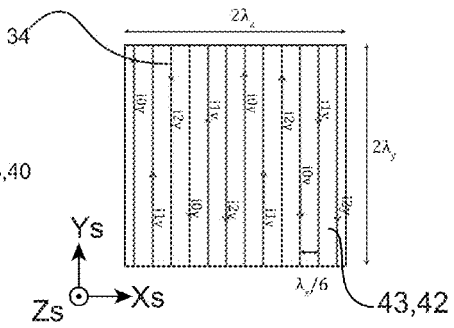

FIGS. 13C and 13D respectively schematically depict an x-trace layout in a first layer 40 and a y-trace layout in a second layer 42 of an exemplary excitation region 43 according to a particular embodiment. Excitation region 43 of the illustrated embodiment of FIGS. 13C, 13D has a stator-x dimension of $2\lambda_x$ and a stator-y dimensions of $2\lambda_y$. In the illustrated embodiment of FIGS. 13C, 13D, $\lambda_x=\lambda_y=\lambda$, although this is not necessary. In some embodiments, an excitation region 43 may have a stator-x dimension of $N_x\lambda_x$ and a stator-y dimension of $N_y\lambda_y$, where $N_x$ and $N_y$ can be arbitrary positive integer numbers and $\lambda_x$ may be, but need not be, the same as $\lambda_y$. Stator x-trace layer 40 of the FIG. 13C embodiment comprises twelve x-traces 32 with a stator-y direction pitch $P_{cx}$ of $\lambda_y/6$. X-traces 32 are excited with three ($n_p=3$) effective current phases $i_{0x}$, $i_{1x}$, $i_{2x}$. In some embodiments, these twelve x-traces can be driven by one three-phase amplifier; in some embodiments, these twelve x-traces can be driven by two three-phase amplifiers, for example, with each group of six adjacent x-traces independently driven by one three phase amplifier. Stator y-trace layer 42 of the FIG. 13D embodiment comprises twelve y-traces 34 with a stator-x direction pitch $P_{cy}$ of $\lambda_x/6$. Y-traces 34 are excited with three ($m_p=3$) effective current phases $i_{0y}$, $i_{1y}$, $i_{2y}$. In some embodiments, these twelve y-traces can be driven by one three-phase amplifier; in some embodiments, these twelve y-traces can be driven by two three-phase amplifiers, for example, with each group of six adjacent y traces independently driven by one three phase amplifier. Within excitation region 43, the x-traces 32 of layer 40 (FIG. 13B) and the y-traces 34 of layer 42 may overlap one another in the stator-z direction.

Figure 13E:
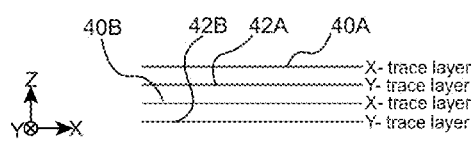
FIGS. 13E and 13F show a pair of stator-z direction configurations for coil layers according to a pair of exemplary embodiments.
Figure 13F:
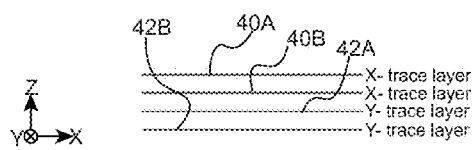

FIGS. 13E and 13F show a pair of stator-z direction configurations for coil layers 40, 42 according to a pair of exemplary embodiments. FIG. 13E depicts four trace layers alternating between x-trace layers 40A, 40B and y-trace layers 42A, 42B. FIG. 13F depicts four trace layers in which two x-trace layers 40A, 40B are adjacent one another in the stator-z direction and two y-trace layers 42A, 42B are adjacent one another in the stator-z direction. In some embodiments, x-trace layers 40 and y-trace layers 42 may be layered in any pattern and any number of x-trace layers 40 and y-trace layers 42 may be provided. It should be noted that different excitation regions 43 may be independently driven or share common multiple phase currents.

Referring back to FIG. 13A, in currently preferred embodiments, first and second coil trace currents $i_x$, $i_y$ are generated based on reference trajectory information ($x_r,y_r,rz_r$) by control system 58. In some embodiments, control system 58 may generate first and second coil trace currents $i_x$, $i_y$ based on reference trajectory information ($x_r,y_r,rz_r$) and position feedback signals related to the current position of moveable stages 10. In some embodiments, control system 58 may generate first and second coil trace currents $i_x$, $i_y$ based on reference trajectory information ($x_r,y_r,rz_r$) without using real-time position feedback signals related to the current position of moveable stages 10. The first and second coil trace currents $i_x$, $i_y$ may create corresponding traveling magnetic field waves which are locked with corresponding ones of reference trajectories $y_r$, $x_r$. In this disclosure and the accompanying claims, when a current, current trace and/or corresponding magnetic field is described as traveling with a reference variable (e.g. with a reference trajectory or reference variable $x_r$, $y_r$), it should be understood to mean that such current, current trace and/or magnetic field varies spatially as the reference variables vary over time (e.g. as reference trajectory variables $x_r$, $y_r$ vary over time). For example, in the case of three effective phases for both first currents $i_x$ and second currents $i_y$ (i.e. $n_p=m_p=3$), current command generator 64 may use reference trajectory information ($x_r,y_r,rz_r$) to generate three effective control signals $i_{0x}$, $i_{1x}$, $i_{2x}$ for the first current phases $i_{kx}$ and three effective control signals $i_{0yr}$, $i_{1yr}$, $i_{2yr}$ for the second current phases $i_{jy}$. These control signals (referred to generally as control signals $i_r$) may then be used to cause amplifier(s) 70 to generate the first and second current phases $i_{0x}$, $i_{1x}$, $i_{2x}$ and $i_{0y}$, $i_{1y}$, $i_{2y}$ (referred to generally as current phases $i_{kx}$, $i_{jy}$). It will be appreciated that control signals $i_{xr}$, $i_{yr}$ may have functional forms similar to first and second current phases $i_{kx}$, $i_{jy}$ or, in some embodiments, may have digitally encoded formats which otherwise specify the functional forms of first and second current phases $i_{kx}$, $i_{jy}$. Accordingly, unless the context dictates otherwise, control signals $i_{xr}$, $i_{yr}$ may be referred to herein interchangeably with first and second current phases $i_{kx}$, $i_{jy}$.

In some embodiments, each first current phase $i_{kx}$ is determined based on a function $F(y_r)$, where $y_r$ is the desired position of a moveable stage 10 in the stator-y direction in a working region 36. The function $F(y_r)$ may be a spatially periodic function of $y_r$ in the stator-y direction. The function, $F(y_r)$ may have the first spatial period $\lambda_1=\lambda_y$ in the stator-y direction. The function, $F(y_r)$, may vary periodically with $y_r$, such that, at least over a portion of working region 36, $F(y_r=y_o)$ is equal to $F(y_r=y_o+\lambda_1)$, where $y_o$ is an arbitrary position of the moveable stage 10 in the stator-y direction. In some embodiments, the arbitrary position $y_o$ is in a first interior portion of working region 36 (i.e. more than a stator-y distance $\lambda_1$ from the stator-x oriented edges of working region 36). $F(y_r)$ may be a sinusoidal function of $y_r$, although $F(y_r)$ may be another periodic function of $y_r$.

Figure 13G:
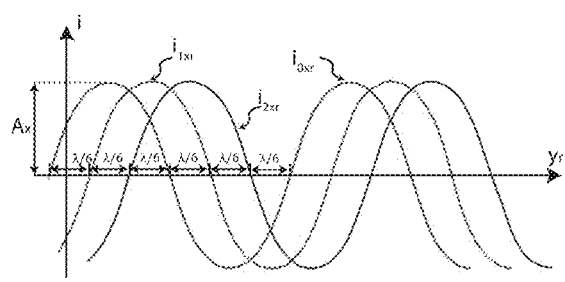
FIG. 13G shows a number of first control signals according to a particular embodiment.

FIG. 13G shows a number of first control signals $i_{xr}$ (i.e. control signals $i_{xr}$ used to generate first current phases $i_x$ which are driven into a first set of (e.g. stator-x oriented) coil traces) according to a particular embodiment where the function $F(y_r)$ is a sinusoidally periodic function of $y_r$ and the number of effective phases $n_p=3$. FIG. 13G shows the three waveforms of the control signals $i_{0xr}$, $i_{1xr}$, $i_{2xr}$ as a function of $y_r$. It can be seen that the waveforms for the control signals $i_{0xr}$, $i_{1xr}$, $i_{2xr}$ are periodic functions of $y_r$ with a spatial period of $\lambda_1 = \lambda_y$, where $\lambda_1 = \lambda_y$ is the first magnetic spatial period in the stator-y direction, as discussed above. It should be noted that to avoid obscuring the drawing, FIG. 13G refers to $\lambda_1 = \lambda_y = \lambda$ without loss of generality. Control signals $i_{0xr}$, $i_{1xr}$, $i_{2xr}$ are fed to amplifier(s) 70 and result in a corresponding current phases $i_{0xr}$, $i_{1xr}$, $i_{2xr}$ where each of current phases $i_{0x}$, $i_{1x}$, $i_{2x}$ is driven into a spatially adjacent one of the first (e.g. stator-x oriented) coil traces. Because current phases $i_{0x}$, $i_{1x}$, $i_{2x}$ are driven into x-coil traces 32, they may be referred to as first current phases $i_{0x}$, $i_{1x}$, $i_{2x}$ or x-current phases. As indicated by FIG. 13G, for the case where the number of phases $n_p = 3$, the spatial phase shift between spatially adjacent x-current phases $i_{0x}$, $i_{1x}$, $i_{2x}$ (and corresponding control signals $i_{0xr}$, $i_{1xr}$, $i_{2xr}$) is $$\frac{\lambda_1}{2n_p} = \frac{\lambda_y}{2n_p} = \frac{\lambda_1}{6},$$

which may also be equal to the stator-y oriented pitch $P_{cx}$ of x-coil traces 32. For the FIG. 13G illustrated embodiment, $F(y_r)$ is a sinusoidally periodic function of $y_r$ and, the waveforms of the control signals $i_{0xr}$, $i_{1xr}$, $i_{2xr}$ can be analytically represented as:

$$i_{0xr} = A_{0x} \sin\left(\frac{y_r}{\lambda_1} 2\pi + \varphi_x\right) \tag{1a}$$

$$i_{1xr} = A_{1x} \sin\left(\frac{y_r}{\lambda_1} 2\pi - \frac{\pi}{3} + \varphi_x\right) = A_{1x} \sin\left(\frac{y_r - \frac{\lambda_1}{6}}{\lambda_1} 2\pi + \varphi_x\right) \tag{1b}$$

$$i_{2xr} = A_{2x} \sin\left(\frac{y_r}{\lambda_1} 2\pi - \frac{2\pi}{3} + \varphi_x\right) = A_{2x} \sin\left(\frac{y_r - \frac{2\lambda_1}{6}}{\lambda_1} 2\pi + \varphi_x\right) \tag{1c}$$

where $A_{kx}$ is the amplitude of the $k^{th}$ phase control signal waveform in an excitation region and $\varphi_x$ is an arbitrary offset. For the case where the control signals $i_{0xr}$, $i_{1xr}$, $i_{2xr}$ are sinusoidally periodic, a full spatial period is equivalent to $2\pi$ radians in electrical phase angle (where the electrical phase angle $\theta$ is related to a spatial distance $d_2$ in a second direction (stator y direction) by $$\theta = \frac{2\pi d_2}{\lambda_1}$$

and, consequently, the phase difference between phase-adjacent ones of control signals $i_{0xr}$, $i_{1xr}$, $i_{2xr}$ can be described as $$\frac{2\pi}{2n_p} = \frac{\pi}{n_p}$$

in electrical phase angle with units of radians, which is evident from equation (1) above and is equivalent to a spatial phase shift of $$\frac{\lambda_1}{6}.$$

In some embodiments, the amplitude $A_{kx}$ is equal for all of the control signals $i_{jxr}$ and can be referred to as $A_x$. X-current phases $i_{0x}$, $i_{1x}$, $i_{2x}$ driven into at least some of the first (e.g. stator-x oriented) coil traces 32 may be amplified versions of control signals $i_{0xr}$, $i_{1xr}$, $i_{2xr}$ and may have the same functional form as control signals $i_{0xr}$, $i_{1xr}$, $i_{2xr}$. In some cases the amplitudes of the x-current phases $i_{0x}$, $i_{1x}$, $i_{2x}$ may be different than those of the control signals $i_{0xr}$, $i_{1xr}$, $i_{2xr}$.

The x-current phases $i_{0x}$, $i_{1x}$, $i_{2x}$ may be connected to be driven into x-traces traces 32 in a manner similar to the connection of the current phases to the stator-y oriented traces shown in FIG. 13B, for example. In some embodiments, x-current phases $i_{0x}$, $i_{1x}$, $i_{2x}$ may be driven into several spatially adjacent (e.g. in the stator-y direction) sets of x-traces 32. In some embodiments, x-current phases $i_{0x}$, $i_{1x}$, $i_{2x}$ may be driven into all of the x-traces 32 in this manner. In some embodiments, x-current phases $i_{0x}$, $i_{1x}$, $i_{2x}$ may be driven into at least some of x-traces 32. It will be appreciated from FIG. 13G that these x-current phases $i_{0x}$, $i_{1x}$, $i_{2x}$ will generate a stator-y direction traveling magnet field wave. This traveling magnetic field wave will move with reference trajectory signal $y_r$. At a particular $y_r$, the magnetic fields created by the x-current phases $i_{0x}$, $i_{1x}$, $i_{2x}$ will interact with the magnetic fields associated with the magnet array assembly 16 of moveable stage 10, to create a potential energy profile (e.g. a well) which has a local minimum when stage 10 is located at the stator-y location $y_r$, thereby trapping moveable stage 10 at the desired stator-y location $y_r$. When $y_r$ changes (i.e. it is desired to move moveable stage 10 to a new stator-y location), the resulting magnetic field generated by x-current phases $i_{0x}$, $i_{1x}$, $i_{2x}$ in x-traces 32 moves with $y_r$ and so does the minimum potential energy location (the minimum potential energy location may also be referred to as the bottom of a potential energy well or potential well). As discussed in more detail below, similar y-current phases can be generated in stator-y oriented coil traces 34 to control the location of moveable stage 10 to a desired location $(x_r, y_r)$.

Generally, the multi-phase current phases $i_{kx}$ are not limited to three effective phases. As discussed above, the number of effective phases $n_p$ for x-current phases $i_{kx}$ may be any integer greater than one. In such cases, the corresponding current phases can be sinusoidally periodic functions of $y_r$ and can have a functional form $$i_{kx} = A_{kx} \sin\left(\frac{y_r}{\lambda_1} 2\pi - k\frac{\pi}{n_p} + \varphi_x\right) \tag{2}$$

where k is a phase index that varies from 0 to $n_p - 1$, $A_{kx}$ is the amplitude of the $k^{th}$ current phase waveform and $\varphi_x$ is an arbitrary offset. It can be seen from equation (2) that in such embodiments, the phase shift between adjacent current phases $i_{kx}$ takes the general form $$\frac{\lambda_1}{2n_p} = \frac{\lambda_y}{2n_p}$$

(spatial phase) or $$\frac{\pi}{n_p}$$

(in electrical angle with units of radians). Phase-adjacent ones of current phases $i_{kx}$ can be driven into spatially adjacent x-traces 32, such that the phase difference between the current phases driven into spatially adjacent x-traces 32 is $$\frac{\lambda_1}{2n_p} = \frac{\lambda_y}{2n_p}$$

(spatial phase) or $$\frac{\pi}{n_p}$$

in electrical angle with units of radians). In such embodiments, x-traces 32 in stator 30 can be designed to have a stator-y oriented coil trace pitch $$P_{cx} = \frac{\lambda_1}{2n_p} = \frac{\lambda_y}{2n_p}.$$

Figure 14A:
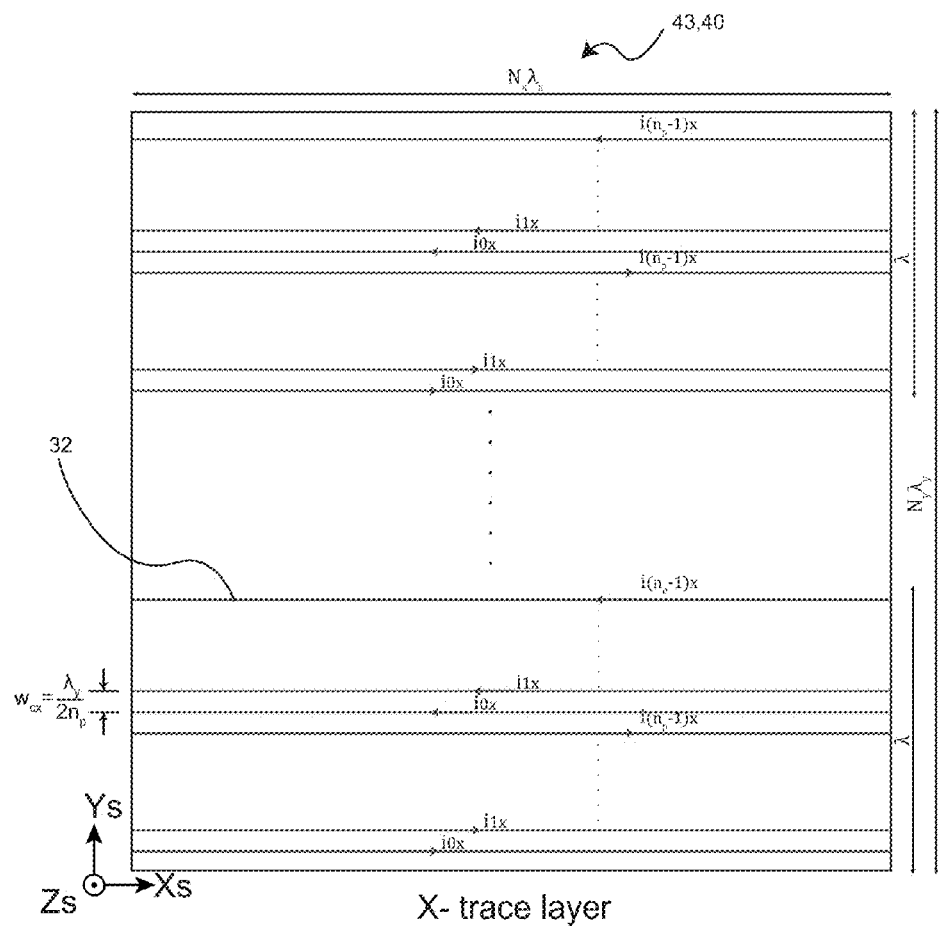
FIG. 14A shows a partial schematic illustration of a $n_p$-phase coil layout in an x-trace layer of an excitation region according to a particular embodiment.
Figure 14B:
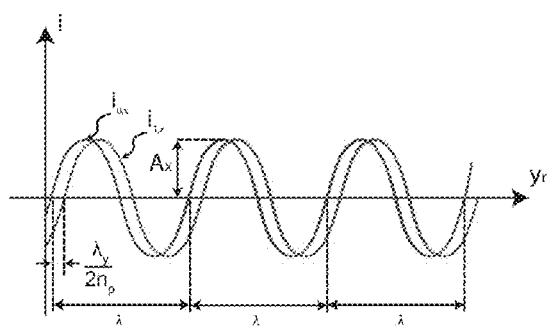
FIG. 14B shows the current waveforms $i_{0x}$, $i_{1x}$ as a function of desired stator-y location $y_r$ for a moveable stage according to particular embodiment.

FIG. 14A shows a partial schematic illustration of a $n_p$-phase coil layout in an x-trace layer 40 of an excitation region 43, with stator-x direction width of $N_x \lambda_x$, and a stator-y direction width of $N_y \lambda_y$ according to a particular embodiment. It can be seen from FIG. 14A that phase-adjacent ones of current phases $i_{kx}$ may be driven into spatially adjacent x-traces 32 and this pattern can be repeated for several spatially adjacent (e.g. in the stator-y direction) sets of x-traces 32. In some embodiments, spatially adjacent sets of x-traces ($2n_p$ traces) can be driven with the same current phases $i_{kx}$. In some embodiments, each set of x-traces ($2n_p$ traces) in one excitation region 43 can be independently driven with current phases $i_{kx}$ to allow the control of multiple moveable stages 10 independently. FIG. 14B shows the current waveforms $i_{0x}$, $i_{1x}$ as a function of desired stator-y location $y_r$ for moveable stage 10 for the case where $A_{kx} = A_x$ is the same for current phases $i_{kx}$. FIG. 14B shows the spatial phase difference $$\frac{\lambda_1}{2n_p} = \frac{\lambda_y}{2n_p}$$

for spatially adjacent current phases $i_{kx}$. While current phases $i_{kx}$ may generally have any waveform that is a spatially periodic function of $y_r$, sinusoidal waveforms are currently preferred due to many advantageous features such as energy efficiency, compact trace layout, simplification of power electronics design, smooth motion and fine motion resolution. Other types of trajectory-dependent periodic waveform can also be used to drive multi-phase coils traces, such as square wave, triangle waves, trapezoidal waves and/or the like.

Current phases $i_{jy}$ driven into at least some of y-traces 34 to control the stator-x position of moveable stage 10 to track a desired $x_r$ position may be similarly generated. In some embodiments, each second current phase $i_{jy}$ is determined based on a function $G(x_r)$, where $x_r$ is the desired position of a moveable stage 10 in the stator-x direction in a working region 36. The function $G(x_r)$ may be a spatially periodic function of $x_r$ in the stator-x direction. The function, $G(x_r)$, may have the second spatial period $\lambda_2 = \lambda_x$ in the stator-x direction. The function, $G(x_r)$, may vary periodically with $x_r$, such that, at least over a portion of working region 36, $G(x_r = x_o)$ is equal to $G(x_r = x_o + \lambda_2)$, where $x_o$ is an arbitrary position of the moveable stage 10 in the stator-x direction. In some embodiments, the arbitrary position $x_o$ is in a second interior portion of working region 36 (i.e. more than a stator-x distance $\lambda_2$ from the stator-y oriented edges of working region 36). $G(x_r)$ may be a sinusoidal function of $x_r$ although $G(x_r)$ may be another type of periodic function of $x_r$.

The waveforms for the control signals $i_{jyr}$ and the corresponding current phases $i_{jy}$ driven into y-traces 34 may be periodic signals of $x_r$ with a spatial period of $\lambda_x = \lambda_2$, where $\lambda_x = \lambda_2$ is the second magnet spatial period in the stator-x direction, as discussed above. Control signals $i_{jyr}$ are fed to amplifier(s) 70 and result in a corresponding current phases $i_{jy}$, where each of current phases $i_{jy}$ is driven into a spatially adjacent one of the second (e.g. stator-y oriented) coil traces. Because current phases $i_{jy}$ are driven into y-coil traces 34, they may be referred to as second current phases $i_{jy}$ or y-current phases. The spatial phase shift between spatially adjacent y-current phases $i_{jy}$ (and corresponding control signals $i_{jyr}$) is $$\frac{\lambda_2}{2m_p} = \frac{\lambda_x}{2m_p},$$

which may also be equal to the stator-x oriented coil trace pitch $P_{cy}$ of y-traces 34. For the case where $G(x_r)$ is a sinusoidally periodic function of $x_r$ and three effective phases (i.e. $m_p = 3$), the waveforms of the control signals $i_{jyr}$ can be analytically represented as:

$$i_{0yr} = A_{0y} \sin\left(\frac{x_r}{\lambda_2} 2\pi + \varphi_y\right) \quad (3a)$$

$$i_{1yr} = A_{1y} \sin\left(\frac{x_r}{\lambda_2} 2\pi - \frac{\pi}{3} + \varphi_y\right) \quad (3b)$$

$$i_{2yr} = A_{2y} \sin\left(\frac{x_r}{\lambda_2} 2\pi - \frac{2\pi}{3} + \varphi_y\right) \quad (3c)$$

where $A_{jy}$ is the amplitude of the $j^{th}$ phase control signal waveform in an excitation region and $\varphi_y$ is an arbitrary offset. For the case where the control signals $i_{0yr}$, $i_{1yr}$, $i_{2yr}$ are sinusoidally periodic, a full spatial period is equivalent to $2\pi$ radians in electrical phase angle (where the electrical phase angle $\theta$ is related to a spatial distance $d_1$ in a first direction (stator-x direction) by $$\theta = \frac{2\pi d_1}{\lambda_2})$$

and, consequently, the phase difference between phase-adjacent ones of control signals $i_{0yr}$, $i_{1yr}$, $i_{2yr}$ is given by $$\frac{2\pi}{2m_p} = \frac{\pi}{m_p}$$

in the electrical angle domain, which is evident from equation (3) above. In some embodiments, the amplitude $A_{jy}$ is equal for all of the control signals $i_{jyr}$ and can be referred to as $A_y$. Y-current phases $i_{0y}$, $i_{1y}$, $i_{2y}$ driven into at least some of the second (e.g. stator-y oriented) coil traces 34 may be amplified versions of control signals $i_{0yr}$, $i_{1yr}$, $i_{2yr}$ and may have the same functional form as control signals $i_{0yr}$, $i_{1yr}$, $i_{2yr}$. In some cases the amplitudes of the y-current phases $i_{0y}$, $i_{1y}$, $i_{2y}$ may be different than those of the control signals $i_{0yr}$, $i_{1yr}$, $i_{2yr}$.

For the general case, where the number of effective phases $m_p$ for y-current phases $i_{jy}$ may be any integer greater than one. In such cases, the corresponding current phases can be sinusoidally periodic functions of $x_r$ and can have a functional form $$i_{jy} = A_{jy} \sin\left(\frac{x_r}{\lambda_2} 2\pi - j\frac{\pi}{m_p} + \varphi_y\right) \quad (4)$$

where j is a phase index that varies from 0 to $m_p$−1, $A_{jy}$ is the amplitude of the $j^{th}$ current phase waveform and $\varphi_y$ is an arbitrary offset. It can be seen from equation (4) that in such embodiments, the phase shift between adjacent current phases $i_{jy}$ takes the general form $$\frac{\lambda_2}{2m_p} = \frac{\lambda_x}{2m_p}$$

(spatial phase) or $$\frac{\pi}{m_p}$$

(in electrical angle win units of radians). Phase-adjacent ones of current phases $i_{jy}$ can be driven into spatially adjacent y-traces 34, such that the phase difference between the current phases driven into spatially adjacent y-traces 34 is $$\frac{\lambda_2}{2m_p} = \frac{\lambda_x}{2m_p},$$

(spatial phase) or $$\frac{\pi}{m_p}$$

(in electrical angle with units of radians). In such embodiments, y-traces 34 in stator 30 can be designed to have a stator-x oriented coil trace pitch $$P_{cy} = \frac{\lambda_2}{2m_p} = \frac{\lambda_y}{2m_p}.$$

The y-current phases $i_{jy}$ may be connected to be driven into y-traces traces 34 in a manner similar to that shown in FIG. 13B, for example. In some embodiments, y-current phases $i_{jy}$ may be driven into several spatially adjacent (e.g. in the stator-x direction) sets of y-traces 34. In some embodiments, y-current phases $i_{jy}$ may be driven into all of the y-traces 34 in this manner. In some embodiments, y-current phases $i_{jy}$ may be driven into at least some of y-traces 34. In some embodiments, spatially adjacent sets of y-traces ($2m_p$ traces) can be driven with the same current phases $i_{jy}$. In some embodiments, each set of y-traces ($2m_p$ traces) in one excitation region 43 can be independently driven with current phases $i_{jy}$ to allow the control of multiple moveable stages 10 independently. These y-current phases $i_{jy}$ will generate a stator-x direction traveling magnet field wave. This traveling wave will move with reference trajectory signal $x_r$. At a particular $x_r$, the magnetic fields created by the y-current phases $i_{jy}$ will interact with the magnetic fields associated with the magnet array assembly 16 of moveable stage 10, to create a potential energy profile (e.g. a well) which has a local minimum when stage 10 is located at the stator-x location $x_r$, thereby trapping moveable stage 10 at the desired stator-x location $x_r$. When $x_r$ changes (i.e. it is desired to move moveable stage 10 to a new stator-x location), the resulting magnetic field generated by y-current phases $i_{jy}$ in y-traces 34 moves with $x_r$ and so does the minimum potential energy location.

In some embodiments, the spatially periodic functions $F_p(y_r)$ and $G_p(x_r)$ are angularly periodic functions with first and second angular periods equal to $2\pi$ ((e.g. sinusoidal functions) such that, as a function of $y_r$, each x-current phase, $i_{kx}$, in a particular one of x-traces 32 is out of phase with one or more adjacent x-current phases $i_{kx}$ in one or more spatially adjacent ones of x-traces 32 by a first electrical angular phase difference $2\pi/n_p$ and, as a function of $x_r$, each second current phase, $i_{jy}$, in a particular one of the y-traces 34 is out of phase with one or more adjacent y-current phases $i_{jy}$ in one or more spatially adjacent y-traces 34 by a second electrical angular phase difference $2\pi/m_p$.

In some embodiments, the x-current phases and y-current phases $i_{kx}$, $i_{jy}$ are driven into corresponding coil traces 32, 34 over at least a portion of the working region 36. For example, in some embodiments, the x- and y-current phases $i_{kx}$, $i_{jy}$ are driven into corresponding traces that span an excitation region 43. This is not necessary, however, in some embodiments, the x- and y-current phases $i_{kx}$, $i_{jy}$ are driven into corresponding traces 32, 34 over a portion of an excitation region 43 or over more than one excitation region 43. In some embodiments, the x- and y-current phases $i_{kx}$, $i_{jy}$ are driven into as few as two x-traces 32 and two y-traces 34.

It will be appreciated that the motion control techniques described in this section may be applied to any of the displacement devices 50 described herein, any of the moveable stages 10 described herein and any of the stators 30 described herein.

Trajectory Acceleration Compensation

The amplitudes $A_{kx}$ of x-current phases $i_{kx}$ (e.g. from equations (1) and (2)) controls the strength or magnitude of the magnetic field corresponding to the $k^{th}$ x-current phase driven into its corresponding x-trace 32—i.e. the magnetic field strength increases with the amplitude $A_{kx}$. As discussed above, in some embodiments, $A_{kx}$ is the same (e.g. $A_{kx}=A_x$) for all the x-current phases $i_{kx}$. For the sake of brevity, much of the discussion that follows will assume $A_{kx}=A_x$ without loss of generality. A stronger magnetic field creates a corresponding steeper potential energy well having a more pronounced local minimum, which in turn more strongly traps/locks moveable stage 10 and permits improved motion tracking error of moveable stage 10, but at the expense of greater energy consumption, where motion tracking error in Y means the difference between the actual stator-y direction location of stage 10 in and its desired stator-y direction location $y_r$ and motion tracking error in X means the difference between the actual stator-x direction location of stage 10 and its desired stator-x location $x_r$. The actual stator-x direction location of stage 10 can be the actual stator-x direction location of the geometric center of the stator 10 magnetic assembly 16. The actual stator-y direction location of stage 10 can be the actual stator-y direction location of the geometric center of the stator 10 magnetic assembly 16.

During implementation, it may be desired to vary $A_x$ from time to time to accord with motion tracking objectives and/or power consumption objectives. In some embodiments, the amplitude $A_x$ may be varied based on reference trajectory acceleration (i.e. the $2^{nd}$ time derivative (acceleration) of $y_r$). For example, in some embodiments, the amplitude $A_x$ may be positively correlated with the acceleration of $y_r$—e.g. $A_x$ may be increased when the acceleration of $y_r$ is relatively high (i.e. there is a desire to change the velocity of moveable stage 10 relatively quickly in the stator-y direction) and decreased when the acceleration of $y_r$ is relatively low (i.e. there is a desire to keep moveable stage 10 relatively stationary or moving with constant velocity in the stator-y direction). For example, in some embodiments, the amplitudes $A_x$ may be varied linearly with the desired acceleration of $y_r$ according to: $A_x = A_0 + a|\ddot{y}_r(t)|$, where $A_0$ represents a minimum current amplitude, a is a positive design parameter and $\ddot{y}_r(t)$ is the desired acceleration of moveable stage 10. Other relationships between amplitude $A_x$ and $\ddot{y}_r(t)$ may provide suitable results, as long as $A_x$ increases with $|\ddot{y}_r(t)|$. For example, an alternative relationship is: $A_x = A_0 + a\ddot{y}_r^2(t)$. In these ways, the system can move moveable stage 10 with a low tracking error in the stator-y direction and high acceleration rates during acceleration, and minimize power consumption during relatively stationary states and relatively low acceleration (constant speed) states (i.e. zero acceleration states). As indicated, the amplitude $A_x$ of trace currents $i_x$ may still be non-zero (e.g. $A_x = A_0$), even when the moveable stage has no desired acceleration in stator-y direction. It will be appreciated that the amplitudes $A_{jy}$ (or $A_y$ with the above-discussed assumption) of the y-current phases $i_{jy}$ (e.g. from equations (3) and (4)) can be varied with the desired acceleration of moveable stage 10 in the stage-x direction (i.e. $|\ddot{x}_r(t)|$) in an analogous manner.

It will be appreciated that the acceleration compensation techniques described in this section may be applied to any of the displacement devices 50 described herein, any of the moveable stages 10 described herein and any of the stators 30 described herein.

High Frequency Amplitude Modulation and Phase Modulation of Coil Trace Currents

In some applications, there may be friction forces which act against translational motion of moveable stage 10 and/or friction torques which act against rotation of moveable stage 10 around a stator-z oriented axis. Such friction may result from contact between the stage and stator bearing surfaces 124, 126. Such friction forces/torque can cause tracking error (i.e. where moveable stage 10 does not exactly track the desired reference parameters $(x_r, y_r, r_{zr})$). Tracking errors may be understood to be the difference between actual positions of a moveable stage 10 (e.g. the actual position of the geometric center of the magnet array assembly 16 corresponding to moveable stage 10) and the desired reference positions $(x_r, y_r, r_{zr})$ of the moveable stage 10. In feedback based control, tracking errors can be fed back to the control system, which can compensate for such tracking errors. However, in some embodiments, control system 54 (FIG. 13A) operates without using real-time position based feedback. Consequently, to minimize tracking errors arising from friction, some embodiments make use of a dynamic lubrication method.

In some embodiments, dynamic lubrication (for x-current phases $i_{kx}$) involves modulating current phase amplitudes Ax and/or modulating current phase angles $\varphi_x$ at temporal frequencies—e.g. at temporal frequencies in a range of 50 Hz to 40 kHz in some embodiments. For example, in the waveforms for each x-current phase $i_1$, the amplitude $A_x$ and phase $\varphi_x$ can be generated in the following way:

$$A_x = A_0 + k|\ddot{y}_r(t)| + A_d \sin(\omega_A t + \psi_A) \quad (5a)$$

$$\varphi_x = \varphi_0 + \varphi_d \sin(\omega_\varphi t + \psi_\varphi) \quad (5b)$$

where $A_d$ is dynamic lubrication modulation amplitude for the current phase amplitude $A_x$, $\omega_A$ is the temporal modulation frequency for the current phase amplitude $A_x$, $\varphi_x$ is the above discussed phase parameter, $\varphi_0$ is an constant phase angle, $\varphi_d$ is modulation amplitude for the current phase $\varphi_x$, $\omega_\varphi$ is modulation frequency for the current phase $\varphi_x$, $\psi_A$ and $\psi_\varphi$ are arbitrary constant modulation phase angles for amplitude modulation and phase modulation, respectively.

High frequency amplitude and/or phase modulation of x-current phases $i_{kx}$ can generate high frequency vibration in the stator-z and stator-y directions and such vibration can help attenuate normal direction (stator-z direction) contact force between bearing surfaces 124, 126 of moveable stage 10 and stator 30 and thus attenuate friction force which tends to inhibit motion in the stator-y direction. Consequently, this effect can help reduce moveable stage tracking errors. In some embodiments, this dynamic lubrication modulation is used only in particular circumstances. For example, in some embodiments, dynamic lubrication modulation may be used when moveable stage 10 is in a relatively stationary state or when moveable stage 10 is moving at a relatively constant speed (i.e. when the desired acceleration parameter $|\ddot{y}_r(t)|$ is relatively low). In some embodiments, dynamic lubrication may be used at all times or at select occasions based on other parameters associated with the desired position $y_r$ of moveable stage 10.

The modulation frequencies $\omega_A$ and $\omega_\varphi$ can be identical or can be set at different values. In one exemplary embodiment, one or both of modulation frequencies $\omega_A$ and $\omega_\varphi$ are set at or near one resonant frequency of moveable stage 10 in the stator-z direction dynamics. In this description and the accompanying claims, the phrase at or near a resonant frequency should be understood to mean at the resonant frequency +/−10%. Due to resonance, the modulation-induced vibration can achieve maximum vibration amplitude. Some embodiments involve setting $Q\omega_A = R\omega_\varphi$, where Q and R may be any positive or negative integer numbers. For example, when Q=R=1, a 2-D rotating nearly elliptical force vector (with force components in the stator-y and stator-z directions) will act on moveable stage 10. Such elliptical excitation by amplitude modulation and phase modulation of x-traces 32 can result in very small amount of motion along the stator-y direction. This elliptical excitation can be used to achieve fine motion control of moveable stages 10 and/or be used to minimize friction-induced motion tracking error or steady-state positioning error.

It will be appreciated that the amplitudes $A_{jy}$ (or $A_y$ with the above-discussed assumption) and/or phases $\varphi_y$ of the y-current phases $i_{jy}$ can be similarly modulated at temporal frequencies—e.g. at temporal frequencies in a range of 50 Hz to 40 kHz in some embodiments. For example, in the waveforms for each y-current phase $i_{jy}$, the amplitude $A_y$ and phase $\varphi_y$ can be generated in the following way:

$$A_y = A_0 + k|\ddot{x}_r(t)| + A_d \sin(\omega_A t + \psi_A) \quad (6a)$$

$$\varphi_y = \varphi_0 + \varphi_d \sin(\omega_\varphi t + \psi_\varphi) \quad (6b)$$

where $A_d$ is dynamic lubrication modulation amplitude for the current phase amplitude $A_y$, $\omega_A$ is the temporal modulation frequency for the current phase amplitude $A_y$, $\varphi_y$ is the above discussed phase parameter, $\varphi_0$ is an constant phase angle, $\varphi_d$ is modulation amplitude for the current phase $\varphi_y$, $\omega_\varphi$ is modulation frequency for the current phase $\varphi_y$, $\psi_A$ and $\omega_\varphi$ are arbitrary constant modulation phase angles for amplitude modulation and phase modulation, respectively. In equations (5) and (6), the dynamic lubrication parameters $A_0$, $\varphi_0$, $A_d$, $\varphi_0$, $\omega_A$, $\omega_\varphi$, $\psi_A$ and $\psi_\varphi$ are the same for x-current phases $i_{kx}$ and y-current phases $i_{jy}$, but this is not necessary and these parameters may be different for x-current phases $i_{kx}$ and y-current phases $i_{jy}$.

It will be appreciated that the amplitude and phase modulation techniques described in this section may be applied to any of the displacement devices 50 described herein, any of the moveable stages 10 described herein and any of the stators 30 described herein.

Impulse Excitation for Fine Positioning

In some embodiments, fine position control of moveable stage 10 may involve application of impulse signals to an initial amplitude and/or initial phase. Impulses may be used to finely adjust the moveable stage when the desired position $(x_r, y_r)$ remains static. Increasing the amplitudes of current phases $i_{kx}$, $i_{jy}$ (as discussed above) can minimize tracking error caused by friction forces—i.e. moveable stage 10 may be brought closer to the minimum magnetic potential energy location $(x_r, y_r)$ at higher amplitudes of current phases $i_{kx}$, $i_{jy}$. Once a moveable stage 10 moves close to its minimum energy location $(x_r, y_r)$, moveable stage 10 will be latched there by friction force and the amplitudes of current phases $i_{kx}$, $i_{jy}$ can be decreased to reduce power consumption. At this stage, in some embodiments, the fine position of moveable stage 10 can be controlled using impulse control as described in more detail below.

Figure 15A:
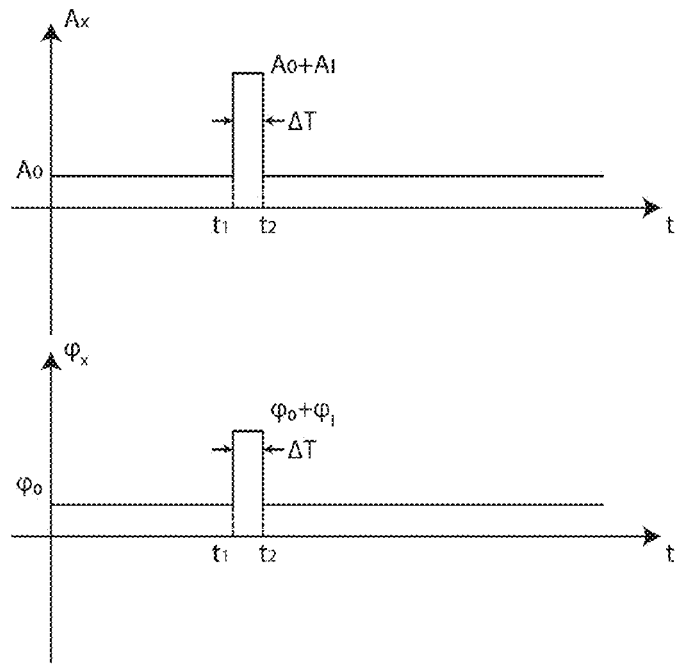
FIG. 15A shows amplitude $A_x$ and phase $\varphi_x$ impulses for an x-current phase $i_{kx}$ according to a particular embodiment.

FIG. 15A shows amplitude $A_x$ and phase $\varphi_x$ impulses for an x-current phase according to a particular embodiment. Similar impulses can be provided to the amplitudes $A_x$ and phases $\varphi_x$ for other x-current phases $i_{kx}$. As shown in FIG. 15A, the amplitude $A_x$ which is at an initial level of $A_0$ prior to $t_1$, suddenly increases to a first impulse amplitude $A_0 + A_1$ at time $t_1$ for a first temporal period $\Delta t$ and then, at time $t_2$, decreases to a lower level. In some embodiments, the lower level (after $t_2$) is $A_0$, while in other embodiments it may be a different amplitude. Similarly, the phase $\varphi_x$ which is at an initial level of $\varphi_0$ prior to $t_1$, suddenly increases to a first impulse amplitude $\varphi_0 + \varphi_1$ at time $t_1$ for a first temporal period $\Delta t$ and then, at time $t_2$, decreases to a lower level. In some embodiments, the lower level (after $t_2$) is $\varphi_0$, while in other embodiments it may be a different from $\varphi_0$. In some embodiments, the phase impulse strength $\varphi_1$ may be positive or negative. For example, $\varphi_1$ can be $+\pi/2$ or $-\pi/2$ or other values. It will be appreciated that amplitude and phase impulses having similar characteristics may be applied to the amplitude $A_y$ and phase $\varphi_y$ of y-current phases $i_{jy}$. Such phase impulses in x-traces can also help achieve stator-y acceleration of moveable stage 10.

In some embodiments, the impulse duration is in a range of $0 < \Delta t \leq 10$ minutes. In some embodiments, the impulse duration is in a range of $0 < \Delta t \leq 1$ minute. In some embodiments, the impulse duration is in a range of $0 < \Delta t \leq 1$ second. In some embodiments, the impulse duration is in a range of $0 < \Delta t \leq 0.1$ second. The impulses in the amplitudes and phases of x-current phases $i_{kx}$ will create impact forces on moveable stage 10 in the stator-y direction and stator-z direction; and impulses in the amplitudes and phases of y-current phases $i_{jy}$ will create impact forces on moveable stage 10 in the stator-x direction and stator-z direction. The resulting impact forces may create small amounts of motion which can help with the fine position of moveable stage 10.

Figure 15B:
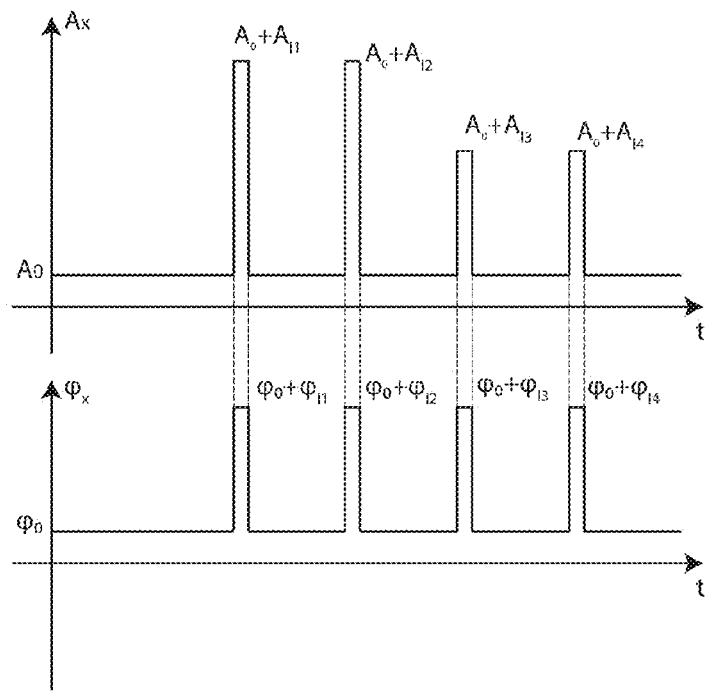
FIG. 15B shows a series of amplitude $A_x$ and phase $\varphi_x$ impulses for an x-current phase $i_{kx}$ according to a particular embodiment.

While the illustrated embodiment of FIG. 15A shows a rectangular impulse waveform, this is not necessary. In some embodiments, impulses of any arbitrary waveform shapes can additionally or alternatively be used. For example, impulses having triangular, rounded or other waveform shapes may be used. Some embodiments involve imparting impulses on the amplitudes $A_x$ (or $A_y$) of x-current phase $i_{kx}$ (or y-current phases $i_{jy}$) without imparting impulses on the phases (i.e. $\varphi_I = 0$). Some embodiments involve imparting impulses on the phases $\varphi_x$ (or $\varphi_y$) of x-current phase $i_{kx}$ (or y-current phases $i_{jy}$) without imparting impulses on the amplitudes (i.e. $A_I = 0$). FIG. 15B shows a series of amplitude $A_x$ and phase $\varphi_x$ impulses for an x-current phase $i_{kx}$ according to a particular embodiment. Each impulse in the FIG. 15B series may have parameters similar to the impulses described above in connection with FIG. 15A. Using a series of impulses like those shown in FIG. 15B, moveable stage 10 can experience a series of impact forces. The impact strength of the series of impulses (e.g. the parameter $A_I$) can vary from one impulse to another (e.g. decreasing over time), as illustrated in FIG. 15B. It will be appreciated that a similar series of amplitude $A_y$ and phase $\varphi_y$ impulses could be used for y-current phases $i_{jy}$. A series of impulses can be used to generate a series of impulse force and thus fine step motion to minimize tracking error, with the aid of suitable feedback position sensors.

Figure 15C:
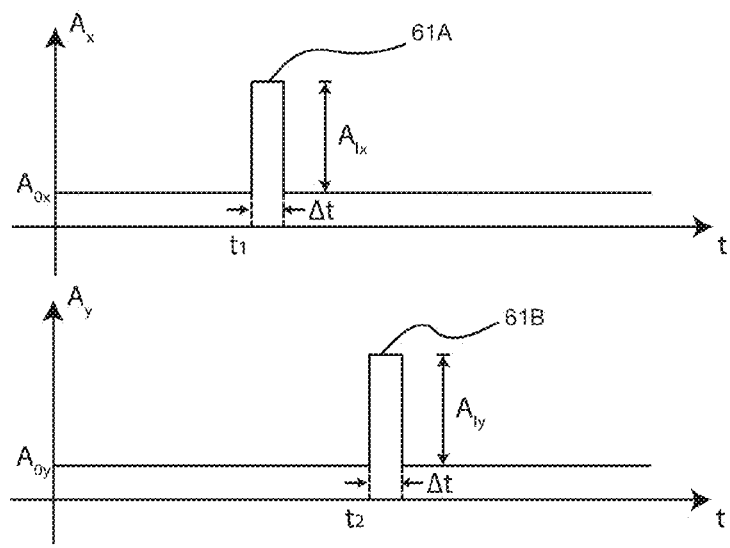
FIG. 15C shows an exemplary moveable stage fine positioning process according to a particular embodiment in which a first amplitude impulse is applied to the x-current phases $i_{kx}$ before a second amplitude impulse is applied to the y-current phases $i_{jy}$.

FIG. 15C shows an exemplary moveable stage fine positioning process according to a particular embodiment in which a first amplitude impulse 61A is applied to the x-current phases $i_{kx}$ at a time $t_1$ and lasts for a period of time $\Delta t$ before a second amplitude impulse 61B is applied to the y-current phases $i_{jy}$ at a time $t_2$. Each impulse 61A, 61B may have features similar to the amplitude impulse described above in FIG. 15A. First impulse 61A may be applied to all of the x-current phases $i_{kx}$ and second impulse 61B may be applied to all of the y-current phases $i_{jy}$. In the illustrated embodiment of FIG. 15C, $t_2 - t_1 > \Delta t$, such that the amplitude $A_y$ of the y-current phases $i_{jy}$ remains at its pre-impulse level ($A_y = A_{0y}$ in the illustrated embodiment) when impulse 61A is applied to the x-current phases $i_{kx}$ and, similarly, the amplitude $A_x$ of the x-current phases $i_{kx}$ remains at its post-impulse level ($A_x = A_{0x}$ in the illustrated embodiment) when impulse 61B is applied to the y-current phases $i_{jy}$. While only exerting impulse excitation on one of x-current phases $i_{kx}$ and y-current phases $i_{jy}$ at a time can help to avoid issues associated with developing excess heat, this feature of the FIG. 15C embodiment is not necessary. In some embodiments, impulses 61A, 61B may overlap temporally. That is, the start time $t_2$ of impulse 61B may occur at a time less than $t_1 + \Delta t$ and the finish time $t_2 - \Delta t$ may occur at a time after $t_1 - \Delta t$. In general, the start time of impulse 61B may be one of before and after the start time of impulse 61A and the finish time of impulse 61B may be the one of before and after the finish time of impulse 61A. In general, the duration $\Delta t_1$ of impulse 61A may be different that the duration $\Delta t_2$ of impulse 61B. FIG. 15C shows only amplitude impulses 61A, 61B. In some embodiments, one or both of amplitude impulses 61A, 61B could be accompanied by phase impulses having characteristics similar to those shown in FIG. 15A.

Figure 15D:
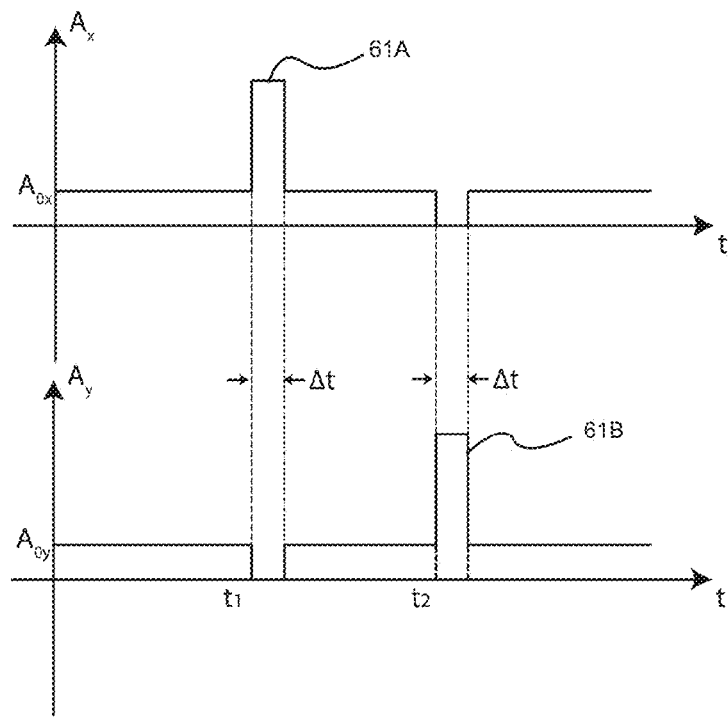
FIG. 15D shows an exemplary moveable stage fine positioning process according to a particular embodiment in which a first amplitude impulse is applied to the x-current phases $i_{kx}$ before a second amplitude impulse is applied to the y-current phases $i_{jy}$.

FIG. 15D shows an exemplary moveable stage fine positioning process in which a first amplitude impulse 61A is applied to the x-current phases $i_{kx}$ at a time $t_1$ and lasts for a period of time $\Delta t$ before a second amplitude impulse 61B is applied to the y-current phases $i_{jy}$ at a time $t_2$. The fine positioning process of the FIG. 15D embodiment differs from the fine positioning process of the FIG. 15C embodiment in that during first impulse 61A applied to the x-current phases $i_{kx}$ (i.e. from the time $t_1$ to $t_1+\Delta t$ in the illustrated embodiment), the amplitudes $A_y$ of the y-current phases $i_{jy}$ are reduced to a low level (e.g. to zero or some other suitable low level) from their nominal level $A_{0y}$ and, similarly, during second impulse 61B applied to the y-current phases $i_{jy}$ (i.e. from the time $t_2$ to $t_2+\Delta t$ in the illustrated embodiment) the amplitudes $A_x$ of the x-current phases $i_{kx}$ are reduced to a low level (e.g. to zero or some other suitable low level) from their nominal level $A_{0x}$. This FIG. 15D amplitude reduction during the application of impulses 61A, 61B can reduce heat generated during impulses 61A, 61B and may also reduce the normal direction contact force between moveable stage 10 and stator 30 during impulses 61A, 61B, and thus further minimize friction force induced positioning error. It will be appreciated that phase impulse excitation may have properties similar to that of amplitude impulse excitation described herein.

It will be appreciated that the impulse excitation fine positioning techniques described in this section may be applied to any of the displacement devices 50 described herein, any of the moveable stages 10 described herein and any of the stators 30 described herein.

Initialization of Moveable Stages

In some embodiments, during operation, displacement device 50 and its control system 58 operate without real-time position feedback (i.e. control system 58 does not require real-time positions of moveable stage(s) 10). However, in some embodiments, it may be beneficial for control system 58 to know initial location(s) of moveable stage(s) 10 (e.g. on startup). The initial location of a moveable stage 10 is useful for determining the coil traces 32, 34 into which current phases $i_{kx}$, $i_{jy}$ should be driven to control the position of the moveable stage 10. Several techniques for determining an initial position(s) of moveable stage(s) 10 are described herein.

Figure 16A:
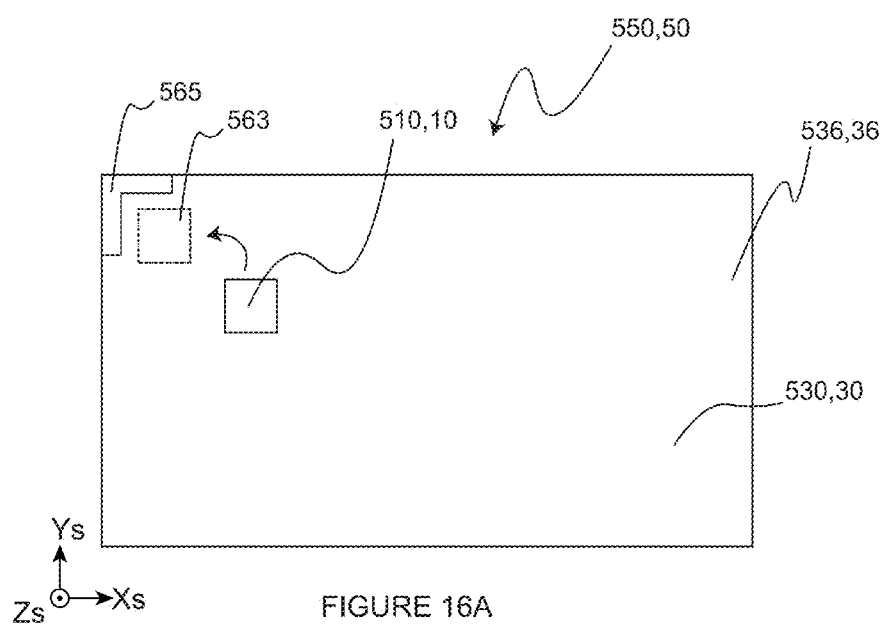
FIG. 16A is a schematic depiction of how a one-by-one initialization process may be used to determine an initial location of a moveable stage in a displacement device according to a particular embodiment.

One example way to determine initial position of moveable stage(s) 10 involves using one-by-one initialization. One-by-one initialization comprises positioning a moveable stage 10 at a specific well-defined start location by other means, such as manually or by a robotic arm/hand. FIG. 16A is a schematic depiction of how a one-by-one initialization process may be used to determine an initial location of a moveable stage in a displacement device 550 according to a particular embodiment. In the FIG. 16A displacement device 550, a pre-defined region 563 is defined for placing a moveable stage 510 upon startup. In some embodiments, placing moveable stage 510 in start region 563 may comprise abutting moveable stage 510 against alignment device 565. In some embodiments, coil traces 32, 34 overlapping start region 563 in the stator-z direction may be switched off (i.e. may not be driven with current phases $i_{kx}$, $i_{jy}$) during the process of locating moveable stage 510 in start region 563—i.e. to minimize interacting forces between moveable stage 510 and stator 530. By placing moveable stage 510 in region 563 and, optionally, pushing or otherwise abutting moveable stage 510 against alignment device 565, moveable stage 510 will be positioned at start region 563. Once the location of moveable stage 510 is approximately known, control system 58 may drive current phases $i_{kx}$, $i_{jy}$ into coil traces 32, 34 in region 563 and may move moveable stage 510 away to other locations in working region 536, whereupon moveable stage 510 is fully controlled by control system 58 and its corresponding current phases $i_{kx}$, $i_{jy}$. Once a first moveable stage 510 is under the control of control system 58, the initialization procedure can be repeated for a next moveable stage 10.

Figure 16B:
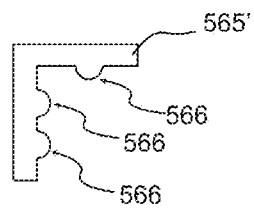
FIG. 16B depicts an alignment device according to another embodiment which may be used with the displacement device and the one-by-one initialization process of FIG. 16A.

FIG. 16B depicts an alignment device 565' according to another embodiment which may be used with displacement device 550 and the one-by-one initialization technique of FIG. 16A. Alignment device 565' comprises one or more alignment features 566, which may interact physically with complementary alignment features (not shown) in moveable stages 510 to assign with one-by-one initialization as described above. In the FIG. 16B embodiment, alignment features 566 each comprise a corresponding protrusion that may be received in a complementary recess in moveable stage 510. It will be appreciated that complementary pairs of alignment features 566 in alignment device 565' and moveable stage 510 could have a variety of other shapes. For example, moveable stage 510 may additionally or alternatively comprise one or more beveled surfaces and/or protrusions and alignment features 566 may additionally or alternatively comprise one or more complementary shaped beveled surfaces and/or recesses.

Figure 16C:
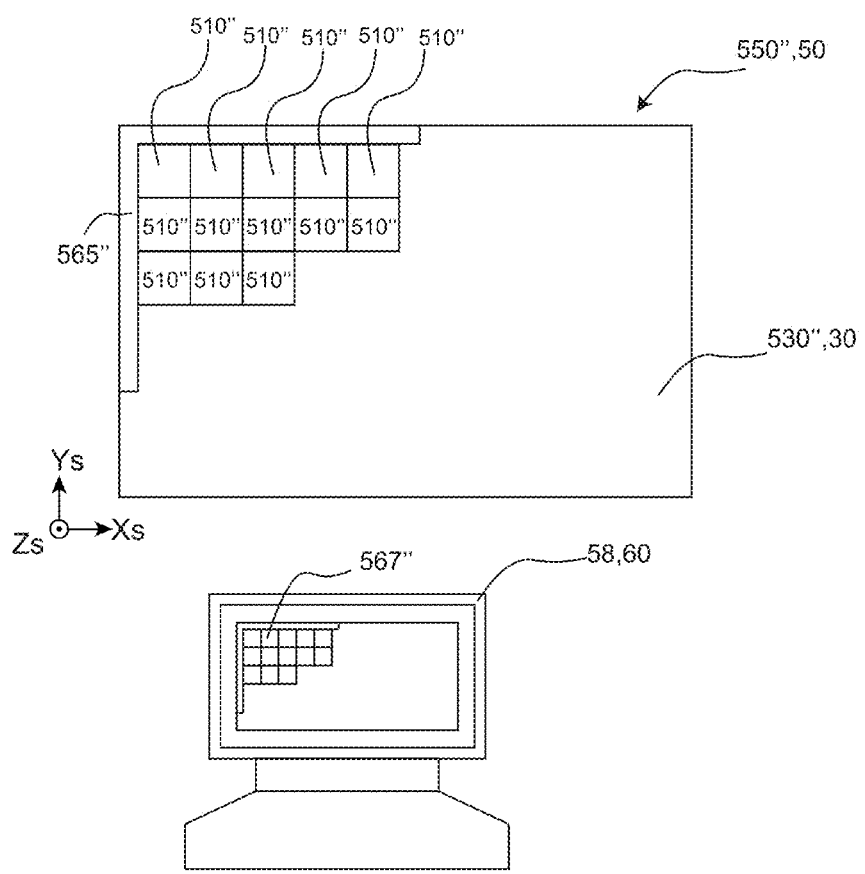
FIG. 16C schematically depicts a displacement device comprising a stator and a plurality of moveable stages which uses a group initialization technique for determining the initial positions of the moveable stages according to a particular embodiment.

FIG. 16C schematically depicts a displacement device 550" comprising a stator 530" and a plurality of moveable stages 510" according to another embodiment. FIG. 16C illustrates a group initialization technique for determining the initial positions of moveable stages 510". Moveable stages 510" are organized side by side to form a pattern either manually or with the aid of a robot device. An optional alignment device 565" (having features similar to alignment devices 565, 656') may be provided and used to facilitate organizing these moveable stages 510". Moveable stages 510" can be organized into a rectangular matrix pattern, for example. In the exemplary embodiment of FIG. 16C, eleven moveable stages 510 are organized into three rows, with the third row not completely filled. Next, information in relation to the organized pattern of moveable stage 510" is input into control system 58 (e.g. controller 60) via a graphical user interface 567" (or by any other suitable input interface). In this way, control system 58 will roughly know the positions of each moveable stage 510" with an accuracy to within a small fraction of spatial periods ($\lambda_x, \lambda_y$). With this information, control system 58 can drive moveable stages 510" and separate moveable stages 510" from each other with an appropriate algorithm.

Alignment devices 565, 565', 565" are optional. For example, when a robot device is used to initialize the positions of moveable stages, alignment devices 565, 565', 565" may not be needed as positional feedback from the robot device (such as positional feedback related to the position of a robot arm/hand) may be sufficient to position each moveable stage accurately. Initialization may occur only once (e.g. when a displacement device is first powered on). In some embodiments, before powering off the displacement device, control system 58 can drive the moveable stages back to their initialization locations. As a result, when the displacement device is powered on again, the moveable stages should be very close to the desired pattern with minimum requirement from an operator. In this sense, only the very first initialization needs some effort to organize the moveable stages to form a matrix pattern, although these methods can be used for adding additional moveable stages or in other situations.

Moveable Stage Motion Path Patterns

Figure 17A:
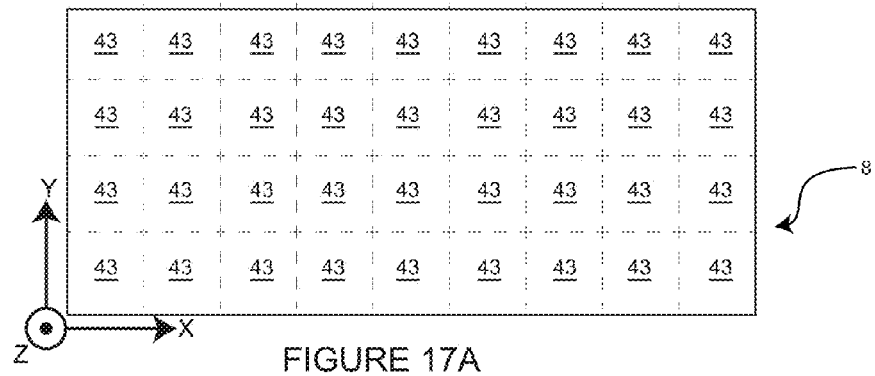
FIG. 17A schematically depicts shows the working region of a stator divided into a plurality of excitation regions according to an example embodiment.
Figure 17B:
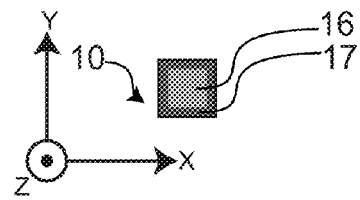
FIG. 17B schematically depicts a moveable stage suitable for use with the FIG. 17A stator.

Displacement devices according to particular embodiments provide flexibility with respect to the motion paths over which moveable stages can be controllably moved, especially when compared to conventional belt-based conveyor or track systems, where the one-dimensional track location and sizes are fixed after manufacturing. For the purpose of illustrating a number of exemplary motion paths of moveable stages, FIG. 17A schematically depicts the working region 36 of a stator 30 divided into a plurality of excitation regions 43 according to a particular embodiment. Each excitation region 43 is associated with one or more amplifier(s) 70 to drive current phases $i_{kx}$, $i_{jy}$ into its x-traces 32 and its y-traces 34. For the examples that follow, it will be assumed (without loss of generality) that the current phases $i_{kx}$, $i_{jy}$ are driven with a three phase configuration similar to that described above, although this is not necessary. In each excitation region 43, the x-current phases $i_{kx}$ are independent from the y-current phases $i_{jy}$. FIG. 17B shows one exemplary moveable stage 10, which may be used with the FIG. 17A stator 30. Moveable stage 10 of the FIG. 17B embodiment comprises a magnet array assembly 16 and bumper 17, which surrounds magnet array assembly 16. It will be understood that although moveable stage 10 of the FIG. 17B embodiment is depicted as being square with a bumper surrounding the perimeter, it may be of any suitable shape or form, such as any of at least the moveable stages described herein.

Figure 17C:
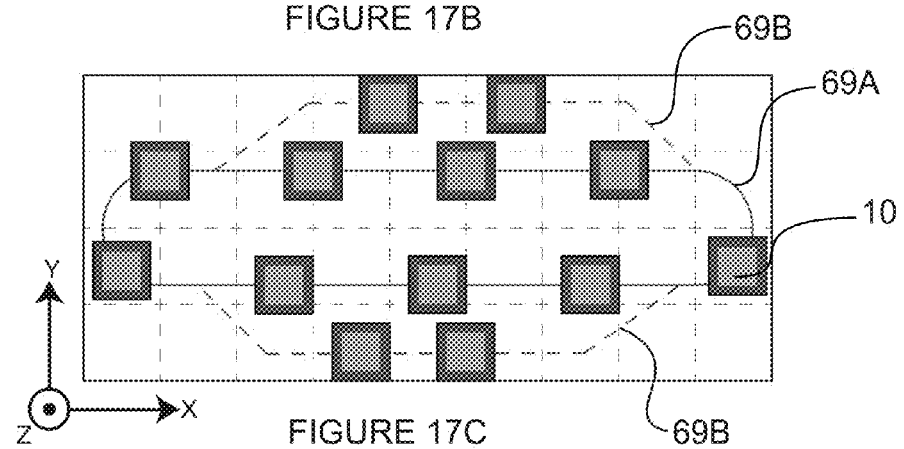
FIGS. 17C-17H depict schematic top views of motion patterns of a plurality of moveable stages (like the one of FIG. 17B) relative to a stator (like the one of FIG. 17A) according to particular embodiments.

FIG. 17C shows one motion pattern of a plurality of the FIG. 17B moveable stages 10 relative to the FIG. 17A stator 30. The FIG. 17C embodiment provides a path 69A (e.g. an oval shaped path 69A), along which a plurality (e.g. nine) moveable stages 10 can move bi-directionally. The FIG. 17C embodiment also provides two entry/exit paths 69B (shown in dashed lines). Moveable stages 10 moving along path 69A can exit via either one of entry/exit paths 69B. Similarly, moveable stages 10 outside path 69A can enter path 69A via one of entry/exit paths 69B. The exact size of the oval shaped path 90 can be dynamically changed by control software to meet certain application needs. Moreover, the numbers, sizes and/or locations of exit/entry paths 69B can also be dynamically changed by control software as desired.

Figure 17D:
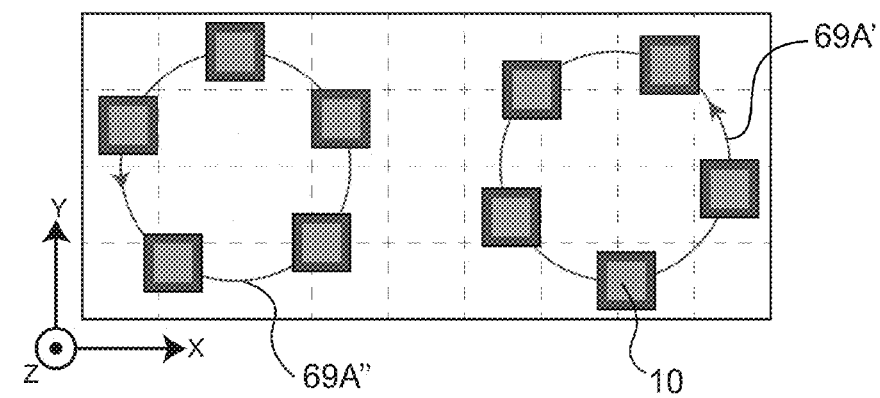
Figure 17E:
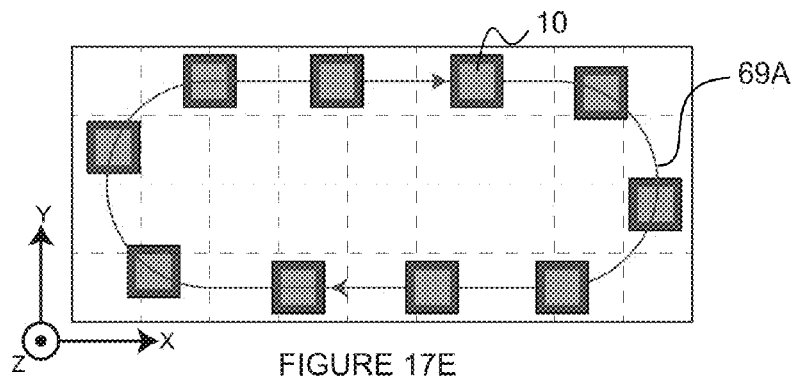
Figure 17F:
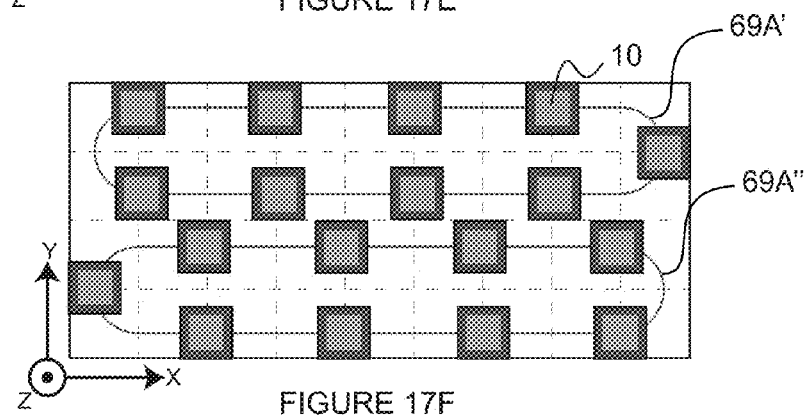

FIG. 17D shows another motion pattern of a plurality of the FIG. 17B moveable stages 10 relative to the FIG. 17A stator 30. Moveable stages 10 move along two paths 69A' and 69A" (e.g. circular paths 69A', 69A"). One moveable stage 10 can transition from one path 69A' to another path 69A", or vice versa. Alternatively, a moveable stage 10 can move out of both circular paths 69N, 69A". FIG. 17E shows another motion pattern of a plurality of the FIG. 17B moveable stages 10 relative to the FIG. 17A stator 30 which mimics a conventional oval shaped conveyer system by moving moveable stages 10 along a path 69A. The motion of moveable stages 10 can be bi-directional and the shape and size of the path 69A can be dynamically adjusted by software. FIG. 17F shows another motion pattern of a plurality of the FIG. 17B moveable stages 10 relative to the FIG. 17A stator 30. FIG. 17F is similar to FIG. 17D in that moveable stages 10 move along two paths 69A' and 69A", except that the FIG. 17F paths 69A', 69A" have different shapes than the FIG. 17D paths.

Figure 17G:
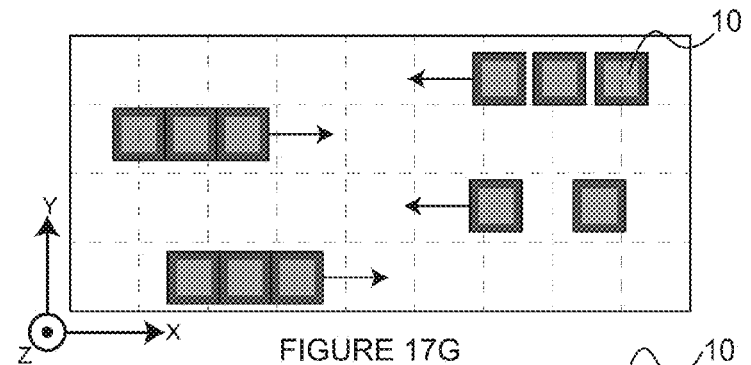
Figure 17H:
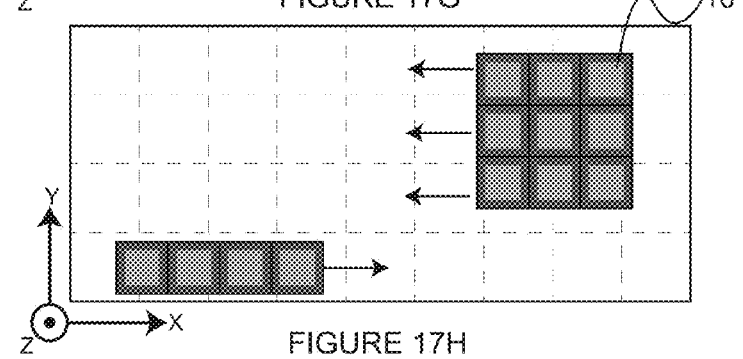

FIG. 17G shows another motion pattern of a plurality of the FIG. 17B moveable stages 10 relative to the FIG. 17A stator 30. FIG. 17G shows that groups of moveable stages 10 can move together very closely. Different groups of moveable stages 10 can pass each other in opposite directions. Different groups of moveable stages 10 can have individual moveable stages 10 spaced apart by varying distances. Groups of moveable stages 10 can comprise any suitable number of available moveable stages 10. Individual moveable stages 10 can switch between groups or form new groups. FIG. 17H shows another motion pattern of a plurality of the FIG. 17B moveable stages 10 relative to the FIG. 17A stator 30. FIG. 17H shows that a matrix group of moveable stages 10 (e.g. 9 moveable stages 10 in a 3 by 3 matrix group) can also move together and have independent motion from another linear group of moveable stages 10, and two groups can pass each other. Moveable stages 10 can form into linear (1D) groups, or matrix (2D) groups as shown in FIG. 17H. Each moveable stage 10 may have completely independent motion from all other moveable stages 10. A plurality of moveable stages 10 can form into groups and a group of moveable stages 10 can also ungroup themselves to allow independent motion for each moveable stage 10.

When a plurality of moveable stages 10 move together in a queue with space in between each moveable stage 10, such as in the FIG. 17F example, each moveable stage 10 can achieve independent motion control, can flexibly move out of the moving queue (dynamic exit), and can also allow other in-coming moveable stages 10 to merge into an existing queue (dynamic entry).

Figure 18A:
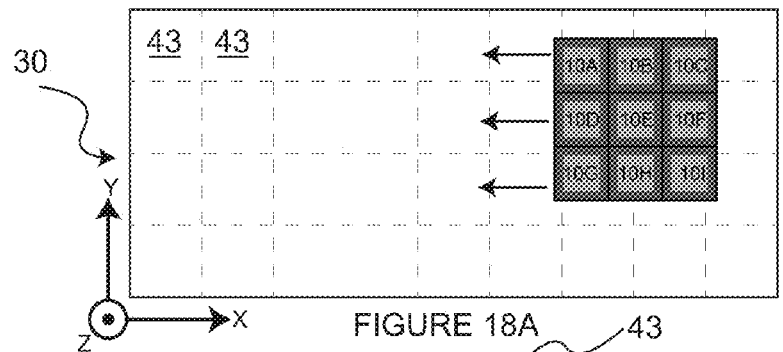
FIGS. 18A-18F schematically illustrate one exemplary embodiment of a process of a number of the FIG. 17B moveable stages 10 ungrouping from one another.
Figure 18B:
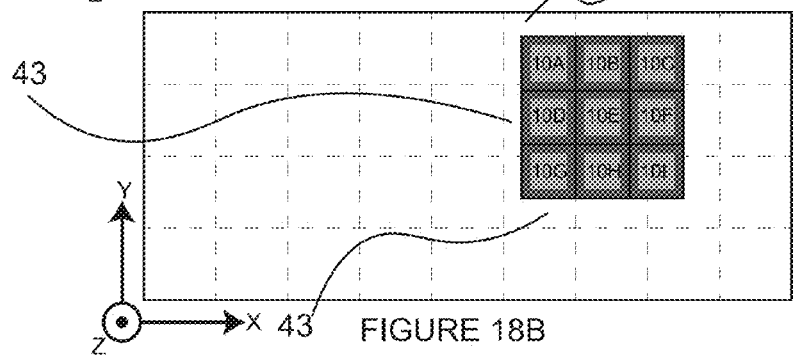
Figure 18C:
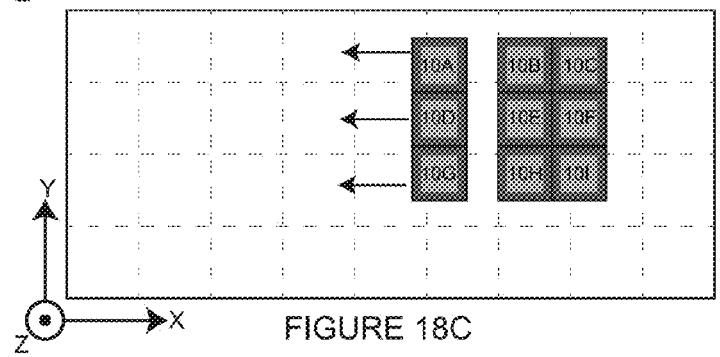
Figure 18D:
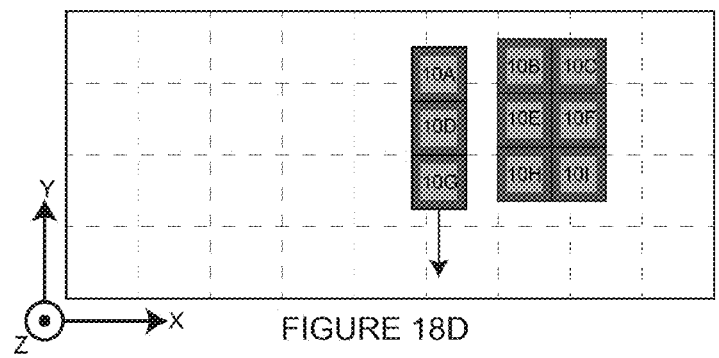
Figure 18E:
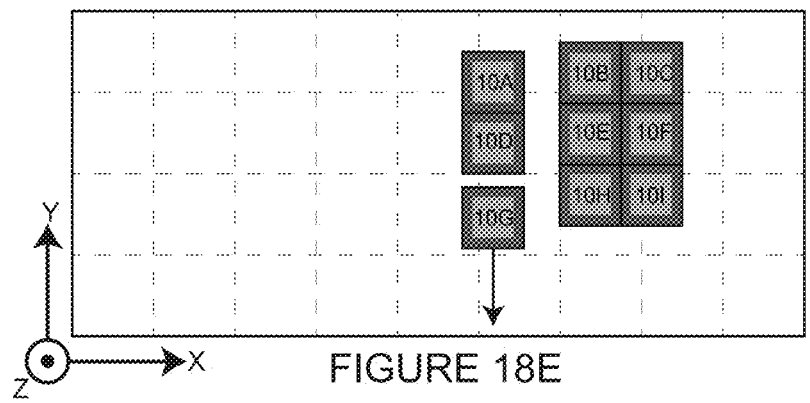
Figure 18F:
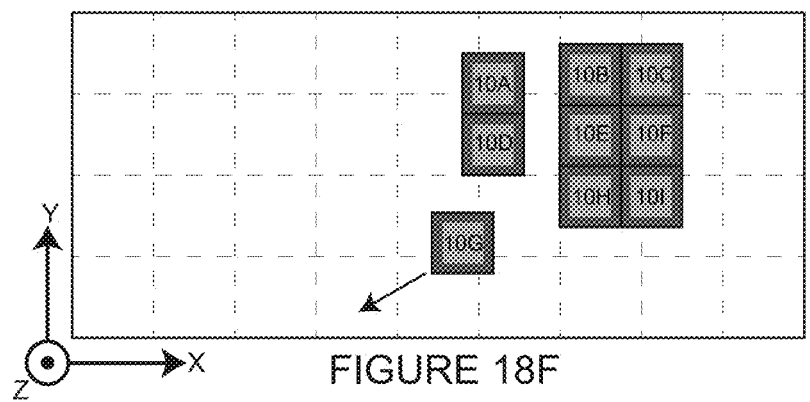

FIGS. 18A-18F schematically illustrate one exemplary embodiment of a process of a number of the FIG. 17B moveable stages 10 ungrouping from one another. In FIG. 18A, nine moveable stages 10A-10I form a group to move together relative to a stator 30 (e.g. the FIG. 17A stator 30, in the illustrated embodiment). Stator 30 includes a plurality of independently driven current excitation regions 43 shown in dashed outline, each pair of excitation regions separated by a corresponding boundary plane. These boundary planes may be oriented in stator-x-stator-z planes or stator-y-stator-z planes. In some embodiments, the center-to-center distance between moveable stages 10 may comprise integer multiples of the first and second array spatial periods ($\lambda_y = \lambda_1$, $\lambda_x = \lambda_2$), the magnet array assemblies 16 of moveable stages 10 grouped as shown in FIG. 18A can share corresponding current phases $i_{kx}$, $i_{jy}$, which couples their motion together. One technique for ungrouping the FIG. 18A moveable stages 10 comprises: (a) the group moves in a first stator-x direction as shown in FIG. 18A until the group reaches the location shown in FIG. 18B, where moveable stages 10A, 10D and 10G are located in excitation regions 43 decoupled from the rest of the group; (b) moveable stages 10A, 10D, 10G may then be driven in the first stator-x direction away from the other moveable stages 10 using suitable y-current phases $i_{jy}$ (which may be the same for each of moveable stages 10A, 10D, 10G). As shown in FIG. 18C, during this time the rest of the moveable stages (10B, 10C, 10E, 10F, 10H, 10I) in the group may be held stationary or may be driven in the second (i.e. opposite to the first) stator-x direction by suitable y-current phases $i_{jy}$. As a result, stages 10A, 10D, 10G are independently driven from the rest of the group; (c) moveable stages 10A, 10D, 10G are then driven in a first stator-y direction (as shown in FIG. 18D) using suitable x-current phases $i_{kx}$ until stage 10G is located in an excitation region 43 that is decoupled from stages 10A and 10D; (d) As shown in FIG. 18E, during this time, stage 10G is further driven in the first stator-y direction using suitable x-current phases $i_{kx}$, while the rest of moveable stages 10A, 10B, 10C, 10D, 10E, 10F, 10H and 10I may be held stationary or may be driven in the second (i.e. opposite to the first) stator-y direction by suitable x-current phases $i_{kx}$. As a result, moveable stage 10G separates from moveable stages 10A, 10D (as shown in FIG. 18E); and (e) as shown in FIG. 18F, moveable stage 10G can now achieve independent motion in stator-x and stator-y directions. In similar ways, the other moveable stages 10 can be ungrouped to achieve independent motion in the stator-x and stator-y directions.

By reversing the above process, a plurality of moveable stages 10 can form into linear (1-dimensional) group(s) or a matrix (2-dimensional) group(s). This is useful in queuing for saving space or in high speed movement of a relatively large number of moveable stages 10.

In general, the currents in different excitation regions may be controllably driven to cause a first group of one or more moveable stages to separate from a second group of one or more moveable stages by: driving the currents to position the plurality of moveable stages at a location in the working region wherein a first boundary plane extending in the stator-z direction between a first of the plurality of excitation regions and a second of the plurality of excitation regions divides the first and second groups of moveable stages (e.g. magnet assemblies of the first group of moveable stages and magnet assemblies of the second group of moveable stages are on opposite sides of the first boundary plane); and driving the plurality of currents in at least some of the coil traces of the first excitation region to at least one of: move the first group of moveable stages in a first direction away from the first boundary plane; and move the first group of moveable stages in a first direction aware from the second group of moveable stages, the first direction parallel with the first boundary plane; while driving the plurality of currents in at least some of the coil traces of the second excitation region to at least one of: maintain the location of the second group of moveable stages within the working region; and move the second group of moveable stages in a second direction away from the first boundary plane; and move the second group of moveable stages in a direction away from the first group of moveable stages, the second directional parallel with the first boundary plane. The first boundary plane between the first and second excitation regions may be in either a stator-x-stator-z plane or a stator-y-stator-z plane. Similarly, a second plurality of currents in different excitation regions may be controllably driven to cause a first sub-group of the first group of moveable stages to separate from a second sub-group of the first plurality of moveable stages by: driving the second plurality of currents into the plurality of electrical coils to position the first group of moveable stages at a location in the working region wherein a second boundary plane extending in a stator-z direction between a third excitation region of the plurality of excitation regions and a fourth excitation region of the plurality of excitation regions divides the first sub-group and the second sub-group of the first group of moveable stages (e.g. magnet assemblies of the first and second sub-groups are on opposite sides of the second boundary plane); and driving the second plurality of currents in at least some of the coil traces of the third excitation region to at least one of: move the first sub-group of moveable stages in a third direction away from the second boundary plane; and move the first sub-group of moveable stages in a third direction away from the second sub-group of moveable stages, the third direction parallel with the surface of the second boundary plane; while driving the second plurality of currents in at least some of the coil traces of the fourth excitation region to at least one of: maintain the location of the second sub-group of moveable stages within the working region; and move the second sub-group of moveable stages in a fourth direction away from the second boundary plane; move the second sub-group of the moveable stages in a fourth direction away from the first sub-group of moveable stages, the fourth direction parallel with the surface of the second boundary plane. The second boundary plane may be in one of a stator-x-stator-z plane and a stator-y-stator-z plane and may be orthogonal to the first boundary plane. The third excitation region may be one of the first excitation region and the second excitation region. The fourth excitation region may be one of the first excitation region and the second excitation region, but is different than the third excitation region.

Some aspects of the invention provide methods for controlling the movement of a plurality of moveable stages relative to a stator to separate a first group of one or more moveable stages from a second group of one or more moveable stages. Each moveable stage among the first and second groups of moveable stages may be similarly constructed with one or more magnet arrays, the one or more magnet arrays comprising at least one magnet array comprising a plurality of magnetization segments, each magnetization segment having a corresponding magnetization direction. The methods comprise: providing a stator comprising a plurality of electrically conductive coils, the plurality of electrically conductive coils shaped to provide a plurality of stator-z-direction-non-overlapping excitation regions, each excitation region comprising: a first plurality of coil traces generally elongated in a stator-x direction and distributed over at least a first portion of a first layer; and a second plurality of coil traces generally elongated in a stator-y direction and distributed over at least a second portion of a second layer, the stator-y direction orthogonal to the stator-x direction. The first and second portions of the first and second layers may overlap one another in a stator-z direction throughout the excitation region. The stator-z direction may be generally orthogonal to both the stator-x direction and the stator-y direction. The method may also comprise controllably driving a plurality of currents into the plurality of electrical coils to thereby cause a first group of one or more of the plurality of moveable stages to separate from a second group of one or more of the plurality of moveable stages. Controllable driving the plurality of currents into the plurality of electrical coils may comprise: driving the plurality of currents into the plurality of electrical coils to position the plurality of moveable stages at a location in the working region wherein a first boundary plane extending in the stator-z direction between a first of the plurality of excitation regions and a second of the plurality of excitation regions divides the first and second groups of moveable stages; driving at least some of the plurality of currents in at least some of the coil traces of the first excitation region to at least one of: move the first group of moveable stages in a first direction away from the first boundary plane; and move the first group of moveable stages in a first direction away from the second group of moveable stages, the first direction parallel with the first boundary plane surface; while driving at least some of the plurality of currents in at least some of the coil traces of the first excitation region, driving at least some of the plurality of currents in at least some of the coil traces of the second excitation region to at least one of: maintain a location of the second group of moveable stages within the working region; move the second group of moveable stages in a second direction away from the first boundary plane; and move the second group of moveable stages in a second direction away from the first group of moveable stages, the second direction parallel with the first boundary plane surface The first boundary plane between the first and second excitation regions may be in one of a stator-x-stator-z plane and a stator-y-stator-z plane.

The method may comprise controllably driving a second plurality of currents into the plurality of electrical coils to thereby cause a first sub-group of the first group of moveable stages to separate from a second sub-group of the first group of moveable stages. Controllably driving the second plurality of currents into the plurality of electrical coils may comprise: driving the second plurality of currents into the plurality of electrical coils to position the first group of moveable stages at a location in the working region wherein a second boundary plane extending in the stator-z direction between a third excitation region of the plurality of excitation regions and a fourth excitation region of the plurality of excitation regions divides the first sub-group and the second sub-group of the first group of moveable stages; and driving at least some of the second plurality of currents in at least some of the coil traces of the third excitation region to at least one of: move the first sub-group of the first group of moveable stages in a third direction away from the second boundary plane; and move the first sub-group of the first group moveable stages in a direction away from the second sub-group of the first group of moveable stages, the third direction parallel with the second boundary plane surface; while driving at least some of the second plurality of currents in at least some of the coil traces of the third excitation region, driving at least some of the second plurality of currents in at least some of the coil traces of the fourth excitation region to at least one of: maintain the location of the second sub-group of the first group of moveable stages within the working region; move the second sub-group of moveable stages in a fourth direction away from the second boundary plane; and move the second sub-group of the first group of moveable stages in a fourth direction away from the first sub-group of the first group of moveable stages, the fourth direction parallel with the second boundary plane surface. The second boundary plane may be in one of a stator-x-stator-z plane and a stator-y-stator-z plane and may be orthogonal to the first boundary plane. The third direction may be orthogonal to the first direction. The third excitation region may be one of the first excitation region and the second excitation region. The fourth excitation region may be one of the first excitation region and the second excitation region, but may be different than the third excitation region. A stator-z location of the third layer may be the same as one of: a stator-z location of the first layer; and a stator-z location of the second layer.

In some embodiments, for each moveable stage in the first and second groups of moveable stages: a stator-x dimension of the first excitation region is greater than a stage-x dimension of the moveable stage and less than twice the stage-x dimension of the moveable stage; a stator-y dimension of the first excitation region is greater than a stage-y dimension of the moveable stage and less than twice the stage-y dimension of the moveable stage; a stator-x dimension of the second excitation region is greater than the stage-x dimension of the moveable stage and less than twice the stage-x dimension of the moveable stage; a stator-y dimension of the second excitation region is greater than the stage-y dimension of the moveable stage and less than twice the stage-y dimension of the moveable stage. Driving at least some of the plurality of currents in at least some of the coil traces of the first excitation region may comprise driving currents with similar periodicity but with different phases into the first plurality of coil traces. In some embodiments, driving at least some of the plurality of currents in at least some of the coil traces of the first excitation region may comprise driving currents with similar periodicity but with different phases into the second plurality of coil traces.

Similarly, the process may be reversed and the currents in different excitation regions may be controllably driven to cause a first group of one or more moveable stages to abut against, or be close (e.g. within a distance $1.5\lambda_1$ or $1.5\lambda_2$) to, a second group of one or more moveable stages by: driving the plurality of currents into the plurality of electrical coils to position the first group of moveable stages at a location in the working region wherein a first boundary plane extending in the stator-z direction between a first of the plurality of excitation regions and a second of the plurality of excitation regions, divides the first and second groups of moveable stages (e.g. magnet assemblies of the first group of moveable stages and magnet assemblies of the second group of moveable stages are on opposite sides of the first boundary plane); and driving the plurality of currents in at least some of the coil traces of the first excitation region to at least one of: maintain the location of the first group of moveable stages within the working region; and move the first group of moveable stages in a first direction toward the first boundary plane; move the first group of moveable stages in a first direction toward the second group of moveable stages, the first direction parallel to the surface of the first boundary plane; while driving the plurality of currents in at least some of the coil traces in the second excitation region to at least one of: move the second group of moveable stages in a second direction toward the first boundary plane; and move the second group of moveable stages in a second direction toward the first group of moveable stages, the second direction parallel with the surface of the first boundary plane.

Some aspects of the invention provide methods for controlling the movement of a plurality of moveable stages relative to a stator to bring the moveable stages into close proximity to one another. The method comprises: providing a stator comprising a plurality of electrically conductive coils, the plurality of electrically conductive coils shaped to provide a plurality of excitation regions, each excitation region comprising: a first plurality of coil traces generally elongated in a stator-x direction and distributed over at least a first portion of a first layer; a second plurality of coil traces generally elongated in a stator-y direction and distributed over at least a second portion of a second layer, the stator-y direction orthogonal to the stator-x direction. The first and second portions of the first and second layers may overlap one another in a stator-z direction throughout the excitation region, the stator-z direction generally orthogonal to both the stator-x direction and the stator-y direction. The method may comprise: providing a plurality of moveable stages moveable relative to the stator within a two-dimensional working region, each moveable stage comprising one or more magnet arrays, the one or more magnet arrays comprising a first magnet array, the first magnet array comprising a plurality of first magnetization segments, each first magnetization segment having a corresponding first magnetization direction; and controllably driving a plurality of currents into the plurality of electrical coils to thereby cause a first group of one or more of the plurality of moveable stages within one magnet array dimension to a second group of one or more of the plurality of moveable stages. Controllably driving the plurality of currents into the plurality of electrical coils may comprise: driving the plurality of currents into the plurality of electrical coils to position the first group of moveable stages at a location in the working region wherein a first boundary plane extending in the stator-z direction between a first of the plurality of excitation regions and a second of the plurality of excitation regions divides the first and second groups of moveable stages; and driving the plurality of currents in at least some of the coil traces of the first excitation region to at least one of: maintain the location of the first group of moveable stages within the working region; move the first group of moveable stages in a first direction toward the first boundary plane; move the first group of moveable stages in a first direction towards the second group of moveable stages, the first direction parallel to the surface of the first boundary plane; while driving the plurality of currents in at least some of the coil traces in the second excitation region to at least one of: move the second group of moveable stages toward the first boundary plane; move the second group of moveable stages in a second direction toward the first group of moveable stages, the second direction parallel to the first boundary plane surface.

Rotating Motion of Moveable Stage with the Aid of α-Coil Traces

Figure 19A:
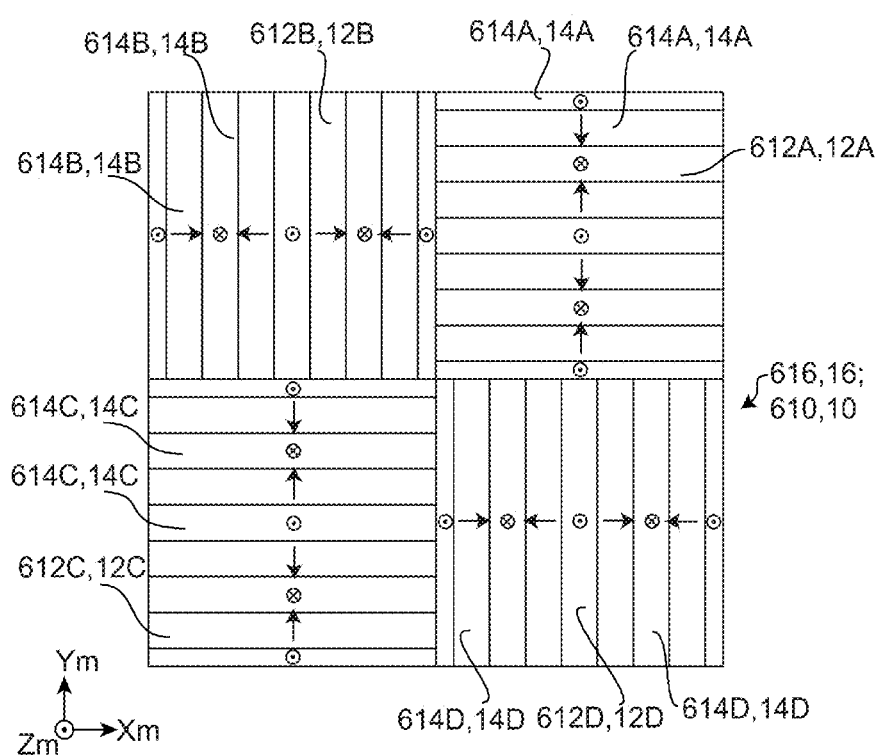
FIGS. 19A-19G schematically depict a technique for implementing rotational motion of a moveable stage about a stator-z oriented axis according to a particular embodiment.

FIGS. 19A-19G schematically depict a technique for implementing rotational motion of a moveable stage 610 about a stator-z oriented axis according to a particular embodiment. The technique of FIGS. 19A-19G is shown for a displacement device incorporating a magnet array assembly 616 and a coil trace assembly 635 according to specific embodiments, but by suitable modification which will be understood to those skilled in the art after the following explanation, the technique of FIGS. 19A-19G can be applied to other displacement devices described herein. FIG. 19A shows a magnet array assembly 616 of a moveable stage 610 according to a particular embodiment which is used to facilitate the illustration of FIGS. 19A-19G.

Figure 19B:
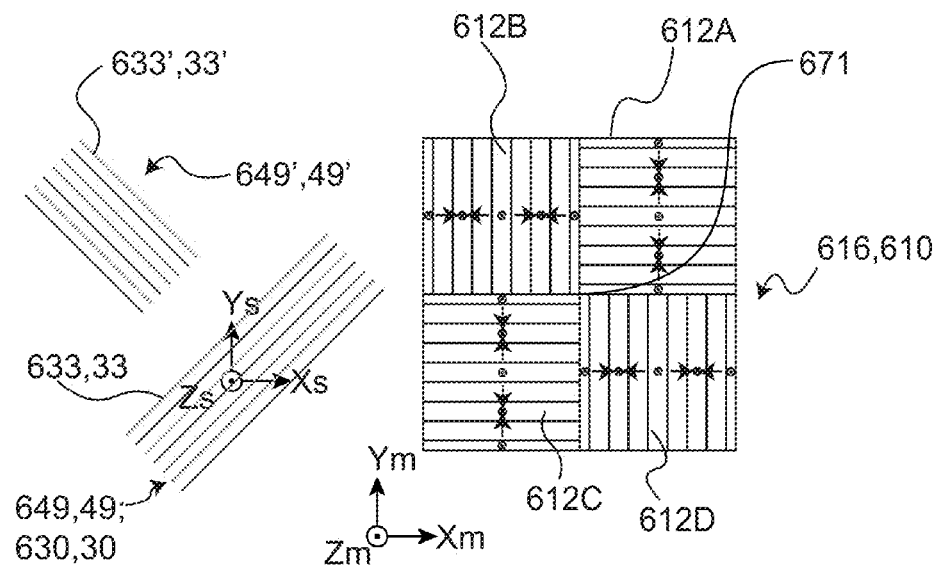
Figure 19C:
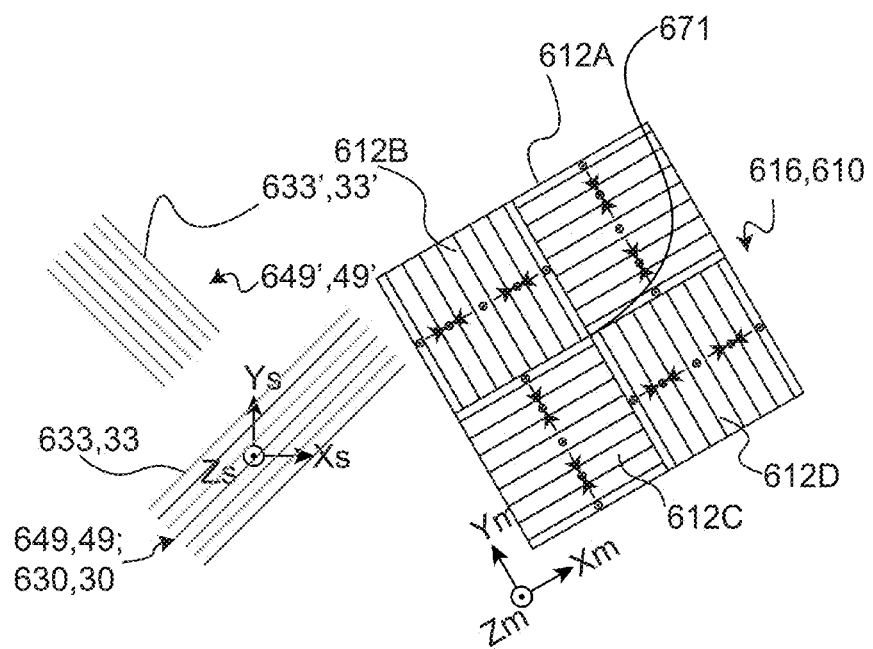

As illustrated in FIG. 19B, stator 630 comprises α-coil traces 633 distributed over at least a portion of a α-trace layer 649 which are oriented at an angle α° relative to the positive stator-x axis. In general, α may be any angle between 0°-90°. To facilitate explanation, it will be assumed, without loss of generality, that α-coil traces 633 are oriented at 45° relative to the positive stator-x axis. Current phases $i_{l\alpha}$ may be driven into α-coil traces 633. Such current phases $i_{l\alpha}$ may have properties similar to the x-current phases $i_{kx}$ and/or the y-current phases $i_{jy}$, except that there may be a different (or the same) spatial period $\lambda_\alpha$. By orienting coil traces 633 to be elongated at 45° relative to the positive stator-x axis, the traveling magnetic field wave generated by the current phases driven into coil traces 633 is generated such that moveable stage 610 will have a local minimum potential energy when magnet array assembly 616 is in the 45°-orientation shown in FIG. 19D. With this potential energy minimum, moveable stage 10 will tend to rotate around a stator-z oriented axis 671 from the 0° orientation shown in FIG. 19B, through the orientation in FIG. 19C to reach the 45°-orientation illustrated in FIG. 19D. During this rotation, the position of the center of moveable stage 610 (through which stator-z oriented axis 671 extends) may remain nearly unchanged in the stator-x, stator-y coordinate system. In addition or in the alternative to using 45°-current phases driven into 45°-traces 633 to effect the rotation of moveable stage 610 between the 0° (FIG. 19B) orientation and the 45° (FIG. 19D) orientation, 135°-current phases could be driven into 135°-traces 633' in 135°-trace layer 649' to effect the rotation of moveable stage 610 between the 0° (FIG. 19B) orientation and the 45° (FIG. 19D) orientation.

Figure 19D:
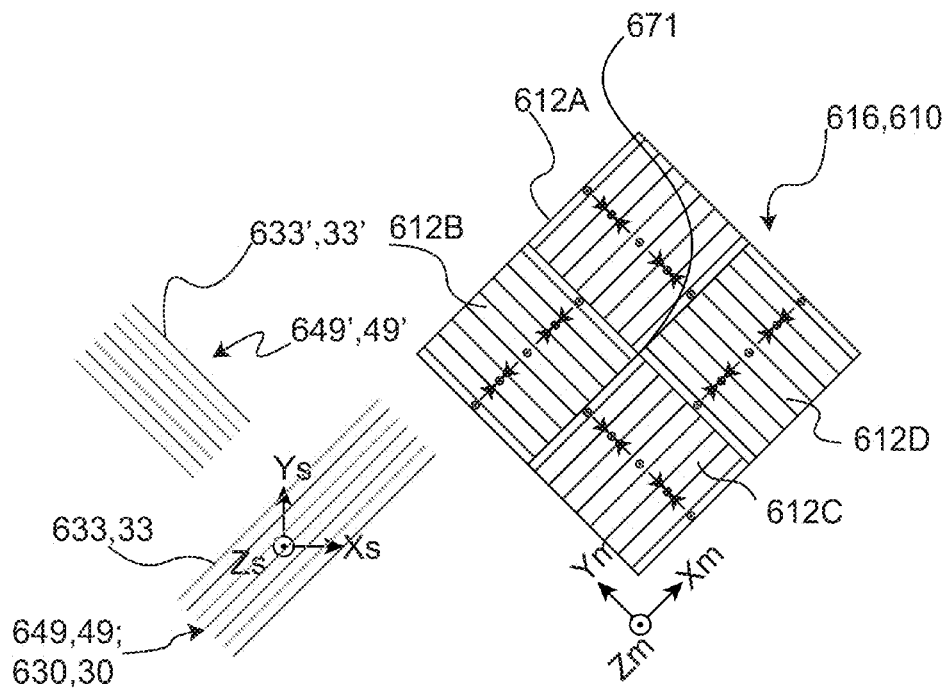
Figure 19E:
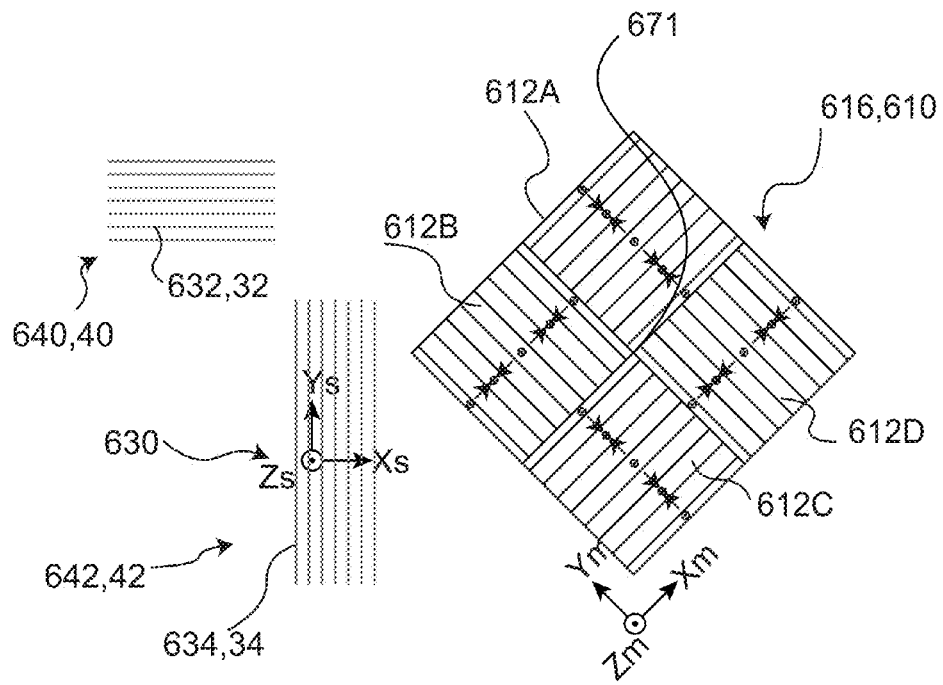
Figure 19F:
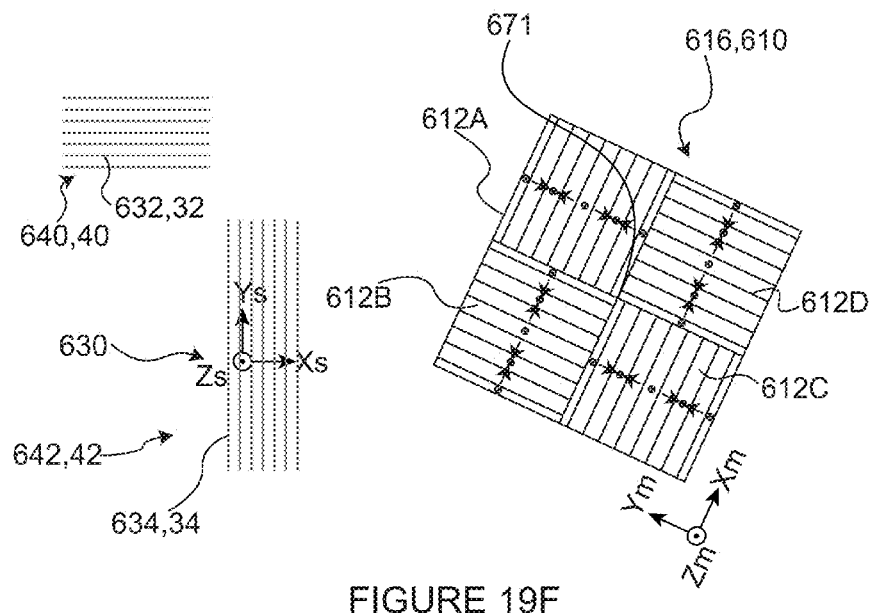

After moveable stage 610 rotates to the orientation shown in FIG. 19D, y-current phases $i_{jy}$ may be driven into y-traces 634 in y-trace layer 642 (FIG. 19E) to achieve further rotation about stator-z oriented axis 671. When y-current phases $i_{jy}$ are driven into y-traces 634, the traveling magnetic field wave generated by y-current phases $i_{jy}$ is generated such that moveable stage 610 will have a local minimum potential energy when magnet array assembly 616 is in the 90°-orientation shown in FIG. 19G. With this potential energy minimum, moveable stage 10 will tend to rotate around stator-z oriented axis 671 from the 45° orientation shown in FIG. 19E, through the orientation in FIG. 19F to reach the 90°-orientation illustrated in FIG. 19G. During this rotation, the position of the center of moveable stage 610 (through which stator-z oriented axis 671 extends) may remain nearly unchanged in the stator-x, stator-y coordinate system. In addition or in the alternative to using y-current phases $i_{jy}$ to effect the rotation of moveable stage 610 between the 45° (FIG. 19E) orientation and the 90° (FIG. 19G) orientation, x-current phases $i_{kx}$ could be driven into x-traces 632 in x-trace layer 640 to effect the rotation of moveable stage 610 between the 45° (FIG. 19E) orientation and the 90° (FIG. 19G) orientation.

Figure 19G:
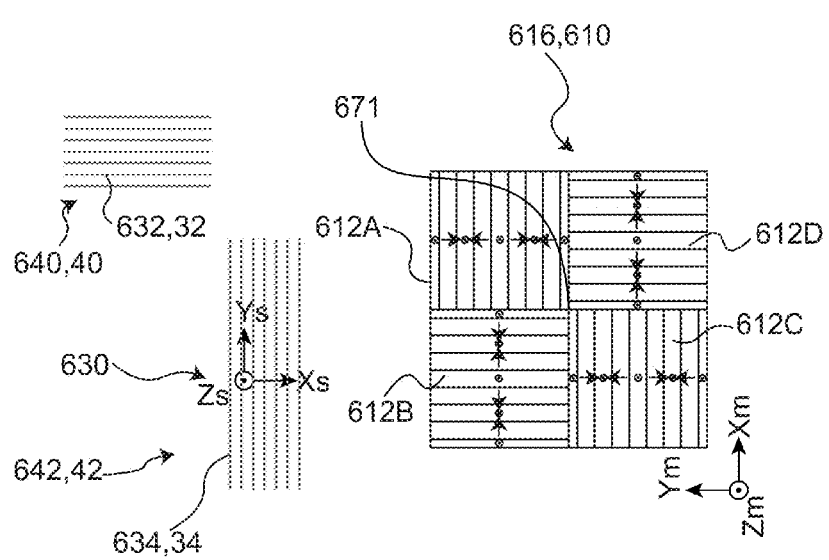

Since magnet array assembly 616 is 90° rotationally symmetric about stator-z oriented axis 671, the FIG. 19G orientation is magnetically equivalent to the FIG. 19B orientation. Consequently, further rotation about axis 671 can be achieved by suitable repetition of the above-described procedures using 45°-current phases and/or 135°-current phases and x-current phases $i_{kx}$ and/or y-current phases $i_{jy}$.

The rotation techniques and coil trace assemblies described in FIGS. 19A-19G are described with application to magnet array assembly 616. It will be appreciated that magnet array assembly 616 has a layout similar to magnet array assembly 416A (FIG. 5A). Any of the rotation techniques and coil trace assemblies described in FIGS. 19A-19G may be used with magnet array assembly 416A (or a left-handed version thereof—see description of left-handed versus right-handed magnet arrays above) and such magnet array assemblies may comprise any of the individual magnet arrays described in FIGS. 6A-6EE. FIG. 5B shows a left-handed magnet array assembly 416B that is different than magnet array assembly 416A (FIG. 5A) in that the individual magnet arrays of magnet array assembly 416B are offset and spaced apart from one another as described above. Regardless, any of the rotation techniques and coil trace assemblies described in FIGS. 19A-19G may be used with magnet array assembly 416B (or a right-handed version thereof) and such magnet array assemblies may comprise any of the individual magnet arrays described in FIGS. 6A-6EE.

360° Rotation Control Methods for 1D Magnet Array Assembly

Figure 20A:
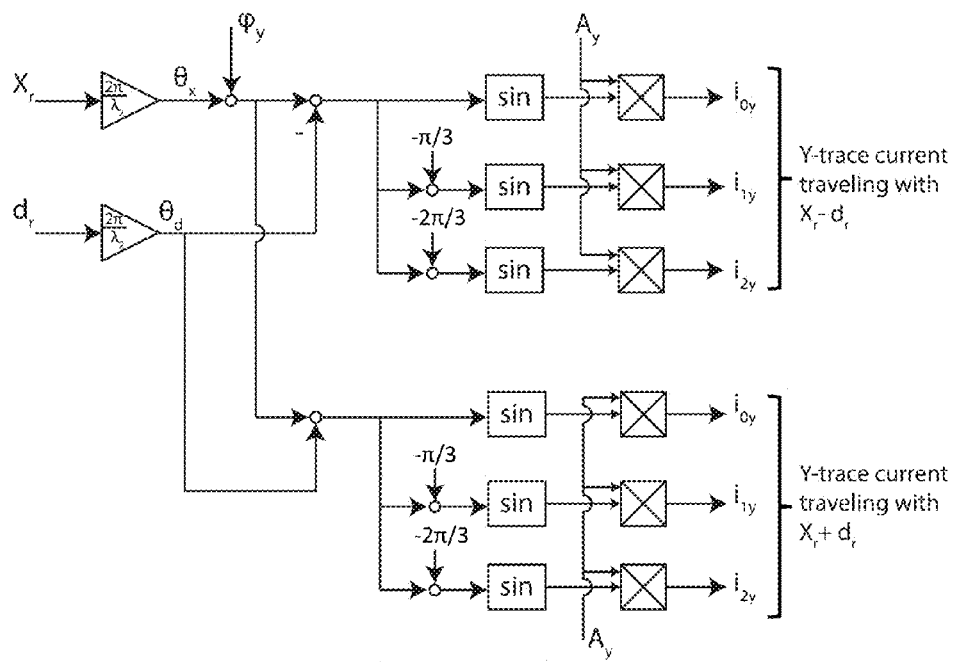
FIGS. 20A and 20B respectively depict the generation of y-current phases $i_{jy}$ and x-current phases $i_{kx}$ which may be used to achieve controllable 360° rotation about a stator-z oriented axis according to a particular embodiment.
Figure 20B:
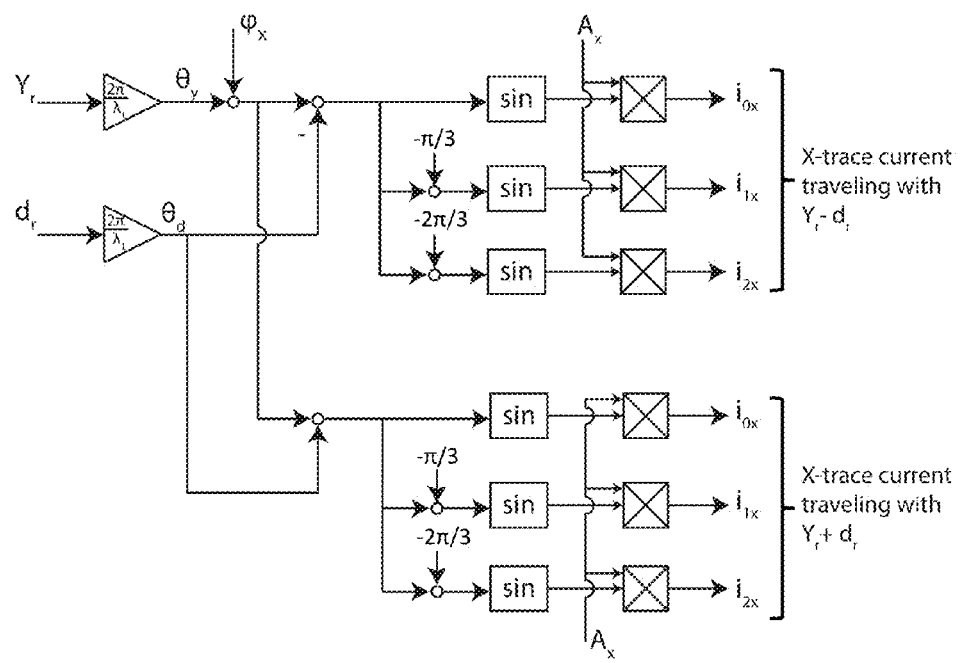

In some embodiments, moveable stages 10 comprising 1D magnet array assemblies 16 (e.g. magnet array assemblies 16 of the type shown in FIGS. 5A, 5B, 5E, 5G, 5I) may be capable of fully controllable 360° rotation about a stator-z oriented axis using current phases driven into coil traces having any two or more directions (e.g. x-current phases $i_{kx}$ driven into x-traces 32 and y-current phases $i_{jy}$ driven into y-traces 34). FIGS. 20A and 20B respectively depict the generation of y-current phases $i_{jy}$ and x-current phases $i_{kx}$ which may be used to achieve controllable 360° rotation about a stator-z oriented axis according to a particular embodiment. The particular embodiment of FIGS. 20A and 20B is a three-phase embodiment where the number of effective phases $n_p=m_p=3$. The top portion of FIG. 20A shows the generation of three y-current phases $i_{0y}, i_{1y}, i_{2y}$ according to:

$$i_{0y} = A_y \sin\left(\frac{x_r - d_r}{\lambda_2} 2\pi + \varphi_y\right) \tag{7a}$$

$$i_{1y} = A_y \sin\left(\frac{x_r - d_r}{\lambda_2} 2\pi - \frac{\pi}{3} + \varphi_y\right) \quad (7b)$$

$$i_{2y} = A_y \sin\left(\frac{x_r - d_r}{\lambda_2} 2\pi - \frac{2\pi}{3} + \varphi_y\right) \quad (7c)$$

where $A_y$ is an amplitude (assumed, in the illustrated embodiment, to be the same for all of the y-current phases $i_{0y}, i_{1y}, i_{2y}$), $\lambda_2 = \lambda_x$ is a spatial period in the stator-x direction, and $\varphi_y$ is a phase offset. It can be seen from equations (7), that the magnetic field generated by the y-current phases $i_{jy}$ travel in the stator-x direction with $x_r - d_r$ in the stator-x direction, where $x_r$ is a reference stator-x trajectory and $d_r$ is a differential reference quantity used to cause rotation, as explained in more detail below. As discussed above, when a current, a current trace and/or its associated magnetic field is described as traveling with a reference variable (e.g. with a reference trajectory variable $x_r$, $y_r$, $d_r$), it should be understood to mean that such current, current trace and/or magnetic field varies spatially as the reference variables vary over time (e.g. the magnetic field generated by the y-current phases travel in the stator-x direction with $x_r - d_r$ as reference trajectory variables $x_r$, $d_r$ vary over time). It can be seen from equations (7) that in such embodiments, the phase shift between adjacent y-current phases $i_{0y}, i_{1y}, i_{2y}$ is $$\frac{\pi}{3}$$

(in electrical angle radians) or $$\frac{\lambda_2}{6}$$

(in spatial phase). Phase-adjacent ones of y-current phases $i_{0y}, i_{1y}, i_{2y}$ can be driven into spatially adjacent y-traces 34, such the phase difference between the y-current phases $i_{0y}, i_{1y}, i_{2y}$ driven into spatially adjacent y-traces 34 is $$\frac{\pi}{3}$$

(in electrical angle radians) or $$\frac{\lambda_2}{6}$$

(in spatial phase). In such embodiments, y-traces 34 in stator 30 can be designed to have a stator-y coil trace pitch $$P_{cy} = \frac{\lambda_2}{6} = \frac{\lambda_x}{6}.$$

This technique for generating y-current phases $i_{jy}$ can be generalized for a different number $m_p$ of effective y-current phases, where $m_p$ is an integer greater than 1. A set of multi-phase sinusoidal y-current phases $i_{jy}$ to produce a magnetic field wave that travels with $x_r - d_r$ in the stator-x direction is given by:

$$i_{jy} = A_y \sin\left(\frac{x_r - d_r}{\lambda_2} 2\pi - j\frac{\pi}{m_p} + \varphi_y\right) \quad (8a)$$

where: j is an integer phase index which varies from 0 to $m_p - 1$, $m_p$ is the number of effective phases and the other variables in equation (8a) have the same meanings as those of equation (7). It can be seen from equation (8a) that in such embodiments, the phase shift between adjacent current phases $i_{jy}$ takes the general form $$\frac{\lambda_2}{2m_p} = \frac{\lambda_x}{2m_p}$$

(in spatial phase) or $$\frac{\pi}{m_p}$$

(in electrical angle radians). Phase-adjacent ones of current phases $i_{jy}$ can be driven into spatially adjacent y-traces 34, such the phase difference between the current phases driven into spatially adjacent y-traces 34 is $$\frac{\lambda_2}{2m_p} = \frac{\lambda_x}{2m_p}$$

(in spatial phase) or $$\frac{\pi}{m_p}$$

(in electrical angle radians). In such embodiments, y-traces 34 in stator 30 can be designed to have a stator-y coil trace pitch $$P_{cy} = \frac{\lambda_2}{2m_p} = \frac{\lambda_x}{2m_p}.$$

Furthermore, the current phases $i_{jy}$ of equation (8a) can be generalized to comprise any periodic function $G(x_r - d_r)$ (rather than being merely sinusoidal) that is periodic with $x_r - d_r$ with a stator-x direction period $\lambda_2 = \lambda_x$, where adjacent current phases $i_{jy}$ in spatially adjacent y-traces are out of phase with one another by a spatial phase difference $$\frac{\lambda_2}{2m_p} = \frac{\lambda_x}{2m_p}.$$

The bottom portion of FIG. 20A shows the generation of three y-current phases $i_{0y}, i_{1y}, i_{2y}$ which vary with $x_r + d_r$ in the stator-x direction according to:

$$i_{0y} = A_y \sin\left(\frac{x_r + d_r}{\lambda_2} 2\pi + \varphi_y\right) \quad (9a)$$

-continued $$i_{1y} = A_y \sin\left(\frac{x_r + d_r}{\lambda_2} 2\pi - \frac{\pi}{3} + \varphi_y\right) \quad (9b)$$

$$i_{2y} = A_y \sin\left(\frac{x_r + d_r}{\lambda_2} 2\pi - \frac{2\pi}{3} + \varphi_y\right) \quad (9c)$$

where the parameters of equations (9) have the same meanings as those of equations (7). However, it can be seen from equations (9) that the currents by the bottom portion of FIG. 20A generate magnetic fields which travel with $x_r + d_r$ in the stator-x direction. For the general case with $m_p$ effective y-current phases, equation (9) may be generalized to:

$$i_{jy} = A_y \sin\left(\frac{x_r + d_r}{\lambda_2} 2\pi - j\frac{\pi}{m_p} + \varphi_y\right) \quad (10a)$$

where the parameters of equation (10) have the same meanings as those of equation (8a). However, it can be seen from equations (10) that the currents generated by the bottom portion of FIG. 20A generate magnetic fields which travel with $x_r + d_r$ in the stator-x direction. It can be seen from equation (10a) that in such embodiments, the phase shift between adjacent current phases $i_{jy}$ takes the general form $$\frac{\lambda_2}{2m_p} = \frac{\lambda_x}{2m_p}$$

(in spatial phase) or $$\frac{\pi}{m_p}$$

(in electrical angle radians). Phase-adjacent ones of current phases $i_{jy}$ can be driven into spatially adjacent y-traces 34, such that the phase difference between the current phases driven into spatially adjacent y-traces 34 is $$\frac{\lambda_2}{2m_p} = \frac{\lambda_x}{2m_p}$$

(in spatial phase) or $$\frac{\pi}{m_p}$$

(in electrical angle radians). In such embodiments, y-traces 34 in stator 30 can be designed to have a stator-y coil trace pitch $$P_{cy} = \frac{\lambda_2}{2m_p} = \frac{\lambda_x}{2m_p}.$$

Furthermore, the current phases $i_{jy}$ of equation (10a) can be generalized to comprise any periodic function $G(x_r + d_r)$ (rather than being merely sinusoidal) that is periodic with $x_r + d_r$ with a stator-x direction period $\lambda_2 = \lambda_x$, where adjacent current phases $i_{jy}$ in spatially adjacent y-traces are out of phase with one another by a spatial phase difference $$\frac{\lambda_2}{2m_p} = \frac{\lambda_x}{2m_p}.$$

While current phases $i_{jy}$ may generally have any waveform that is a spatially periodic function of $x_r - d_r$ (in the top portion of FIG. 20A) or $x_r + d_r$ (in the bottom portion of FIG. 20A), sinusoidal waveforms are currently preferred due to many advantageous features such as energy efficiency, compact trace layout, simplification of power electronics design, smooth motion and fine motion resolution. Other types of trajectory-dependent periodic waveform can also be used to drive multi-phase coils traces, such as square wave, triangle waves, trapezoidal waves and/or the like. Y-current phases $i_{jy}$ that generate magnetic fields that travel with $x_r + d_r$ may be referred to herein collectively as second positive rotational currents and individually as second positive rotational current phases. Conversely, y-current phases $i_{jy}$ that generate magnetic fields that travel with $x_r - d_r$ may be referred to herein collectively as second negative rotational currents and individually as second negative rotational current phases.

In moveable stage rotating process, when $x_r$ is fixed or no translation motion in the stator-x direction is commanded, the two types of y-current phases $i_{jy}$ and corresponding magnetic field traveling waves generated by the top and bottom portions of FIG. 20A will travel in two opposite directions along the stator-x axis. For example, when $d_r$ is ramping up positively (increase with time at a positive rate), the y-current phases $i_{jy}$ and corresponding magnetic field traveling waves generated by top part of FIG. 20A will travel in the negative stator-x direction and the y-current phases $i_{jy}$ and corresponding magnetic field traveling waves generated by the bottom part of FIG. 20A will travel in the positive stator-x direction.

In an analogous manner, the top portion of FIG. 20B shows the generation of three x-current phases $i_{0x}$, $i_{1x}$, $i_{2x}$ which vary with $y_r - d_r$ in the stator-y direction which, for the general case with $n_p$ effective x-current phases, may be generalized to:

$$i_{kx} = A_x \sin\left(\frac{y_r - d_r}{\lambda_1} 2\pi - k\frac{\pi}{n_p} + \varphi_x\right) \quad (11)$$

where $A_x$ is an amplitude (assumed, in the illustrated embodiment, to be the same for all of the x-current phases $i_{jy}$), $\lambda_1 = \lambda_y$ is a spatial period in the stator-y direction, $\varphi_x$ is a phase offset, k is an integer phase index which varies from 0 to $n_p - 1$, $n_p$ is the number of effective phases, $y_r$ is a reference stator-y trajectory and $d_r$ is a differential reference quantity used to cause rotation, as explained in more detail below. As was the case with the y-current phases discussed above, the current phases $i_{kx}$ of equation (11) can be generalized to comprise any periodic function $F(y_r - d_r)$ (rather than being merely sinusoidal) that is periodic with $y_r - d_r$ with a stator-y direction period $\lambda_1 = \lambda_y$, where adjacent current phases $i_{kx}$ in spatially adjacent x-traces are out of phase with one another by a spatial phase difference $$\frac{\lambda_1}{2n_p} = \frac{\lambda_y}{2n_p}.$$

The bottom portion of FIG. 20B shows the generation of three x-current phases $i_{0x}$, $i_{1x}$, $i_{2x}$ which vary with $y_r+d_r$ in the stator-y direction which, for the general case with $n_p$ effective x-current phases, may be generalized to:

$$i_{kx} = A_x \sin\left(\frac{y_r + d_r}{\lambda_1} 2\pi - k\frac{\pi}{n_p} + \varphi_x\right) \quad (12)$$

where the parameters of equation (12) have the same meanings as those of equation (11). As was the case with the y-current phases discussed above, the current phases $i_{kx}$ of equation (12) can be generalized to comprise any periodic function $F(y_r+d_r)$ (rather than being merely sinusoidal) that is periodic with $y_r+d_r$ with a stator-y direction period $\lambda_1=\lambda_y$, where adjacent current phases $i_{kx}$ in spatially adjacent x-traces are out of phase with one another by a spatial phase difference $$\frac{\lambda_1}{2n_p} = \frac{\lambda_y}{2n_p}.$$

It can De seen from equations (11) and (12) that in such embodiments, the phase shift between adjacent x-current phases $i_{kx}$ takes the general form $$\frac{\lambda_1}{2n_p} = \frac{\lambda_y}{2n_p}$$

(in spatial phase) or $$\frac{\pi}{n_p}$$

(in electrical angle radians). Phase-adjacent ones of x-current phases $i_{kx}$ can be driven into spatially adjacent x-traces 32, such the phase difference between the current phases driven into spatially adjacent x-traces 32 is $$\frac{\lambda_1}{2n_p} = \frac{\lambda_y}{2n_p}$$

(spatial phase) or $$\frac{\pi}{n_p}$$

(in radians). In such embodiments, x-traces 32 in stator 30 can be designed to have a stator-x coil trace pitch $$P_{cx} = \frac{\lambda_1}{2n_p} = \frac{\lambda_y}{2n_p}.$$

While current phases $i_{kx}$ may generally have any waveform that is a spatially periodic function of $y_r-d_r$ (in the top portion of FIG. 20B) or $y_r+d_r$ (in the bottom portion of FIG. 20B), sinusoidal waveforms are currently preferred due to many advantageous features such as energy efficiency, compact trace layout, simplification of power electronics design, smooth motion and fine motion resolution. Other types of trajectory-dependent periodic waveform can also be used to drive multi-phase coils traces, such as square wave, triangle waves, trapezoidal waves and/or the like. X-current phases $i_{kx}$ that generate magnetic fields that travel with $y_r+d_r$ may be referred to herein collectively as first positive rotational currents and individually as first positive rotational current phases. Conversely, x-current phases $i_{kx}$ that generate magnetic fields that travel with $y_r-d_r$ may be referred to herein collectively as first negative rotational currents and individually as first negative rotational current phases. Furthermore, it should be appreciated that the differential variable $d_r$ described above in connection with equation (7)-(12) and in the description of the embodiments in FIGS. 20A and 20B may be the same variable; in general, however, the differential variable $d_r$ used in the embodiment of FIG. 20A (equations (7)-(10)) may be different than, and independent from, the differential variable $d_r$ used in the embodiment of FIG. 20B (equations (11)-(12)).

In moveable stage rotating process, when $y_r$ is fixed or no translation motion in the stator-y direction is commanded, the two types of x-current phases ikx and corresponding magnetic field traveling waves generated by the top and bottom portions of FIG. 20B will move in two opposite directions along the stator-y axis. For example, when $d_r$ is ramping up positively (increasing with time at a positive rate), the x-current phases $i_{kx}$ and corresponding magnetic field traveling waves generated by top part of FIG. 20B will travel in the negative stator-y direction and the x-current phases $i_{kx}$ and corresponding magnetic field traveling waves generated by the bottom part of FIG. 20B will travel in the positive stator-y direction.

Figure 21A:
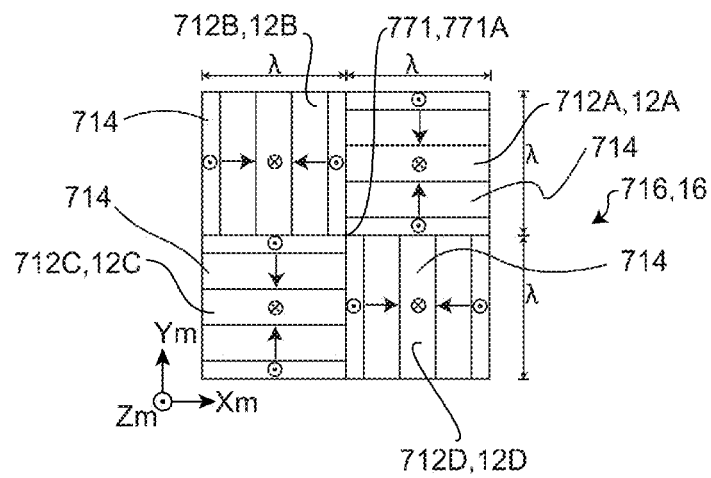
FIG. 21A shows one non-limiting example of magnet array assembly which may be used for controllable 360° rotation according to a particular embodiment.

FIG. 21A shows one non-limiting example of magnet array assembly 716 which may be used for controllable 360° rotation according to a particular embodiment. Magnet array assembly 716 comprises four 1D magnet arrays 712A-712D. Magnet arrays 712B, 712D are linearly elongated in stage-y direction, and magnet array 712A, 712C are linearly elongated in stage-x direction. Each magnet array 712 comprises a plurality of linearly elongated magnetization segments 714 with corresponding magnetization directions generally orthogonal to its elongation direction. Each 1D magnet array has a stage-x dimension of 1λ and a stage-y dimension of 1λ, where it is assumed (for each of explanation and without loss of generality) that $\lambda_1=\lambda_y=\lambda_2=\lambda_x=\lambda$. Generally, any 1D magnet array assembly 16 described herein can be used for the controllable 360° rotation operation, by applying the operational methods and control algorithms described herein with appropriate modification where desired. Magnet array assemblies having the 90° rotational symmetric property (about a z-oriented axis (e.g. axis 771 at the center stage-x-stage-y center of magnet array assembly 16 and/or moveable stage 10)) are currently preferred.

Figure 21B:
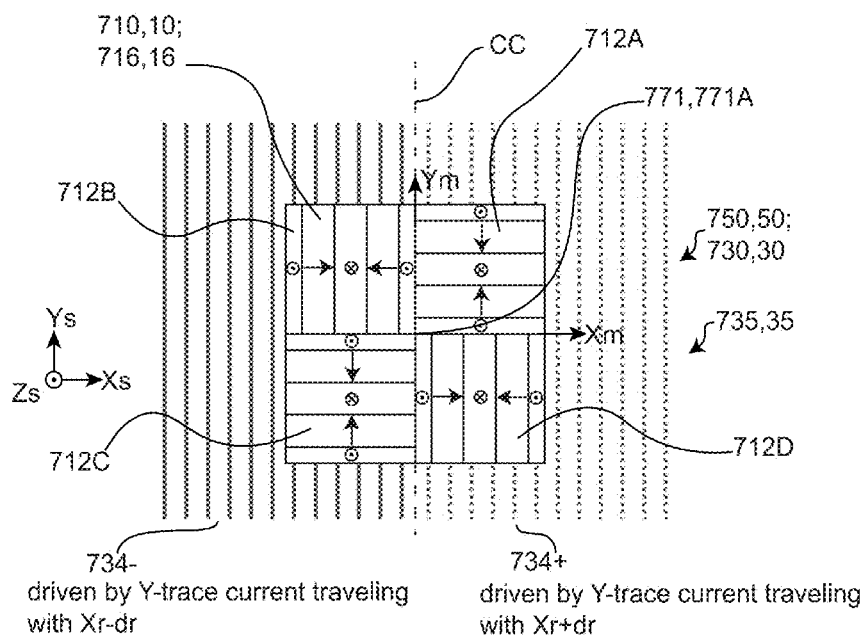
FIGS. 21B-21K illustrate possible coil traces and corresponding current phases $i_{kx}$, $i_{jy}$ driven therein to operate the FIG. 21A magnet array assembly to achieve controllable rotation.
Figure 21C:
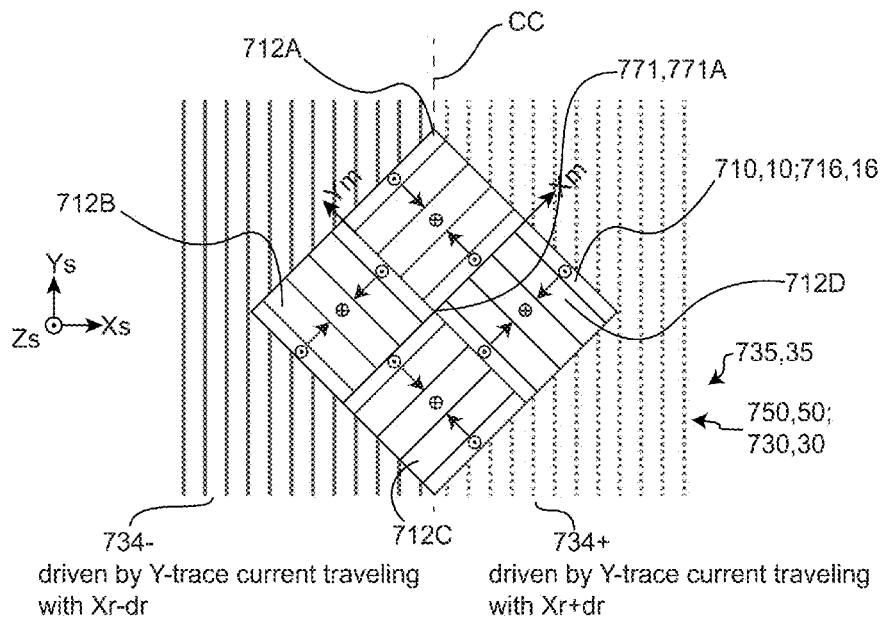

FIGS. 21B-21K illustrate possible coil traces 732, 734 and corresponding current phases $i_{kx}$, $i_{jy}$ driven therein to operate the FIG. 21A magnet array assembly 716 to achieve controllable rotation. FIG. 21B shows a top view of a displacement device 750 including a moveable stage 710 comprising the FIG. 21A magnet array assembly 716 which is moveable relative to a stator 730 comprising coil assembly 735. A stator-z oriented axis 771 extends through the stage-x-stage-y center 771A of moveable stage 710 and/or magnet array assembly 716 and coincides with a notional dividing plane CC, which extends in the stator-y and stator-z directions. Inside stator coil assembly 735, there are first and second pluralities (i.e. first and second groups) of y-traces 734 that are elongated in the stator-y direction: traces 734− (shown in solid lines) and traces 734+ (shown in broken lines), where traces 734− represent the y-traces located on the negative stator-x side of a boundary that coincides with dividing plane CC and traces 734+ represent the y-traces located on the positive stator-x side of the boundary that coincides with dividing plane CC. First and second pluralities of coil traces 734+, 734− may be located on the same or different layers (e.g. at the same or different stator-z locations). Coil traces 734+ are driven with y-current phases $i_{jy}$ (and generate corresponding magnetic fields) which travel with $x_r+d_r$ (i.e. coil traces 734+ are driven with second positive rotational current phases) and coil traces 734− are driven with y-current phases $i_{jy}$ (and generate corresponding magnetic fields) which travel with $x_r+d_r$ (i.e. coil traces 734− are driven with second negative rotational current phases). In practice, the first and second pluralities of y-current phases $i_{jy}$ can be driven into y-traces 734 of two excitation regions 43 with dividing plane CC as a boundary of two excitation regions 43. Additionally or alternatively, first and second pluralities of y-current phases $i_{jy}$ can be independently driven into two pluralities of y-traces 734 inside one excitation region 43. During the rotation process, $x_r$ may be fixed or there may be no commanded translation motion along the stator-x axis. The two types of traveling magnetic field waves (i.e. those generated by the current phases driven in traces 734− and those generated by the current phases driven in traces 734+) will move in opposite directions. When $d_r$ is positively ramping up (i.e. increasing its value with time), the magnetic field traveling wave generated by current phases driven in coil traces 734+ will travel in the positive stator-x direction and this wave will pull 1D magnet array 712D in the positive stator-x direction; at the same time, the magnetic field traveling wave generated by current phases driven in coil traces 734− will travel in the negative stator-x direction and this wave will pull 1D magnet array 712B in the negative stator-x direction. Consequently, magnet array assembly 716 will rotate around its central z-oriented axis 771 in a counter-clockwise direction as shown in FIG. 21C. For example, when $d_r$ increases by X, magnet array assembly 716 will rotate around central stator-z oriented axis 771 by 90°. Due to its 90° rotational symmetry, magnet array assembly 716 is in the same magnetic configuration after a rotation of 90°, and thus a further increase of λ in $d_r$ will result in a further 90° rotation around central stator-z oriented axis 771. By repeating this sequence, any controllable amount of rotation can be achieved. If $d_r$ is negatively ramping (i.e. decreasing its value with time), magnet array assembly 816 will rotate around central stator-z oriented axis 771 in a clockwise direction.

Figure 21D:
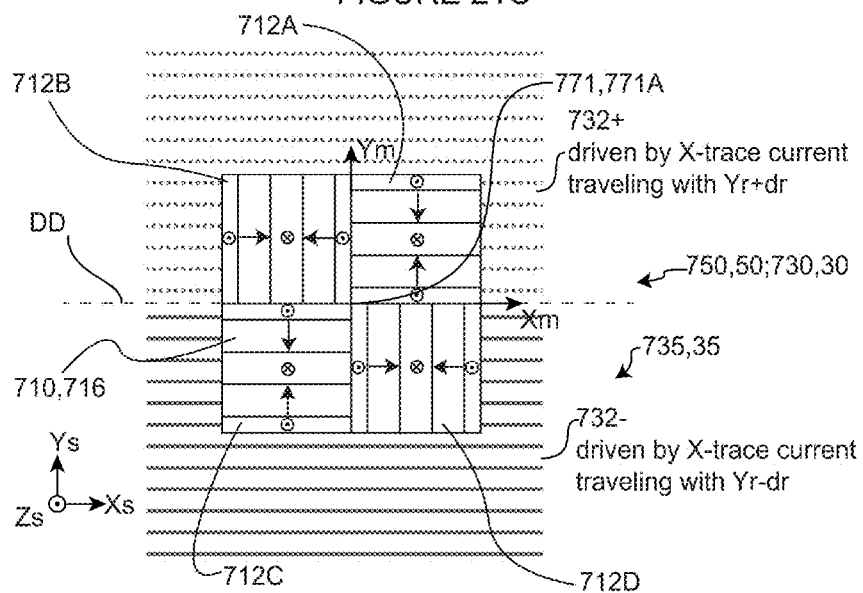

FIG. 21D illustrates a method of controllably rotating magnet array assembly 716 and its corresponding moveable stage 710 using x-current phases $i_{kx}$ driven into first and second pluralities (i.e. first and second groups) of x-traces 732+, 732−. First and second pluralities of x-traces 732+, 732− may be located on the same or different layers (e.g. at the same or different stator-z locations). The FIG. 21D illustration shows a notional dividing plane DD which extends in the stator-x and stator-z directions and coincides with the stator-z oriented axis 771 at the stage-x-stage-y center 771A of magnet array assembly 716 and/or moveable stage 710). Inside stator coil assembly 735, there are first plurality 732− and second plurality 732+ of x-traces 732 that are elongated in the stator-x direction, where traces 732− represent the x-traces located on the negative stator-y side of a boundary that coincides with dividing plane DD and traces 732+ represent the x-traces located on the positive stator-y side of the boundary that coincides with dividing plane DD. Coil traces 732+ are driven with x-current phases $i_{kx}$ (and generate corresponding magnetic fields) which travel with $y_r+d_r$ (i.e. coil traces 732+ are driven with first positive rotational current phases) and coil traces 732− are driven with x-current phases $i_{kx}$ (and generate corresponding magnetic fields) which travel with $y_r−d_r$ (i.e. coil traces 732− are driven with first negative rotational current phases). In practice, first and second pluralities of x-current phases $i_{kx}$ can be driven into x-traces 732 of two excitation regions 43 with dividing plane DD as a boundary of two excitation regions 43. Additionally or alternatively, first and second pluralities of x-current phases $i_{kx}$ can be independently driven into two pluralities (i.e. groups) of x-traces 732 inside one excitation region 43. During the rotation process, $y_r$ may be fixed or there may be no commanded translation motion along the stator-y axis. The two types of traveling magnetic field waves (i.e. those generated by the current phases driven in traces 732− and those generated by the current phases driven in traces 732+) will move in opposite directions. When $d_r$ is positively ramping up (i.e. increasing its value with time), the magnetic field traveling wave generated by current phases driven in coil traces 732+ will travel in the positive stator-y direction and this wave will pull 1D magnet array 712A in the positive stator-y direction; at the same time, the magnetic field traveling wave generated by current phases driven in coil traces 732− will travel in the negative stator-y direction and this wave will pull 1D magnet array 712C in the negative stator-y direction. Consequently, magnet array assembly 716 will rotate around its central z-oriented axis 771 in a counter-clockwise direction. For example, when $d_r$ increases by λ, magnet array assembly 716 will rotate around central stator-z oriented axis 771 by 90°. Due to its 90° rotational symmetry, magnet array assembly 716 is in the same magnetic configuration after a rotation of 90°, and thus a further increase of λ in $d_r$ will result in a further 90° rotation around central stator-z oriented axis 771. By repeating this sequence, any controllable amount of rotation can be achieved. If $d_r$ is negatively ramping (i.e. decreasing its value with time), magnet array assembly 716 will rotate around central stator-z oriented axis 771 in a clockwise direction.

Figure 21E:
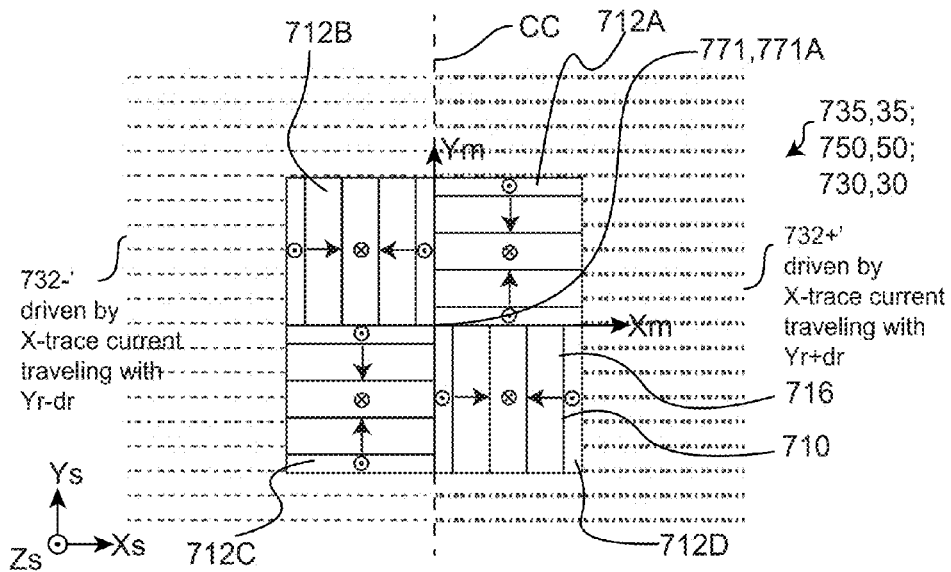

FIG. 21E illustrates a method of controllably rotating magnet array assembly 716 and its corresponding moveable stage 710 using x-current phases $i_{kx}$ driven into first and second pluralities of x-traces 732+', 732−'. First and second pluralities of x-traces 732+', 732−' may be located on the same or different layers (e.g. at the same or different stator-z locations). The FIG. 21E illustration shows a notional dividing plane CC which extends in the stator-y and stator-z directions and coincides with stator-z oriented axis 771 in the stage-x-stage-y center 771A of magnet array 716 and/or moveable stage 710. Inside stator coil assembly 735 of the FIG. 21E embodiment, there are first plurality 732−' and second plurality 732+' of x-traces 732 that are elongated in the stator-x direction, where traces 732−' represent x-traces located on the negative stator-x side of a boundary that coincides with dividing plane CC and traces 732+' represent x-traces located on the positive stator-x side of the boundary that coincides with dividing plane CC. Coil traces 732+' are driven with x-current phases $i_{kx}$ (and generate corresponding magnetic fields) which travel with $y_r+d_r$ (i.e. coil traces 732+' are driven by first positive rotational current phases) and coil traces 732−' are driven with x-current phases $i_{kx}$ (and generate corresponding magnetic fields) which travel with $y_r−d_r$ (i.e. coil traces 732−' are driven by first negative rotational current phases). In practice, first and second pluralities of x-current phases $i_{kx}$ can be independently driven into x-traces 732 of two excitation regions 43 with dividing plane CC as a boundary of two excitation regions 43. Additionally or alternatively, first and second pluralities of x-current phases $i_{kx}$ can be independently driven into two pluralities (i.e. groups) of x-traces 732 inside one excitation region 43. During the rotation process, $y_r$ is not necessarily fixed in which case the techniques illustrated in FIG. 21E permit moveable stage 710 to achieve simultaneous stator-y oriented translation and rotation about central stator-z oriented axis 771. The two types of traveling magnetic field waves (i.e. those generated by the current phases driven in traces 732–' and those generated by the current phases driven in traces 732+') will move with different characteristics: one moves ahead of $y_r$ by a distance $d_r$ and the other moves behind $y_r$ by a distance $d_r$. When $d_r$ is positively ramping up (i.e. increasing its value with time), the magnetic field traveling wave generated by current phases driven in coil traces 732+' will pull 1D magnet array 712A in the positive stator-y direction relative to stage-x-stage-y center 771A of magnet array assembly 716 and/or moveable stage 710; at the same time, the magnetic field traveling wave generated by current phases driven in coil traces 732–' will pull 1D magnet array 712C in the negative stator-y direction relative to stage-x-stage-y center 771A of magnet arrays 716 and/or moveable stage 710. Consequently, magnet array assembly 716 will rotate around its central z-oriented axis 771 in a counter-clockwise direction. For example, when $d_r$ increases by $\lambda$, magnet array assembly 716 will rotate around central stator-z oriented axis 771 by 90°. Due to its 90° rotational symmetry, magnet array assembly 716 is in the same magnetic configuration after a rotation of 90°, and thus a further increase of $\lambda$ in $d_r$ will result in a further 90° rotation around stator-z oriented axis 771. By repeating this sequence, any controllable amount of rotation can be achieved. If $d_r$ is negatively ramping (i.e. decreasing its value with time), magnet array assembly 716 will rotate around central stator-z oriented axis 771 in a clockwise direction.

Figure 21F:
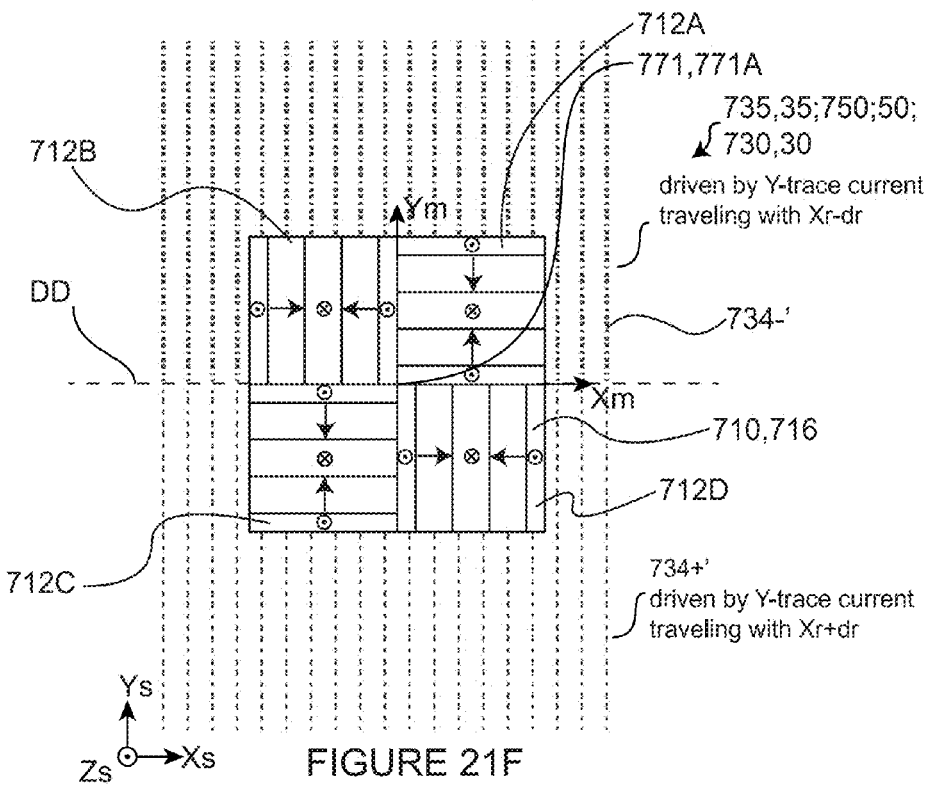

FIG. 21F illustrates a method of controllably rotating magnet array assembly 716 and its corresponding moveable stage 710 using y-current phases driven into first and second pluralities of y-traces 734+', 734–'. First and second pluralities of y-traces 734+', 734–' may be located on the same or different layers (e.g. at the same or different stator-z locations). The FIG. 21F illustration shows a notional dividing plane DD which extends in the stator-x and stator-z directions and coincides with the stator-z oriented axis 771 in the stage-x-stage-y center 771A of magnet array 716 and/or moveable stage 710. Inside stator coil assembly 735 of the FIG. 21F embodiment, there are first plurality 734–' and second plurality 734+' of y-traces 734 that are elongated in the stator-y direction, where traces 734–' represent y-traces located on the positive stator-y side of a boundary which coincides with dividing plane DD and traces 734+' represent y-traces located on the negative stator-y side of the boundary which coincides with dividing plane DD. Coil traces 734+' are driven with y-current phases $i_{jy}$ (and generate corresponding magnetic fields) which travel with $x_r+d_r$ (i.e. coil traces 734+' are driven by second positive rotational current phases) and coil traces 734–' are driven with y-current phases $i_{jy}$ (and generate corresponding magnetic fields) which travel with $x_r-d_r$ (i.e. coil traces 734–' are driven by second negative rotational current phases). In practice, first and second pluralities of y-current phases $i_{jy}$ can be independently driven into y-traces 734 of two excitation regions 43 with dividing plane DD as a boundary of two excitation regions 43. Additionally or alternatively, first and second pluralities of y-current phases $i_{jy}$ can be independently driven into two pluralities (i.e. groups) of y-traces 734 inside one excitation region 43. During the rotation process, $x_r$ is not necessarily fixed in which case the techniques illustrated in FIG. 21F permit moveable stage 710 to achieve simultaneous stator-x oriented translation and rotation about stator-z oriented axis 771. The two types of traveling magnetic field waves (i.e. those generated by the current phases driven in traces 734–' and those generated by the current phases driven in traces 734+') will move with different characteristics: one moves ahead of $x_r$ by a distance $d_r$ and the other moves behind $x_r$ by a distance $d_r$. When $d_r$ is positively ramping up (i.e. increasing its value with time), the magnetic field traveling wave generated by current phases driven in coil traces 734+' will pull 1D magnet array 712D in the positive stator-x direction relative to the stage-z-stage-y center 771A of magnet array assembly 716 and/or moveable stage 710; at the same time, the magnetic field traveling wave generated by current phases driven in coil traces 734–' will pull 1D magnet array 712B in the negative stator-x direction relative to the stage-x-stage-y center 771A of magnet array assembly 716 and/or moveable stage 710. Consequently, magnet array assembly 716 will rotate around its central z-oriented axis 771 in a counter-clockwise direction. For example, when $d_r$ increases by $\lambda$, magnet array assembly 716 will rotate around the stator-z oriented axis 771 by 90°. Due to its 90° rotational symmetry, magnet array assembly 716 is in the same magnetic configuration after a rotation of 90°, and thus a further increase of $\lambda$ in $d_r$ will result in a further 90° rotation around central stator-z oriented axis 771. By repeating this sequence, any controllable amount of rotation can be achieved. If $d_r$ is negatively ramping (i.e. decreasing its value with time), magnet array assembly 716 will rotate around central stator-z oriented axis 771 in a clockwise direction.

Figure 21G:
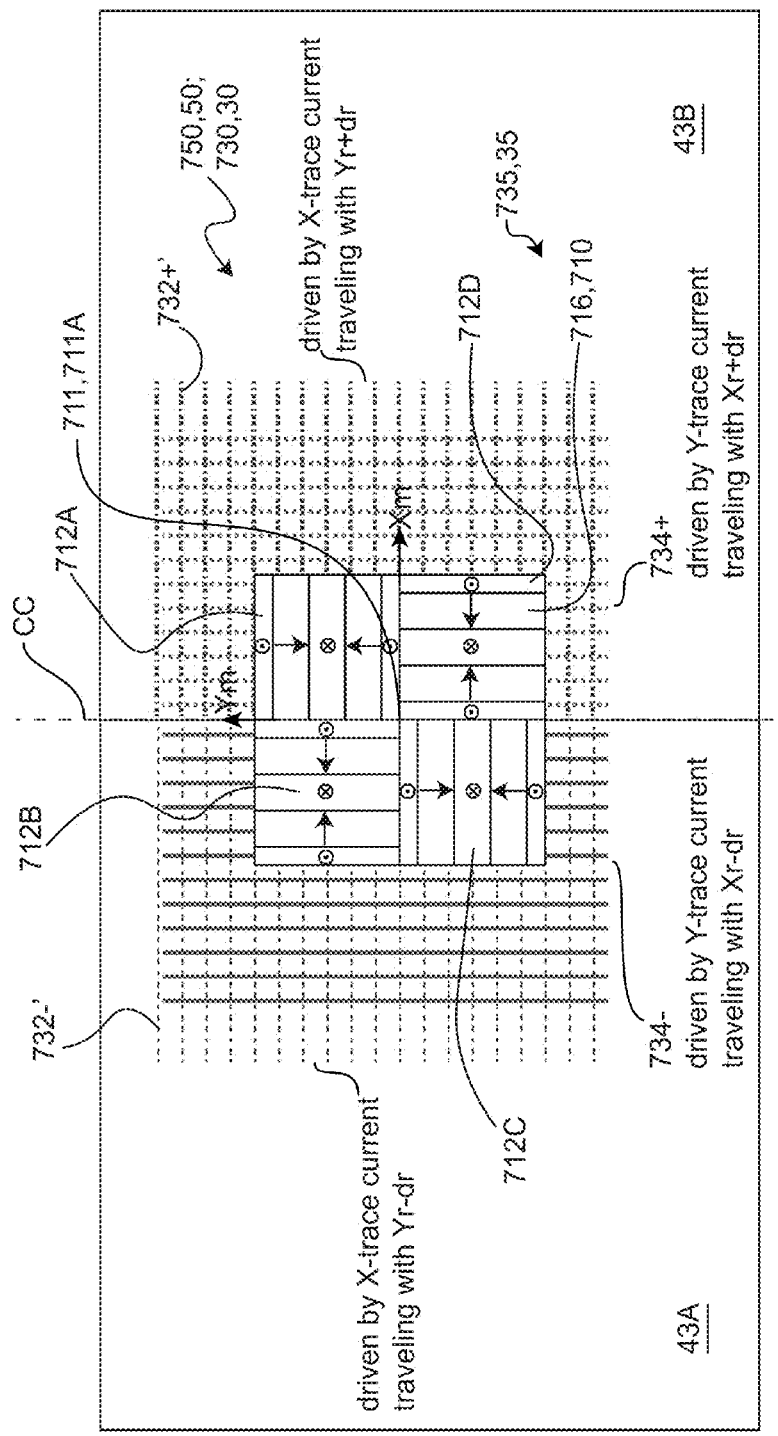

As shown in FIG. 21G, some embodiments comprise combining the techniques shown in FIGS. 21B and 21E by driving x-current phases $i_{kx}$ in traces 732–', 732+' and y-current phases $i_{jy}$ in traces 734–, 734+ to achieve greater torque during rotation. The rotation of magnet array assembly 716 is operated along the plane CC that extends in the stator-y direction and stator-z direction. Boundary plane CC may be at the boundary between a pair of excitation regions 43A, 43B. The FIG. 21G technique allows rotation of moveable stage 710 while the stage-x-stage-y center 771A of magnet array assembly 716 and/or moveable stage 710 translates along CC (i.e. in the stator-y direction).

Figure 21H:
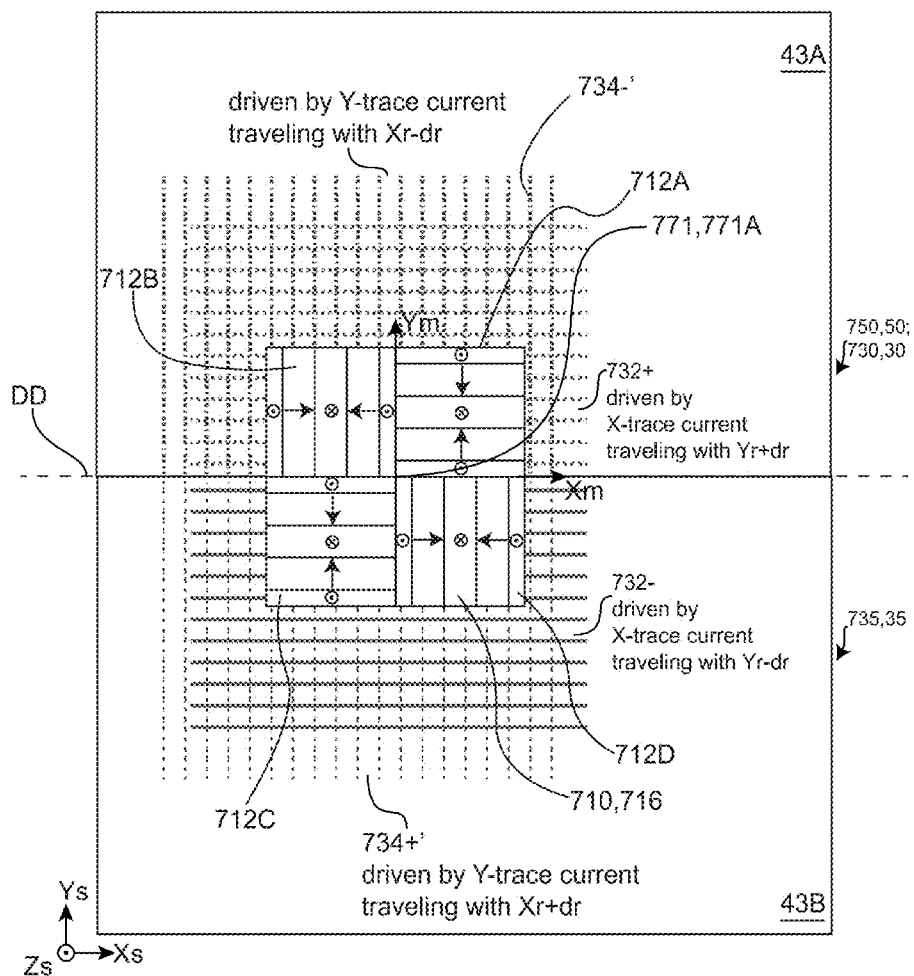

As shown in FIG. 21H, some embodiments comprise combining the techniques shown in FIGS. 21D and 21F by driving y-current phases $i_{jy}$ in traces 734–', 734+' and x-current phases $i_{kx}$ in traces 732–, 732+ to achieve larger torque during rotation. The rotation of magnet array assembly 716 is operated along the plane DD that extends in the stator-x direction and stator-z direction. Boundary plane DD may be the boundary between a pair of excitation regions 43A, 43B. The FIG. 21H technique allows rotation of moveable stage 710 while the stage-x-stage-y center 771A of magnet array assembly 716 and/or moveable stage 710 translates along DD (i.e. in the stator-x direction).

As shown in FIG. 21I, some embodiments comprise combining the techniques shown in FIGS. 21C and 21D by driving y-current phases in traces 734–, 734+ and x-current phases $i_{kx}$ in traces 732–, 732+ to achieve larger torque during rotation.

As shown in FIG. 21J, some embodiments comprise rotating magnet array assembly 716 and its corresponding moveable stage 710 at the intersection point of four independently driven current excitation regions 43A-43D. The FIG. 21J illustration shows notional dividing boundary planes CC, DD which respectively extend in the stator-y/stator-z and stator-x/stator-z directions and the intersection of boundary planes CC and DD coincides with the stator-z oriented axis 771 in the stage-x-stage-y center 771A of magnet array assembly 716 and/or moveable stage 710. Stator-z oriented axis 771 coincides with the intersection of excitation regions 43A-43D—i.e. a corner of each of excitation regions 43A-43D coincides with axis 771. Inside stator coil assembly 735 of the FIG. 21J embodiment, x-traces 732A in excitation region 43A are driven with x-current phases $i_{kx}$ (and generate corresponding magnetic fields) which travel with $y_r+d_r$, y-traces 734B in excitation region 43B are driven with y-current phases $i_{jy}$ (and generate corresponding magnetic fields) which travel with $x_r-d_r$, x-traces 732C in excitation regions 43C are driven with x-current phases $i_{kx}$ (and generate corresponding magnetic fields) which travel with $y_r-d_r$, and y-traces 734D in excitation region 43D are driven with y-current phases $i_{jy}$ (and generate corresponding magnetic fields) which travel with $x_r+d_r$. For the sake of drawing clarity, only partial coil traces are shown in excitation regions 43A-43D of the FIG. 21J illustration, but coil traces 732A, 734B, 732C, 734D may be distributed throughout at least a portion of their respective excitation regions 43A-43D. The current phases driven into the coil traces in each of excitation regions 43A-43D create traveling magnetic field waves that move in different directions. When $d_r$ is positively ramping up (i.e. increasing its value with time): the magnetic field traveling wave generated by current phases driven in x-coil traces 732A (region 43A) will pull 1D magnet array 712A in the positive stator-y direction; the magnetic field traveling wave generated by current phases driven in y-coil traces 734B (region 43B) will pull 1D magnet array 712B in the negative stator-x direction; the magnetic field traveling wave generated by current phases drive in x-coil traces 732C (region 43C) will pull 1D magnet array 712C in the negative stator-y direction; and the magnetic field traveling wave generated by current phases driven in y-coil traces 734D (region 43D) will pull 1D magnet array 712D in the positive stator-x direction. Consequently, magnet array assembly 716 will rotate around its central z-oriented axis 771 in a counter-clockwise direction. For example, when $d_r$ increases by λ, magnet array assembly 716 will rotate around central stator-z oriented axis 771 by 90° counter-clockwise. Due to its 90° rotational symmetry, magnet array assembly 716 is in the same magnetic configuration after a rotation of 90°, and thus a further increase of λ in $d_r$ will result in a further 90° rotation around central stator-z oriented axis 771. By repeating this sequence, any controllable amount of rotation can be achieved. If $d_r$ is negatively ramping (i.e. decreasing its value with time), magnet array assembly 716 will rotate around central stator-z oriented axis 771 in a clockwise direction.

Figure 21:
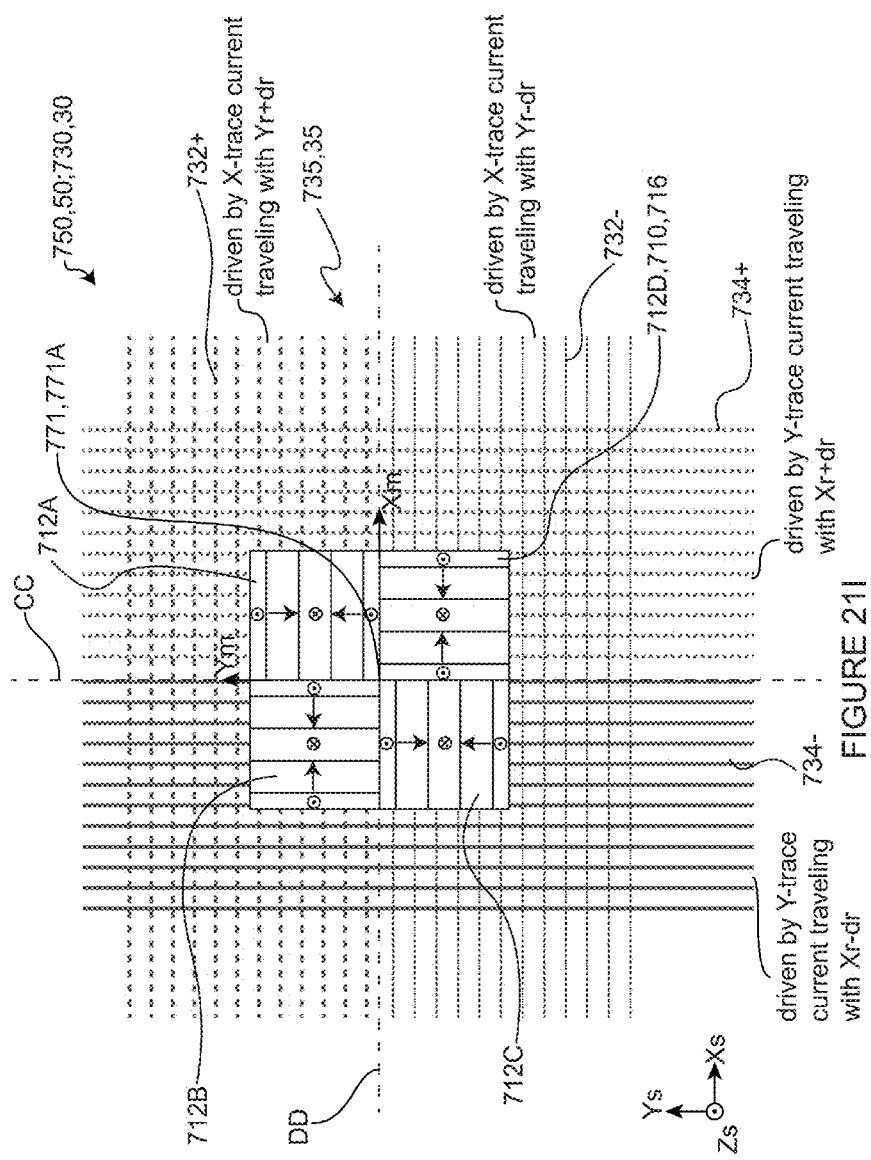
Figure 21K:
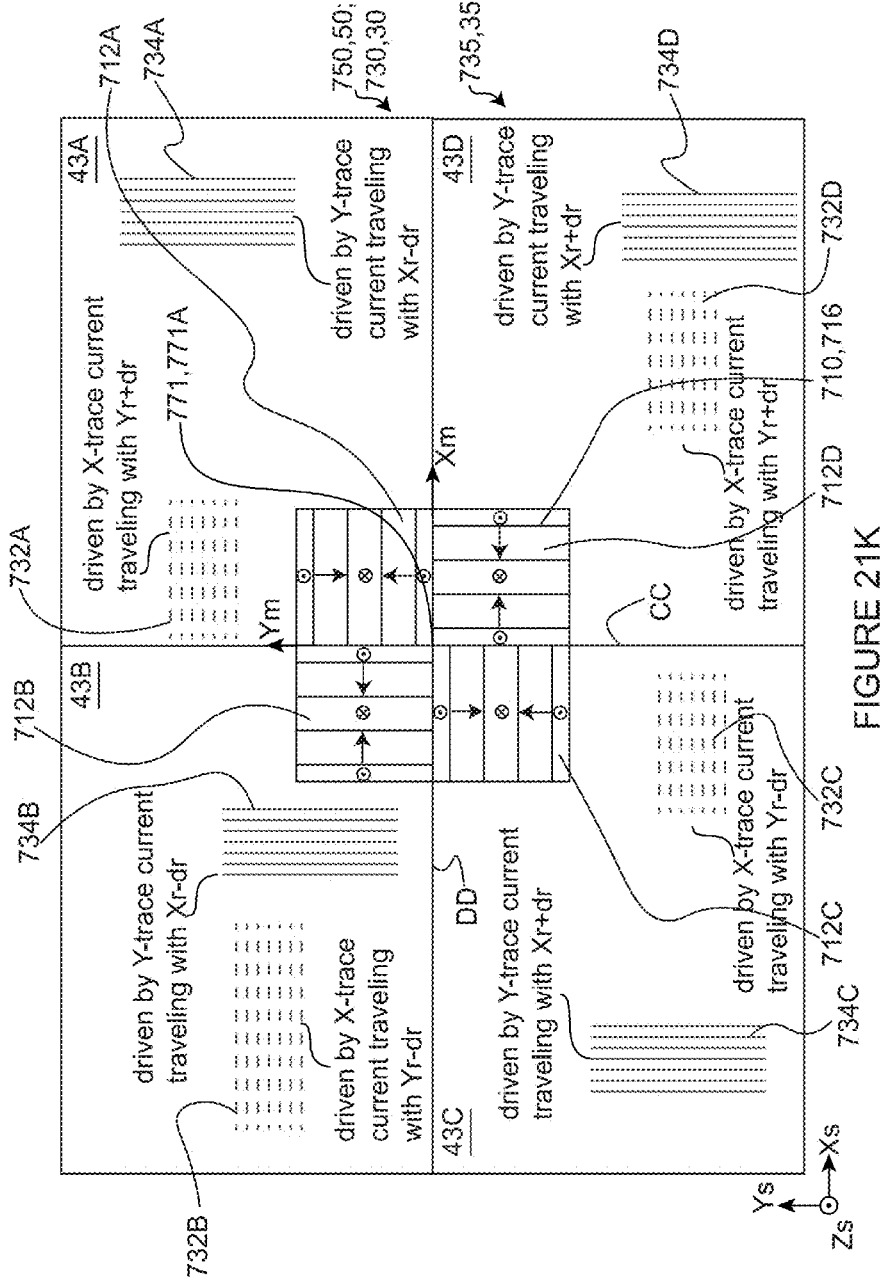

FIG. 21K shows another embodiment which comprises rotating magnet array assembly 716 and its corresponding moveable stage 710 at the intersection point of four independently driven current excitation regions 43A-43D. The FIG. 21K embodiment may be considered to be a combination of techniques shown in FIGS. 21E and 21F. The FIG. 21K illustration shows notional boundary dividing planes CC, DD which respectively extend in the stator-y/stator-z and stator-x/stator-z directions and the intersection of boundary planes CC, DD coincides with the stator-z oriented axis 771 in the stage-x-stage-y center 771A of magnet array assembly 716 and/or moveable stage 710. Stator-z oriented axis 771 is coincident with the intersection of excitation regions 43A-43D—i.e. a corner of each of excitation regions 43A-43D is located at axis 771. Inside stator coil assembly 735 of the FIG. 21K embodiment, x-traces 732A in excitation region 43A are driven with x-current phases $i_{kx}$ (and generate corresponding magnetic fields) which travel with $y_r+d_r$, y-traces 734A in excitation region 43A are driven with y-current phases $i_{jy}$ (and generate corresponding magnetic fields) which travel with $x_r-d_r$, x-traces 732B in excitation region 43B are driven with x-current phases $i_{kx}$ (and generate corresponding magnetic fields) which travel with $y_r=d_r$, y-traces 734B in excitation region 43B are driven with y-current phases $i_{jy}$ (and generate corresponding magnetic fields) which travel with $x_r-d_r$, x-traces 732C in excitation regions 43C are driven with x-current phases $i_{kx}$ (and generate corresponding magnetic fields) which travel with $y_r-d_r$, y-traces 734C in excitation region 43C are driven with y-current phases $i_{jy}$ (and generate corresponding magnetic fields) which travel with $x_r+d_r$, x-traces 732D in excitation regions 43D are driven with x-current phases $i_{kx}$ (and generate corresponding magnetic fields) which travel with $y_r+d_r$, and y-traces 734D in excitation region 43D are driven with y-current phases $i_{jy}$ (and generate corresponding magnetic fields) which travel with $x_r+d_r$. For the sake of drawing clarity, only partial coil traces are shown in excitation regions 43A-43D of the FIG. 21K illustration, but coil traces 732A-732D, 734A-734D may be distributed over corresponding layers throughout at least a portion of their respective excitation regions 43A-43D. The current phases driven into the coil traces in each of excitation regions 43A-43D create traveling magnetic field waves that move in different directions. When $d_r$ is positively ramping up (i.e. increasing its value with time): the magnetic field traveling wave generated by current phases driven in x-coil traces 732A (region 43A) will pull 1D magnet array 712A in the positive stator-y direction; the magnetic field traveling wave generated by current phases driven in y-coil traces 734B (region 43B) will pull 1D magnet array 712B in the negative stator-x direction; the magnetic field traveling wave generated by current phases drive in x-coil traces 732C (region 43C) will pull 1D magnet array 712C in the negative stator-y direction; the magnetic field traveling wave generated by current phases driven in y-coil traces 734D (region 43D) will pull 1D magnet array 712D in the positive stator-x direction.

Initially, when stage 710 is in the configuration shown in FIG. 21K, the y-current phases in traces 734A (region 43A), the x-current phases in traces 732B (region 43B), the y-current phases in traces 734C (region 43C) and the x-current phases in traces 732D (region 43D) will have minimal effect on stage 710, as their trace elongation directions are orthogonal to the elongation directions of the magnetization segments in their corresponding magnet arrays 712A, 712B, 712C, 712D. However, as stage 710 starts to rotate in the counterclockwise direction (with $d_r$ ramping upwardly): the y-current phases in traces 734A (region 43A) will start to pull magnet array 712A in the negative stator-x direction; the x-current phases in traces 732B (region 43B) will start to pull magnet array 712B in the negative stator-y direction; the y-current phases in traces 734C (region 43C) will start to pull magnet array 712C in the positive stator-x direction; and the x-current phases in traces 732D (region 43D) will start to pull magnet array 712D in the positive stator-y direction. This will further help to rotate stage 710 about axis 771 in the counter-clockwise direction (in the FIG. 21K view).

Consequently, magnet array assembly 716 will rotate counter-clockwise about its central z-oriented axis 771 in a counter-clockwise direction. For example, when $d_r$ increases by λ, magnet array assembly 716 will rotate around central stator-z oriented axis 771 by 90°. Due to its 90° rotational symmetry, magnet array assembly 716 is in the same magnetic configuration after a rotation of 90°, and thus a further increase of λ in $d_r$ will result in a further 90° rotation around stator-z oriented axis 771. By repeating this sequence, any controllable amount of rotation can be achieved. If $d_r$ is negatively ramping (i.e. decreasing its value with time), magnet array assembly 716 will rotate around central stator-z oriented axis 771 in a clockwise direction.

Figure 22A:
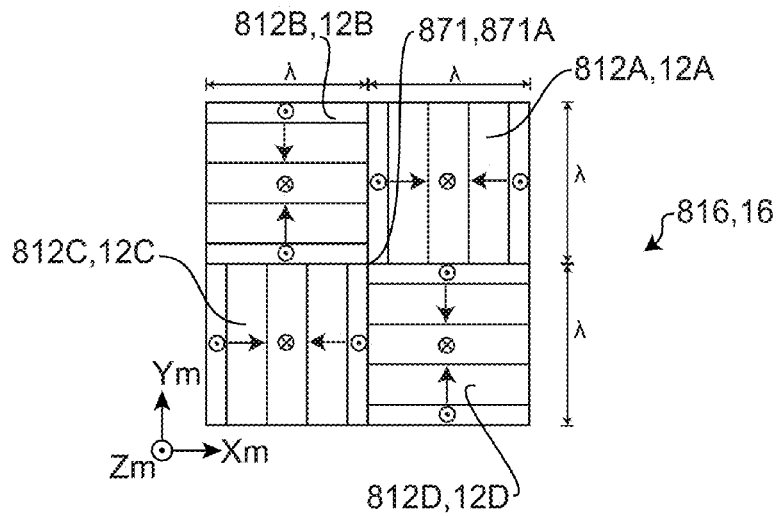
FIG. 22A shows one non-limiting example of magnet array assembly which may be used for controllable 360° rotation according to a particular embodiment.

FIG. 22A shows another non-limiting example of magnet array assembly 816 which may be used for controllable 360° rotation according to a particular embodiment. Comparing FIG. 22A to FIG. 21A, it can be seen that magnet array assembly 816 of FIG. 22A is similar to magnet array 716 of FIG. 21A, except that the relative orientation of magnet arrays 812A-812D in magnet array 816 is different than that of magnet arrays 712A-712D in magnet arrays 716. In particular, magnet array assembly 716 (FIG. 21A) is a right-handed magnet array assembly and magnet array assembly 816 (FIG. 22A) is a left-handed magnet array assembly (see descriptions of left-handed and right handed magnet array assemblies described above in connection with FIGS. 5A and 5B). Like magnet arrays 712A-712D, each magnet array 812A-812D has a stage-x dimension of 1λ and a stage-y dimension of 1λ, where it is assumed (for each of explanation and without loss of generality) that $\lambda_1=\lambda_y=\lambda_2=\lambda_x=\lambda$. Generally, magnet array assembly 816 of FIG. 22A can be controllably rotated by appropriate modification of the techniques described in FIGS. 20A, 20B and 21B-21J. Such techniques will be appreciated by those skilled in the art having regard to the teachings of this disclosure. A number of non-limiting examples of such techniques are shown in FIGS. 22B-22F.

Figure 22B:
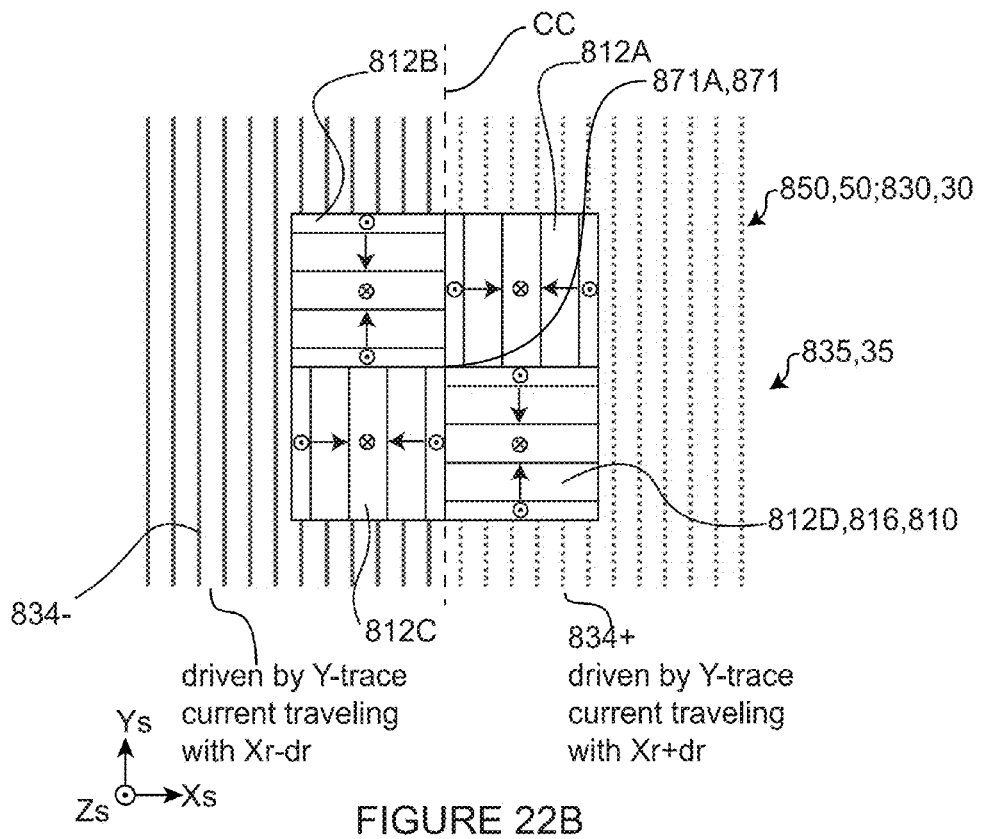
FIGS. 22B-22F illustrate possible coil traces and corresponding current phases $i_{kx}$, $i_{jy}$ driven therein to operate the FIG. 22A magnet array assembly to achieve controllable rotation.

As illustrated in FIG. 22B, a displacement device 850 having a moveable stage 810 comprising the FIG. 22A magnet array assembly 816 can be rotated about z-oriented axis 871 located at the stage-x/stage-y center 871 of magnet array 816. In a manner analogous to FIG. 21B described above, rotating magnet array 816 comprises driving y-current phases $i_{jy}$ into y-traces 834+ and into y-traces 834−. However, due to the left-handed pattern of magnet array assembly 816 (as compared to the right-handed pattern of magnet array 716), the same y-current phases $i_{jy}$ driven into the same y-traces (and the corresponding same magnetic field traveling waves) will result in rotation of magnet array assembly 816 (and its moveable stage 810) in opposite rotational directions than magnet array assembly 716 (and its moveable stage 710).

Figure 22C:
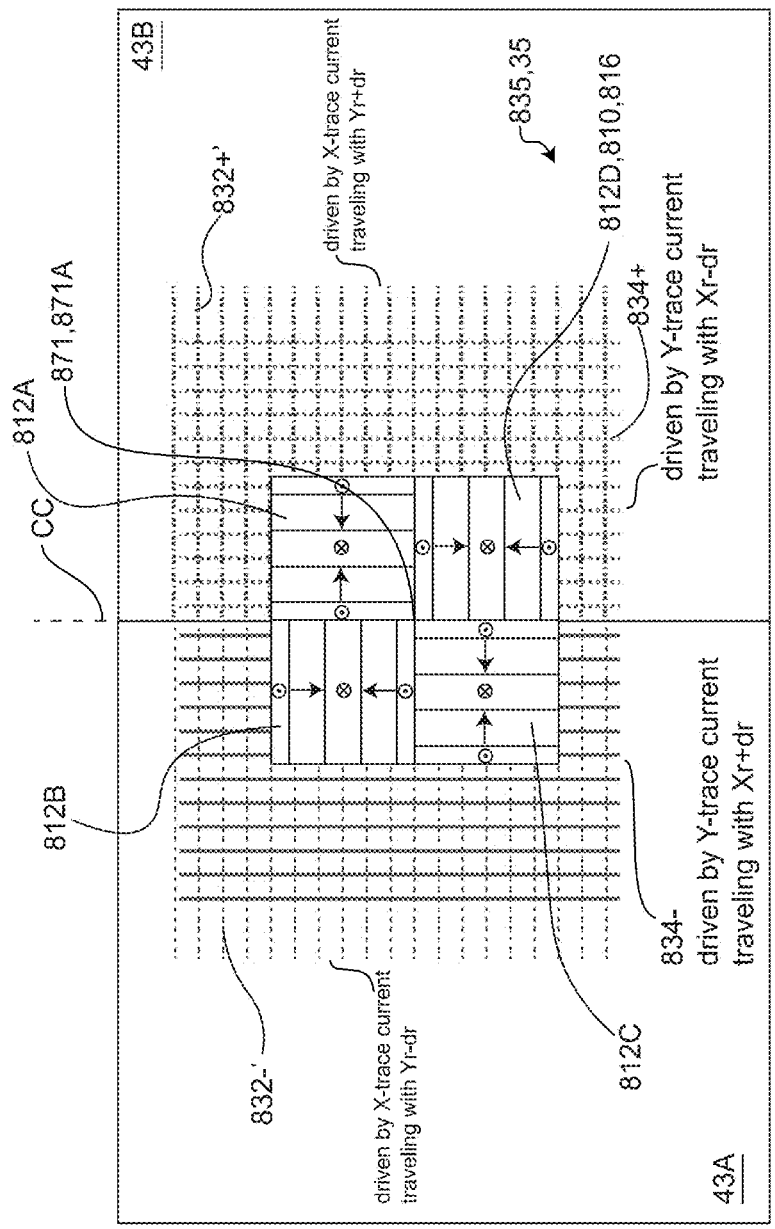

FIG. 22C shows a current driving method modified from 21G to accommodate the left-handed magnet array assembly 816. In FIG. 22C, magnet array assembly 816 (and its corresponding moveable stage 810) are rotated about axis 871 by a stator 830 comprising a coil assembly 835, which comprises first and second pluralities of x-traces 832−', 832+' and first and second pluralities of y-traces 834−, 834+, similar to the system described in FIG. 21G. First and second pluralities of x-traces 832+, 832− may be located on the same or different layers (e.g. at the same or different stator-z locations). First and second pluralities of y-traces 834+, 834− may be located on the same or different layers (e.g. at the same or different stator-z locations). However, for the left-handed magnet array assembly 816, the current driven into these traces is different than in FIG. 21G. More particularly, in FIG. 22C, y-traces 834− are driven with y-current phases $i_{jy}$ (and generate corresponding magnetic fields) which travel with $x_r+d_r$ and y-traces 834+ are driven with y-current phases $i_{jy}$ (and generate corresponding magnetic fields) which travel with $x_r-d_r$. The x-current phases driven into coil traces 832−' and 832+' may be similar to those driven into coil traces 732−' and 732+' for the FIG. 21G described above. Using these current driving methods shown in FIG. 22C, magnet array assembly 816 will rotate counter-clockwise (in the view of FIG. 22C), when $d_r$ is ramping up and clockwise when $d_r$ is ramping down.

Figure 22D:
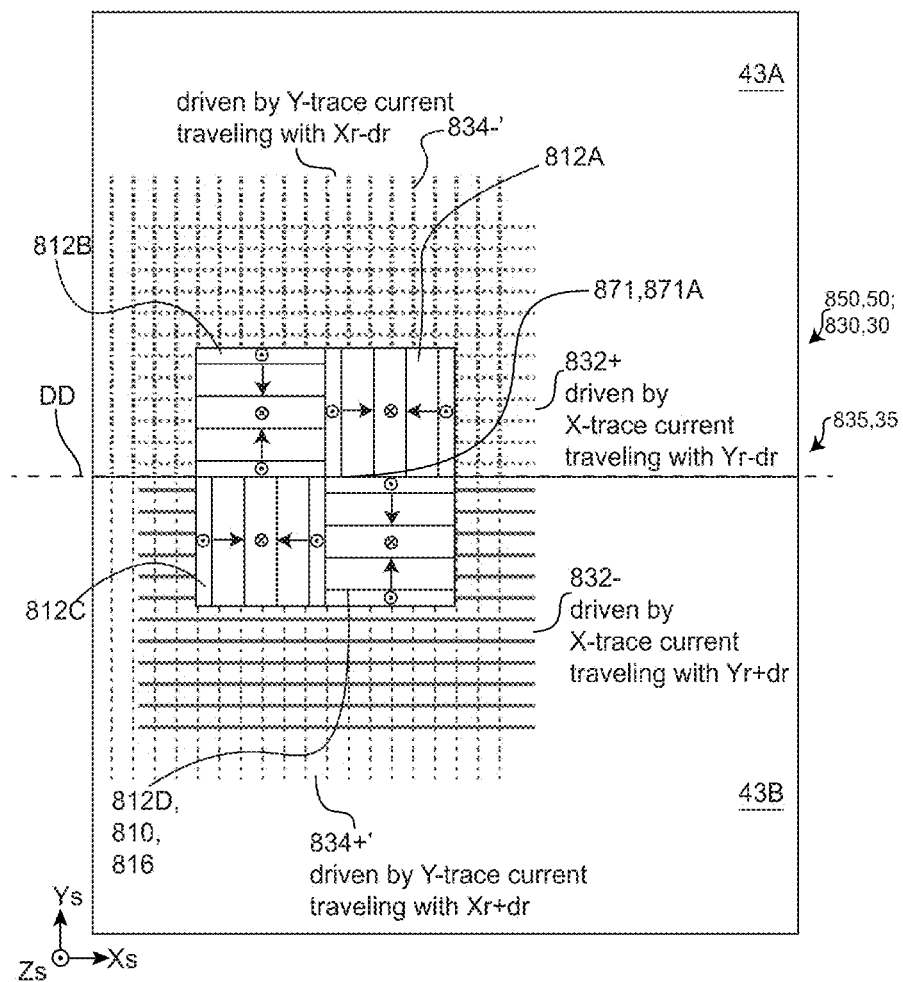

FIG. 22D shows a current driving method modified from FIG. 21H to accommodate the left-handed magnet array assembly 816. In FIG. 22D, magnet array assembly 816 (and its corresponding moveable stage 810) are rotated about axis 871 by a stator 830 comprising a coil assembly 835, which comprises first and second pluralities of x-traces 832−, 832+ and first and second pluralities of y-traces 834−', 834+', similar to the system described in FIG. 21H. First and second pluralities of x-traces 832+, 832− may be located on the same or different layers (e.g. at the same or different stator-z locations). First and second pluralities of y-traces 834+', 834−' may be located on the same or different layers (e.g. at the same or different stator-z locations). However, for the left-handed magnet array assembly 816, the current driven into these traces is different than in FIG. 21H. More particularly, in FIG. 22C, x-traces 832− are driven with x-current phases $i_{kx}$ (and generate corresponding magnetic fields) which travel with $y_r+d_r$ and x-traces 832+ are driven with x-current phases $i_{kx}$ (and generate corresponding magnetic fields) which travel with $y_r-d_r$. The y-current phases driven into coil traces 834−' and 834+' may be similar to those driven into coil traces 734−' and 734+' for the FIG. 21H described above. Using these current driving methods shown in FIG. 22D, magnet array assembly 816 will rotate counter-clockwise (in the view of FIG. 22D), when $d_r$ is ramping up and clockwise when $d_r$ is ramping down.

Figure 22E:
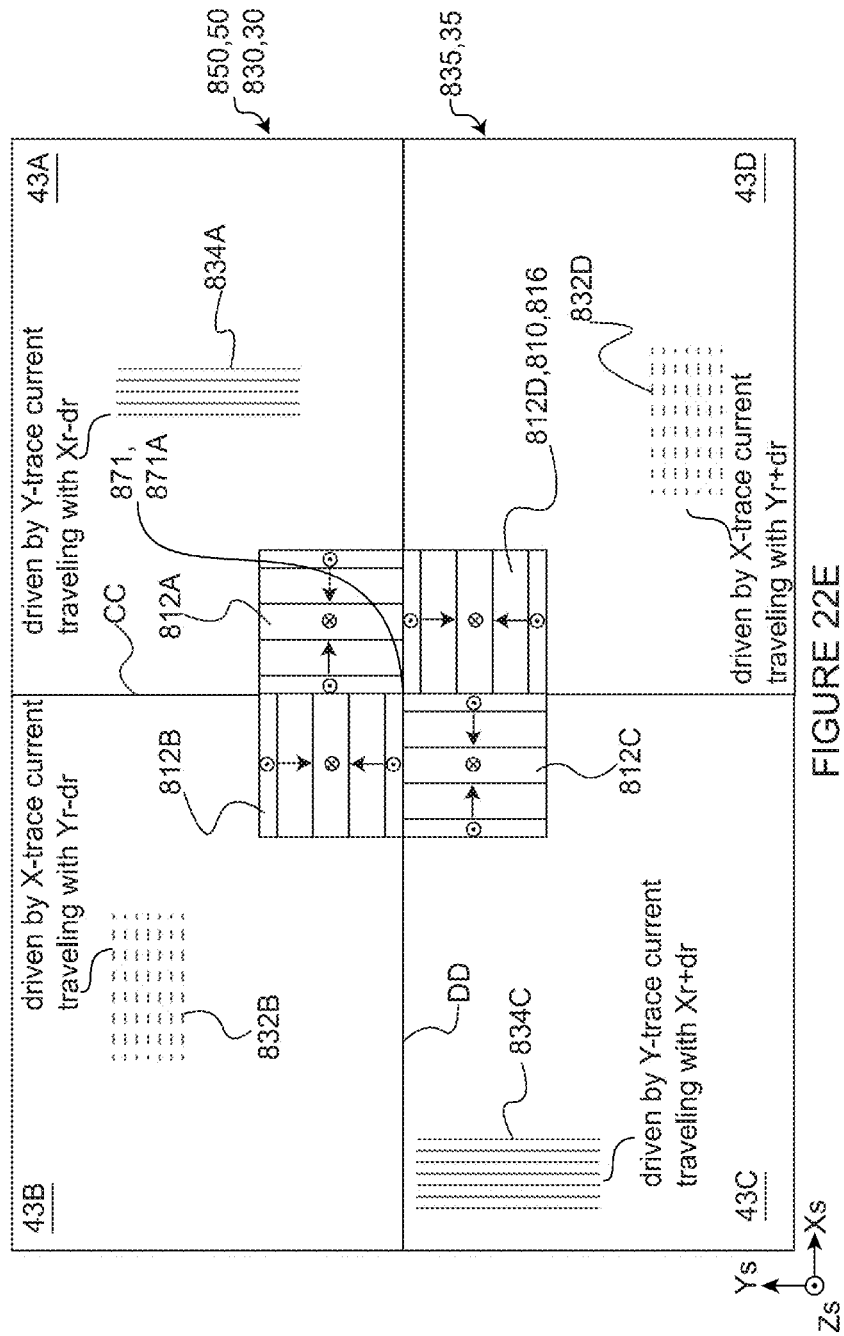

FIG. 22E shows a current driving method modified from FIG. 21J to accommodate the left-handed magnet array assembly 816. In FIG. 22E, magnet array assembly 816 (and its corresponding moveable stage 810) are rotated about axis 871 by a stator 830 comprising a coil assembly 835, which comprises four independently driven current excitation regions 43A-43D. The FIG. 22E illustration shows notional dividing planes CC, DD which respectively extend in the stator-y/stator-z and stator-x/stator-z directions and the intersection of planes CC/DD coincides with stator-z oriented axis 871 in the stage-x-stage-y center 871A of magnet array assembly 816 and/or moveable stage 810. Stator-z oriented axis 871 is coincident with the intersection of excitation regions 43A-43D—i.e. a corner of each of excitation regions 43A-43D is located at axis 871. Inside stator coil assembly 835 of the FIG. 22E embodiment, y-traces 834A in excitation region 43A are driven with y-current phases $i_{jy}$ (and generate corresponding magnetic fields) which travel with $x_r-d_r$, x-traces 832B in excitation region 43B are driven with x-current phases $i_{kx}$ (and generate corresponding magnetic fields) which travel with $y_r-d_r$, y-traces 834C in excitation regions 43C are driven with y-current phases $i_{jy}$ (and generate corresponding magnetic fields) which travel with $x_r+d_r$ and x-traces 732D in excitation region 43D are driven with x-current phases $i_{kx}$ (and generate corresponding magnetic fields) which travel with $y_r+d_r$. For the sake of drawing clarity, only partial coil traces are shown in excitation regions 43A-43D of the FIG. 22E illustration, but coil traces 834A, 832B, 834C, 832D may be distributed throughout at least a portion of their respective excitation regions 43A-43D. The current phases driven into the coil traces in each of excitation regions 43A-43D create traveling magnetic field waves that move in different directions. When $d_r$ is positively ramping up (i.e. increasing its value with time): the magnetic field traveling wave generated by current phases driven in y-coil traces 834A (region 43A) will pull 1D magnet array 812A in the negative stator-x direction; the magnetic field traveling wave generated by current phases driven in x-coil traces 832B (region 43B) will pull 1D magnet array 812B in the negative stator-y direction; the magnetic field traveling wave generated by current phases drive in y-coil traces 834C (region 43C) will pull 1D magnet array 812C in the positive stator-x direction; and the magnetic field traveling wave generated by current phases driven in x-coil traces 832D (region 43D) will pull 1D magnet array 812D in the positive stator-y direction. Consequently, magnet array assembly 816 will rotate around its central z-oriented axis 871 in a counter-clockwise direction. For example, when $d_r$ increases by $\lambda$, magnet array assembly 816 will rotate around the stator-z oriented axis 871 by 90°. If $d_r$ is negatively ramping (i.e. decreasing its value with time), magnet array assembly 816 will rotate around the stator-z oriented axis 871 in a clockwise direction.

Figure 22F:
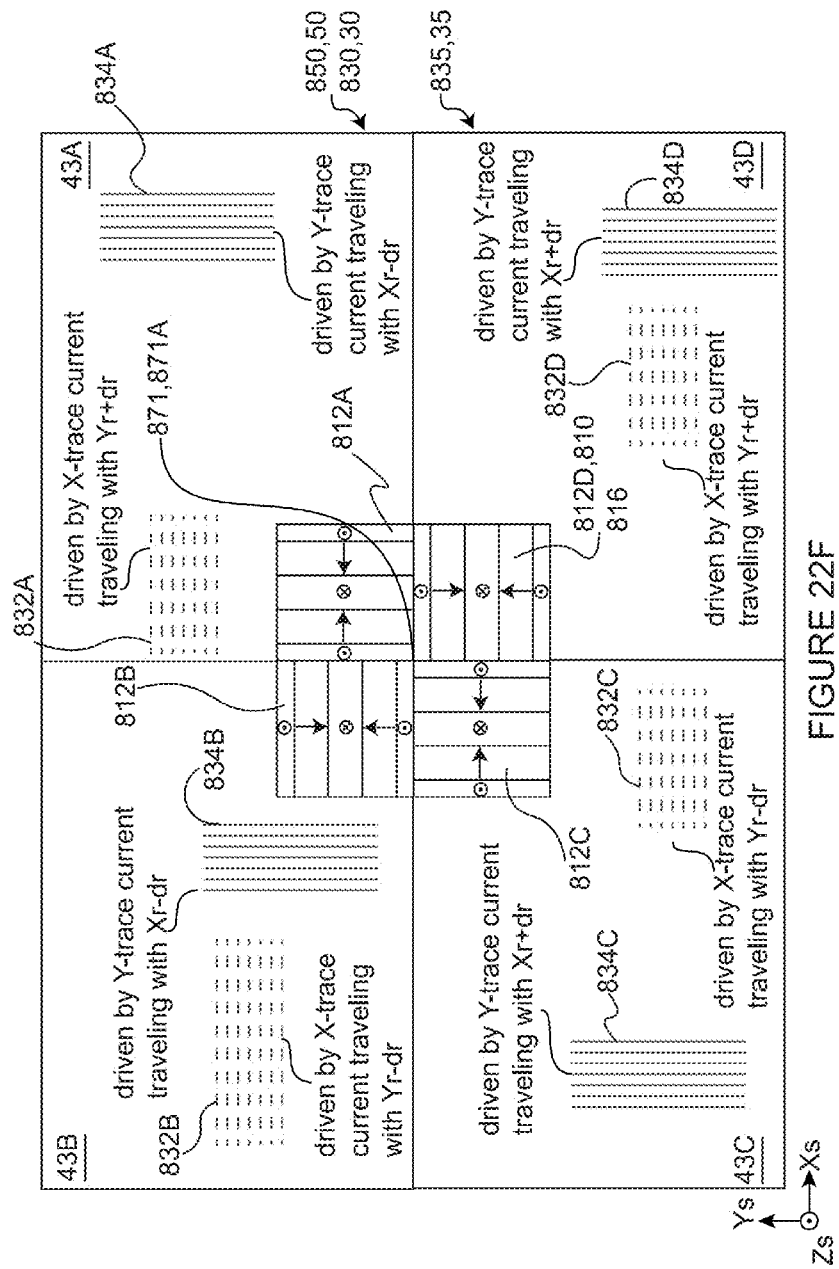

FIG. 22F shows a current driving method similar to FIG. 21K for left-handed magnet array assembly 816. In FIG. 22F, magnet array assembly 816 (and its corresponding moveable stage 810) are rotated about axis 871 by a stator 830 comprising a coil assembly 835, which comprises four independently driven current excitation regions 43A-43D having features similar to those of FIG. 22E. Inside stator coil assembly 835 of the FIG. 22F embodiment, y-traces 834A in excitation region 43A are driven with y-current phases $i_{jy}$ (and generate corresponding magnetic fields) which travel with $x_r-d_r$, x-traces 832A in excitation region 43A are driven with x-current phases $i_{kx}$ (and generate corresponding magnetic fields) which travel with $y_r+d_r$, x-traces 832B in excitation region 43B are driven with x-current phases $i_{kx}$ (and generate corresponding magnetic fields) which travel with $y_r-d_r$, y-traces 834B in excitation region 43B are driven with y-current phases $i_{jy}$ (and generate corresponding magnetic fields) which travel with $x_r-d_r$, y-traces 834C in excitation regions 43C are driven with y-current phases $i_{jy}$ (and generate corresponding magnetic fields) which travel with $x_r+d_r$, x-traces 832C in excitation region 43C are driven with x-current phases $i_{kx}$ (and generate corresponding magnetic fields) which travel with $y_r-d_r$, x-traces 732D in excitation region 43D are driven with x-current phases $i_{kx}$ (and generate corresponding magnetic fields) which travel with $y_r+d_r$ and y-traces 834D in excitation region 43D are driven with y-current phases $i_{jy}$ (and generate corresponding magnetic fields) which travel with $x_r+d_r$. For the sake of drawing clarity, only partial coil traces are shown in excitation regions 43A-43D of the FIG. 22F illustration, but coil traces 834A, 832B, 834C, 832D may be distributed throughout at least a portion of their respective excitation regions 43A-43D. The coil traces 832A-832D and 834A-834D in excitation regions 43A-43D and their corresponding drive current phases $i_{kx}$, $i_{jy}$ are the same as coil traces 732A-732D and 734A-734D in excitation regions 43A-43D and corresponding drive current phases $i_{kx}$, $i_{jy}$ of the FIG. 21K embodiment. As a result, when $d_r$ is positively ramping up, magnet array assembly 816 and its corresponding moveable stage 810 will rotate counter-clockwise and when $d_r$ is negatively ramping down, magnet array assembly 816 and its corresponding moveable stage 810 will rotate clockwise.

The rotation techniques and coil trace assemblies 735, 835 described in FIGS. 20, 21 and 22 are described with application to magnet array assemblies 716 and 816. It will be appreciated that magnet array assembly 716 has a layout similar to magnet array assembly 416A (FIG. 5A) and that magnet array assembly 816 has a layout similar to a left-handed version of magnet array assembly 416A (FIG. 5A). Any of the rotation techniques and coil trace assemblies 735, 835 described in FIGS. 20, 21 and 22 may be used with magnet array assembly 416A (or a left-handed version thereof) and such magnet array assemblies may comprise any of the individual magnet arrays described in FIGS. 6A-6EE. FIG. 5B shows a left-handed magnet array assembly 416B that is different than magnet array assemblies 716 and 816 in that the individual magnet arrays of magnet array assembly 416B are offset and spaced apart from one another as described above. Regardless, any of the rotation techniques and coil trace assemblies 735, 835 described in FIGS. 20, 21 and 22 may be used with magnet array assembly 416B (or a right-handed version thereof) and such magnet array assemblies may comprise any of the individual magnet arrays described in FIGS. 6A-6EE, by applying the operational methods and control algorithms described herein with appropriate modification.

360° Rotation Control Methods for 2D Magnet Array Assembly

Figure 23A:
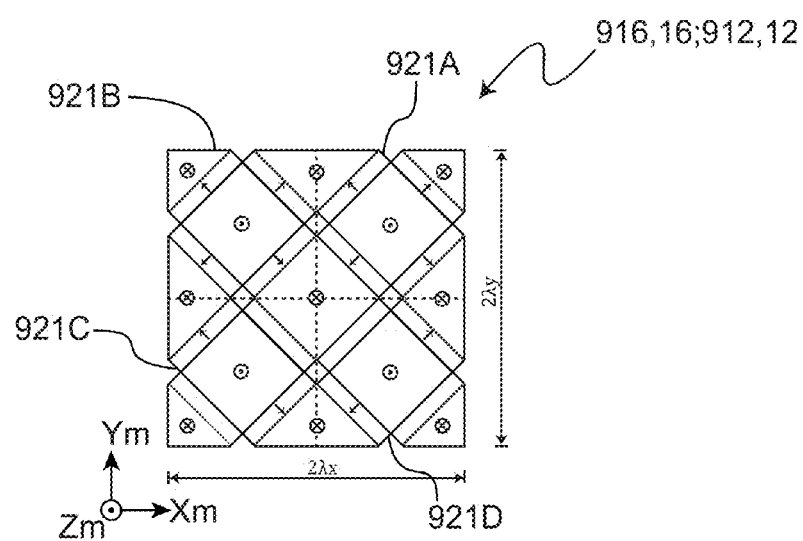
FIG. 23A shows one non-limiting example of magnet array assembly which may be used for controllable 360° rotation according to a particular embodiment.

In some embodiments, moveable stages 10 comprising 2D magnet array assemblies 16 (e.g. magnet array assemblies 16 of the type shown in FIGS. 4A, 4B, 4D) may be capable of fully controllable 360° rotation about a stator-z oriented axis using current phases driven into coil traces having any two or more directions (e.g. x-current phases $i_{kx}$ driven into x-traces 32 and y-current phases $i_{jy}$ driven into y-traces 34). Such x-current phases $i_{kx}$ and y-current phases $i_{jy}$ could be similar to, and have any of the characteristics of, the current phases described above which vary with $y_r \pm d_r$ and $x_r \pm d_r$—see FIGS. 20A, 20B and the corresponding description and generalizations discussed above. FIG. 23A shows one non-limiting example of magnet array assembly 916 comprising a magnet array 912 which may be used for controllable 360° rotation according to a particular embodiment. Magnet array assembly 916 and magnet array 912 of the FIG. 23A embodiment comprise a plurality of sub-arrays 921. By way of non-limiting example, as shown by dashed lines in FIG. 23A, each of sub-arrays 921A, 921B, 921C, 921D may be similar to sub-array 321 of the embodiment shown in FIG. 4D. In some embodiments, each of sub-arrays 921 of magnet array assembly 916 may be similar to any of the other 2D sub-arrays 21 described herein. Generally, any 2D magnet array assembly 16 described herein can be used for the controllable 360° rotation operation, by applying the operational methods and control algorithms described herein with appropriate modification where desired. Magnet array assemblies 916 with 90° rotational symmetric property (about a z-oriented axis (e.g. axis 971)) are currently preferred.

Magnet array assembly 916 of the FIG. 23A embodiment comprises a stage-x direction dimension of $2\lambda_x$ and a stage-y direction dimension of $2\lambda_y$. In the FIG. 23A embodiment, $\lambda_x = \lambda_y = \lambda$ without loss of generality. Generally, the stage-x and stage-y direction dimensions of magnet array assembly 916 may comprise any positive integer number of its magnetic spatial period $\lambda$ and magnet array assembly 916 may comprise any positive integer number of sub-arrays 921. The magnetization directions of each magnetization segment in the FIG. 23A illustration are shown with the conventional field direction annotations. In some embodiments, the magnetization directions of each of the magnetization segments in the FIG. 23A sub-arrays 921 could be reversed (i.e. have its magnetization direction changed by 180° for each magnetization segment).

Figure 23B:
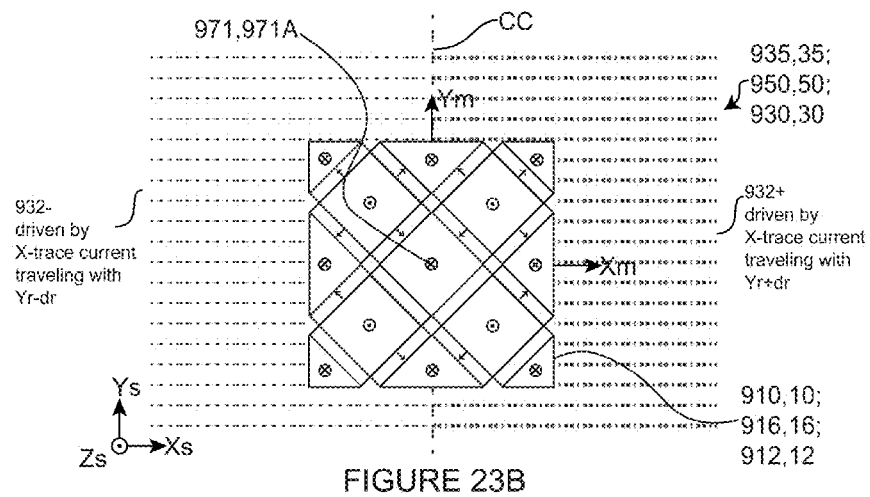

FIGS. 23B-23F illustrate possible coil traces 932, 934 and corresponding current phases $i_{kx}$, $i_{jy}$ driven therein to operate the FIG. 23A magnet array assembly 916 to achieve controllable rotation. FIG. 23B shows a top view of a displacement device 950 including a moveable stage 910 comprising the FIG. 23A magnet array assembly 916 which is moveable relative to a stator 930 comprising coil assembly 935. A stator-z oriented axis 971 extends through the stage-x-stage y center 971A of magnet array assembly 916 and/or moveable stage 910 and coincides with a notional dividing plane CC, which extends in the stator-y and stator-z directions. Inside stator coil assembly 935, there are first plurality 932− and second plurality 932+ of x-traces 932 that are elongated in the stator-x direction, where traces 932− represent the x-traces located on the negative stator-x side of dividing plane CC and traces 932+ represent the x-traces located on the positive stator-x side of dividing plane CC. Coil traces 932+ are driven with x-current phases $i_{kx}$ (and generate corresponding magnetic fields) which travel with $y_r$+$d_r$ and coil traces 932− are driven with x-current phases $i_{kx}$ (and generate corresponding magnetic fields) which travel with $y_r$−$d_r$. In practice, first and second pluralities of x-current phases $i_{kx}$ can be independently driven into x-traces 932 of two excitation regions 43 with dividing plane CC as a boundary of two excitation regions 43. Additionally or alternatively, first and second pluralities of x-current phases $i_{kx}$ can be independently driven into two pluralities (i.e. groups) of x-traces 932 inside one excitation region 43. During the rotation process, $y_r$ is not necessarily fixed in which case the techniques illustrated in FIG. 23B permit moveable stage 910 to achieve simultaneous stator-y oriented translation and rotation about central stator-z oriented axis 971. The two types of traveling magnetic field waves (i.e. those generated by the current phases driven in traces 932−) and those generated by the current phases driven in traces 932+) will move with different characteristics: one moves ahead of $y_r$ by a distance $d_r$ and the other moves behind $y_r$ by a distance $d_r$. When $d_r$ is positively ramping up (increasing its value with time), the magnetic field traveling wave generated by current driven in coil traces 932+ will tend to pull the portion of magnet array 912 that is on the positive stage-x side of plane CC toward the positive stator-y direction relative to the stage-x-stage-y center 971A of magnet array assembly 916 and/or moveable stage 910; at the same time the magnetic field traveling wave generated by current driven in coil traces 932− will pull the portion of magnet array 912 that is on the negative stage-x side of plane CC toward the negative stator-y direction relative to stage-x-stage-y center 971A of magnet array assembly 916. Consequently, magnet array assembly 916 will rotate around central stator-z oriented axis 971 in a counter-clockwise direction. If $d_r$ is negatively ramping (decreasing its value with time), magnet array assembly 916 will rotate around central stator-z oriented axis 971 in a clockwise direction.

Figure 23C:
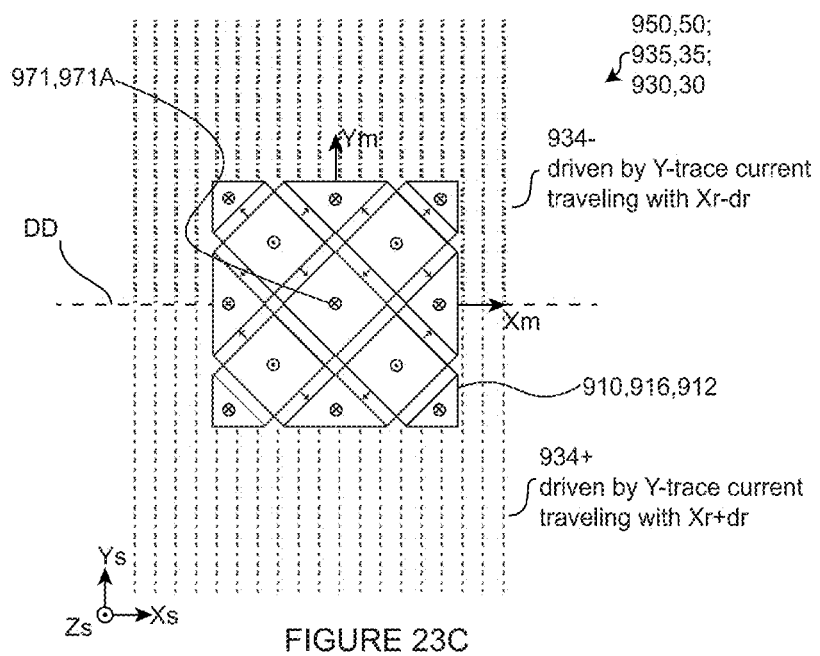

FIG. 23C illustrates a method of controllably rotating magnet array assembly 916 and its corresponding moveable stage 910 using y-current phases $i_{jy}$ driven into first and second pluralities of y-traces 934+, 934−. The FIG. 23C illustration shows a notional dividing plane DD which extends in the stator-x and stator-z directions and coincides with the stator-z oriented axis 971 in the stage-x-stage-y center 971A of magnet array assembly 916 and/or moveable sage 910. Inside stator coil assembly 935, there are first plurality 934− and second plurality 934+ of y-traces 934 that are elongated in the stator-y direction, where traces 934+ represent the y-traces located on the negative stator-y side of dividing plane DD and traces 934− represent the y-traces located on the positive stator-y side of dividing plane DD. Coil traces 934+ are driven with y-current phases $i_{jy}$ (and generate corresponding magnetic fields) which travel with $x_r$+$d_r$ and coil traces 934− are driven with y-current phases $i_{jy}$ (and generate corresponding magnetic fields) which travel with $x_r$−$d_r$. In practice, first and second pluralities of y-current phases $i_{jy}$ can be independently driven into y-traces 934 of two excitation regions 43 with dividing plane DD as a boundary of two excitation regions 43. Additionally or alternatively, first and second pluralities of y-current phases $i_{jy}$ can be independently driven into two pluralities (i.e. groups) of y-traces 934 inside one excitation region 43. During the rotation process, $x_r$ is not necessarily fixed in which case the techniques illustrated in FIG. 23C permit moveable stage 910 to achieve simultaneous stator-x oriented translation and rotation about central stator-z oriented axis 971. The two types of traveling magnetic field waves (i.e. those generated by the current phases driven in traces 934−) and those generated by the current phases driven in traces 934+) will move with different characteristics: one moves ahead of $x_r$ by a distance $d_r$ and the other moves behind $x_r$ by a distance $d_r$. When $d_r$ is positively ramping up (increasing its value with time), the magnetic field traveling wave generated by current driven in coil traces 934+ will tend to pull the portion of magnet array assembly 916 that is on the negative stage-y side of plane DD toward the positive stator-x direction relative to the stage-x-stage-y center 971A of magnet array assembly 916 and/or moveable stage 910; at the same time the magnetic field traveling wave generated by current driven in coil traces 934− will tend to pull the portion of magnet array assembly 916 that is on the positive stage-y side of plane DD toward the negative stator-x direction relative to stage-x-stage-y center 971A of magnet array assembly 916 and/or moveable stage 910. Consequently, magnet array assembly 916 will rotate around central stator-z oriented axis 971 in a counter-clockwise direction. If $d_r$ is negatively ramping (decreasing its value with time), magnet array assembly 916 will rotate around central stator-z oriented axis 971 in a clockwise direction.

Figure 23D:
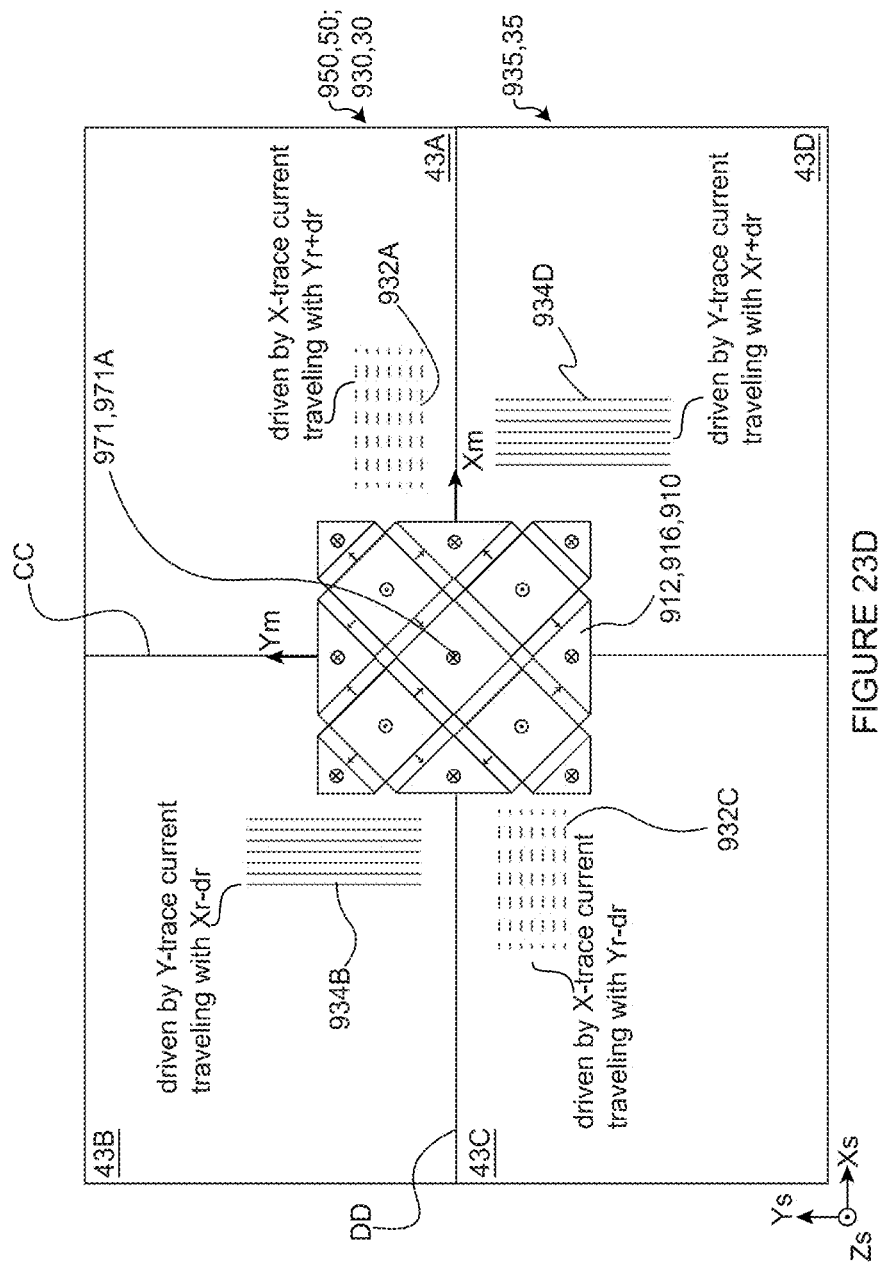

As shown in FIG. 23D, some embodiments comprise rotating magnet array assembly 916 and its corresponding moveable stage 910 at the intersection point of four independently driven current excitation regions 43A-43D. The FIG. 23D illustration shows notional dividing planes CC, DD which respectively extend in the stator-y/stator-z and stator-x/stator-z directions and the intersection of panes CC/DD coincides with the stator-z oriented axis 971 in the stage-x-stage-y center 971A of magnet array assembly 916 and/or moveable stage 910. Stator-z oriented axis 971 is coincident with the intersection of excitation regions 43A-43D—i.e. a corner of each of excitation regions 43A-43D is located at axis 971. Inside stator coil assembly 935 of the FIG. 23D embodiment, x-traces 932A in excitation region 43A are driven with x-current phases $i_{kx}$ (and generate corresponding magnetic fields) which travel with $y_r$+$d_r$, y-traces 934B in excitation region 43B are driven with y-current phases $i_{jy}$ (and generate corresponding magnetic fields) which travel with $x_r$−$d_r$, x-traces 932C in excitation regions 43C are driven with x-current phases $i_{kx}$ (and generate corresponding magnetic fields) which travel with $y_r$−$d_r$ and y-traces 934D in excitation region 43D are driven with y-current phases $i_{jy}$ (and generate corresponding magnetic fields) which travel with $x_r$+$d_r$. For the sake of drawing clarity, only partial coil traces are shown in excitation regions 43A-43D of the FIG. 23D illustration, but coil traces 932A, 934B, 932C, 934D may be distributed throughout at least a portion of their respective excitation regions 43A-43D. The current phases driven into the coil traces in each of excitation regions 43A-43D create traveling magnetic field waves that move in different directions. When $d_r$ is positively ramping up (i.e. increasing its value with time): the magnetic field traveling wave generated by current phases driven in x-coil traces 932A (region 43A) will pull the portion of magnet array assembly 916 located on the positive stage-x side of plane CC and the positive stage-y side of plane DD in the positive stator-y direction; the magnetic field traveling wave generated by current phases driven in y-coil traces 934B (region 43B) will pull the portion of magnet array assembly 916 located on the negative stage-x side of plane CC and the positive stage-y side of plane DD in the negative stator-x direction; the magnetic field traveling wave generated by current phases driven in x-coil traces 932C (region 43C) will pull the portion of magnet array assembly 916 located on the negative stage-x side of plane CC and the negative stage-y side of plane DD in the negative stator-y direction; and the magnetic field traveling wave generated by current phases driven in y-coil traces 934D (region 43D) will pull the portion of magnet array assembly 916 located on the positive stage-x side of plane CC and the negative stage-y side of plane DD in the positive stator-x direction. Consequently, magnet array assembly 916 will rotate around its central z-oriented axis 971 in a counter-clockwise direction. If $d_r$ is negatively ramping (decreasing its value with time), magnet array assembly 916 will rotate around the stator-z oriented axis 971 in a clockwise direction.

Figure 23E:
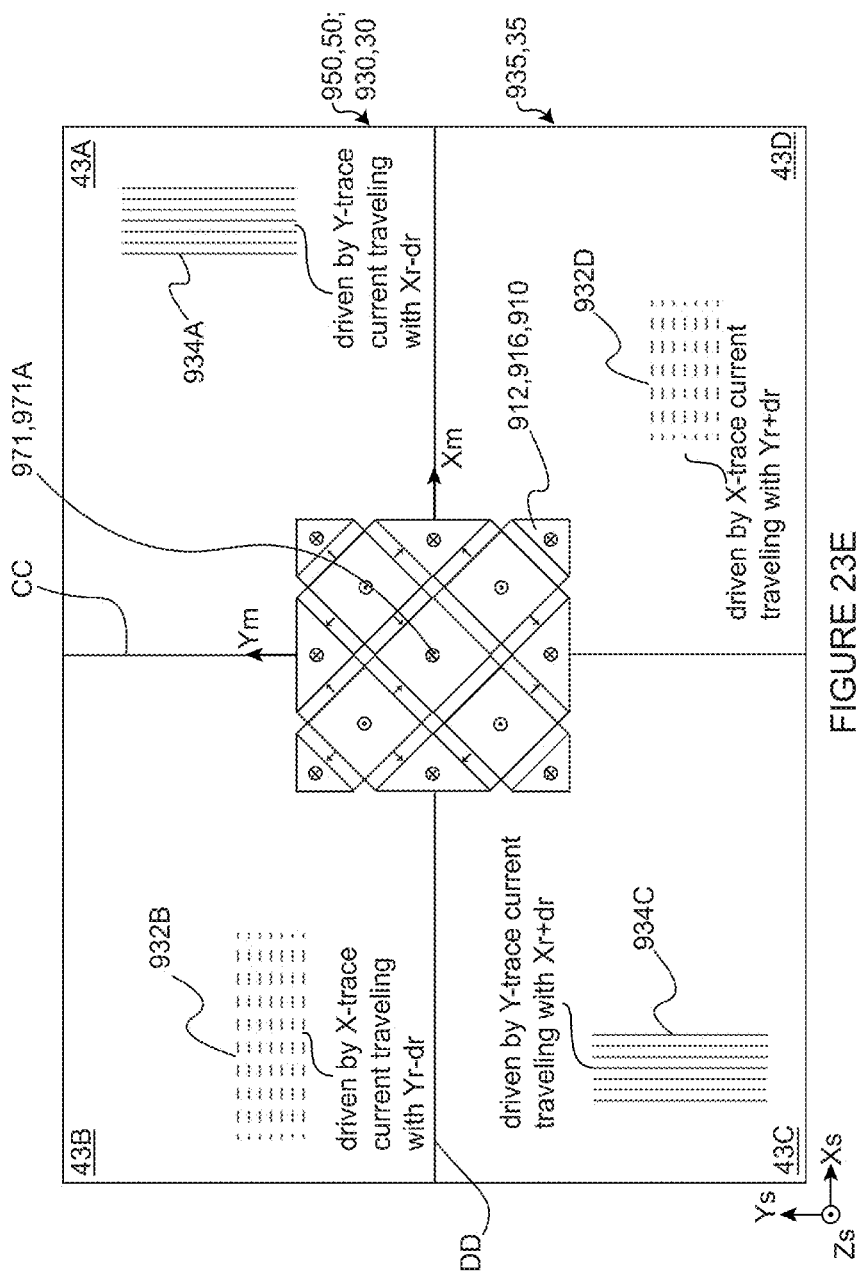

Like FIG. 23D, FIG. 23E shows another technique for rotating magnet array assembly 916 and its corresponding moveable stage 910 at the intersection point of four independently driven current excitation regions 43A-43D. The FIG. 23E illustration shows notional dividing planes CC, DD which respectively extend in the stator-y/stator-z and stator-x/stator-z directions and the intersection of planes CC, DD coincides with the stator-z oriented axis 971 in the stage-x-stage-y center 971A of magnet array assembly 916 and/or moveable stage 910. Stator-z oriented axis 971 is coincident with the intersection of excitation regions 43A-43D—i.e. a corner of each of excitation regions 43A-43D is located at axis 971. Inside stator coil assembly 935 of the FIG. 23E embodiment, y-traces 934A in excitation region 43A are driven with y-current phases $i_{jy}$ (and generate corresponding magnetic fields) which travel with $x_r$–$d_r$, x-traces 932B in excitation region 43B are driven with x-current phases $i_{kx}$ (and generate corresponding magnetic fields) which travel with $y_r$–$d_r$, y-traces 934C in excitation regions 43C are driven with y-current phases $i_{jy}$ (and generate corresponding magnetic fields) which travel with $x_r$+$d_r$ and x-traces 932D in excitation region 43D are driven with x-current phases $i_{kx}$ (and generate corresponding magnetic fields) which travel with $y_r$+$d_r$. For the sake of drawing clarity, only partial coil traces are shown in excitation regions 43A-43D of the FIG. 23E illustration, but coil traces 934A, 932B, 934C, 932D may be distributed throughout at least a portion of their respective excitation regions 43A-43D. The current phases driven into the coil traces in each of excitation regions 43A-43D create magnetic field waves that move in different directions. When $d_r$ is positively ramping up (i.e. increasing its value with time): the magnetic field traveling wave generated by current phases driven in y-coil traces 934A (region 43A) will pull the portion of magnet array assembly 916 on the positive stage-x side of plane CC and on the positive stage-y side of plane DD in the negative stator-x direction; the magnetic field traveling wave generated by current phases driven in x-coil traces 932B (region 43B) will pull the portion of magnet array assembly 916 on the negative stage-x side of plane CC and on the positive stage-y side of plane DD in the negative stator-y direction; the magnetic field traveling wave generated by current phases drive in y-coil traces 934C (region 43C) will pull the portion of magnet array assembly 916 on the negative stage-x side of plane CC and on the negative stage-y side of plane DD in the positive stator-x direction; and the magnetic field traveling wave generated by current phases driven in x-coil traces 932D (region 43D) will pull the portion of magnet array assembly 916 on the positive stage-x side of plane CC and on the negative stage-y side of plane DD in the positive stator-y direction. Consequently, magnet array assembly 916 will rotate around its central z-oriented axis 971 in a counter-clockwise direction. If $d_r$ is negatively ramping (i.e. decreasing its value with time), magnet array assembly 916 will rotate around central stator-z oriented axis 971 in a clockwise direction.

FIG. 23F shows another embodiment which comprises rotating magnet array assembly 916 and its corresponding moveable stage 910 at the intersection point of four independently driven current excitation regions 43A-43D. The FIG. 23F embodiment may be considered to be a combination of techniques shown in FIGS. 23D and 23E. The FIG. 23F illustration shows notional dividing planes CC, DD which respectively extend in the stator-y/stator-z and stator-x/stator-z directions and the intersection of the planes CC, DD coincides with the stator-z oriented axis 971 in the stage-x-stage-y center 971A of magnet array assembly 916 and/or moveable stage 910. Stator-z oriented axis 971 is coincident with the intersection of excitation regions 43A-43D—i.e. a corner of each of excitation regions 43A-43D is located at axis 971. Inside stator coil assembly 935 of the FIG. 23F embodiment, x-traces 932A in excitation region 43A are driven with x-current phases $i_{kx}$ (and generate corresponding magnetic fields) which travel with $y_r$+$d_r$, y-traces 934A in excitation region 43A are driven with y-current phases $i_{jy}$ (and generate corresponding magnetic fields) which travel with $x_r$–$d_r$, x-traces 932B in excitation region 43B are driven with x-current phases $i_{kx}$ (and generate corresponding magnetic fields) which travel with $y_r$–$d_r$, y-traces 934B in excitation region 43B are driven with y-current phases $i_{jy}$ (and generate corresponding magnetic fields) which travel with $x_r$–$d_r$, x-traces 932C in excitation regions 43C are driven with x-current phases $i_{kx}$ (and generate corresponding magnetic fields) which travel with $y_r$–$d_r$, y-traces 934C in excitation region 43C are driven with y-current phases $i_{jy}$ (and generate corresponding magnetic fields) which travel with $x_r$+$d_r$, x-traces 932D in excitation regions 43D are driven with x-current phases $i_{kx}$ (and generate corresponding magnetic fields) which travel with $y_r$+$d_r$, and y-traces 934D in excitation region 43D are driven with y-current phases $i_{jy}$ (and generate corresponding magnetic fields) which travel with $x_r$+$d_r$. For the sake of drawing clarity, only partial coil traces are shown in excitation regions 43A-43D of the FIG. 23F illustration, but coil traces 932A-932D, 934A-934D may be distributed over corresponding layers throughout at least a portion of their respective excitation regions 43A-43D. The current phases driven into the coil traces in each of excitation regions 43A-43D create traveling magnetic field waves that move in different directions. When $d_r$ is positively ramping up (i.e. increasing its value with time): the magnetic field traveling wave generated by current phases driven in x-coil traces 932A (region 43A) will pull the portion of magnet array assembly 916 on the positive stage-x side of plane CC and the positive stage-y side of plane DD in the positive stator-y direction and the magnetic field traveling wave generated by current phases driven in y-coil traces 934A (region 43A) will pull the portion of magnet array assembly 916 on the positive stage-x side of plane CC and the positive stage-y side of plane DD in the negative stator-x direction; the magnetic field traveling wave generated by current phases driven in x-coil traces 932B (region 43B) will pull the portion of magnet array assembly 916 on the negative stage-x side of plane CC and the positive stage-y side of plane DD in the negative stator-y direction and the magnetic field traveling wave generated by current phases driven in y-coil traces 934B (region 43B) will pull the portion of magnet array assembly 916 on the negative stage-x side of plane CC and the positive stage-y side of plane DD in the negative stator-x direction; the magnetic field traveling wave generated by current phases drive in x-coil traces 932C (region 43C) will pull the portion of magnet array assembly 916 on the negative stage-x side of plane CC and the negative stage-y side of plane DD in the negative stator-y direction and the magnetic field traveling wave generated by current phases driven in y-coil traces 934C (region 43C) will pull the portion of magnet array assembly 916 on the negative stage-x side of plane CC and the negative stage-y side of plane DD in the positive stator-x direction; and the magnetic wave generated by current phases driven in x-coil traces 932D (region 43D) will pull the portion of magnet array assembly 916 on the positive stage-x side of plane CC and the negative stage-y side of plane DD in the positive stator-y direction and the magnetic field traveling wave generated by current phases driven in y-coil traces 934D (region 43D) will pull the portion of magnet array assembly 916 on the positive stage-x side of plane CC and the negative stage-y side of plane DD in the positive stator-x direction. Consequently, magnet array assembly 916 will rotate around its central z-oriented axis 971 in a counter-clockwise direction. If $d_r$ is negatively ramping (i.e. decreasing its value with time), magnet array assembly 916 will rotate around central stator-z oriented axis 971 in a clockwise direction.

Application in In-Vitro Diagnostics

Referring back to the FIG. 3 embodiment, displacement device 150 of the FIG. 3 embodiment may be used for a particular application, wherein part holder 119 carries a glass or plastic tube 119A, which may contain biological samples 119B, for example. Moveable stage 110 may, for example, carry biological samples 119B to travel between different biological sample analyzers for biological content analysis.

Figure 24:
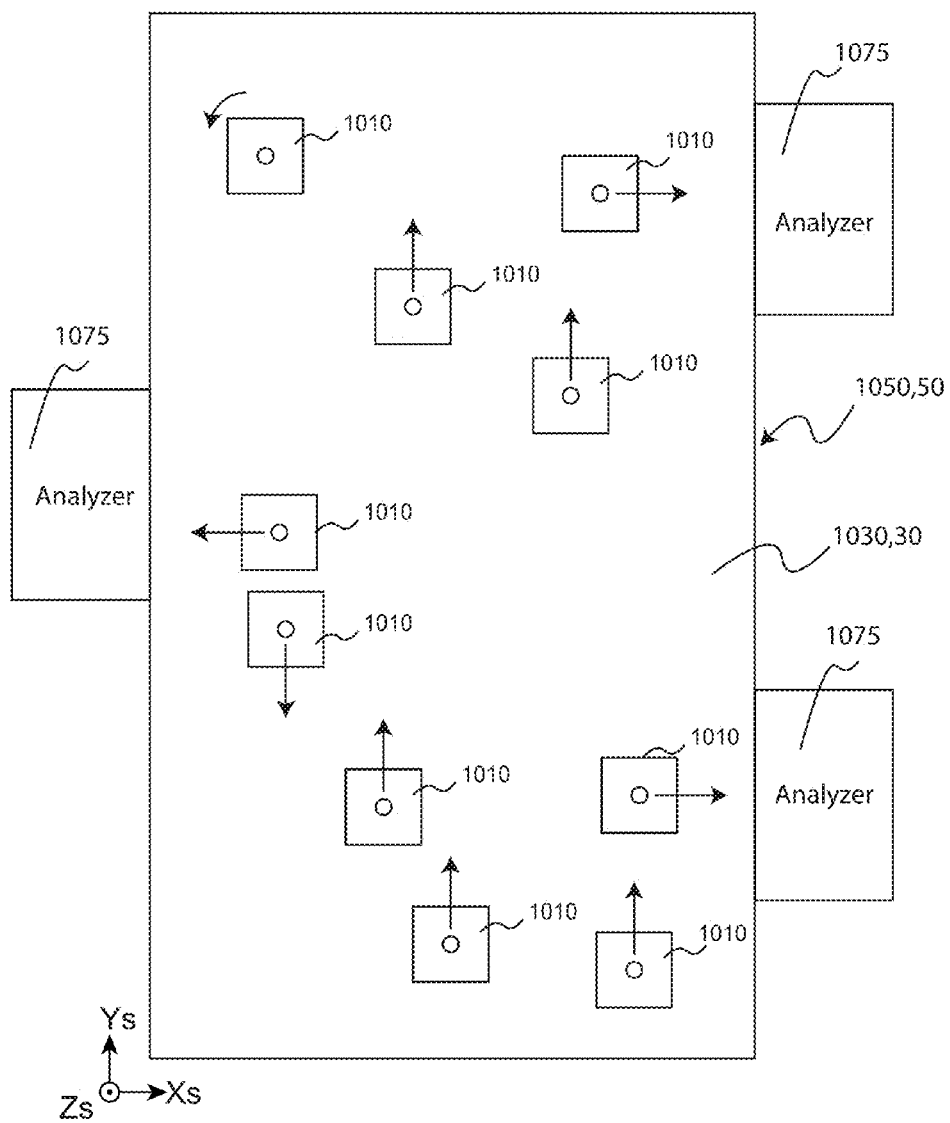
FIG. 24 depicts another exemplary embodiment showing a displacement device of any of the types described herein used for another particular application.

FIG. 24 depicts another exemplary embodiment showing a displacement device 1050 of any of the types described herein used for another particular application. On stator 1030, there are many moveable stages 1010. Each moveable stage 1010 may carry a particular biological sample. Samples can be sent to different analyzers 1075 based on user input, such as a doctor's recommendation. As each sample may require different analysis, the moving path of each moveable stage 1010 is not necessarily the same. Moveable stages 1010 may carry samples in or out of an analyzer 1075. A moveable stage 1010 may carry samples and have a full 360° controllable rotation so that, for example, a sample label on tube 119A (FIG. 3) can be scanned (e.g. by a barcode reader, a RFID reader and/or the like) to verify its identification. Arrows in FIG. 24 show possible motion directions of each moveable stage 1010. The flexibility of moving in the stator-x and stator-y directions and rotating around a stator-z direction axis of this displacement devices make it very suitable for many applications, such as this application.

Certain implementations of the invention comprise controllers, computers and/or computer processors which execute software instructions which cause the controllers, computers and/or processors to perform a method of the invention. For example, one or more processors in a controller or computer may implement data processing steps in the methods described herein by executing software instructions retrieved from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical (non-transitory) media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a software module, controller, processor, assembly, device, component, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments are discussed herein, those of skill in the art will recognize certain modifications, permutations, additions and sub-combinations thereof. For example:

In some embodiments, a combination of skewed coil traces and slanted magnet arrays may also be usefully implemented to eliminate internal stresses in the magnetic arrays while reducing or minimizing the effects of the interaction of current carrying coil traces with higher order harmonics of the magnetic fields of the magnet arrays.

Coil traces may be fabricated using techniques other than PCB technology. Any conductor that is or may be shaped to be generally linearly elongated may be used to provide coil traces.

In this description and the accompanying claims, elements are said to overlap one another in or along a direction. When it is described that two or more objects overlap in or along the Z-direction, this usage should be understood to mean that a Z-direction-oriented line could be drawn to intersect the two or more objects.

In the embodiments described herein the stator and stage bearing surfaces are generally flat (e.g. planar). This is not necessary. In some embodiments, the stator and stage bearing surfaces may comprise complementarily curved surfaces. In the case of curved bearing surfaces, the stage-z and stator-z may be understood to be oriented parallel to the direction of the normal of such curved bearing surfaces.

In some instances, this description and the accompanying claims use the term generally to describe directions, orientations, shapes, relationships (e.g. equalities) and/ or the like. For example, a coil trace may be generally elongated in a stator-x direction or a surface may be generally planar. Such directions, orientations, shapes, relationships and/or the like should be considered to accommodate the specified directions, orientations, shapes, relationships and/or the like and/or relatively small deviations (from an operational or engineering perspective) from the specified directions, orientations, shapes, relationships and/or the like.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A displacement device comprising:
   a stator comprising a plurality of electrically conductive coils, the plurality of electrically conductive coils shaped to provide:
      a first plurality of coil traces generally elongated in a stator-x direction and distributed over at least a first portion of a first layer;
      a second plurality of coil traces generally elongated in a stator-y direction and distributed over at least a second portion of a second layer, the stator-y direction non-parallel to the stator-x direction;
      the first and second portions of the first and second layers overlapping one another in a stator-z direction, the stator-z direction generally orthogonal to both the stator-x direction and the stator-y direction;
   a moveable stage comprising one or more magnet arrays, the moveable stage moveable relative to the stator within a two-dimensional working region, the one or more magnet arrays comprising a first magnet array, the first magnet array comprising a plurality of first magnetization segments, each first magnetization segment having a corresponding first magnetization direction;
   one or more amplifiers connected to drive a plurality of currents in the plurality of electrically conductive coils;
   a controller connected to deliver signals to the one or more amplifiers and configured, by using such signals, to control the currents driven by the one or more amplifiers and to thereby cause the moveable stage to track a desired position, $(x_r, y_r)$, within the working region, where $x_r$ is a desired position of the moveable stage in the stator-x direction in the working region and $y_r$ is a desired position of the moveable stage in the stator-y direction in the working region;
   wherein:
      the controller is configured to control the currents driven by the one or more amplifiers to drive first currents, $i_x$, in at least some of the first plurality of coil traces and to drive second currents, $i_y$, in at least some of the second plurality of coil traces;
      the first currents, $i_x$, comprise a plurality of first current phases, $i_{kx}$, each first current phase, $i_{kx}$, driven into a corresponding one of the at least some of the first plurality of coil traces and phase-adjacent first current phases driven into spatially adjacent ones of the at least some of the first plurality of coil traces, where:
         k is an integer from 0 to $n_p-1$ representing a first phase index; and
         $n_p$ is a number greater than or equal to two of different effective phases in the first currents, $i_x$;
      each first current phase, $i_{kx}$, is determined based on a function $F(y_r)$, where $F(y_r)$ is a spatially periodic function of $y_r$ in the stator-y direction over the working region, with a first spatial period, $\lambda_1$;
      each first current phase, $i_{kx}$, in a particular one of the at least some of the first plurality of coil traces is out of phase, as a function of $y_r$, with one or more phase-adjacent first current phases in one or more spatially adjacent ones of the at least some of the first plurality of coil traces by a first spatial phase difference $$\frac{\lambda_1}{2n_p};$$

the second currents, $i_y$, comprise a plurality of second current phases, $i_{jy}$, each second current phase, $i_{jy}$, driven into a corresponding one of the at least some of the second plurality of coil traces and phase-adjacent second current phases driven into spatially adjacent ones of the at least some of the second plurality of coil traces, where:
   j is an integer from 0 to $m_p-1$ representing a second phase index; and
   $m_p$ is a number greater than or equal to two of different effective phases in the second currents, $i_y$;
each second current phase, $i_{jy}$, is determined based on a function $G(x_r)$, where $G(x_r)$ is a spatially periodic function of $x_r$ in the stator-x direction over the working region, with a second spatial period, $\lambda_2$; and
each second current phase, $i_{jy}$, in a particular one of the at least some of the second plurality of coil traces is out of phase, as a function of $x_r$, with one or more phase-adjacent second current phases in one or more spatially adjacent ones of the at least some of the second plurality of coil traces by a second spatial phase difference $$\frac{\lambda_2}{2m_p}.$$

2. A displacement device according to claim 1 wherein $F(y_r)$ and $G(x_r)$ are each sinusoidal functions.

3. A displacement device according to claim 1 wherein the controller is configured to determine each first current phase, $i_{kx}$, according to $$i_{kx} = A_{kx}\sin\left(\frac{y_r}{\lambda_1}2\pi - k\frac{\pi}{n_p} + \varphi_x\right)$$

where, $A_{kx}$ is an amplitude of the $k^{th}$ first current phase, $i_{kx}$, and $\varphi_x$ is an arbitrary phase offset, and to determine each second current phase, $i_{jy}$, according to $$i_{jy} = A_{jy}\sin\left(\frac{x_r}{\lambda_2}2\pi - j\frac{\pi}{m_p} + \varphi_y\right)$$

where, $A_{jy}$ is an amplitude of the $j^{th}$ second current phase, $i_{jy}$, and $\varphi_y$ is an arbitrary phase offset.

4. A displacement device according to claim 3 wherein the amplitude $A_{kx}=A_x$ and the amplitude $A_x$ is the same for each of the first current phases and wherein the amplitude $A_{yj}=A_y$ and the amplitude $A_y$ is the same for each of the second current phases.

5. A displacement device according to claim 1 wherein: $F(y_r)$ varies periodically with $y_r$ over at least a first portion of the working region such that $F(y_r=y_o)$ is equal to $F(y_r=y_o+\lambda_1)$ where $y_o$ is an arbitrary position of the moveable stage in the stator-y direction inside the first portion of the working region; and $G(x_r)$ varies periodically with $x_r$ over at least a second portion of the working region such that $G(x_r=x_o)$ is equal to $G(x_r=x_o+\lambda_2)$ where $x_o$ is an arbitrary position of the moveable stage in the stator-x direction inside the second portion of the working region.

6. A displacement device according to claim 1 wherein each of the plurality of first magnetization segments is linearly elongated in a stage-x direction, each first magnetization direction of each first magnetization segment is generally orthogonal to the stage-x direction and at least two of the first magnetization segments have first magnetization directions that are different from one another and wherein the first magnetization directions of the first magnetization segments exhibit the first spatial period $\lambda_1$ over a stage-y direction width of the first magnet array, the stage-y direction non-parallel to the stage-x direction.

7. A displacement device according to claim 6 wherein the one or more magnet arrays comprise:
a second magnet array, the second magnet array comprising a plurality of second magnetization segments linearly elongated in the stage-y direction, each second magnetization direction of each second magnetization segment is generally orthogonal to the stage-y direction and at least two of the second magnetization segments have second magnetization directions that are different from one another and wherein the second magnetization directions of the second magnetization segments exhibit the second spatial period $\lambda_2$ over a stage-x direction width of the second magnet array
a third magnet array, the third magnet array comprising a plurality of third magnetization segments linearly elongated in the stage-x direction, each third magnetization direction of each third magnetization segment is generally orthogonal to the stage-x direction and at least two of the third magnetization segments have third magnetization directions that are different from one another and wherein the third magnetization directions of the third magnetization segments exhibit the first spatial period $\lambda_1$ over a stage-y direction width of the third magnet array; and
a fourth magnet array, the fourth magnet array comprising a plurality of fourth magnetization segments linearly elongated in the stage-y direction, each fourth magnetization direction of each fourth magnetization segment is generally orthogonal to the stage-y direction and at least two of the fourth magnetization segments have fourth magnetization directions that are different from one another and wherein the fourth magnetization directions of the fourth magnetization segments exhibit the second spatial period $\lambda_2$ over a stage-x direction width of the fourth magnet array.

8. A displacement device according to claim 7 wherein: the stage-y direction width of the first magnet array is equal to the first spatial period $\lambda_1$ such that the first magnetization directions of the first magnetization segments exhibit a single period over the stage-y direction width of the first magnet array; and the stage-x direction width of the second magnet array is equal to the second spatial period $\lambda_2$ such that the second magnetization directions of the second magnetization segments exhibit a single period over the stage-x direction width of the second magnet array.

9. A displacement device according to claim 3 wherein the controller is configured to determine $A_{kx}$ based, at least in part, on a desired acceleration of the moveable stage in the stage-y direction and to determine $A_{jy}$ based, at least in part, on a desired acceleration of the moveable stage in the stage-x direction.

10. A displacement device according to claim 1, wherein the controller is configured to control the one or more amplifiers to finely adjust the moveable stage in the stator-y direction when the desired position of the moveable stage in the stator-y direction, $y_r$, remains static by creating a first impulse in the first currents, $i_x$, the first impulse comprising increasing an amplitude of each first current phase, $i_{kx}$, to a first impulse amplitude for a first temporal period, $\Delta t_1$, then decreasing the amplitude of each first current phase, $i_{kx}$, back to a lower level after the first temporal period, $\Delta t_1$.

11. A displacement device according to claim 10, wherein the controller is configured to control the one or more amplifiers to finely adjust the moveable stage in the stator-x direction when the desired position of the moveable stage in the stator-x direction, $x_r$, remains static by creating a second impulse in the second currents, $i_y$, the second impulse comprising increasing an amplitude of each second current phase, $i_{jy}$, to a second impulse amplitude for a second temporal period, $\Delta t_2$, then decreasing the amplitude of each second current phase, $i_{jy}$, back a lower level after the second temporal period, $\Delta t_2$.

12. A displacement device according to claim 11 wherein a start time of the first temporal period, $\Delta t_1$, is one of before and after a start time of the second temporal period, $\Delta t_2$ and a finish time of the first temporal period, $\Delta t_1$, is the one of before and after a finish time of the second temporal period, $\Delta t_2$.

13. A displacement device according to claim 12 wherein the controller is configured to reduce the amplitude of each second current phase, $i_{jy}$, during the first temporal period, $\Delta t_1$, and to reduce the amplitude of each first current phase, $i_{kx}$, during the second temporal period, $\Delta t_2$.

14. A displacement device according to claim 1 wherein the controller is configured to control the one or more amplifiers to finely adjust the moveable stage in the stator-y direction when the desired position of the moveable stage in the stator-y direction, $y_r$, remains static by creating a first phase impulse in the first currents, $i_x$, the first phase impulse comprising increasing the phase of each first current phase, $i_{kx}$, to a first impulse phase for a first temporal period, $\Delta t_1$, then decreasing the phase of each first current phase, $i_{kx}$, back to a lower level after the first temporal period, $\Delta t_1$.

15. A displacement device according to claim 1 wherein:
the stator comprises a stator bearing layer comprising a generally planar stator bearing surface;
the moveable stage comprises a stage bearing layer comprising a generally planar stage bearing surface;
the moveable stage is arranged atop the stator such that the stage bearing surface is generally parallel with and bears against the stator bearing surface; and
the controller is configured to control the currents driven by the one or more amplifiers to drive the first currents, $i_x$, in the at least some of the first plurality of coil traces and to drive the second currents, $i_y$, in the at least some of the second plurality of coil traces, such that the first currents, $i_x$, and the second currents, $i_y$, create a magnetic field which causes a corresponding magnetic force on the one or more magnet arrays of the moveable stage, the magnetic force attracting the moveable stage toward the stator when the controller is controlling the currents driven by the one or more amplifiers to move the moveable stage between first and second locations in the working region.

16. A displacement device according to claim 1 wherein the controller is configured to modulate an amplitude $A_{kx}$ of each first current phase $i_{kx}$ based on a modulation term of the form $A_d \sin(\omega_A t + \psi_A)$ where $A_d$ is dynamic lubrication amplitude modulation amplitude, $\omega_A$ is a temporal amplitude modulation frequency and $\psi_A$ is an arbitrary constant modulation phase angle.

17. A displacement device according to claim 1 wherein the controller is configured to modulate a phase $\varphi_{kx}$ of each current phase $i_{kx}$ based on a modulation term of the form $\varphi_d \sin(\omega_\varphi t + \psi_\varphi)$ where $\varphi_d$ is dynamic lubrication phase modulation amplitude, $\omega_\varphi$ is a temporal phase modulation frequency and $\psi_\varphi$ is an arbitrary constant modulation phase angle.

18. A displacement device according to claim 1 wherein the stator-x and stator-y directions are orthogonal to one another, the first and second layers located at corresponding first and second stator-z locations, and the plurality of electrically conductive coils is shaped to provide a third plurality of coil traces distributed over at least a portion of a third layer at a corresponding third stator-z location and generally elongated in a direction in a plane of the stator-x and stator-y directions and at an angle $\alpha$ relative to the stator-x direction, wherein the controller is configured to control the currents driven by the one or more amplifiers to thereby cause the moveable stage to rotate about a stage-z oriented axis, and wherein:
the controller is configured to cause the one or more amplifiers, for a temporal period, to temporarily discontinue driving the first currents, $i_x$, or substantially reduce amplitudes of the first currents, $i_x$, in the at least some of the first plurality of coil traces and to temporarily discontinue driving the second currents, $i_y$, or substantially reduce amplitudes of the second currents, $i_y$, in the at least some of the second plurality of coil traces;
during the temporal period, the controller is configured to cause the one or more amplifiers to drive third currents, $i_\alpha$, in at least some of the third plurality to coil traces, to thereby effect rotation of the moveable stage about the stage-z oriented axis by an angular distance $\alpha$ in a first angular direction.

19. A displacement device according to claim 18 wherein the controller is configured, after effecting rotation of the moveable stage about the stage-z oriented axis by an angular distance a, to discontinue driving the third currents, $i_\alpha$, or substantially reduce amplitudes of the third currents, $i_\alpha$, in the at least some of the third plurality of coil traces and to drive one of: the first currents, $i_x$, in the at least some of the first plurality of coil traces and the second currents, $i_y$, in the at least some of the second plurality of coil traces to thereby effect rotation of the moveable stage about the stage-z oriented axis by a further angular distance (90°−α) in the first angular direction.

20. A method, in a displacement device, for controlling the movement of a moveable stage relative to a stator, the method comprising:
providing a stator comprising a plurality of electrically conductive coils, the plurality of electrically conductive coils shaped to provide:
a first plurality of coil traces generally elongated in a stator-x direction and distributed over at least a first portion of a first layer;
a second plurality of coil traces generally elongated in a stator-y direction and distributed over at least a second portion of a second layer, the stator-y direction non-parallel to the stator-x direction;
the first and second portions of the first and second layers overlapping one another in a stator-z direction, the stator-z direction generally orthogonal to both the stator-x direction and the stator-y direction;
providing a moveable stage comprising one or more magnet arrays, the moveable stage moveable relative to the stator within a two-dimensional working region, the one or more magnet arrays comprising a first magnet array, the first magnet array comprising a plurality of first magnetization segments, each first magnetization segment having a corresponding first magnetization direction;
controllably driving a plurality of currents into the plurality of electrical coils to thereby cause the moveable stage to track a desired position, $(x_r, y_r)$, within the working region, where $x_r$ is a desired position of the moveable stage in the stator-x direction in the working region and $y_r$ is a desired position of the moveable stage in the stator-y direction in the working region;
wherein controllably driving the plurality of currents into the plurality of electrical coils comprises:
driving first currents, $i_x$, in at least some of the first plurality of coil traces and driving second currents, $i_y$, in at least some of the second plurality of coil traces;
the first currents, $i_x$, comprising a plurality of first current phases, $i_{kx}$, each first current phase, $i_{kx}$, driven into a corresponding one of the at least some of the first plurality of coil traces and phase-adjacent first current phases driven into spatially adjacent ones of the at least some of the first plurality of coil traces, where:
k is an integer from 0 to $n_p-1$ representing a first phase index; and
$n_p$ is a number of different effective phases in the first currents, $i_x$;
each first current phase, $i_{kx}$, is determined based on a function $F(y_r)$, where $F(y_r)$ is a spatially periodic function of $y_r$ in the stator-y direction over the working region, with a first spatial period, $\lambda_1$;
each first current phase, $i_{kx}$, in a particular one of the at least some of the first plurality of coil traces is out of phase, as a function of $y_r$, with one or more phase-adjacent first current phases in one or more spatially adjacent ones of the at least some of the first plurality of coil traces by a first spatial phase difference $$\frac{\lambda_1}{2n_p};$$

the second currents, $i_y$, comprising a plurality of second current phases, $i_{jy}$, each second current phase, $i_{jy}$, driven into a corresponding one of the at least some of the second plurality of coil traces and phase-adjacent second current phases driven into spatially adjacent ones of the at least some of the second plurality of coil traces, where:
j is an integer from 0 to $m_p-1$ representing a second phase index; and
$m_p$ is a number of different effective phases in the second currents, $i_y$;
each second current phase, $i_{jy}$, is determined based on a function $G(x_r)$, where $G(x_r)$ is a spatially periodic function of $x_r$ in the stator-x direction over the working region, with a second spatial period, $\lambda_2$; and each second current phase, $i_{jy}$, in a particular one of the at least some of the second plurality of coil traces is out of phase, as a function of $x_r$, with one or more phase-adjacent second current phases in one or more spatially adjacent ones of the at least some of the second plurality of coil traces by a second spatial phase difference $$\frac{\lambda_2}{2m_p}.$$

* * * * *